US011425472B2

United States Patent
Komada et al.

(10) Patent No.: US 11,425,472 B2
(45) Date of Patent: Aug. 23, 2022

(54) OPERATING DEVICE FOR HUMAN-POWERED VEHICLE

(71) Applicant: SHIMANO INC., Sakai (JP)

(72) Inventors: Yasuyuki Komada, Sakai (JP); Takuma Sakai, Sakai (JP); Yuichiro Hidaka, Sakai (JP); Shun Kakehashi, Sakai (JP); Kazuma Mori, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/683,212

(22) Filed: Nov. 13, 2019

(65) Prior Publication Data

US 2021/0144453 A1 May 13, 2021

(51) Int. Cl.
*H04Q 9/00* (2006.01)
*H04B 1/034* (2006.01)
*B62K 21/26* (2006.01)
*B62K 23/06* (2006.01)
*B62K 21/12* (2006.01)

(52) U.S. Cl.
CPC ............... *H04Q 9/00* (2013.01); *H04B 1/034* (2013.01); *B62K 21/12* (2013.01); *B62K 21/26* (2013.01); *B62K 23/06* (2013.01); *H04Q 2209/88* (2013.01)

(58) Field of Classification Search
CPC ...... H04Q 9/00; H04Q 2209/88; H04B 1/034; B62K 23/06; B62K 21/12; B62K 21/26
See application file for complete search history.

(56) References Cited

U.S. PATENT DOCUMENTS

| 6,073,730 | A | 6/2000 | Abe | |
|---|---|---|---|---|
| 7,760,078 | B2* | 7/2010 | Miki | B62K 23/02 340/432 |
| 9,434,437 | B2 | 9/2016 | Van Dyke et al. | |
| 9,963,197 | B2 | 5/2018 | Watarai et al. | |
| 10,486,658 | B2 | 11/2019 | Komatsu et al. | |
| 2003/0032327 | A1 | 2/2003 | LaBonte | |
| 2008/0210046 | A1 | 9/2008 | De Perini | |
| 2009/0315692 | A1 | 12/2009 | Miki et al. | |
| 2012/0096978 | A1* | 4/2012 | Voshell | B62K 21/12 74/551.8 |
| 2014/0102237 | A1* | 4/2014 | Jordan | B62M 25/08 74/473.12 |

(Continued)

FOREIGN PATENT DOCUMENTS

| CN | 1202437 | 12/1998 |
|---|---|---|
| CN | 107303934 | 10/2017 |

(Continued)

OTHER PUBLICATIONS

Define electrical contact, Google Search, May 7, 2021 (Year: 2021), See Cite No. 7.

(Continued)

*Primary Examiner* — Thomas S McCormack
(74) *Attorney, Agent, or Firm* — Mori & Ward, LLP

(57) ABSTRACT

An operating device for a human-powered vehicle comprises a base member and circuitry. The base member includes a power-supply accommodating part configured to accommodate a power supply extending along a reference plane. The circuitry is provided to the base member to extend along an additional reference plane intersecting with the reference plane.

20 Claims, 75 Drawing Sheets

(56) References Cited

U.S. PATENT DOCUMENTS

| | | | |
|---|---|---|---|
| 2016/0311499 A1 | 10/2016 | Kasai | |
| 2017/0080993 A1 | 3/2017 | Bierwerth et al. | |
| 2017/0305395 A1 | 10/2017 | Komatsu et al. | |
| 2018/0001960 A1 | 1/2018 | Pasqua | |
| 2018/0057102 A1 | 3/2018 | Komatsu et al. | |
| 2018/0057103 A1 | 3/2018 | Komatsu et al. | |
| 2018/0057104 A1 | 3/2018 | Komatsu et al. | |
| 2019/0002057 A1 | 1/2019 | Jordan et al. | |
| 2019/0210691 A1* | 7/2019 | Cahan | B62K 23/06 |
| 2019/0382074 A1 | 12/2019 | Bierwerth et al. | |
| 2019/0382081 A1* | 12/2019 | Bierwerth | B62K 23/02 |
| 2021/0139102 A1 | 5/2021 | Komada et al. | |
| 2021/0144453 A1 | 5/2021 | Komada et al. | |

FOREIGN PATENT DOCUMENTS

| | | |
|---|---|---|
| CN | 107776814 | 3/2018 |
| DE | 102016010801 | 3/2017 |
| DE | 10 2018 009 621 | 7/2019 |
| DE | 10 2019 004 154 | 12/2019 |
| TW | M570268 U | 11/2018 |
| TW | I667168 B | 8/2019 |
| TW | I667169 | 8/2019 |

OTHER PUBLICATIONS

Office Action with Form PTO-892 Notice of References Cited issued by the United States Patent and Trademark Office for the co-pending U.S. Appl. No. 16/950,829, filed May 12, 2021.

Office Action with Form PTO-892 Notice of References Cited issued by the United States Patent and Trademark Office for the co-pending U.S. Appl. No. 16/864,165, filed May 14, 2021.

Office Action with Form PTO-892 Notice of References Cited issued by the United States Patent and Trademark Office for the co-pending U.S. Appl. No. 16/864,165, filed Nov. 9, 2021.

Define plane, Google Search, Nov. 17, 2021, See Cite No. 12.

Definition of plane, merriam-webster.com, Nov. 16, 2021, See Cite No. 12.

Definition of area, merriam-webster.com, Nov. 16, 2021, See Cite No. 12.

Define reference plane, Google Search, Nov. 16, 2021, See Cite No. 12.

Office Action with Form PTO-892 Notice of References Cited issued by the United States Patent and Trademark Office for the co-pending U.S. Appl. No. 16/683,206, filed Nov. 22, 2021.

Office Action with Form PTO-892 Notice of References Cited issued by the United States Patent and Trademark Office for the co-pending U.S. Appl. No. 16/683,200, filed Dec. 9, 2021.

Advisory Action issued by the United States Patent and Trademark Office for the co-pending application serial No. 16/864.165, filed Feb. 4, 2022.

Office Action issued by the United States Patent and Trademark Office for the co-pending U.S. Appl. No. 16/864,165, filed Feb. 15, 2022.

* cited by examiner

OPERATING DEVICE FOR
HUMAN-POWERED VEHICLE

BACKGROUND OF THE INVENTION

Field of the Invention

The present invention relates to an operating device for a human-powered vehicle.

Discussion of the Background

A human-powered vehicle includes an operating unit configured to operate an operated unit.

SUMMARY OF THE INVENTION

In accordance with a first aspect of the present invention, an operating device for a human-powered vehicle comprises a base member and circuitry. The base member includes a power-supply accommodating part configured to accommodate a power supply extending along a reference plane. The circuitry is provided to the base member to extend along an additional reference plane intersecting with the reference plane.

With the operating device according to the first aspect, it is possible to arrange the power-supply accommodating part and the circuitry along a shape of the base member.

In accordance with a second aspect of the present invention, the operating device according to the first aspect is configured so that the reference plane and the additional reference plane intersect with each other to define an intersection angle. The intersection angle is equal to or smaller than 150 degrees.

With the operating device according to the second aspect, it is possible to arrange the power-supply accommodating part and the circuitry along a shape of the base member.

In accordance with a third aspect of the present invention, the operating device according to the second aspect is configured so that With the operating device according to the third aspect, it is possible to reliably arrange the power-supply accommodating part and the circuitry along a shape of the base member.

In accordance with a fourth aspect of the present invention, the operating device according to any one of the first to third aspects further comprises an operating member pivotally coupled to the base member about a pivot axis.

With the operating device according to the fourth aspect, it is possible to operate other device by using the operating member.

In accordance with a fifth aspect of the present invention, the operating device according to the fourth aspect is configured so that at least one of the reference plane and the additional reference plane extends along the pivot axis.

With the operating device according to the fifth aspect, it is possible to arrange the power-supply accommodating part and the circuitry along a shape of the base member.

In accordance with a sixth aspect of the present invention, the operating device according to the fourth or fifth aspect is configured so that at least one of the reference plane and the additional reference plane intersects with the pivot axis.

With the operating device according to the sixth aspect, it is possible to arrange the power-supply accommodating part and the circuitry along a shape of the base member.

In accordance with a seventh aspect of the present invention, the operating device according to any one of the fourth to sixth aspects is configured so that the base member includes a first end portion configured to be coupled to a handlebar, a second end portion opposite to the first end portion, and a grip portion provided between the first end portion and the second end portion.

With the operating device according to the seventh aspect, it is possible to apply the power-supply accommodating part to a road-type and/or bar-end type operating device.

In accordance with an eighth aspect of the present invention, the operating device according to the seventh aspect is configured so that at least one of the power-supply accommodating part and the circuitry is at least partly provided at the second end portion of the base member.

With the operating device according to the eighth aspect, it is possible to utilize the second end portion of the base member as a portion to which the power-supply accommodating part is provided.

In accordance with a ninth aspect of the present invention, the operating device according to the seventh or eighth aspect is configured so that one of the power-supply accommodating part and the circuitry is at least partly provided above the other of the power-supply accommodating part and the circuitry in a mounting state where the first end portion is coupled to the handlebar.

With the operating device according to the ninth aspect, it is possible to efficiently arrange the power-supply accommodating part and the circuitry in the base member.

In accordance with a tenth aspect of the present invention, the operating device according to any one of the seventh to ninth aspect is configured so that one of the power-supply accommodating part and the circuitry at least partly overlaps with the pivot axis when viewed along the pivot axis.

With the operating device according to the tenth aspect, it is possible to utilize a surrounding area of the pivot axis as a region in which one of the power-supply accommodating part and the circuitry is provided.

In accordance with an eleventh aspect of the present invention, the operating device according to any one of the seventh to tenth aspects is configured so that one of the power-supply accommodating part and the circuitry is closer to the operating member than the other of the power-supply accommodating part and the circuitry.

With the operating device according to the eleventh aspect, it is possible to efficiently arrange the power-supply accommodating part and the circuitry in the base member.

In accordance with a twelfth aspect of the present invention, the operating device according to any one of the fourth to eleventh aspect is configured so that the base member includes a first lateral surface and a second lateral surface. The second lateral surface is provided on a reverse side of the first lateral surface along the pivot axis. One of the power-supply accommodating part and the circuitry is at least partly provided on one of the first lateral surface and the second lateral surface.

With the operating device according to the twelfth aspect, it is possible to utilize a lateral surface of the base member for one of the power-supply accommodating part and the circuitry.

In accordance with a thirteenth aspect of the present invention, the operating device according to any one of the first to twelfth aspects is configured so that the power-supply accommodating part includes a first inner surface and an insertion opening. The first inner surface extends along the reference plane and having a first outline defining a first area as viewed in a direction perpendicular to the reference plane. The insertion opening extends along an insertion opening plane non-parallel to the reference plane. The insertion opening has an opening outline defining an insertion opening area viewed in a direction perpendicular to the insertion opening plane. The first area is larger than the insertion opening area.

With the operating device according to the thirteenth aspect, it is possible to insert or remove the power supply such as a button cell shaped as a flat cylinder into or from the power-supply accommodating part.

In accordance with a fourteenth aspect of the present invention, the operating device according to the thirteenth aspects is configured so that the power-supply accommodating part includes an accommodating space and a second inner surface extending along the reference plane. The insertion opening area is defined between the first inner surface and the second inner surface. The accommodating space is at least partly defined between the first inner surface and the second inner surface.

With the operating device according to the fourteenth aspect, it is possible to ensure the accommodating space in the accommodating structure by using the first inner surface and the second inner surface.

In accordance with a fifteenth aspect of the present invention, the operating device according to the fourteenth aspect is configured so that the power-supply accommodating part includes a third inner surface extending between the first inner surface and the second inner surface. The power-supply accommodating part is at least partly defined by the first inner surface, the second inner surface, and the third inner surface. The third inner surface includes a facing part facing toward the insertion opening.

With the operating device according to the fifteenth aspect, it is possible to efficiently ensure the accommodating part by using the first inner surface, the second inner surface, and the third inner surface.

In accordance with a sixteenth aspect of the present invention, the operating device according to the fifteenth aspect further comprises an electrical contact. The electric contact is provided in at least one of the first inner surface, the second inner surface, and the third inner surface to be contactable with the power supply in a state where the power supply is accommodated in the power-supply accommodating part.

With the operating device according to the sixteenth aspect, it is possible to electrically connect the electrical contact with a positive electrode and/or a negative electrode in the accommodating part.

In accordance with a seventeenth aspect of the present invention, the operating device according to any one of the first to sixteenth aspects is configured so that the circuitry includes at least one of a communicator, an antenna, an informing unit, and a controller.

With the operating device according to the seventeenth aspect, it is possible to transmit a signal via a wireless and/or wired communication channel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a side elevational view of the operating device illustrated in FIG. 1.

DESCRIPTION OF THE EMBODIMENTS

Figure 1:
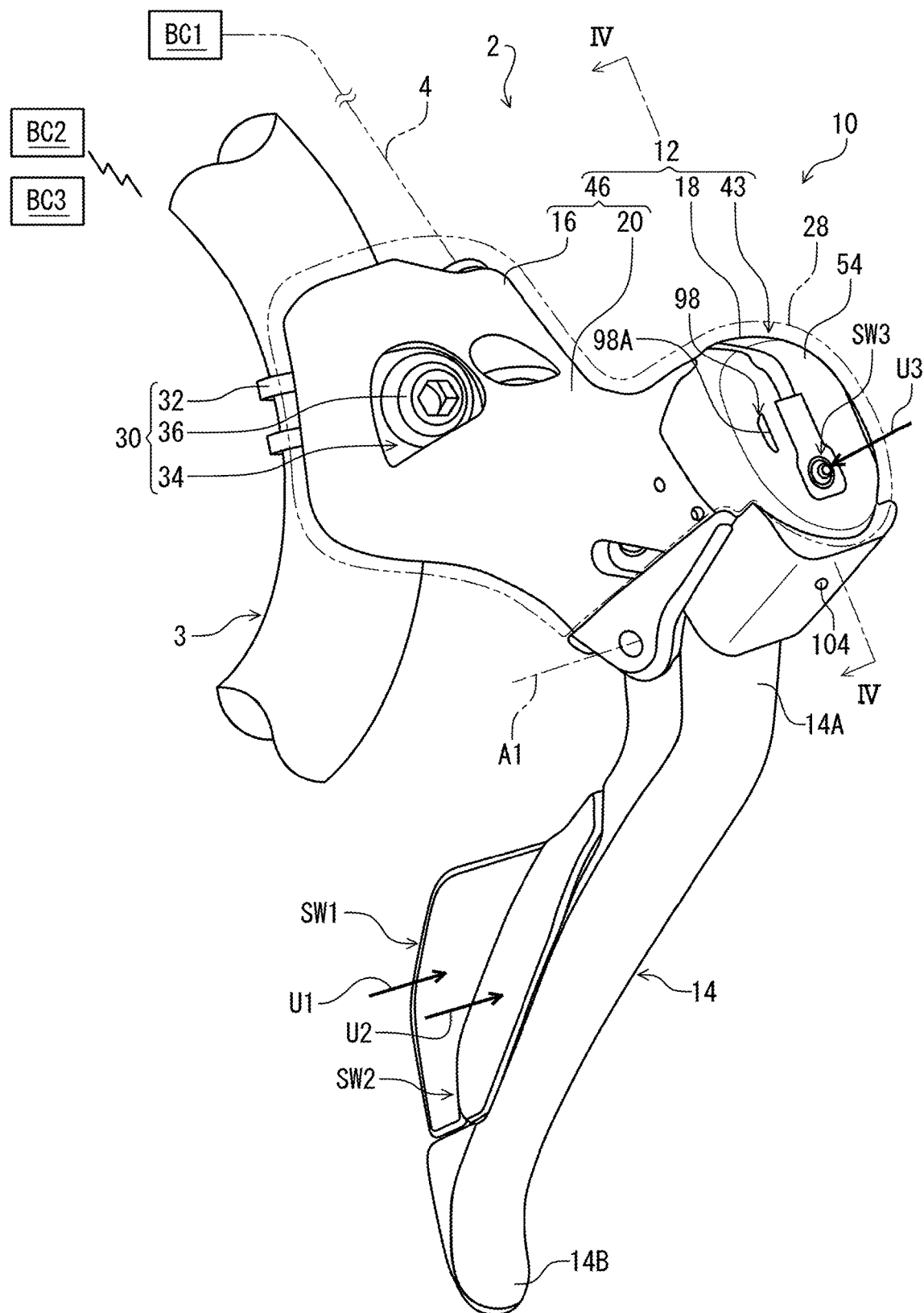
FIG. 1 is a perspective view of an operating device in accordance with a first embodiment.

The embodiment(s) will now be described with reference to the accompanying drawings, wherein like reference numerals designate corresponding or identical elements throughout the various drawings.

First Embodiment

As seen in FIG. 1, an operating or electric device 10 for a human-powered vehicle 2 is configured to be mounted to a handlebar 3. In this embodiment, the operating device 10 is configured to be mounted to a drop-down handlebar.

However, structures of the operating device 10 can be applied to other operating devices mounted to other type of handlebars such as a flat handlebar, a time trial handlebar, and a bull horn handlebar.

For example, the human-powered vehicle 2 is a vehicle to travel with a motive power including at least a human power of a user who rides the human-powered vehicle 2 (i.e., rider). The human-powered vehicle 2 has an arbitrary number of wheels. For example, the human-powered vehicle 2 has at least one wheel. In this embodiment, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle, a tricycle, and a kick scooter. In this embodiment, the human-powered vehicle 2 is a bicycle. An electric assisting system including an electric motor can be applied to the human-powered vehicle 2 (e.g., the bicycle) to assist muscular motive power of the user. Namely, the human-powered vehicle 2 can be an E-bike.

The operating device 10 is operatively coupled to at least one device to operate the at least one device. In this embodiment, the operating device 10 is operatively coupled to an operated device BC1 such as a brake device. The operating device 10 is operatively coupled to the operated device BC1 via a hydraulic hose 4. However, the operating device 10 can be operatively coupled to a mechanical component such as a brake device via a mechanical control cable including an inner wire. The operated device BC1 can include devices other than a brake device.

The operating device 10 is electrically connected to an electric component BC2 and an additional electric component BC3. Thus, the operating device 10 can also be referred to as an electric device 10. In this embodiment, the operating device 10 is wirelessly connected to the electric component BC2 and the additional electric component BC3. However, the operating device 10 is connected to the electric component BC2 and the additional electric component BC3 via an electrical control cable.

Examples of the electric component BC2 and the additional electric component BC3 include an additional or satellite operating device, an adjustable seatpost, a suspension, a gear changing device, a brake device, a lighting device, and a display device. In this embodiment, the electric component BC2 includes a gear shifting device such as a derailleur. The additional electric component BC3 includes an adjustable seatpost. However, the electric component BC2 and the additional electric component BC3 are not limited to the above devices.

In this embodiment, the operating device 10 is a right-hand side operating/control device configured to be operated by the rider's right hand to actuate the operated device BC1. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or seat) in the human-powered vehicle 2 with facing the handlebar 3. Accordingly, these terms, as utilized to describe the operating device 10 or other components, should be interpreted relative to the human-powered vehicle 2 equipped with the operating device 10 as used in an upright riding position on a horizontal surface.

The operating device 10 comprises switches SW1, SW2, and SW3. The switch SW1 is configured to be activated in response to a user input U1. The switch SW2 is configured to be activated in response to a user input U2. The switch SW3 is configured to be activated in response to a user input U3. In this embodiment, the electric component BC2 is configured to be operated in response to the user inputs U1 and U2 of the switches SW1 and SW2. The additional electric component BC3 is configured to be operated in response to the user input U3 of the switch SW3. For example, the electric component BC2 is configured to upshift and downshift in response to the user inputs U1 and U2 received by the switches SW1 and SW2. The additional electric component BC3 is configured to change a state of the additional electric component BC3 between a lock state and an adjustable state in response to the user input U3 received by the switch SW3. However, each of the switches SW1 to SW3 can be used to operate other devices.

Figure 2:
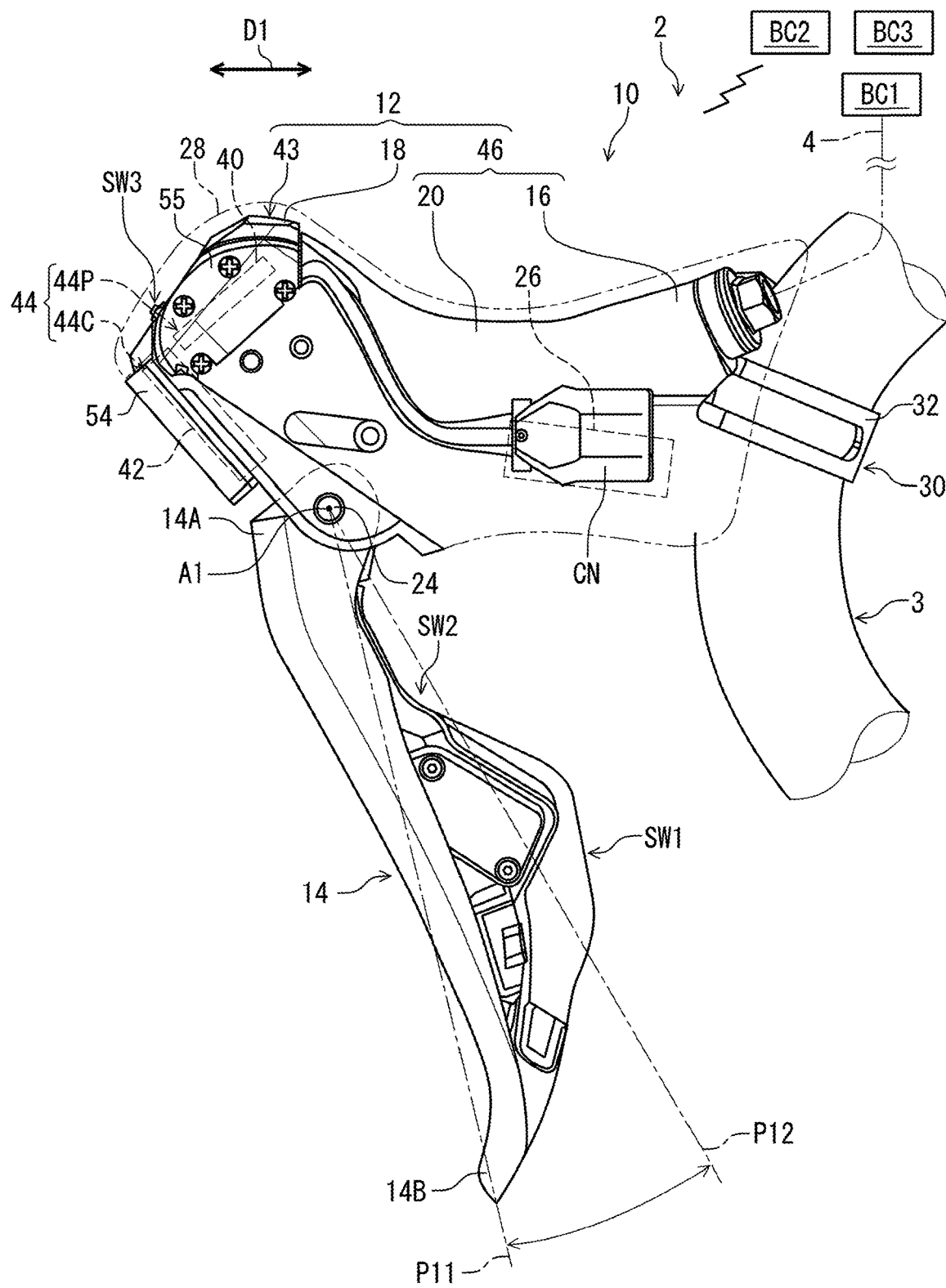
FIG. 2 is a side elevational view of the operating device illustrated in FIG. 1.

As seen in FIG. 2, the operating device 10 for the human-powered vehicle 2 comprises a base member 12. The electric device 10 further comprises at least one of an operating member and an actuated member movable relative to the base member 12. In this embodiment, the operating device 10 for the human-powered vehicle 2 comprises an operating member 14. The base member 12 extends in a longitudinal direction D1. The base member 12 includes a first end portion 16 and a second end portion 18. The first end portion 16 is configured to be coupled to the handlebar 3. The second end portion 18 is opposite to the first end portion 16. The second end portion 18 is opposite to the first end portion 16 in the longitudinal direction D1. The second end portion 18 constitutes a free end portion of the base member 12. The base member 12 includes a grip portion 20 provided between the first end portion 16 and the second end portion 18. The grip portion 20 is provided between the first end portion 16 and the second end portion 18 in the longitudinal direction D1.

The operating member 14 is movably coupled to the base member 12. The operating member 14 is pivotally coupled to the base member 12 about a pivot axis A1. The pivot axis A1 is provided closer to the second end portion 18 than to the first end portion 16. The operating member 14 includes a proximal end portion 14A and a distal end portion 14B opposite to the proximal end portion 14A. The operating member 14 extends from the proximal end portion 14A to the distal end portion 14B. The proximal end portion 14A is closer to the pivot axis A1 than the distal end portion 14B. The distal end portion 14B is farther from the proximal end portion 14A than the pivot axis A1 in a longitudinal direction of the operating member 14. In this embodiment, the distal end portion 14B is the farthest from the proximal end portion 14A in the operating member 14 and constitutes a free end portion of the operating member 14. The distal end portion 14B is provided below the pivot axis A1 and the proximal end portion 14A in a mounting state where the first end portion 16 is coupled to the handlebar 3.

The operating member 14 is pivotable relative to the base member 12 between a rest position P11 and an operated position P12 about the pivot axis A1. The operating device 10 includes a pivot shaft 24 defining the pivot axis A1. The pivot shaft 24 pivotally couples the operating member 14 to the base member 12. In this embodiment, the rest position P11 and the operated position P12 are defined by the pivot axis A1 and the distal end portion 14B.

In the present application, the term "rest position" as used herein refers to a position at which a movable part such as the operating member 14 remains stationary in a state where the movable part is not operated by the user. The tem' "operated position" as used herein refers to a position at which the movable part has been operated by the user to perform the operation of a device such as the operated device BC1.

The base member 12 includes a hydraulic unit 26 provided in the base member 12. The hydraulic unit 26 is configured to generate hydraulic pressure in response to a movement of the operating member 14. For example, the hydraulic unit 26 includes a cylinder bore, a piston, and a reservoir. Since the hydraulic unit 26 includes structures which have been known, they will not be described in detail here for the sake of brevity. The operating member 14 can be operatively coupled to another structure instead of the hydraulic unit 26. For example, the operating member 14 can be operatively coupled to a mechanical control cable such as a Bowden cable so as to operate the operated device BC1.

The operating device 10 further comprises a grip cover 28. The grip cover 28 is configured to be attached to the base member 12 so as to at least partly cover the base member 12 in a state where the grip cover 28 is attached to the base member 12. For example, the grip cover 28 is made of a non-metallic material such as an elastic material. Examples of the elastic material include rubber. A rider sometimes grips the base member 12 (e.g., the grip portion 20) and leans on the base member 12 (e.g., the grip portion 20) through the grip cover 28 during riding. The grip cover 28 can be omitted from the operating device 10.

The switches SW1 and SW2 are mounted to the operating member 14 to be movable relative to the base member 12 along with the operating member 14. The switch SW3 is mounted to the base member 12. The switch SW3 is provided to the second end portion 18. The switch SW3 is provided between the base member 12 and the grip cover 28. The switch SW3 is configured to be operated by the user via the grip cover 28. However, the positions of the switches SW1, SW2, and SW3 are not limited to this embodiment.

Figure 3:
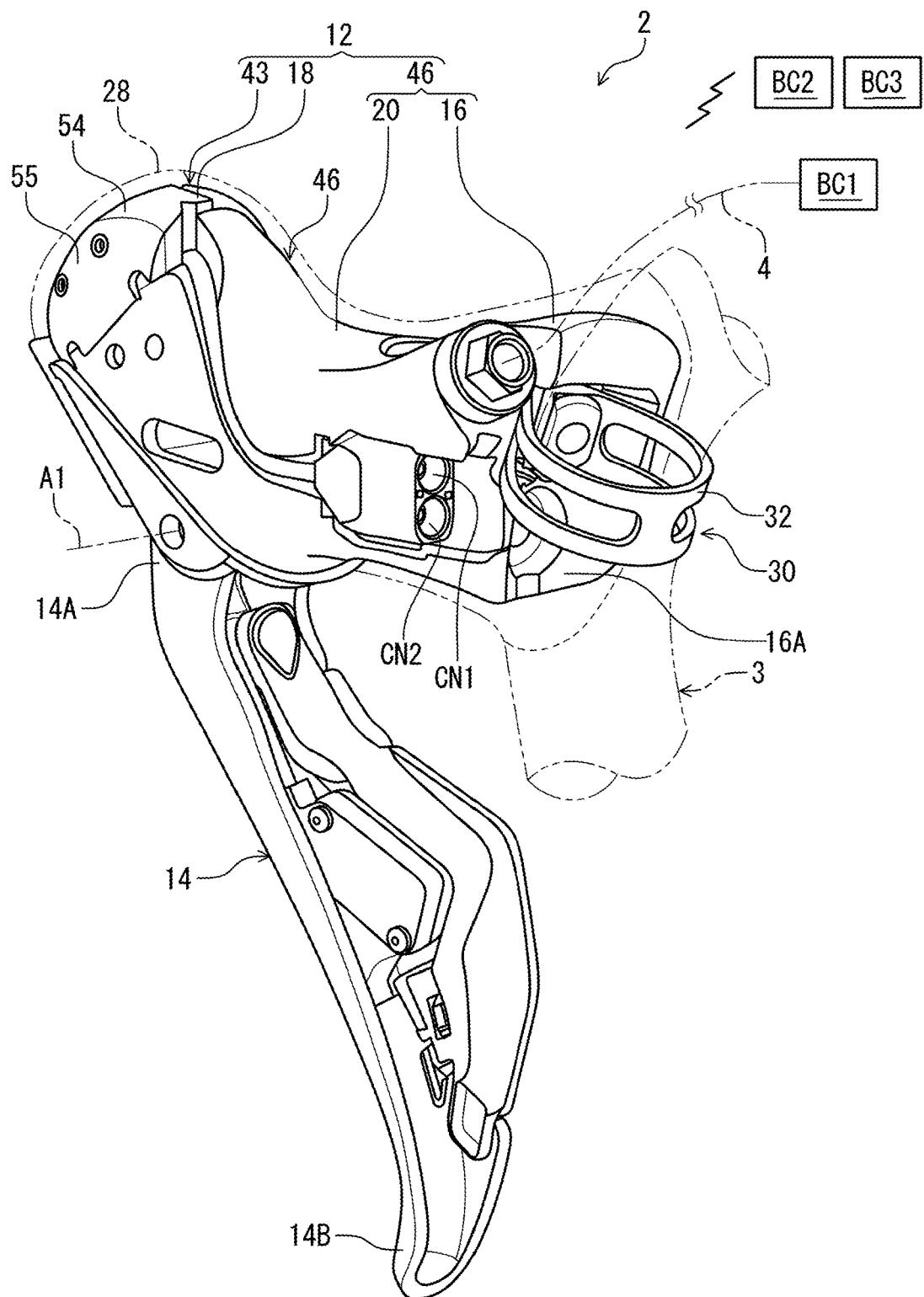
FIG. 3 is another perspective view of the operating device illustrated in FIG. 1.

As seen in FIG. 3, the first end portion 16 includes a contact surface 16A configured to contact the handlebar 3 in the mounting state where the first end portion 16 is coupled to the handlebar 3. The operating device 10 further comprises a mounting structure 30 configured to couple the first end portion 16 to the handlebar 3. As seen in FIG. 1, the mounting structure 30 preferably includes a band clamp 32 and a tightening member 34. The tightening member 34 is configured to couple the band clamp 32 to the first end portion 16. The tightening member 34 includes a mounting bolt 36 so as to clamp the handlebar 3 between the band clamp 32 and the first end portion 16. The mounting structure 30 can include other structures which is similar to the band clamp 32 and which is used in a road shifter for mounting to a drop-down handlebar.

As seen in FIG. 2, the operating device 10 comprises a power supply 40. The operating device 10 for the human-powered vehicle 2 comprises circuitry 42. The power supply 40 is configured to supply electricity to the circuitry 42 and other components. Examples of the power supply 40 include a primary battery, a secondary battery, and a capacitor. In this embodiment, for example, the power supply 40 includes a button cell shaped as a flat cylinder. However, the power supply 40 is not limited to this embodiment.

The operating device 10 comprises a connector CN to which at least one electric control cable is to be detachably connected. The connector CN is attached to the base member 12. In this embodiment, the connector CN includes connection ports CN1 and CN2 (see, e.g., FIG. 3) configured to detachably receive electric control cables. The circuitry 42 is configured to be electrically connected to the power supply 40, the switches SW1, SW2 and SW3, and the connector CN. A total number of the connection ports is not limited to this embodiment. The connector CN can include one connection port or at least three connection ports.

The term "detachable and/or attachable," as used herein, encompasses a configuration in which an element is repeatedly detachable from and attachable to another element without substantial damage.

The base member 12 includes an accommodating structure 43. Namely, the electric device 10 for the human-powered vehicle 2 comprises the accommodating structure 43. The accommodating structure 43 is provided to the second end portion 18. The accommodating structure 43 is disposed at a location which is the farthest from the first end portion 16 in the second end portion 18 along the longitudinal direction D1 as viewed along the pivot axis A1. The accommodating structure 43 includes an accommodating part 44 configured to accommodate at least one of the power supply 40 and the circuitry 42.

In this embodiment, the accommodating part 44 is configured to accommodate the power supply 40 and the circuitry 42. Specifically, the accommodating part 44 includes a power-supply accommodating part 44P and a circuitry accommodating part 44C. Namely, the base member 12 includes the power-supply accommodating part 44P and the circuitry accommodating part 44C. The accommodating structure 43 includes the power-supply accommodating part 44P and the circuitry accommodating part 44C. The power-supply accommodating part 44P is configured to accommodate the power supply 40. The circuitry accommodating part 44C is configured to accommodate the circuitry 42. However, the accommodating part 44 can be configured to accommodate only one of the power supply 40 and the circuitry 42. One of the power-supply accommodating part 44P and the circuitry accommodating part 44C can be omitted from the accommodating part 44.

The accommodating part 44 is at least partly provided farther from the first end portion 16 of the base member 12 than the proximal end portion 14A of the operating member 14 in the longitudinal direction D1. The accommodating part 44 is at least partly provided farther from the contact surface 16A of the first end portion 16 than the operating member 14. At least one of the power-supply accommodating part 44P and the circuitry 42 is at least partly provided at the second end portion 18 of the base member 12.

In this embodiment, the accommodating part 44 is partly provided farther from the first end portion 16 of the base member 12 than the proximal end portion 14A of the operating member 14 in the longitudinal direction D1. The accommodating part 44 is partly provided farther from the contact surface 16A of the first end portion 16 than the operating member 14. The power-supply accommodating part 44P and the circuitry 42 are entirely provided at the second end portion 18 of the base member 12. However, the accommodating part 44 can be entirely provided farther from the first end portion 16 of the base member 12 than the proximal end portion 14A of the operating member 14 in the longitudinal direction D1. The accommodating part 44 can be entirely provided farther from the contact surface 16A of the first end portion 16 than the operating member 14. At least one of the power-supply accommodating part 44P and the circuitry 42 can be partly provided at the second end portion 18 of the base member 12.

The base member 12 includes a base body 46. The accommodating structure 43 is a separate member form the base body 46 and is secured to the base body 46 with a fastener or a bonding structure such as adhesive. The base body 46 includes the first end portion 16 and the grip portion 20 of the base member 12. The operating member 14 is pivotally coupled to the base body 46 about the pivot axis A1. However, the accommodating structure 43 can be integrally provided with the base body 46 as a one-piece unitary member. The position of the accommodating structure 43 in the base member 12 is not limited to this embodiment.

One of the power supply 40 and the circuitry 42 is closer to the operating member 14 than the other of the power supply 40 and the circuitry 42 as viewed along the pivot axis A1. In this embodiment, the circuitry 42 is closer to the operating member 14 than the power supply 40 as viewed along the pivot axis A1. However, the power supply 40 can be closer to the operating member 14 than the circuitry 42.

One of the power supply 40 and the circuitry 42 is at least partly provided above the other of the power supply 40 and the circuitry 42 in the mounting state where the first end portion 16 is coupled to the handlebar 3. In this embodiment, the power supply 40 is partly provided above the circuitry 42 in the mounting state where the first end portion 16 is coupled to the handlebar 3. However, the power supply 40 can be partly provided above the circuitry 42 in the mounting state where the first end portion 16 is coupled to the handlebar 3. The circuitry 42 can be at least partly provided above the power supply 40 in the mounting state where the first end portion 16 is coupled to the handlebar 3.

One of the power-supply accommodating part 44P and the circuitry 42 is closer to the operating member 14 than the other of the power-supply accommodating part 44P and the circuitry 42. In this embodiment, the circuitry 42 is closer to the operating member 14 than the power-supply accommodating part 44P. However, the power-supply accommodating part 44P can be closer to the operating member 14 than the circuitry 42. A distance between the power-supply accommodating part 44P and the operating member 14 can be equal to a distance between the circuitry 42 and the operating member 14.

One of the power-supply accommodating part 44P and the circuitry 42 is at least partly provided above the other of the power-supply accommodating part 44P and the circuitry 42 in the mounting state where the first end portion 16 is coupled to the handlebar 3. In this embodiment, the power-supply accommodating part 44P is partly provided above the circuitry 42 in the mounting state where the first end portion 16 is coupled to the handlebar 3. However, the power-supply accommodating part 44P can be entirely provided above the circuitry 42 in the mounting state where the first end portion 16 is coupled to the handlebar 3. The circuitry 42 can be at least partly provided above the power-supply accommodating part 44P in the mounting state where the first end portion 16 is coupled to the handlebar 3.

Figure 4:
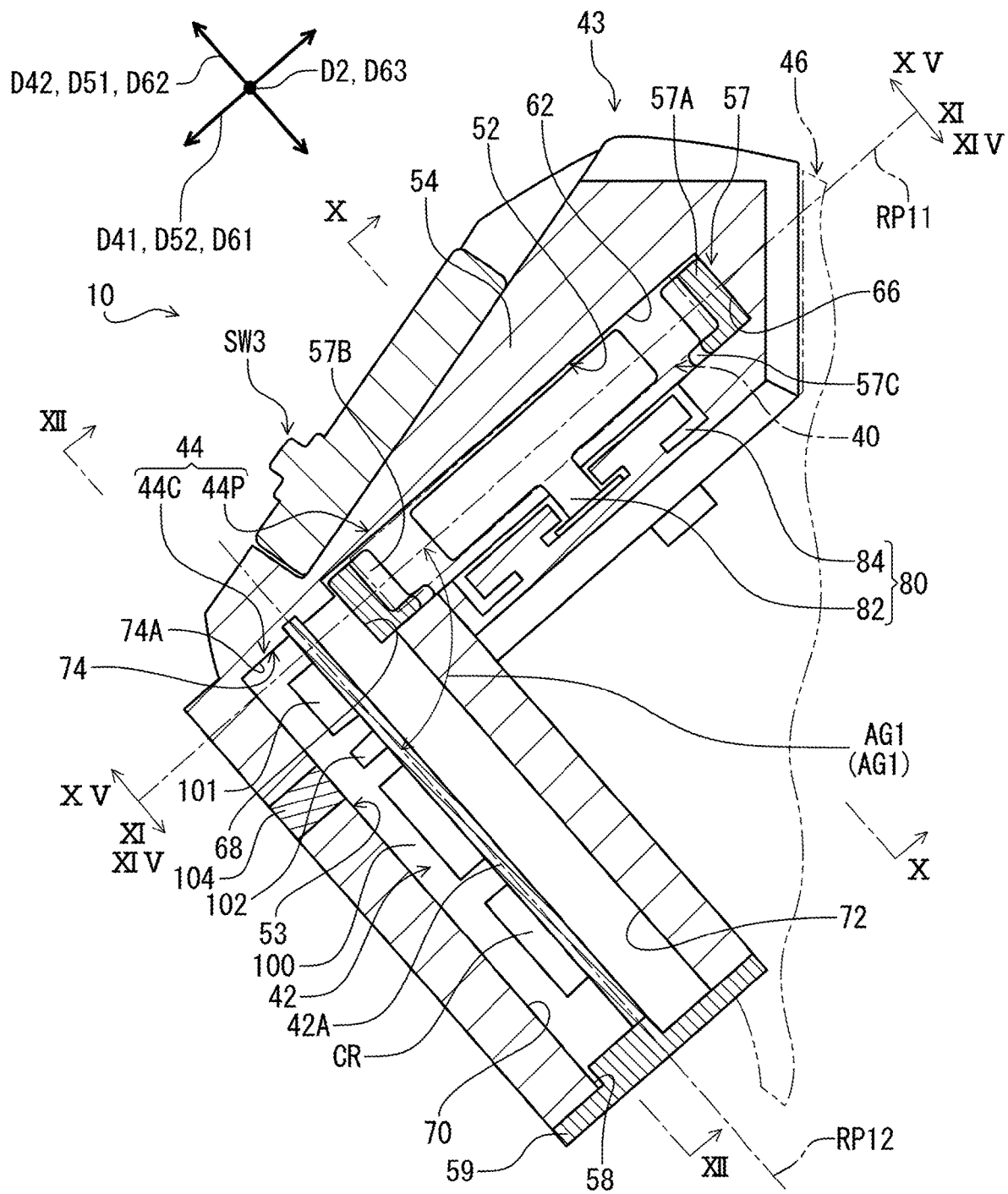
FIG. 4 is a partial cross-sectional view of the operating device taken along line IV-IV of FIG. 1.

As seen in FIG. 4, the power-supply accommodating part 44P extends along a reference plane RP11. The circuitry accommodating part 44C extends along an additional reference plane RP12. The power-supply accommodating part 44P is configured to accommodate the power supply 40 extending along the reference plane RP11. The circuitry 42 is provided to the base member 12 to extend along the additional reference plane RP12 intersecting with the reference plane RP11. The circuitry 42 includes a circuit board 42A. The circuit board 42A is provided to the base member 12 to extend along the additional reference plane RP12.

The reference plane RP11 and the additional reference plane RP12 intersect with each other to define an intersection angle AG1. The intersection angle AG1 is equal to or smaller than 150 degrees. The intersection angle AG1 is equal to or larger than 30 degrees. In this embodiment, the intersection angle AG1 is 90 degrees. For example, the pivot axis A1 and more than half of the base body 46 are provided in a region RG1 defined between the reference plane RP11 and the additional reference plane RP12. The intersection angle AG1 is defined in the region RG1 in which the pivot axis A1 and more than half of the base body 46 are provided. However, the intersection angle AG1 is not limited to this embodiment and the above range.

The accommodating part 44 includes an accommodating space 52 in which at least one of the power supply 40 and the circuitry 42 is to be provided. In this embodiment, the power-supply accommodating part 44P includes the accommodating space 52 in which the power supply 40 is to be provided. However, the position of the accommodating space 52 is not limited to the power-supply accommodating part 44P. The accommodating space 52 can be configured to accommodate the circuitry 42 or both the power supply 40 and the circuitry 42.

The accommodating part 44 includes an accommodating space 53 in which at least one of the power supply 40 and the circuitry 42 is to be provided. In this embodiment, the circuitry accommodating part 44C includes the accommodating space 53 in which the circuitry 42 is to be provided. However, the position of the accommodating space 53 is not limited to the circuitry accommodating part 44C. The accommodating space 53 can be configured to accommodate the power supply 40 or both the power supply 40 and the circuitry 42.

Figure 5:
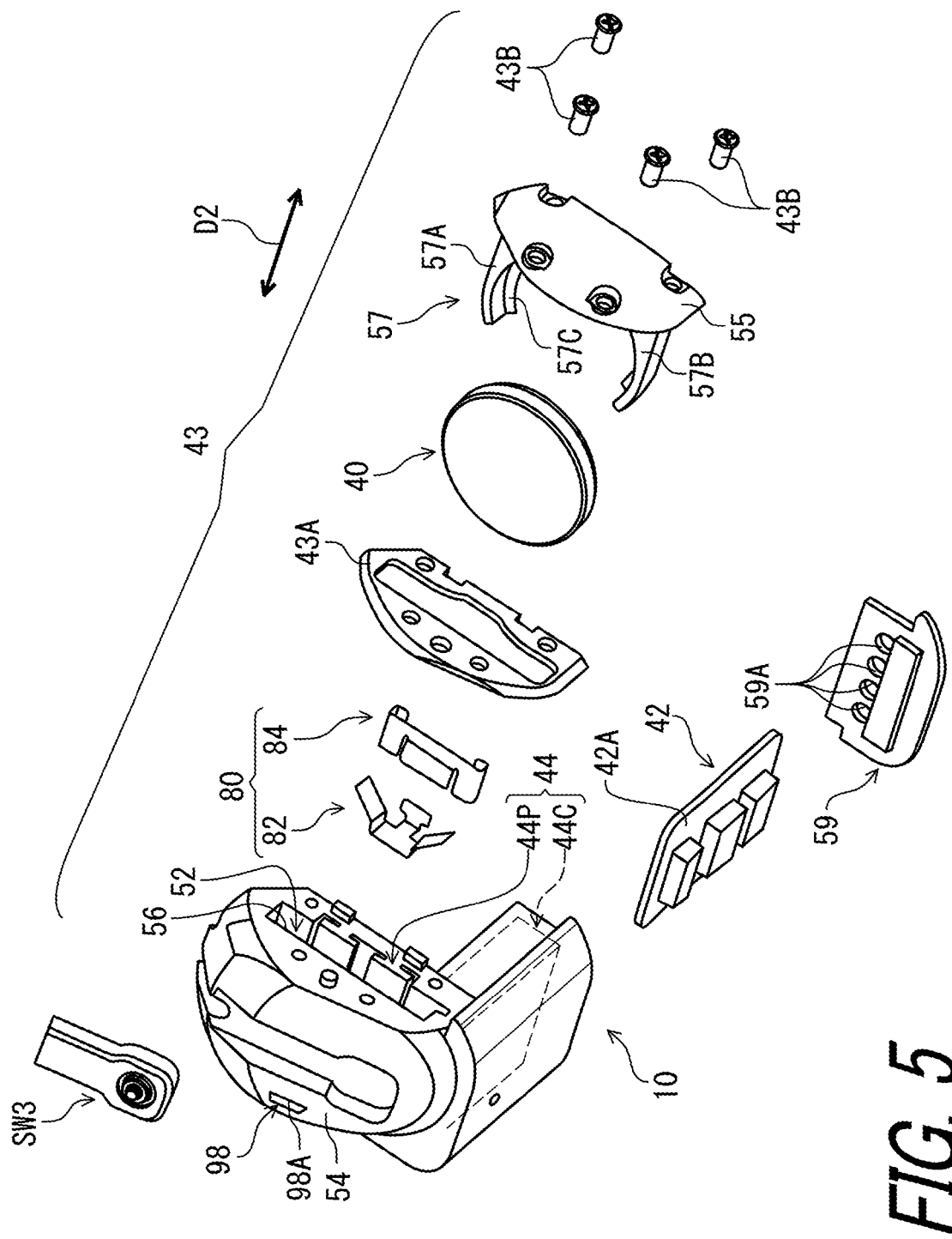
FIG. 5 is an exploded perspective view of an accommodating structure of the operating device illustrated in FIG. 1.

As seen in FIG. 5, the accommodating structure 43 includes a main body 54 and an attachment member 55. The attachment member 55 is configured to be attached to the main body 54. The power-supply accommodating part 44P is provided to at least one of the main body 54 and the attachment member 55 so as to accommodate the power supply 40. In this embodiment, the power-supply accommodating part 44P is provided to the main body 54. However, the power-supply accommodating part 44P can be provided to the attachment member 55 or both the main body 54 and the attachment member 55.

The attachment member 55 is a separate member from the main body 54. The main body 54 is integrally provided as a one-piece unitary member. Each of the main body 54 and the attachment member 55 is made of a non-metallic material such as a fiber-reinforced plastic. However, the material of the main body 54 and the attachment member 55 is not limited to this embodiment.

The accommodating part 44 includes an insertion opening 56 provided at an end of the accommodating part 44. In this embodiment, the power-supply accommodating part 44P includes the insertion opening 56. The accommodating space 52 includes the insertion opening 56. The power supply 40 passes through the insertion opening 56 when the power supply 40 is inserted into or removed from the accommodating space 52. The accommodating space 52 is open through the insertion opening 56 in an axial direction D2 with respect to the pivot axis A1 in a state where the insertion opening 56 is not covered by other members. The attachment member 55 is configured to be attached to the main body 54 to cover the insertion opening 56.

The attachment member 55 is detachably attached to the main body 54. The electric device 10 further comprises a fastener 43B. The fastener 43B is configured to fasten the attachment member 55 to the main body 54 to be removable from the main body 54 without damage. In this embodiment, the electric device 10 comprises a plurality of fasteners 43B. Examples of the fastener 43B include a screw. The attachment member 55 is detachably attached to the main body 54 with the plurality of fasteners 43B. The accommodating structure 43 is configured to allow the power supply 40 to be removed from the power-supply accommodating part 44P in an open state where the attachment member 55 is detached from the main body 54. The attachment member 55 is configured to close the insertion opening 56 in a state where the attachment member 55 is attached to the main body 54. However, the attachment member 55 can be connected to the main body 54 with another member such as a strap to prevent the attachment member 55 from unintentionally dropping from the main body 54.

The electric device 10 further comprises a seal member 43A. The seal member 43A is configured to be provided between the main body 54 and the attachment member 55 in a state where the attachment member 55 is attached to the main body 54. In this embodiment, the seal member 43A is made of a non-metallic material such as an elastic material. Examples of the elastic material include rubber. The seal member 43A is attached to the main body 54 with an integrally molding or a bonding structure such as adhesive. However, the seal member 43A can be attached to the attachment member 55 with an integrally molding or a bonding structure such as adhesive.

The electric device 10 further comprises a holder 57. The holder 57 is configured to at least partly receive the power supply 40 and configured to be arranged in the power-supply accommodating part 44P. The holder 57 is a separate member from the main body 54. The holder 57 is provided to the attachment member 55. The holder 57 extends from the attachment member 55 in the axial direction D2. The holder 57 is configured to be provided in the accommodating space 52 in a state where the attachment member 55 is secured to the main body 54. In this embodiment, the holder 57 is integrally provided with the attachment member 55 as a one-piece unitary member. However, the holder 57 can be provided to the main body 54. The holder 57 can be a separate member from the attachment member 55.

Figure 6:
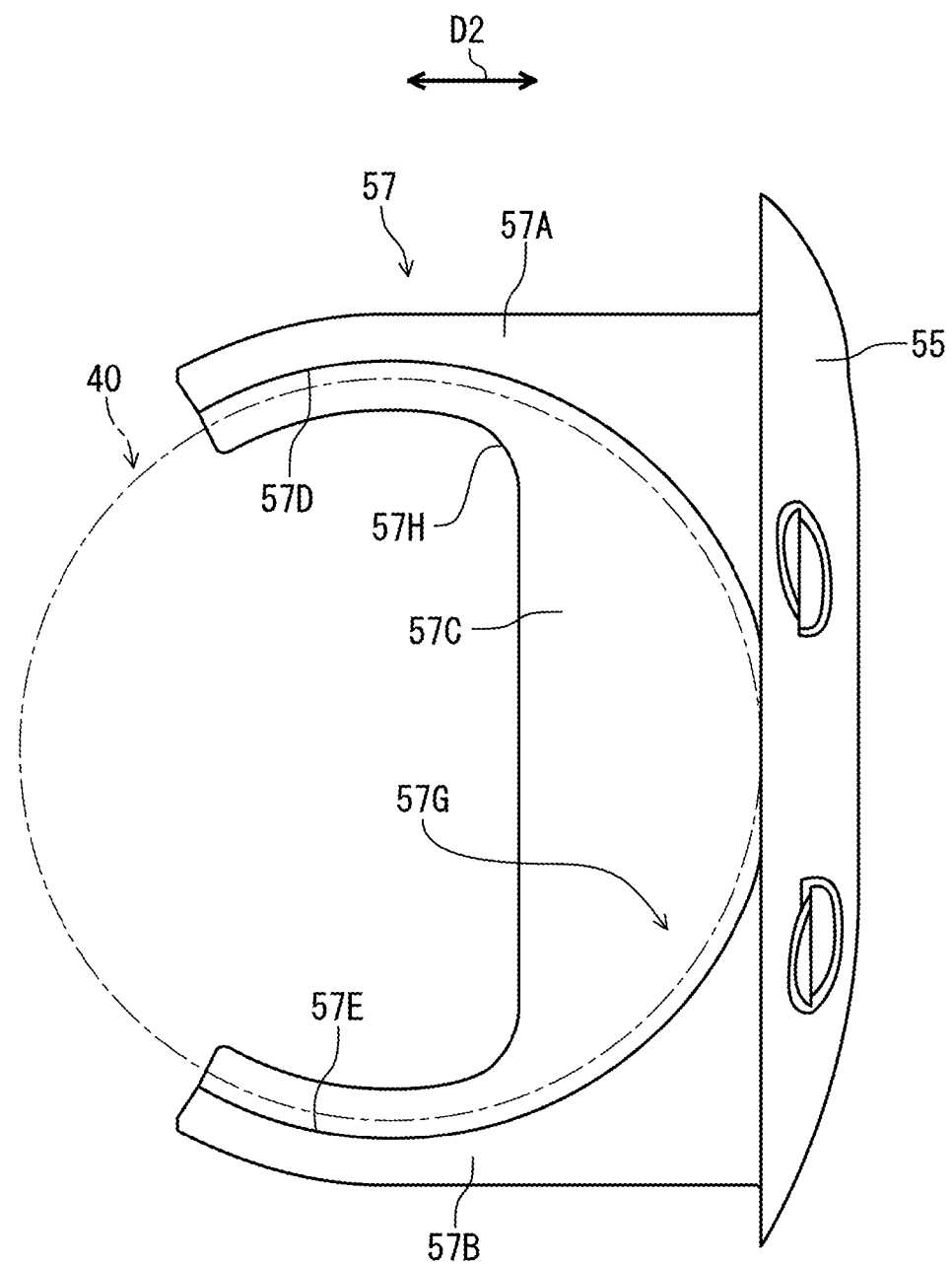
FIG. 6 is a plan view of a holder and an attachment member of the accommodating structure illustrated in FIG. 5.

As seen in FIG. 6, the holder 57 includes a first holding arm 57A, a second holding arm 57B, and a support base 57C. The first holding arm 57A protrudes from the attachment member 55 in the axial direction D2. The second holding arm 57B protrudes from the attachment member 55 in the axial direction D2. The first holding arm 57A includes a first holding surface 57D contactable with the power supply 40. The second holding arm 57B includes a second holding surface 57E contactable with the power supply 40. The second holding surface 57E is spaced apart from the first holding surface 57D. The first holding surface 57D has a curved shape extending along an outer periphery of the power supply 40. The second holding surface 57E has a curved shape extending along the outer periphery of the power supply 40. However, the shapes of the first holding surface 57D and the second holding surface 57E are not limited to the curved shape. The support base 57C is contactable with the power supply 40. The support base 57C is provided between the first holding arm 57A and the second holding arm 57B. The support base 57C couples the first holding arm 57A and the second holding arm 57B. The support base 57C extends from the first holding surface 57D toward the second holding surface 57E. The support base 57C extends from the second holding surface 57E toward the first holding surface 57D.

Figure 7:
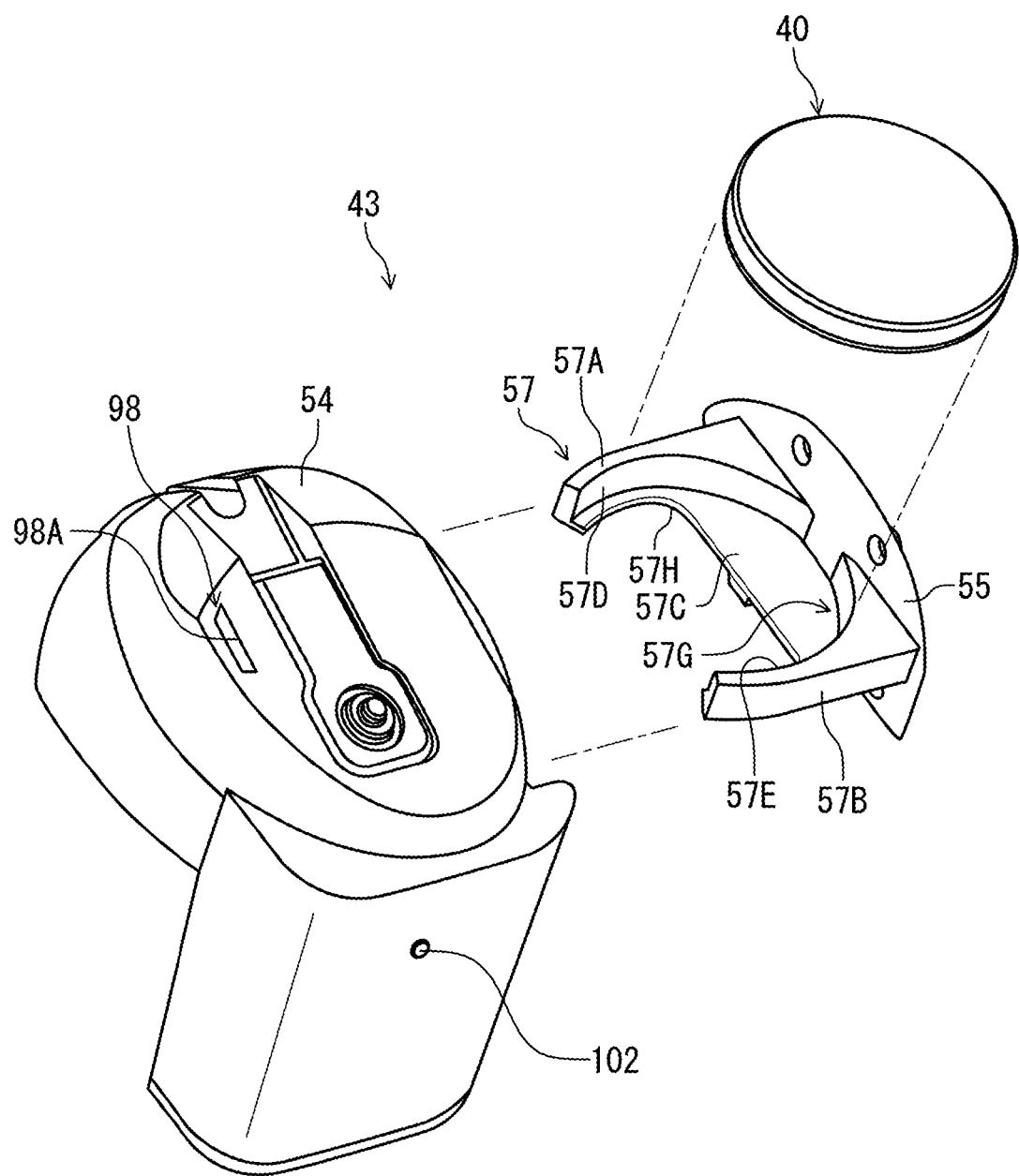
FIG. 7 is an exploded perspective view of the accommodating structure of the operating device illustrated in FIG. 1.

As seen in FIG. 7, the first holding arm 57A, the second holding arm 57B, and the support base 57C define a support recess 57G in which the power supply 40 is to be provided. The power supply 40, the attachment member 55, and the holder 57 can be treated as a single unit in a state where the power supply 40 is provided in the support recess 57G.

Figure 8:
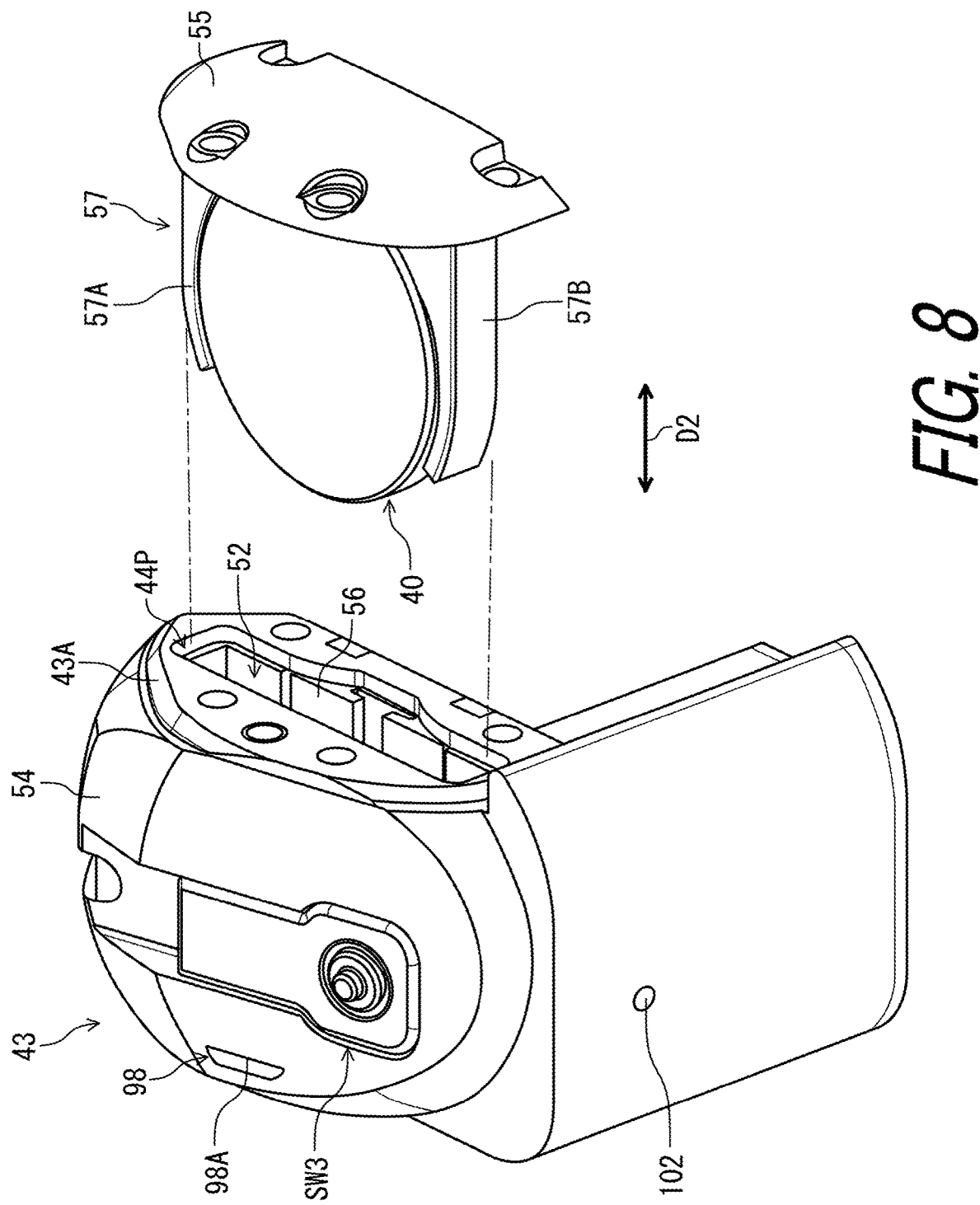
FIG. 8 is another exploded perspective view of the accommodating structure of the operating device illustrated in FIG. 1.

As seen in FIG. 8, the holder 57 is configured to carry the power supply 40 when the power supply 40 is inserted in and/or removed from the power-supply accommodating part 44P through the insertion opening 56. The holder 57 is configured to carry the power supply 40 when the attachment member 55 is secured to and/or detached from the main body 54.

Figure 9:
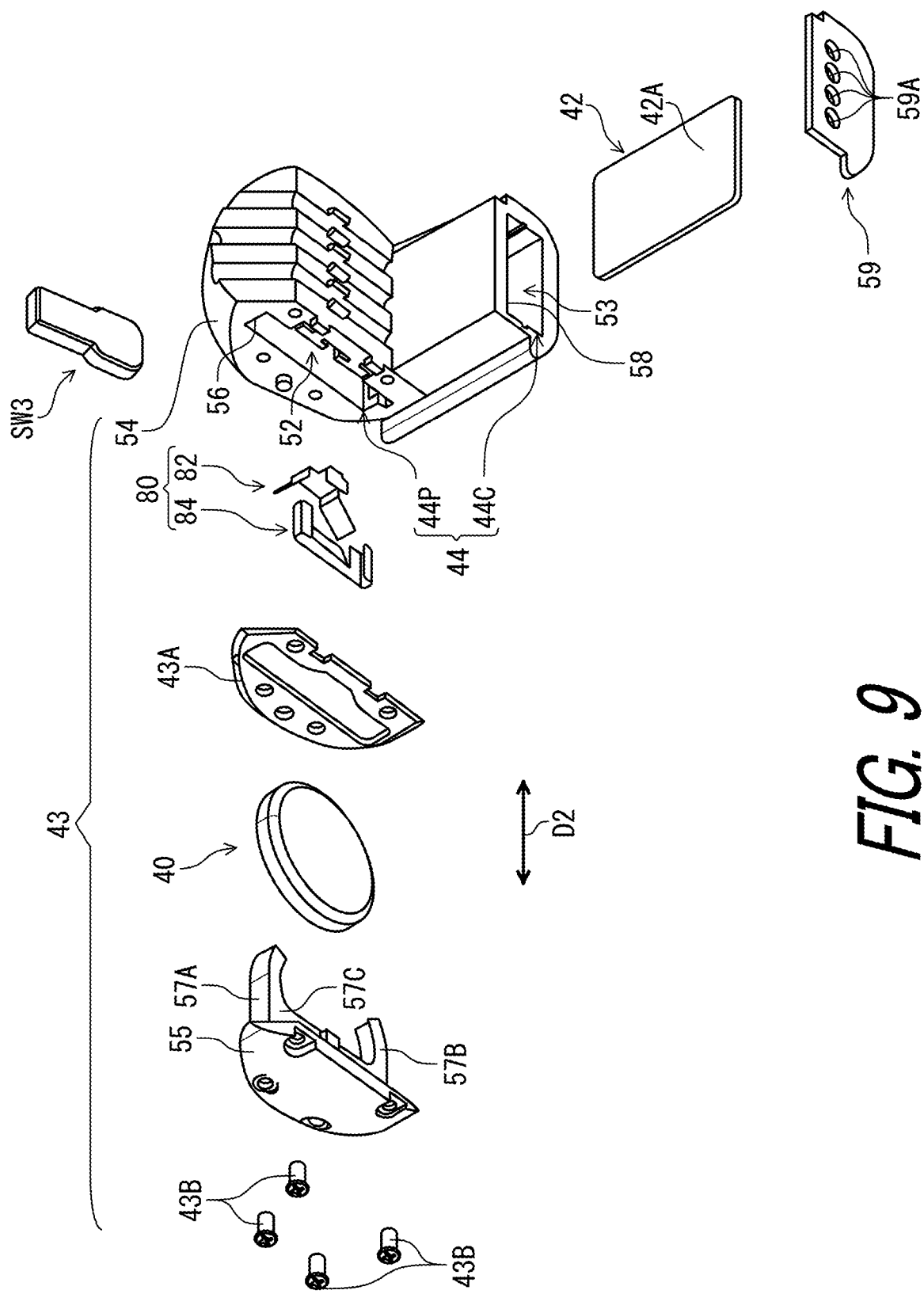
FIG. 9 is another exploded perspective view of an accommodating structure of the operating device illustrated in FIG. 1.

As seen in FIG. 9, the accommodating part 44 includes an insertion opening 58 provided at an end of the accommodating part 44. In this embodiment, the circuitry accommodating part 44C includes the insertion opening 58. The accommodating space 53 includes the insertion opening 58. The circuitry 42 passes through the insertion opening 58 when the circuitry 42 is inserted into and removed from the accommodating space 53. The accommodating space 53 is open through the insertion opening 58 in a direction different from the axial direction D2 in a state where the insertion opening 58 is not covered by other members.

The accommodating structure 43 includes an additional attachment member 59. The additional attachment member 59 is configured to be attached to the main body 54 to cover the insertion opening 58. The additional attachment member 59 includes a plurality of through-holes 59A. At least one electric cable extends through at least one of the plurality of through-holes 59A. The additional attachment member 59 includes four through-holes 59A. However, the total number of the through-hole 59A is not limited to this embodiment.

As seen in FIG. 2, the grip cover 28 is configured to be attached to the base member 12 so as to at least partly expose the accommodating structure 43 from the grip cover 28 in the state where the grip cover 28 is attached to the base member 12. In this embodiment, the grip cover 28 is configured to be attached to the base member 12 so as to partly expose the main body 54 from the grip cover 28 in the state where the grip cover 28 is attached to the base member 12. The grip cover 28 is configured to be attached to the base member 12 so as not to expose the attachment member 55 from the grip cover 28 in the state where the grip cover 28 is attached to the base member 12. However, the structure of the grip cover 28 is not limited to the above structure. The grip cover 28 can be configured to be attached to the base member 12 so as not to expose the main body 54 from the grip cover 28 in the state where the grip cover 28 is attached to the base member 12. The grip cover 28 can be configured to be attached to the base member 12 so as to at least partly expose the attachment member 55 from the grip cover 28 in the state where the grip cover 28 is attached to the base member 12.

As seen in FIG. 4, the accommodating part 44 includes a first inner surface 60 and a second inner surface 62. In this embodiment, the power-supply accommodating part 44P includes the first inner surface 60. The power-supply accommodating part 44P includes the second inner surface 62. The second inner surface 62 faces towards the first inner surface 60. The second inner surface 62 is spaced apart from the first inner surface 60. The accommodating space 52 is at least partly defined between the first inner surface 60 and the second inner surface 62. Namely, the first inner surface 60 and the second inner surface 62 are spaced apart from each other to at least partly define the accommodating space 52 between the first inner surface 60 and the second inner surface 62.

The first inner surface 60 extends along the reference plane RP11. The second inner surface 62 extends along the reference plane RP11. The reference plane RP11 is defined between the first inner surface 60 and the second inner surface 62. The first inner surface 60 and the second inner surface 62 are parallel to the reference plane RP11. However, the first inner surface 60 and the second inner surface 62 can be non-parallel to the reference plane RP11.

The first inner surface 60 extends along a first direction D41 and faces toward the second inner surface 62. The second inner surface 62 extends along the first direction D41 and faces toward the first inner surface 60. In this embodiment, the first inner surface 60 faces toward the second inner surface 62 in a second direction D42. The first direction D41 is parallel to the reference plane RP11. The second direction D42 is perpendicular to the first direction D41 and is parallel to the additional reference plane RP12. However, the relationship among the reference plane RP11, the additional reference plane RP12, the first direction D41, and the second direction D42 is not limited to this embodiment.

Figure 10:
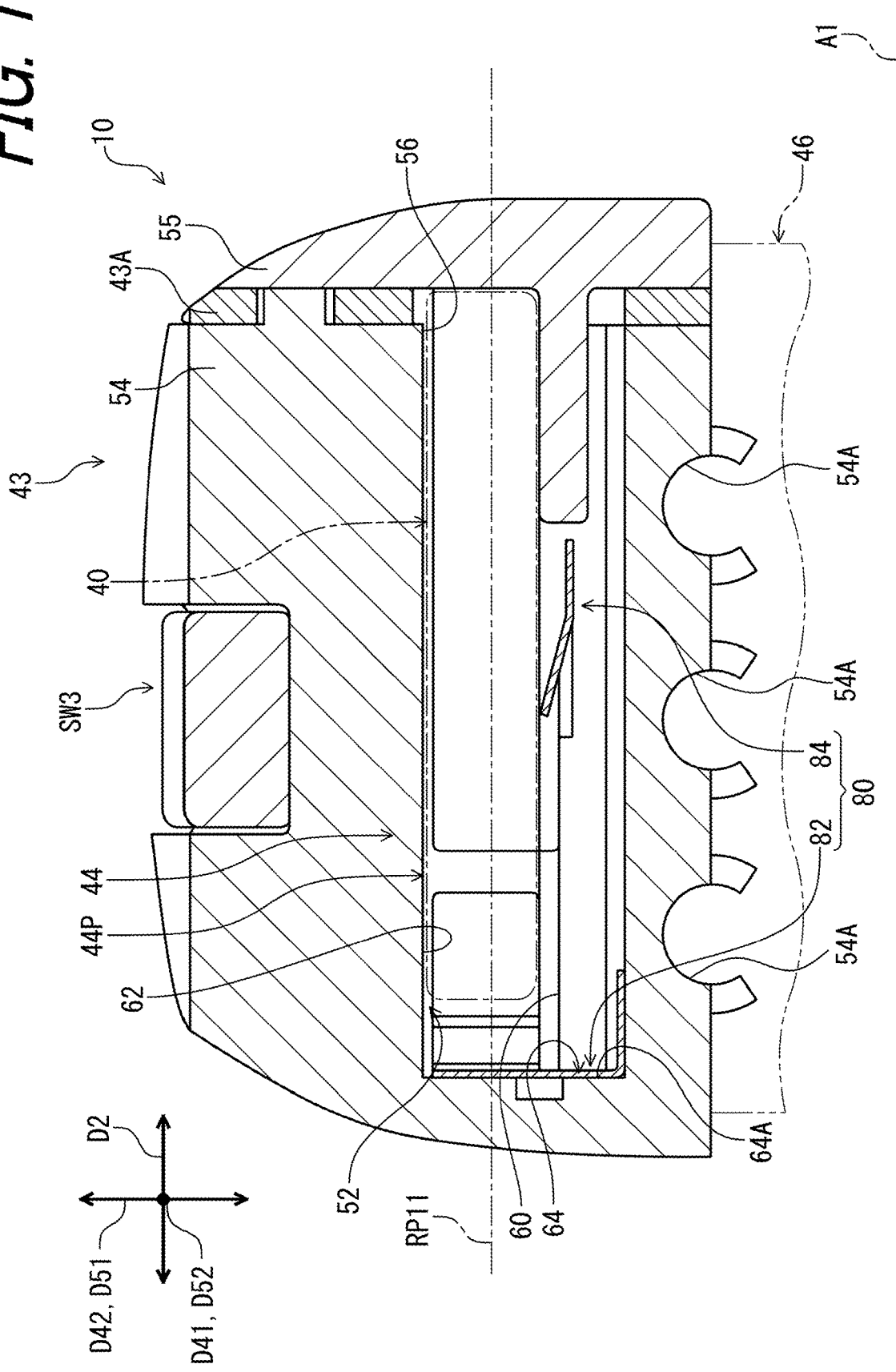
FIG. 10 is a partial cross-sectional view of the operating device taken along line X-X of FIG. 4.

As seen in FIG. 10, the accommodating part 44 includes a third inner surface 64 extending between the first inner surface 60 and the second inner surface 62. In this embodiment, the power-supply accommodating part 44P includes the third inner surface 64 extending between the first inner surface 60 and the second inner surface 62. The third inner surface 64 extends in the second direction D42. The accommodating space 52 is at least partly defined by the first inner surface 60, the second inner surface 62, and the third inner surface 64. The third inner surface 64 includes a facing part 64A facing toward the insertion opening 56. The power-supply accommodating part 44P extends in the axial direction D2. The accommodating space 52 extends from the third inner surface 64 to the insertion opening 56 in the axial direction D2. In this embodiment, the reference plane RP11 is parallel to the axial direction D2. However, the relationship between the reference plane RP11 and the axial direction D2 is not limited to this embodiment.

Figure 11:
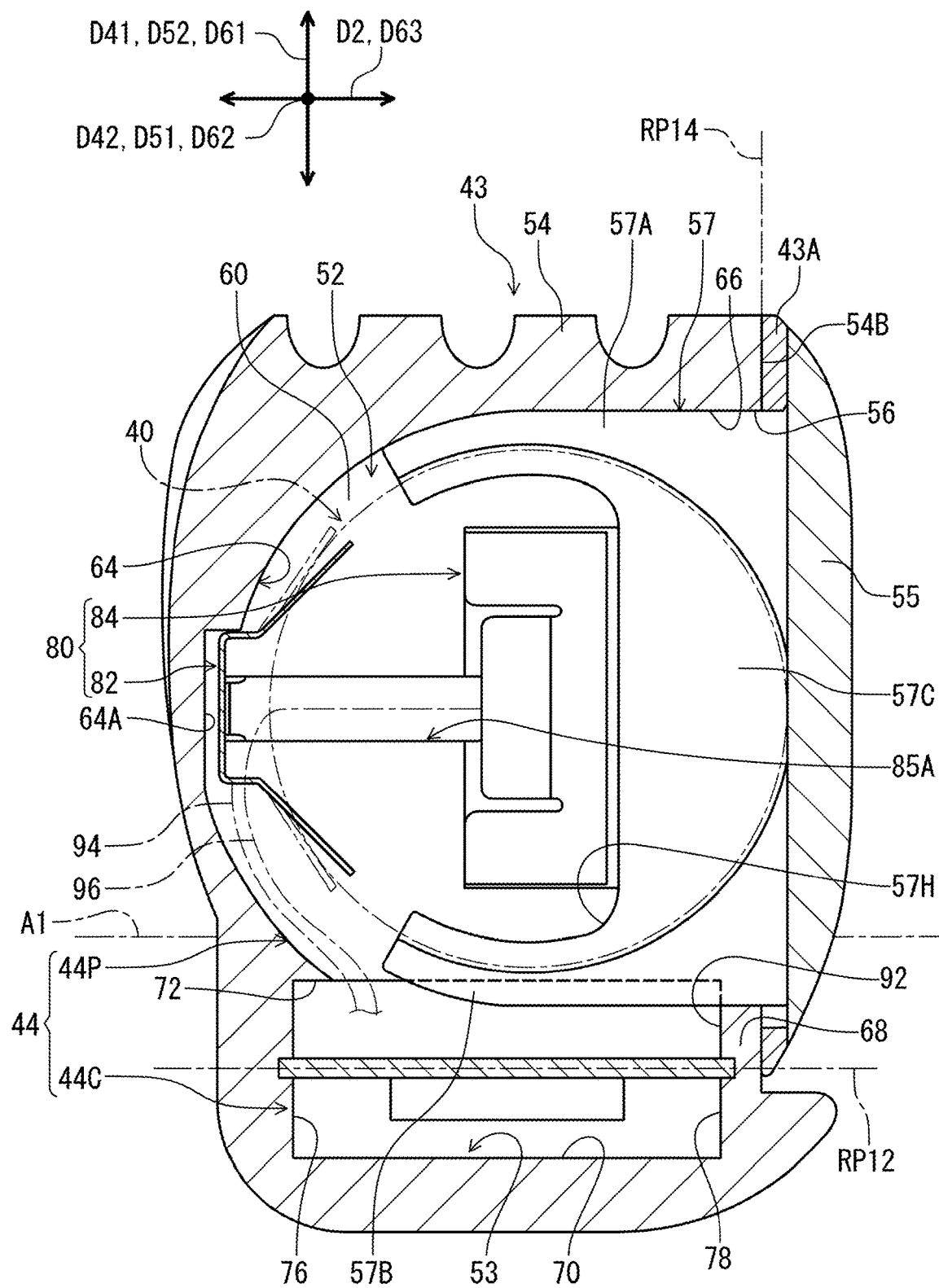
FIG. 11 is a partial cross-sectional view of the operating device taken along line XI-XI of FIG. 4.

As seen in FIG. 11, the third inner surface 64 has a curved shape. The third inner surface 64 extends along an outer periphery of the power supply 40 in a state where the power supply 40 is provided in the accommodating space 52. However, the shape of the third inner surface 64 is not limited to this embodiment.

The accommodating part 44 includes a fourth inner surface 66 and a fifth inner surface 68. The fourth inner surface 66 extends along the axial direction D2 from the third inner surface 64 to the insertion opening 56. The fifth inner surface 68 extends along the axial direction D2 from the third inner surface 64 to the insertion opening 56. The third inner surface 64 circumferentially extends from the fourth inner surface 66 to the fifth inner surface 68.

As seen in FIG. 4, the fourth inner surface 66 extends between the first inner surface 60 and the second inner surface 62. The fifth inner surface 68 extends between the first inner surface 60 and the second inner surface 62. The fourth inner surface 66 and the fifth inner surface 68 are spaced apart from each other to at least partly define the accommodating space 52 between the fourth inner surface 66 and the fifth inner surface 68. The fourth inner surface 66 faces toward the fifth inner surface 68. The fourth inner surface 66 extends in the second direction D42. The fifth inner surface 68 extends in the second direction D42. However, the structures of the fourth inner surface 66 and the fifth inner surface 68 are not limited to this embodiment.

As seen in FIG. 4, the accommodating part 44 includes a first inner surface 70 and a second inner surface 72. In this embodiment, the circuitry accommodating part 44C includes the first inner surface 70. The circuitry accommodating part 44C includes the second inner surface 72. The second inner surface 72 is spaced apart from the first inner surface 70. The accommodating space 53 is at least partly defined between the first inner surface 70 and the second inner surface 72. Namely, the first inner surface 70 and the second inner surface 72 are spaced apart from each other to at least partly define the accommodating space 53 between the first inner surface 70 and the second inner surface 72.

The first inner surface 70 extends along the additional reference plane RP12. The second inner surface 72 extends along the additional reference plane RP12. The additional reference plane RP12 is defined between the first inner surface 70 and the second inner surface 72. The first inner surface 70 and the second inner surface 72 are parallel to the additional reference plane RP12. However, the first inner surface 70 and the second inner surface 72 can be non-parallel to the additional reference plane RP12.

The first inner surface 70 extends along a first direction D51 and faces toward the second inner surface 72. The second inner surface 72 extends along the first direction D51 and faces toward the first inner surface 70. In this embodiment, the first inner surface 70 faces toward the second inner surface 72 in a second direction D52. The first direction D51 is parallel to the additional reference plane RP12 and the second direction D42. The second direction D52 is perpendicular to the first direction D51 and is parallel to the reference plane RP11 and the first direction D41. However, the relationship among the reference plane RP11, the additional reference plane RP12, the first direction D41, and the second direction D42, the first direction D51, and the second direction D52 is not limited to this embodiment.

The accommodating part 44 includes a third inner surface 74 extending between the first inner surface 70 and the second inner surface 72. In this embodiment, the circuitry accommodating part 44C includes the third inner surface 74 extending between the first inner surface 70 and the second inner surface 72. The third inner surface 74 extends in the second direction D52. The accommodating space 53 is at least partly defined by the first inner surface 70, the second inner surface 72, and the third inner surface 74. The third inner surface 74 includes a facing part 74A facing toward the insertion opening 58 with respect to the accommodating space 53. The circuitry accommodating part 44C extends in the first direction D51. The accommodating space 53 extends from the third inner surface 74 to the insertion opening 58 in the first direction D51.

As seen in FIG. 11, the accommodating part 44 includes a fourth inner surface 76 and a fifth inner surface 78. The fourth inner surface 76 extends between the first inner surface 70 and the second inner surface 72. The fifth inner surface 78 extends between the first inner surface 70 and the second inner surface 72. The fourth inner surface 76 and the fifth inner surface 78 are spaced apart from each other to at least partly define the accommodating space 53 between the fourth inner surface 76 and the fifth inner surface 78. The fourth inner surface 76 faces toward the fifth inner surface 78.

Figure 12:
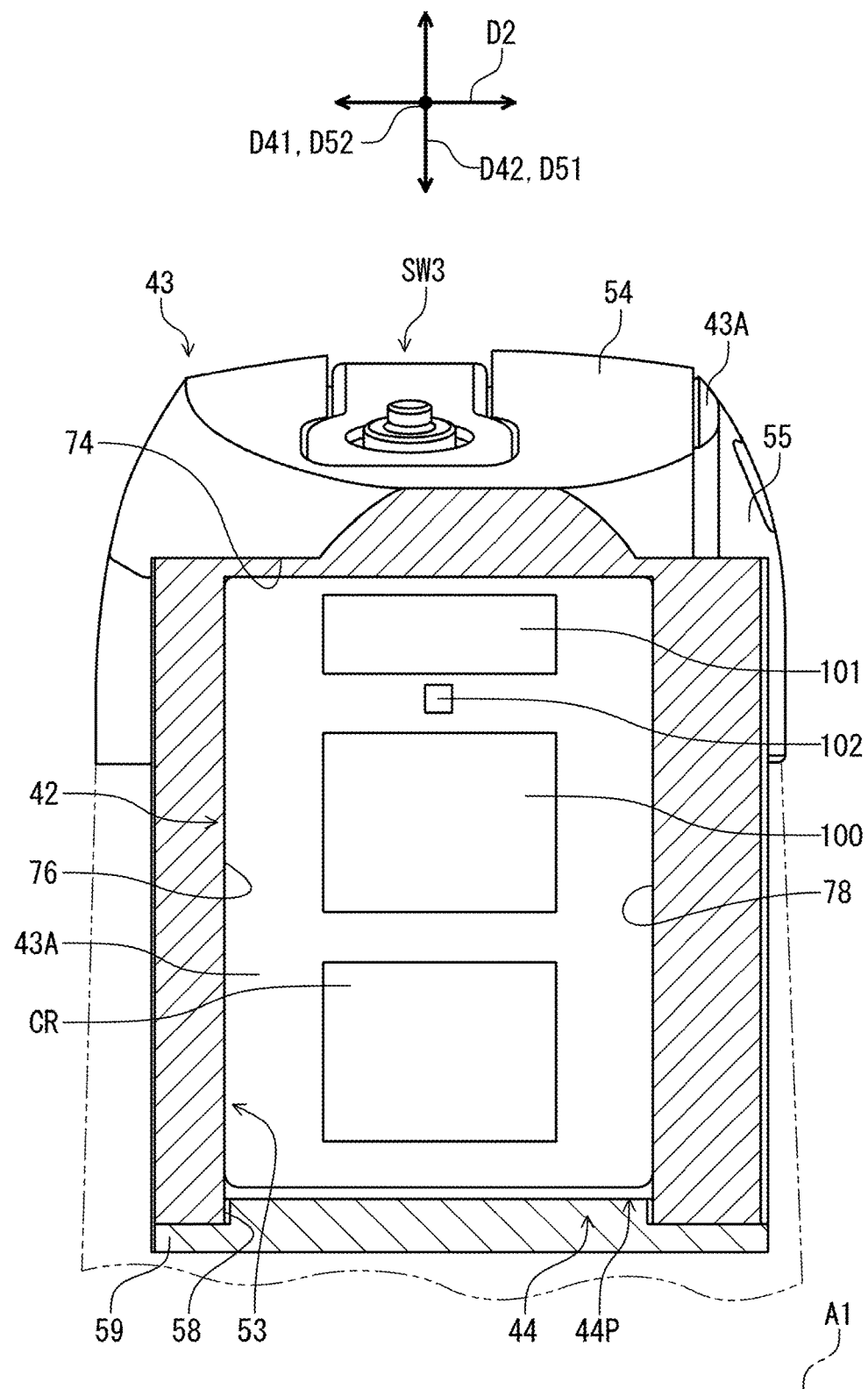
FIG. 12 is a partial cross-sectional view of the operating device taken along line XII-XII of FIG. 4.

As seen in FIG. 12, the fourth inner surface 76 extends from the third inner surface 74 to the insertion opening 58 in the first direction D51. The fifth inner surface 78 extends from the third inner surface 74 to the insertion opening 58 in the first direction D51. However, the structures of the fourth inner surface 76 and the fifth inner surface 78 are not limited to this embodiment. The third inner surface 74 extends from the fourth inner surface 76 to the fifth inner surface 78.

As seen in FIG. 10, the operating device 10 further comprises an electrical contact 80. Namely, the electric device 10 further comprises the electrical contact 80. The electrical contact 80 is configured to contact the power supply 40 in a state where the power supply 40 is provided in the accommodating part 44. The electrical contact 80 is provided in at least one of the first inner surface 60, the second inner surface 62 and the third inner surface 64 to be contactable with the power supply 40 in the state where the power supply 40 is accommodated in the accommodating part 44. The electrical contact 80 is provided in at least one of the first inner surface 60, the second inner surface 62, and the third inner surface 64 to be contactable with the power supply 40 in a state where the power supply 40 is accommodated in the power-supply accommodating part 44P. In this embodiment, the electrical contact 80 is provided in the first inner surface 60 and the third inner surface 64 to be contactable with the power supply 40 in the state where the power supply 40 is provided in the accommodating part 44. However, the position of the electrical contact 80 is not limited to this embodiment. For example, the electrical contact 80 can be provided in the second inner surface 62 and the third inner surface 64 to be contactable with the power supply 40 in the state where the power supply 40 is provided in the accommodating part 44.

In this embodiment, the electrical contact 80 includes a positive contact 82 and a negative contact 84 which is a separate member from the positive contact 82. The positive contact 82 is configured to contact a positive electrode of the power supply 40 in the state where the power supply 40 is provided in the accommodating part 44 (e.g., the power-supply accommodating part 44P). The negative contact 84 is configured to contact a negative electrode of the power supply 40 in the state where the power supply 40 is provided in the accommodating part 44 (e.g., the power-supply accommodating part 44P). The positive contact 82 is provided in the third inner surface 64 to be contactable with the power supply 40 in the state where the power supply 40 is provided in the accommodating part 44 (e.g., the power-supply accommodating part 44P). The negative contact 84 is provided in the first inner surface 60 to be contactable with the power supply 40 in the state where the power supply 40 is provided in the accommodating part 44 (e.g., the power-supply accommodating part 44P). However, the positions of the positive contact 82 and the negative contact 84 are not limited to this embodiment.

As seen in FIG. 11, the support base 57C of the holder 57 includes a recess 57H. The recess 57H is provided between the first holding arm 57A and the second holding arm 57B to avoid interference between the holder 57 and the electrical contact 80. The electrical contact 80 is at least partly provided in the recess 57H in a state where the holder 57 is provided in the power-supply accommodating part 44P. At least one of the positive contact 82 and the negative contact 84 is at least partly provided in the recess 57H in the state where the holder 57 is provided in the power-supply accommodating part 44P. In this embodiment, the negative contact 84 is partly provided in the recess 57H in the state where the holder 57 is provided in the power-supply accommodating part 44P. However, the positional relationship between the holder 57 and the electrical contact 80 is not limited to this embodiment.

Figure 13:
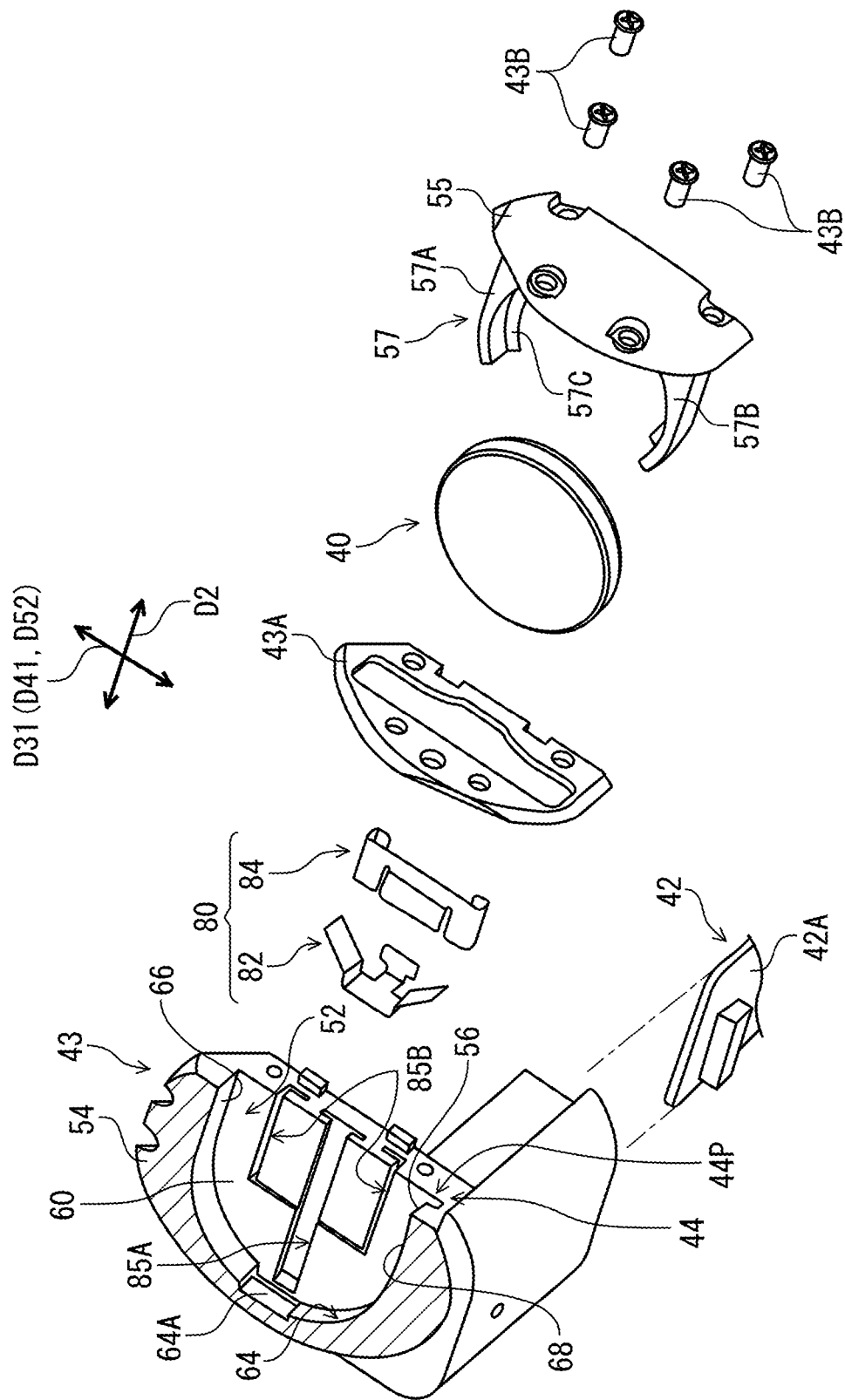
FIG. 13 is another exploded perspective view of an accommodating structure of the operating device illustrated in FIG. 1, with a cross-sectional view of a main body of the accommodating structure.

As seen in FIG. 13, the main body 54 includes a first attachment groove 85A and a pair of second attachment grooves 85B. The first attachment groove 85A is provided in at least one of the first inner surface 60, the second inner surface 62 and the third inner surface 64. The second attachment groove 85B is provided in at least one of the first inner surface 60, the second inner surface 62 and the third inner surface 64. In this embodiment, the first attachment groove 85A and the pair of second attachment groove 85B are provided in the first inner surface 60. The positive contact 82 and the negative contact 84 are at least partly provided in the first attachment groove 85A to be secured to the main body 54. The negative contact 84 is at least partly provided in the pair of second attachment groove 85B to be secured to the main body 54. However, the positions of the positive contact 82 and the negative contact 84 are not limited to this embodiment.

As seen in FIGS. 10 and 11, at least one of the reference plane RP11 and the additional reference plane RP12 extends along the pivot axis A1. In this embodiment, the reference plane RP11 and the additional reference plane RP12 extend along the pivot axis A1. The reference plane RP11 and the additional reference plane RP12 are parallel to the pivot axis A1. However, at least one of the reference plane RP11 and the additional reference plane RP12 can be inclined relative to the pivot axis A1.

Figure 14:
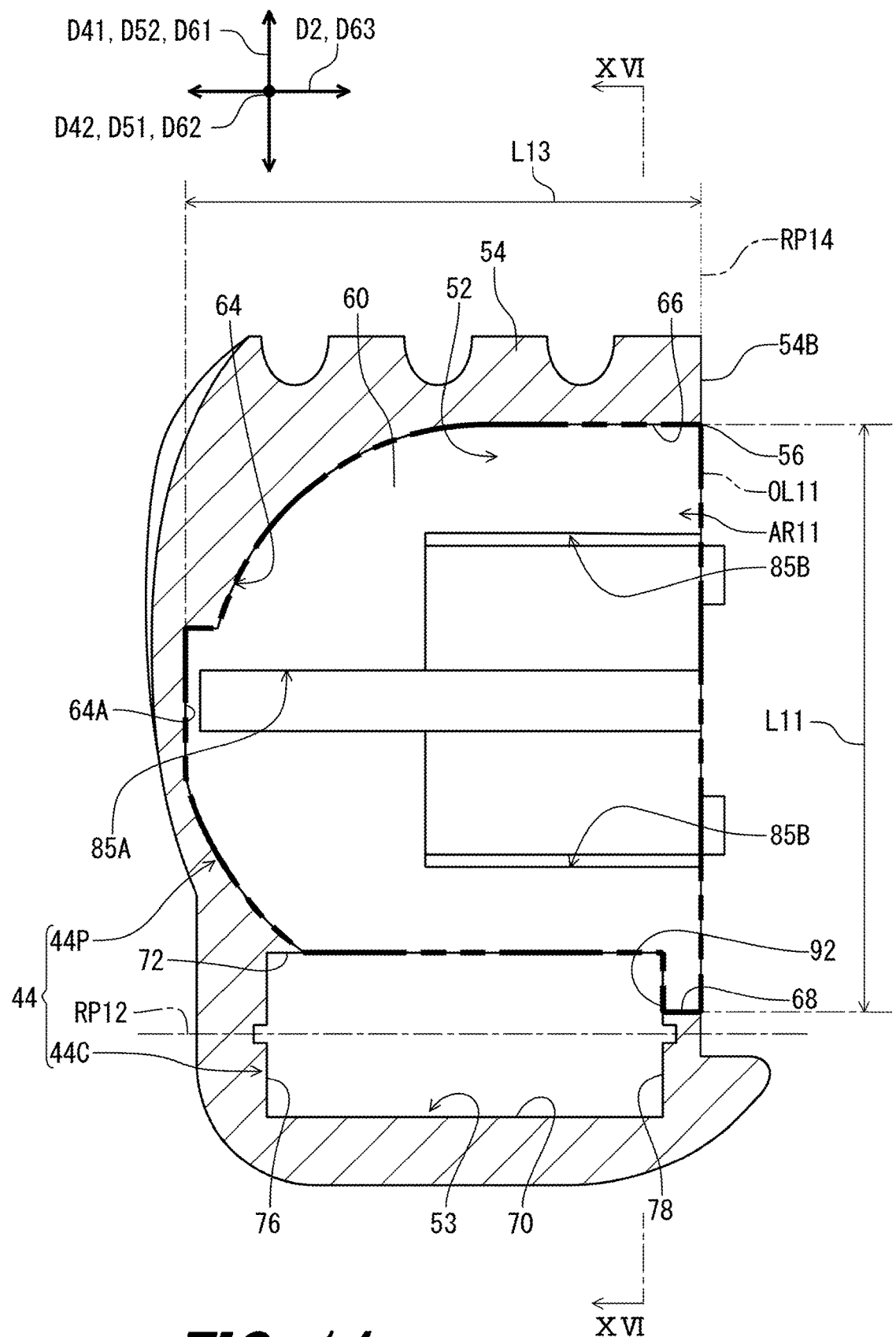
FIG. 14 is a cross-sectional view of the main body of the accommodating structure taken along line XIV-XIV of FIG. 4.

As seen in FIG. 14, the first inner surface 60 has a first outline OL11. The first outline OL11 defines a first area AR11 as viewed in a direction perpendicular to the reference plane RP11 (see, e.g., FIG. 4). In this embodiment, the first outline OL11 defines the first area AR11 as viewed in the second direction D42 perpendicular to the reference plane RP11 (see, e.g., FIG. 4).

Figure 15:
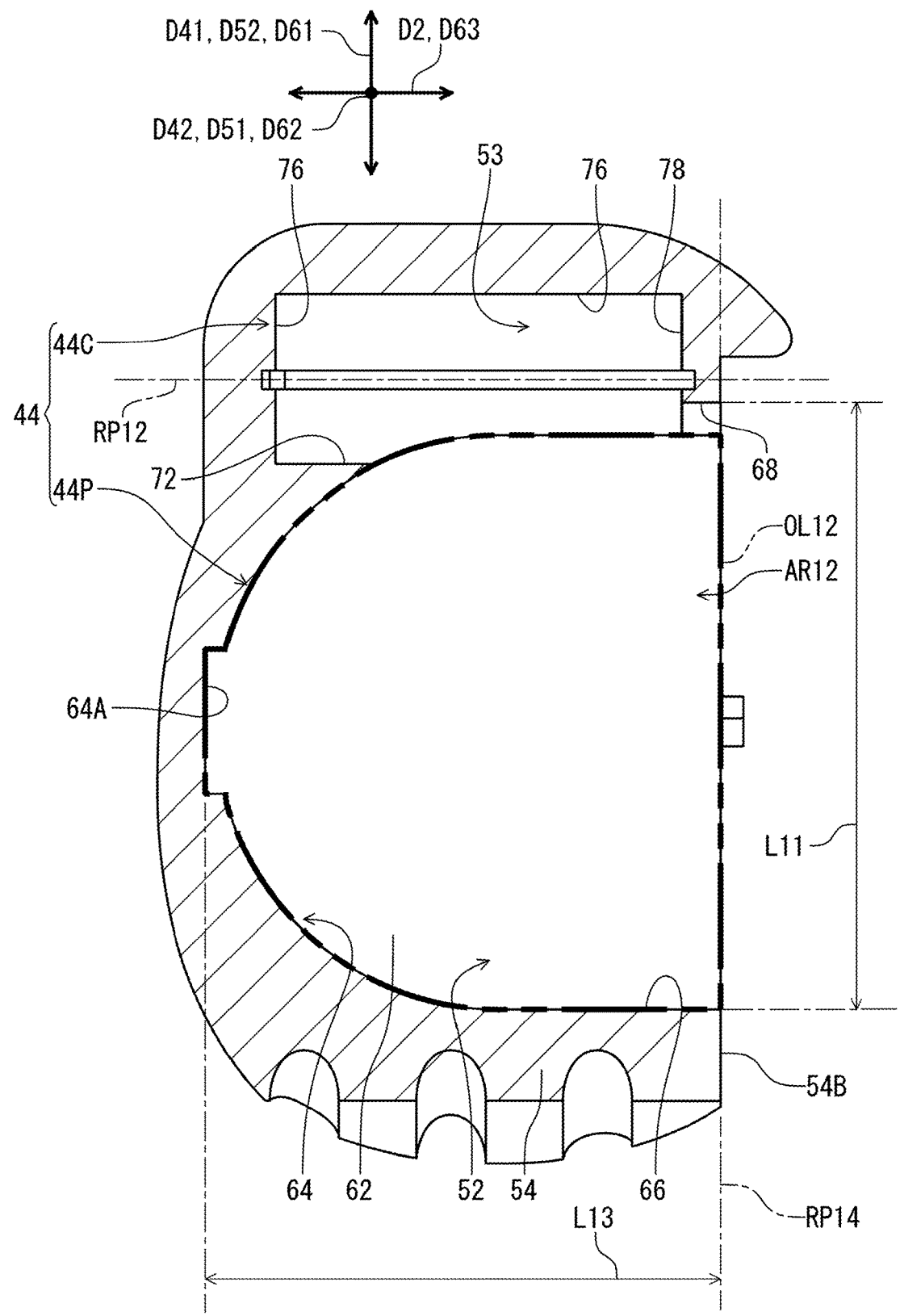
FIG. 15 is another cross-sectional view of the main body of the accommodating structure taken along line XV-XV of FIG. 4.

As seen in FIG. 15, the second inner surface 62 has a second outline OL12. The second outline OL12 defines a second area AR12 as viewed in the direction perpendicular to the reference plane RP11. In this embodiment, the second outline OL12 defines the second area AR12 as viewed in the second direction D42 perpendicular to the reference plane RP11 (see, e.g., FIG. 4).

Figure 16:
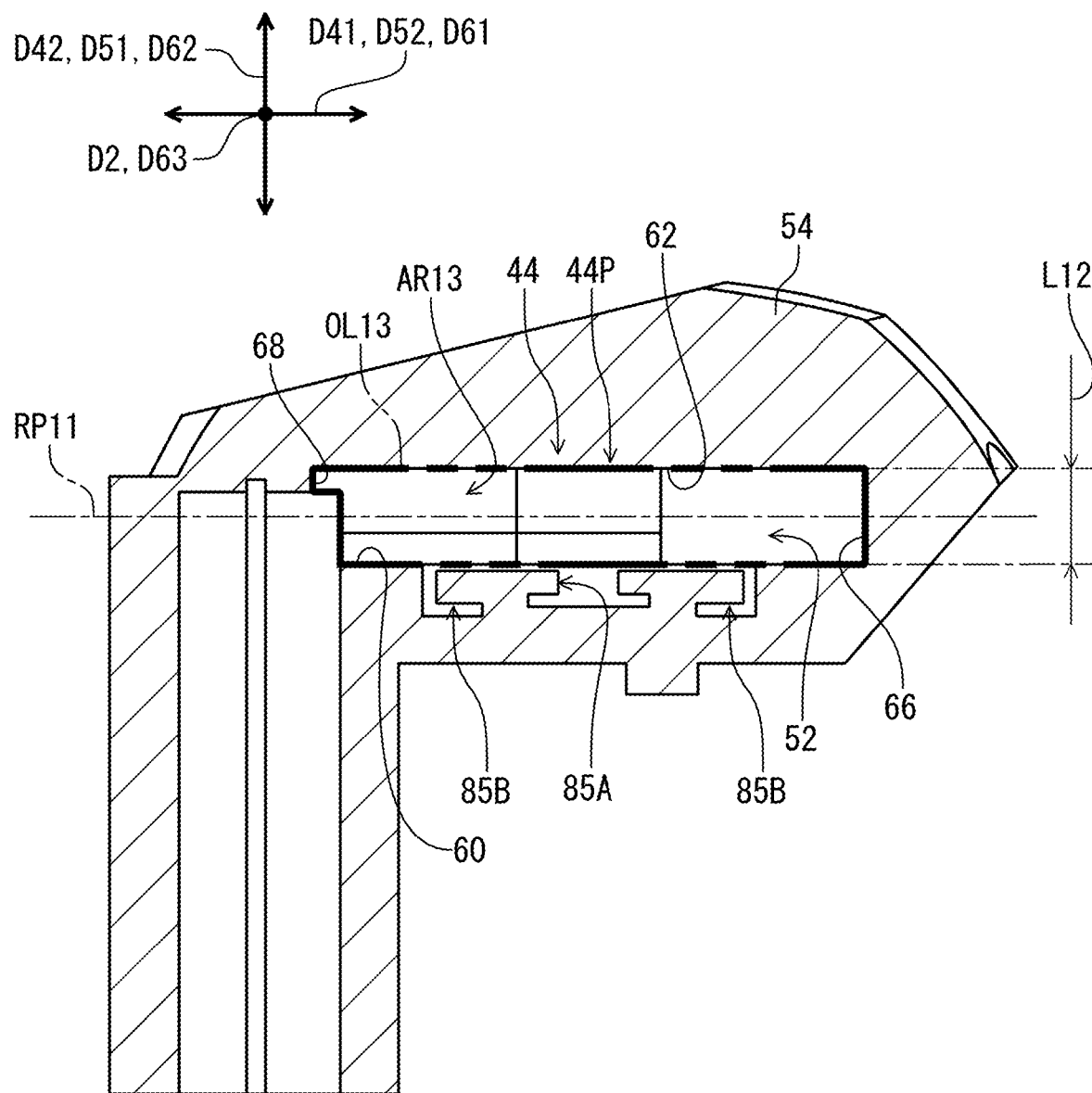
FIG. 16 is another cross-sectional view of the main body of the accommodating structure taken along line XVI-XVI of FIG. 14.

As seen in FIG. 16, the third inner surface 64 has a third outline OL13. The third outline OL13 defines a third area AR13 as viewed in a direction parallel to the reference plane RP11. In this embodiment, the third outline OL13 defines the third area AR13 as viewed in the axial direction D2 parallel to the reference plane RP11.

As seen in FIG. 14, the insertion opening 56 extends along an insertion opening plane RP14. In this embodiment, the insertion opening plane RP14 extends in the first direction D41. The insertion opening plane RP14 is parallel to the first direction D41 and is perpendicular to the axial direction D2. As seen in FIG. 11, the main body 54 includes an attachment surface 54B. The seal member 43A is in contact with the attachment surface 54B in a state where the seal member 43A is attached to the main body 54. The insertion opening plane RP14 is defined on the attachment surface 54B.

Figure 17:
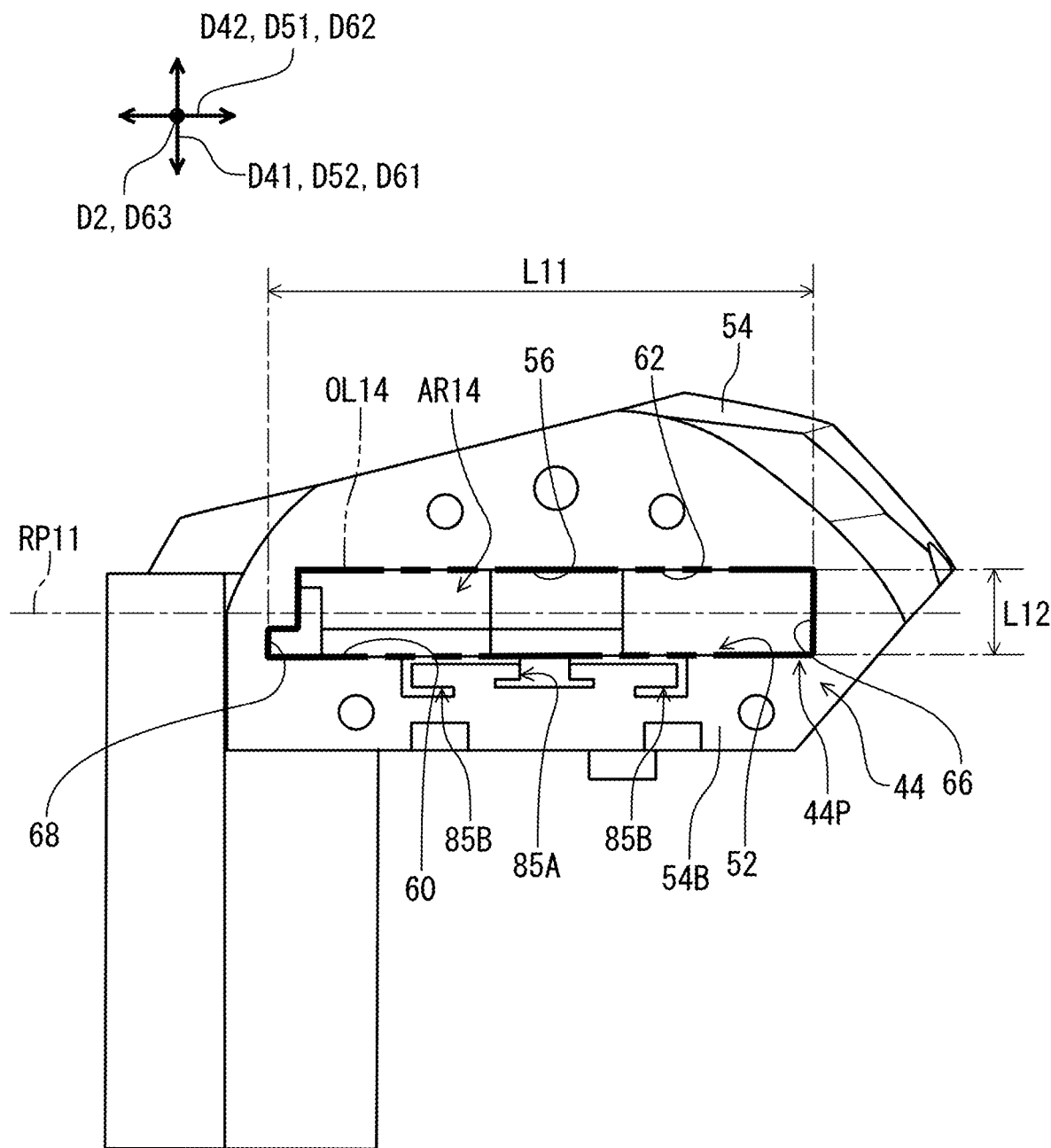
FIG. 17 is a side elevational view of the main body of the accommodating structure illustrated in FIG. 14.

As seen in FIG. 17, the insertion opening 56 has an opening outline OL14. The opening outline OL14 defines an insertion opening area AR14 as viewed in a direction perpendicular to the insertion opening plane RP14 (see, e.g., FIG. 14). The insertion opening area AR14 is defined between the first inner surface 60 and the second inner surface 62. In this embodiment, the opening outline OL14 defines the insertion opening area AR14 as viewed in the axial direction D2 perpendicular to the insertion opening plane RP14 (see, e.g., FIG. 14).

The insertion opening area AR14 has a first length L11 and a second length L12. The first length L11 is defined in a first length direction D61 parallel to the reference plane RP11. The first length L11 is defined from the fourth inner surface 66 to the fifth inner surface 68 in the first length direction D61. Thus, the first length L11 of the insertion opening 56 is equal to a length of the power-supply accommodating part 44P defined in the first length direction D61 (i.e., the first direction D41).

The second length L12 is defined in a second length direction D62 perpendicular to the first length direction D61. The second length L12 is defined from the first inner surface 60 to the second inner surface 62 in the second length direction D62. In this embodiment, the first length L11 is longer than the second length L12. However, the first length L11 can be equal to or shorter than the second length L12.

As seen in FIG. 14, the power-supply accommodating part 44P has a third length L13 defined in a third length direction D63 perpendicular to the first length direction D61 and parallel to the reference plane RP21. The third length L13 is defined as a maximum depth of the power-supply accommodating part 44P. Specifically, the third length L13 is defined as a maximum depth of the accommodating space 52 of the power-supply accommodating part 44P. The third length direction D63 is parallel to the axial direction D2.

As seen in FIGS. 14 and 17, the third length L13 is longer than the second length L12. The first area AR11 is larger than the insertion opening area AR14. However, the first area AR11 can be equal to or smaller than the insertion opening area AR14. The third length L13 can be equal to or shorter the second length L12.

As seen in FIGS. 15 and 17, the second area AR12 is larger than the insertion opening area AR14. However, the second area AR12 can be equal to or smaller than the insertion opening area AR14.

As seen in FIGS. 14 and 17, the first area AR11 is larger than the third area AR13. However, the first area AR11 can be equal to or smaller than the third area AR13.

Figure 18:
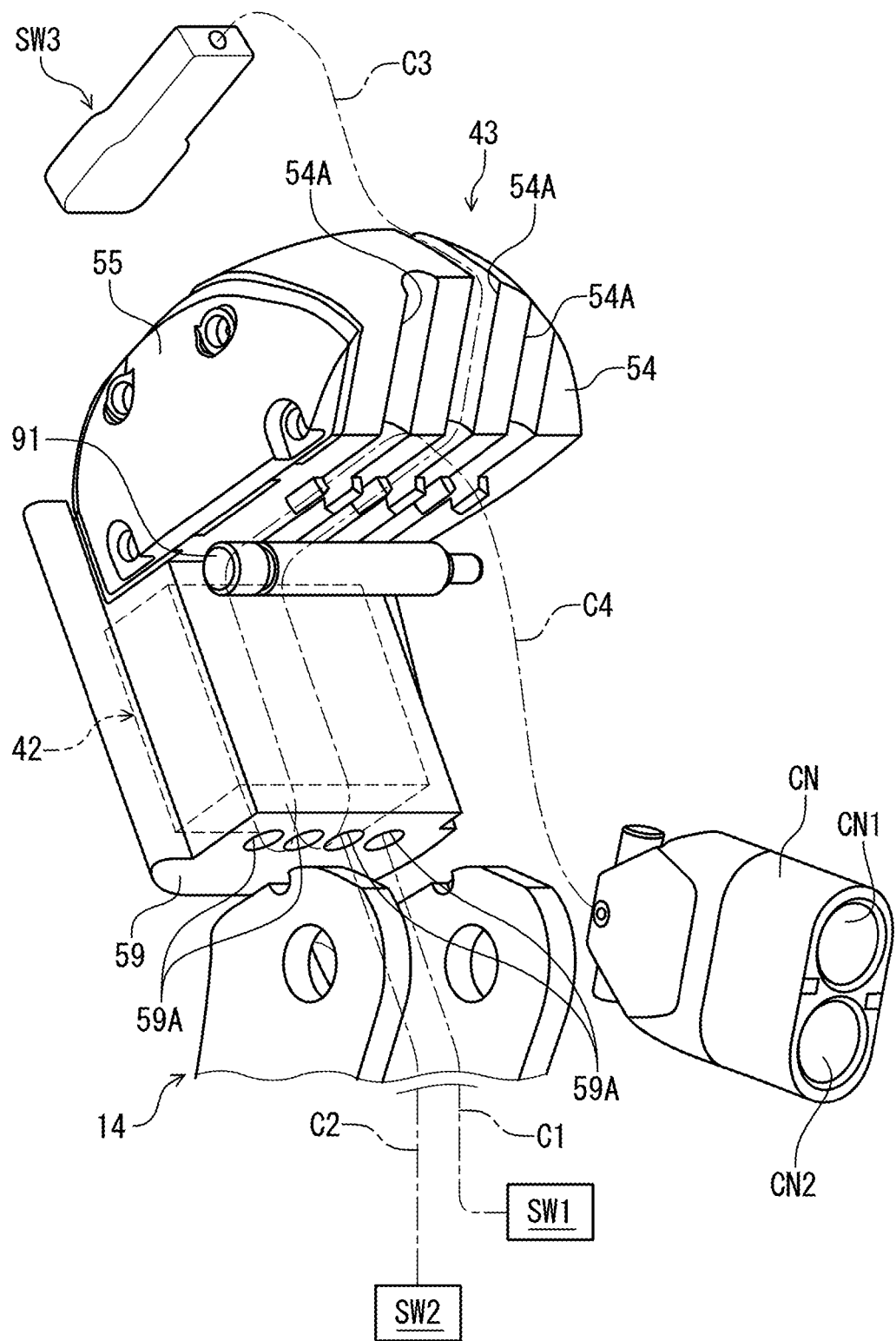
FIG. 18 is an exploded perspective view of the operating device illustrated in FIG. 1.

As seen in FIG. 18, the switch SW1 is electrically connected to the circuitry 42 via an electric cable C1. The switch SW2 is electrically connected to the circuitry 42 via an electric cable C2. The switch SW3 is electrically connected to the circuitry 42 via an electric cable C3. The connector CN is electrically connected to the circuitry 42 via an electric cable C4. The electric cable C4 includes a plurality of lines corresponding to the connection ports CN1 and CN2 of the connector CN. The electric cable C1 extends through one of the plurality of through-holes 59A to connect the switch SW1 to the circuitry 42. The electric cable C2 extends through one of the plurality of through-holes 59A to connect the switch SW2 to the circuitry 42. The electric cable C3 extends through one of the plurality of through-holes 59A to connect the switch SW3 to the circuitry 42. The electric cable C4 extends through one of the plurality of through-holes 59A to connect the connector CN to the circuitry 42.

The main body 54 includes a plurality of grooves 54A. In this embodiment, the power-supply accommodating part 44P includes the plurality of grooves 54A. The plurality of grooves 54A is provided on an outer surface of the main body 54. The electric cable C3 is partly provided in one of the plurality of grooves 54A. The electric cable C4 is partly provided in one of the plurality of grooves 54A. A total number of the grooves 54A is not limited to this embodiment and can be increased or decreased. The at least one of the grooves 54A can be omitted from the main body 54.

The operating device 10 comprises a support member 91. The support member 91 is attached to the base member 12 (see, e.g., FIG. 2). In this embodiment, the support member 91 is attached to the base body 46 of the base member 12. The support member 91 is spaced apart from the accommodating structure 43. The electric cables C3 and C4 are partly provided between the accommodating structure 43 and the support member 91.

Figure 19:
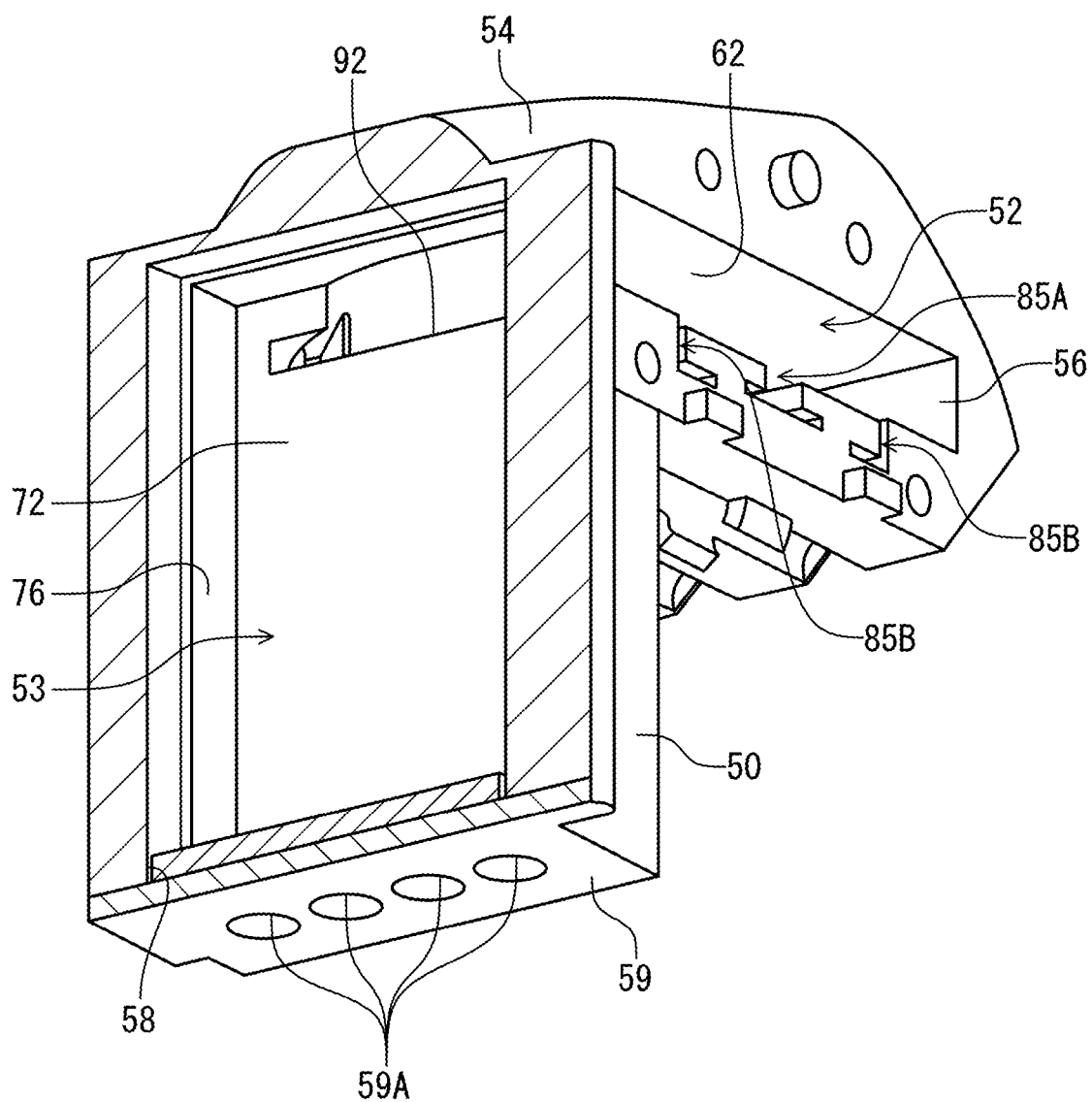
FIG. 19 is a cross-sectional perspective view of the main body of the accommodating structure illustrated in FIG. 14.

As seen in FIG. 19, the accommodating space 52 is in communication with the accommodating space 53 inside the accommodating structure 43. The accommodating structure 43 includes an intermediate opening 92. The intermediate opening 92 is provided between the accommodating spaces 52 and 56 to connect the accommodating space 52 to the accommodating space 53.

As seen in FIG. 11, the positive contact 82 is electrically connected to the circuitry 42 via an electric cable 94. The negative contact 84 is electrically connected to the circuitry 42 via an electric cable 96. The electric cables 94 and 96 extend from the accommodating space 52 to the accommodating space 53 through the intermediate opening 92.

As seen in FIG. 1, the operating device 10 comprises a charging unit 98 through which the power supply 40 is to be charged. In this embodiment, the charging unit 98 includes a charging port 98A. The charging port 98A is configured to be detachably connected to a charging cable. The charging unit 98 is electrically connected to the circuitry 42. In this embodiment, the charging unit 98 is provided to the main body 54. The charging unit 98 is covered by the grip cover 28 in the state where the grip cover 28 is attached to the base member 12. The charging unit 98 is provided above the pivot axis A1 in the mounting state where the base member 12 is mounted to the handlebar 3. Examples of the charging cable include a universal serial bus (USB) cable and a micro USB cable. Examples of the charging unit 98 include a USB port and a micro USB port. However, the position of the charging unit 98 is not limited to this embodiment. The charging unit 98 can include a wireless charging structure through which the power supply 40 can be wirelessly charged.

Figure 20:
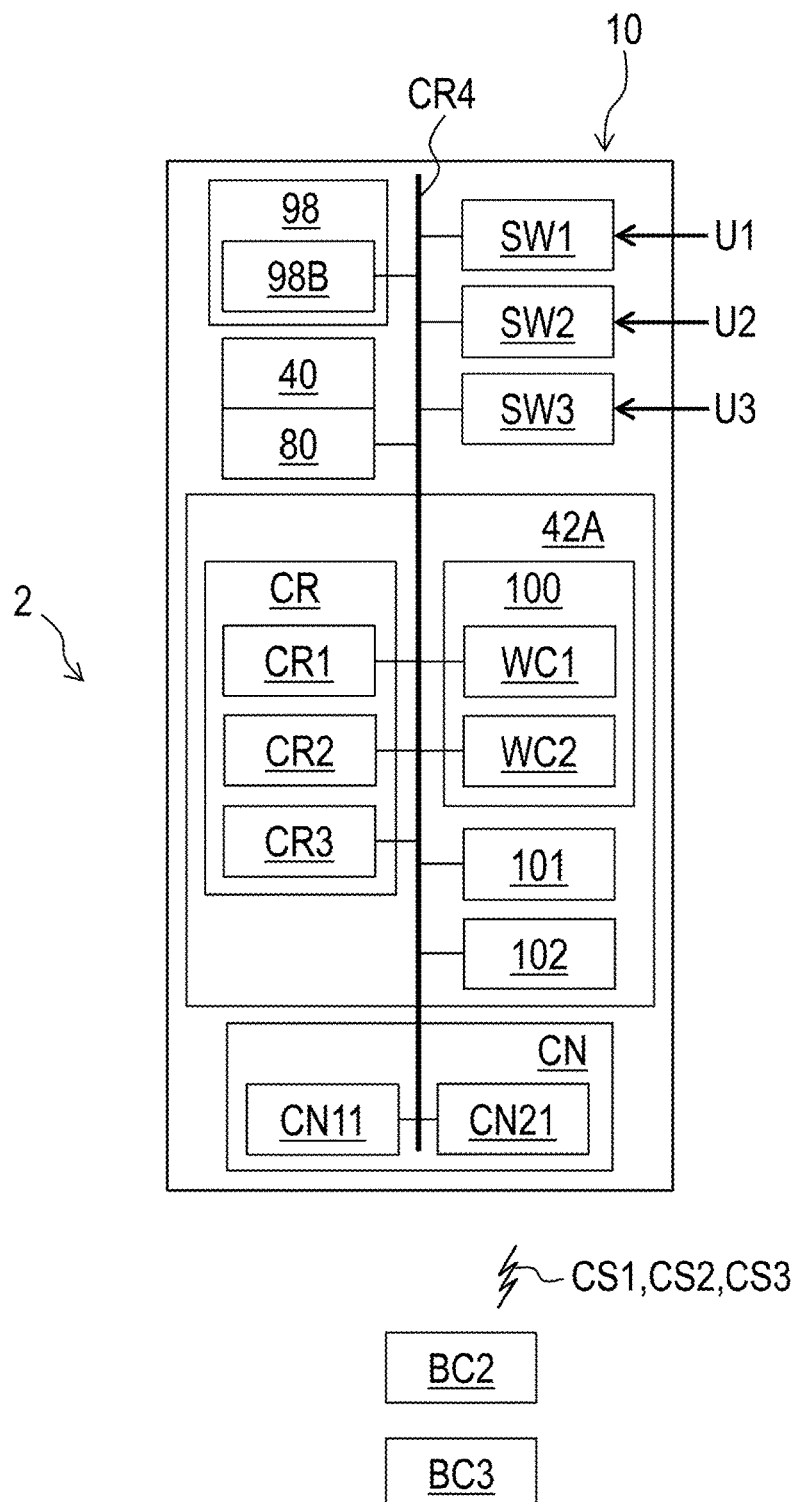
FIG. 20 is a block diagram of a human-powered vehicle including the operating device illustrated in FIG. 1 (wireless communication).
Figure 21:
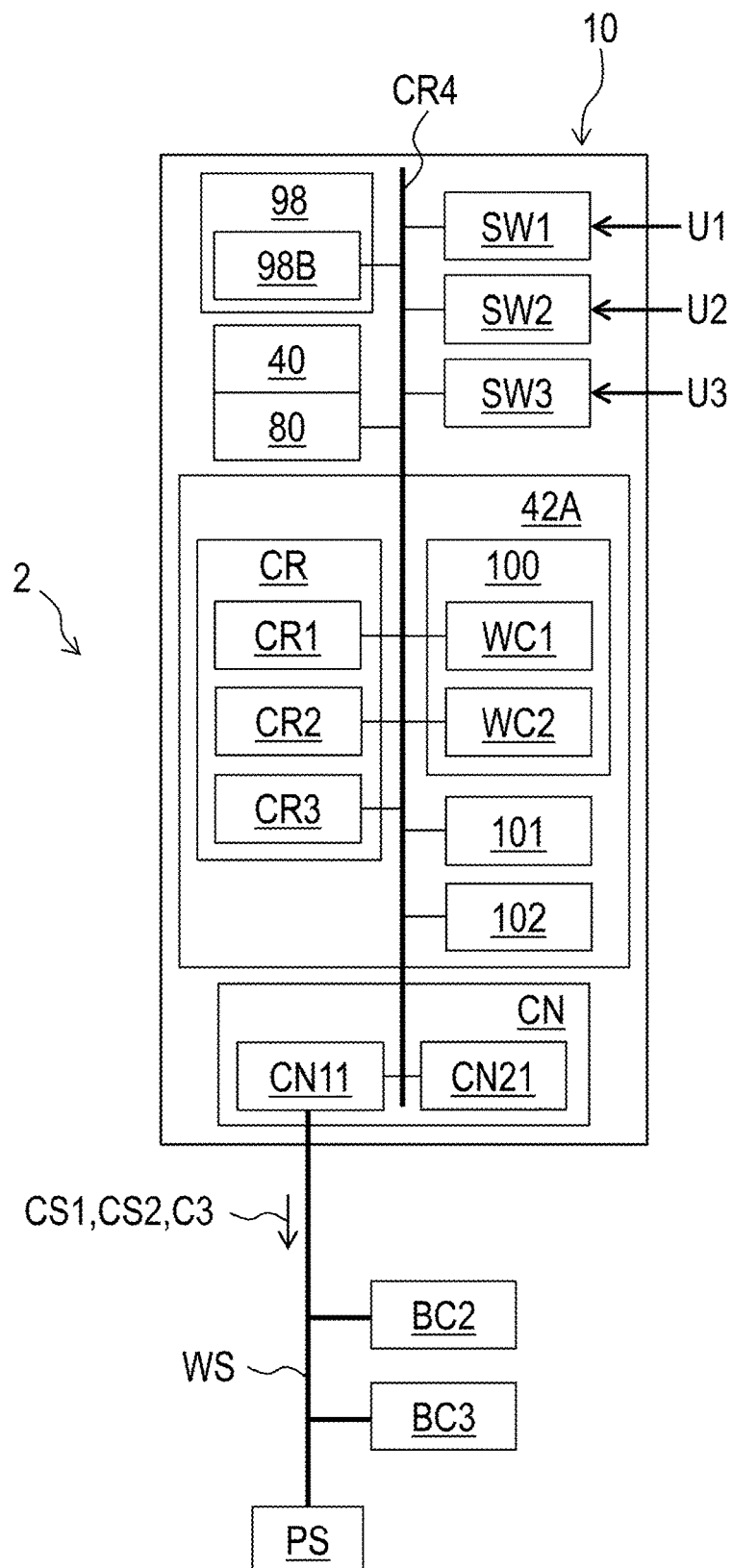
FIG. 21 is a block diagram of the human-powered vehicle of the operating device illustrated in FIG. 1 (wired communication).

As seen in FIGS. 20 and 21, the circuitry 42 includes at least one of a communicator, an antenna, an informing unit, and a controller. In this embodiment, the circuitry 42 includes a communicator 100, an antenna 101, an informing unit 102, and a controller CR. The communicator 100, the antenna 101, the informing unit 102, and the controller CR are electrically mounted on the circuit board 42A. The communicator 100, the antenna 101, the informing unit 102, and the controller CR are electrically connected with each other via the circuit board 42A.

The communicator 100 is configured to communicate with another device via at least one of a wired communication channel and a wireless communication channel. In this embodiment, the communicator 100 includes a wired communicator WC1 and a wireless communicator WC2. The wired communicator WC1 is configured to communicate with a wired communicator of the electric component BC2 via a wired communication channel. The wireless communicator WC2 is configured to communicate with a wireless communicator of the electric component BC2 using the antenna 101 via a wireless communication channel. The wireless communicator WC2 is configured to communicate with a wireless communicator of the additional electric component BC3 using the antenna 101 via a wireless communication channel.

The controller CR is configured to control another device in response to the user inputs U1 to U3 and/or other information. In this embodiment, the controller CR is configured to control the wired communicator WC1 and the wireless communicator WC2 to transmit a control signal CS1 and/or CS2 to the electric component BC2. The controller CR is configured to control the wired communicator WC1 and the wireless communicator WC2 to transmit a control signal CS3 to the additional electric component BC3.

In this embodiment, the control signal CS1 indicates upshifting of the electric component BC2. The control signal CS2 indicates downshifting of the electric component BC2. The control signal CS3 indicates that the state of the additional electric component BC3 is changed between the lock state and the adjustable state.

The controller CR is configured to select one of the wired communicator WC1 and the wireless communicator WC2. In this embodiment, the controller CR is configured to select the wireless communicator WC2 as a default communicator. The controller CR is configured to detect connection between the connector CN and an electric control cable. The connector CN includes a plurality of connector contacts CN11 and CN21. The connector contact CN11 is configured to be electrically connected to an electrical control cable connected to the connection port CN1 (see, e.g., FIG. 2) of the connector CN. The connector contact CN21 is configured to be electrically connected to an electrical control cable connected to the connection port CN2 (see, e.g., FIG. 2) of the connector CN.

The plurality of connector contacts CN11 and CN21 is electrically connected to the controller CR. The controller CR is configured to detect electricity supplied from the electric power source PS to the connector CN. The controller CR is configured to select the wireless communicator WC2 if the electric control cable is not connected to the connector CN. The controller CR is configured to select the wired communicator WC1 if the electric control cable is connected to the connector CN. However, the controller CR can be configured to select the wired communicator WC1 as a default communicator.

The controller CR includes a processor CR1, a memory CR2, and a system bus CR4. The processor CR1 and the memory CR2 are electrically mounted on the circuitry 42. The processor CR1 includes a central processing unit (CPU) and a memory controller. The processor CR1 is electrically connected to the memory CR2 with the circuitry 42 and the system bus CR4. The master wired communicator and the master wireless communicator are configured to be electrically mounted on the circuitry. Each of the wired communicator WC1 and the wireless communicator WC2 is electrically connected to the processor CR1 and the memory CR2 with the circuitry 42 and the system bus CR4.

The memory CR2 includes a read only memory (ROM) and a random-access memory (RAM). The memory CR2 includes storage areas each having an address in the ROM and the RAM. The processor CR1 is configured to control the memory CR2 to store data in the storage areas of the memory CR2 and reads data from the storage areas of the memory CR2. The memory CR2 (e.g., the ROM) stores a program. The program is read into the processor CR1, and thereby the configuration and/or algorithm of the communicator 100 is performed.

In this embodiment, the wired communication channel is established using power line communication (PLC) technology. More specifically, the electric wiring structure WS includes a ground line and a voltage line. The PLC technology is used for communicating between electric components. The PLC carries data on a conductor that is also used simultaneously for electric power transmission or electric power distribution to the electric components.

As seen in FIG. 21, in this embodiment, the human-powered vehicle 2 can include an electric power source PS provided separately from the power supply 40. The electric power source PS is configured to be mounted to a vehicle frame. For example, the electric power source PS has a capacity greater than a capacity of the power supply 40. The electric power source PS is configured to be electrically connected to the connector CN of the operating device 10 via an electric control cable of an electric wiring structure WS. Electricity is supplied from the electric power source PS through the electric wiring structure WS connected to the operating device 10, the electric component BC2 and the additional electric component BC3. Furthermore, the wired communicator WD1 is configured to receive signals from each other through the electric wiring structure WS using the PLC. Examples of the electric power source PS include a primary battery and a secondary battery. However, the electric power source PS is not limited to this embodiment.

The PLC uses unique device identification (ID) that is assigned to an electric component such as the operating device 10. In this embodiment, the memory CR2 is configured to store device information including unique device ID assigned to the operating device 10. Based on the unique device ID, the controller CR is configured to recognize signals which are necessary for itself among signals transmitted via the wired communication channel. For example, the controller CR is configured to generate signals including the device information indicating the communicator 100.

The controller CR is configured to recognize signals including other device information as signals transmitted from the electric component BC2 via the wired communication channel. The wired communicator WC1 is configured to separate input signals to a power source voltage and signals including device information. The wired communicator WC1 is configured to regulate the power source voltage to a level at which the communicator 100 can properly operate. The wired communicator WC1 is further configured to superimpose output signals such as signals including the device information on the power source voltage applied to the electric wiring structure WS from the electric power source PS.

The wireless communicator WC2 includes a signal transmitting circuit and a signal receiving circuit. The wireless communicator WC2 is configured to superimpose digital signals on carrier wave using a predetermined wireless communication protocol to wirelessly transmit the digital signal. In this embodiment, the wireless communicator WC2 is configured to encrypt signals using a cryptographic key to generate encrypted wireless signals.

The wireless communicator WC2 is configured to receive and/or transmit a wireless signal via the antenna 101. In this embodiment, the wireless communicator WC2 is configured to decode the wireless signal to recognize signals and/or information wirelessly transmitted from another wireless communicator. The wireless communicator WC2 is configured to decrypt the wireless signal using the cryptographic key. The wireless communicator WC2 can also be referred to as a wireless communication circuit WC2.

The controller CR is configured to generate the control signal CS1 in response to the user input U1. The controller CR is configured to generate the control signal CS2 in response to the user input U2. The controller CR is configured to generate the control signal CS3 in response to the user input U3. The controller CR is configured to control the wired communicator WC1 to respectively transmit the control signals CS1, CS2, and CS3 via the wired communication channel in response to the user inputs U1, U2, and U3 if the controller CR selects the wired communicator WC1. The controller CR is configured to control the wireless communicator WC2 to respectively transmit the control signals CS1, CS2, and CS3 via the wireless communication channel in response to the user inputs U1, U2, and U3 if the controller CR selects the wireless communicator WC2.

The charging unit 98 includes a charging contact 98B. The charging contact 98B is electrically connected to the controller CR. The controller CR is configured to detect electricity supplied from the electric power source PS to the connector CN. The controller CR includes a charging controller CR3 configured to control charging of the power supply 40. The charging controller CR3 is configured to detect electricity supplied from an external power supply to the charging unit 98. The charging controller CR3 is configured to control the charging of a secondary battery of the power supply 40 if the external power supply is connected to the charging unit 98.

As seen in FIG. 4, the informing unit 102 is configured to inform the user of a state of the operating device 10. Examples of the state of the operating device 10 includes a communication state of the communicator 100, a level of remaining electricity of the power supply 40, a charging state of the power supply 40, and a pairing state of the communicator 100. Examples of the informing unit 102 include a light emitting device such as a light-emitting diode (LED) and a loudspeaker. In this embodiment, the informing unit 102 is provided to the accommodating structure 43. The informing unit 102 is provided to the circuitry accommodating part 44C. The accommodating structure 43 includes a light transmitting part 104. The light transmitting part 104 is provided in a position where the light transmitting part 104 is not covered by the grip cover 28 in the state where the grip cover 28 is attached to the base member 12. The informing unit 102 and the light transmitting part 104 are provided above the pivot axis A1 in the mounting state where the base member 12 is mounted to the handlebar 3. However, the position of the informing unit 102 is not limited to this embodiment.

Second Embodiment

An operating or electric device 210 in accordance with a second embodiment will be described below referring to FIGS. 22 to 37. The operating or electric device 210 has the same structure and/or configuration as those of the operating or electric device 10 except for the accommodating structure 43. Thus, elements having substantially the same function as those in the first embodiment will be numbered the same here and will not be described and/or illustrated again in detail here for the sake of brevity.

Figure 22:
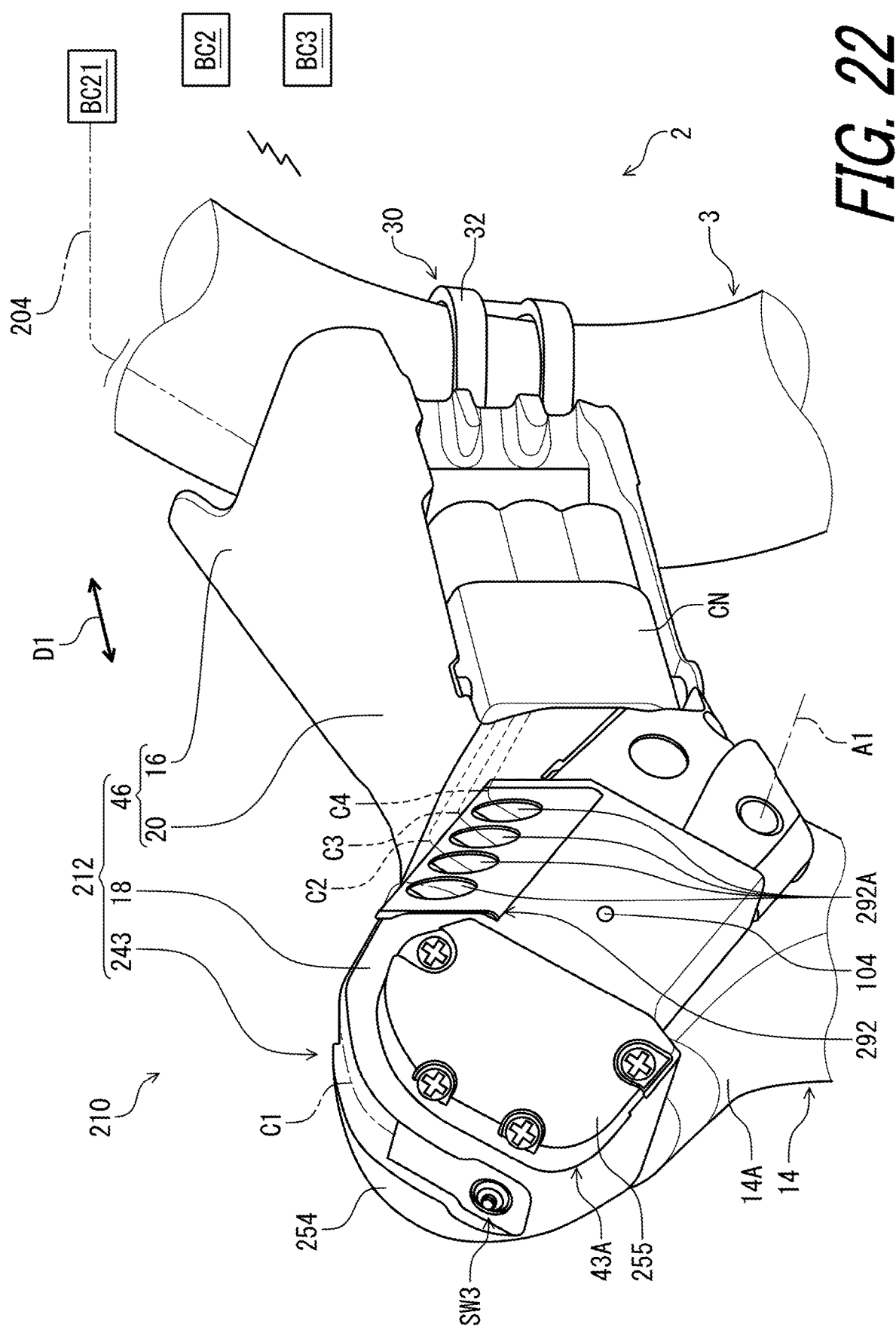
FIG. 22 is a perspective view of an operating device in accordance with a second embodiment.

As seen in FIG. 22, the operating device 210 for the human-powered vehicle 2 comprises a base member 212. The electric device 210 further comprises at least one of an operating member and an actuated member movable relative to the base member 12. In this embodiment, the operating device 210 for the human-powered vehicle 2 comprises the operating member 14. The base member 212 has substantially the same structure as that of the base member 12 of the first embodiment.

Figure 23:
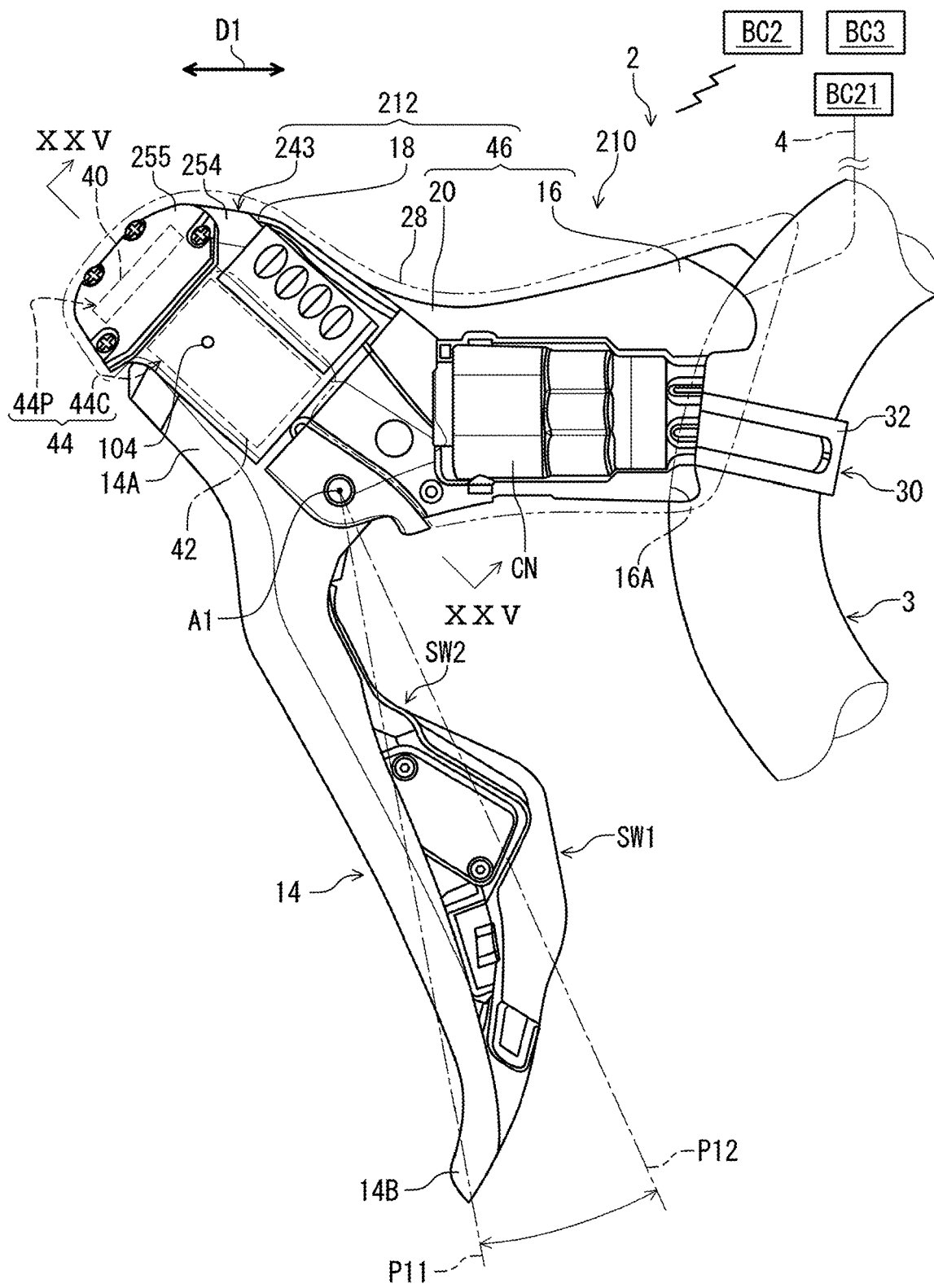
FIG. 23 is a side elevational view of the operating device illustrated in FIG. 22.

As seen in FIG. 23, the base member 212 extends in the longitudinal direction D1. The base member 212 includes the first end portion 16 and the second end portion 18. The first end portion 16 is configured to be coupled to the handlebar 3. The second end portion 18 is opposite to the first end portion 16. The second end portion 18 is opposite to the first end portion 16 in the longitudinal direction D1. The second end portion 18 constitutes a free end portion of the base member 212. The base member 212 includes the grip portion 20 provided between the first end portion 16 and the second end portion 18. The grip portion 20 is provided between the first end portion 16 and the second end portion 18 in the longitudinal direction D1. The base member 212 includes the base body 46.

In this embodiment, the operating device 210 is configured to be connected to an electric component BC21 such as a brake device via a mechanical control cable 204 such as a Bowden cable. The hydraulic unit 26 of the first embodiment is omitted from the operating device 210. As with the first embodiment, however, the operating device 210 can include a hydraulic unit configured to actuate the operated device BC1.

As seen in FIG. 23, the base member 212 includes an accommodating structure 243. Namely, the electric device 210 for the human-powered vehicle 2 comprises the accommodating structure 243. The accommodating structure 243 is provided to the second end portion 18. The accommodating structure 243 is disposed at a location which is the farthest from the first end portion 16 in the second end portion 18 along the longitudinal direction D1 as viewed along the pivot axis A1. The accommodating structure 243 includes the accommodating part 244 configured to accommodate at least one of the power supply 40 and the circuitry 42.

In this embodiment, the accommodating part 244 is configured to accommodate the power supply 40 and the circuitry 42. The accommodating part 244 has substantially the same structure as that of the accommodating part 44 of the first embodiment. Specifically, the accommodating part 244 includes the power-supply accommodating part 244P and the circuitry accommodating part 244C. Namely, the base member 212 includes the power-supply accommodating part 244P and the circuitry accommodating part 244C. The accommodating structure 243 includes the power-supply accommodating part 244P and the circuitry accommodating part 244C. The power-supply accommodating part 244P has substantially the same structure as that of the power-supply accommodating part 44P of the first embodiment. The circuitry accommodating part 244C has substantially the same structure as that of the circuitry accommodating part 44C of the first embodiment. The power-supply accommodating part 244P is configured to accommodate the power supply 40. The circuitry accommodating part 244C is configured to accommodate the circuitry 42. However, the accommodating part 244 can be configured to accommodate only one of the power supply 40 and the circuitry 42. One of the power-supply accommodating part 244P and the circuitry accommodating part 244C can be omitted from the accommodating part 244.

In this embodiment, the positional relationship among the power-supply accommodating part 244P, the circuitry accommodating part 244C, and the base body 46 is different from the positional relationship among the power-supply accommodating part 44P, the circuitry accommodating part 44C, and the base body 46 described in the first embodiment.

Figure 24:
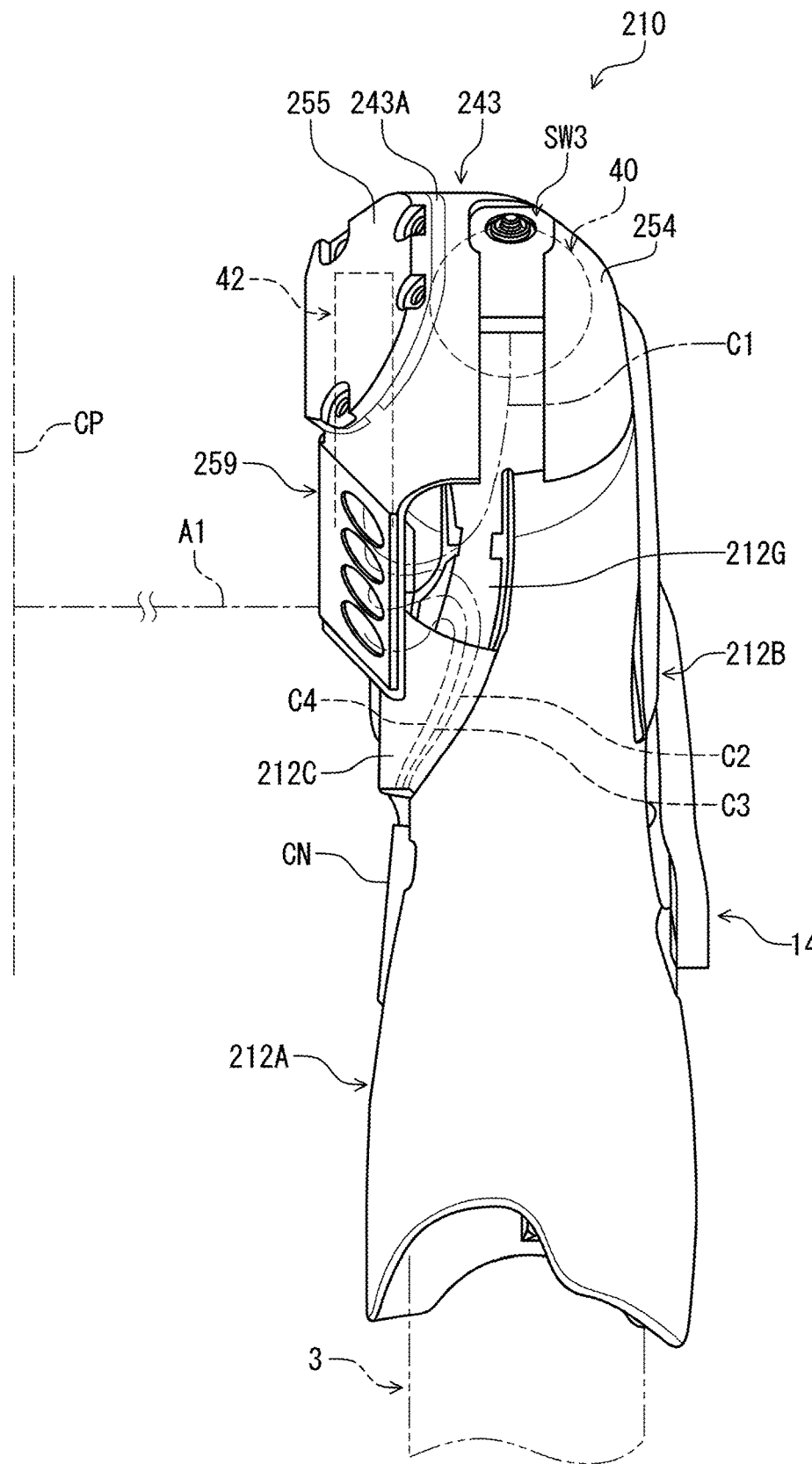
FIG. 24 is a top view of the operating device illustrated in FIG. 22.

As seen in FIG. 24, the base member 212 includes a first lateral surface 212A and a second lateral surface 212B. The second lateral surface 212B is provided on a reverse side of the first lateral surface 212A along the pivot axis A1. One of the power supply 40 and the circuitry 42 is at least partly provided on one of the first lateral surface 212A and the second lateral surface 212B. One of the power-supply accommodating part 44P and the circuitry 42 is at least partly provided on one of the first lateral surface 212A and the second lateral surface 212B. In this embodiment, the circuitry 42 is at least partly provided on the first lateral surface 212A. The first lateral surface 212A is provided between the second lateral surface 212B and an axial center plane CP of the handlebar 3. The axial center plane CP is perpendicular to the pivot axis A1 in the mounting state where the base member 212 is mounted to the handlebar 3. The axial center plane CP is defied to bisect an axial length of the handlebar 3. The circuitry 42 can be at least partly provided on the second lateral surface 212B. The power supply 40 can be at least partly provided on one of the first lateral surface 212A and the second lateral surface 212B.

As seen in FIG. 23, the accommodating part 244 is at least partly provided farther from the first end portion 16 of the base member 212 than the proximal end portion 14A of the operating member 14 in the longitudinal direction D1. The accommodating part 244 is at least partly provided farther from the contact surface 16A of the first end portion 16 than the operating member 14. At least one of the power-supply accommodating part 244P and the circuitry 42 is at least partly provided at the second end portion 18 of the base member 212. In this embodiment, the accommodating part 244 is partly provided farther from the first end portion 16 of the base member 212 than the proximal end portion 14A of the operating member 14 in the longitudinal direction D1. The accommodating part 244 is partly provided farther from the contact surface 16A of the first end portion 16 than the operating member 14. The power-supply accommodating part 244P and the circuitry 42 are entirely provided at the second end portion 18 of the base member 212. However, the accommodating part 244 can be entirely provided farther from the first end portion 16 of the base member 212 than the proximal end portion 14A of the operating member 14 in the longitudinal direction D1. The accommodating part 244 can be entirely provided farther from the contact surface 16A of the first end portion 16 than the operating member 14. At least one of the power-supply accommodating part 244P and the circuitry 42 can be partly provided at the second end portion 18 of the base member 212.

The base member 212 includes the base body 46. The accommodating structure 243 is a separate member form the base body 46 and is attached to the base body 46. However, the accommodating structure 243 can be integrally provided with the base body 46 as a one-piece unitary member. The position of the accommodating structure 243 in the base member 212 is not limited to this embodiment.

As with the operating device 10 of the first embodiment, one of the power supply 40 and the circuitry 42 is closer to the operating member 14 than the other of the power supply 40 and the circuitry 42 as viewed along the pivot axis A1. In this embodiment, the circuitry 42 is closer to the operating member 14 than the power supply 40 as viewed along the pivot axis A1. However, the power supply 40 can be closer to the operating member 14 than the circuitry 42.

One of the power supply 40 and the circuitry 42 is at least partly provided above the other of the power supply 40 and the circuitry 42 in the mounting state where the first end portion 16 is coupled to the handlebar 3. In this embodiment, the power supply 40 is partly provided above the circuitry 42 in the mounting state where the first end portion 16 is coupled to the handlebar 3. However, the power supply 40 can be partly provided above the circuitry 42 in the mounting state where the first end portion 16 is coupled to the handlebar 3. The circuitry 42 can be at least partly provided above the power supply 40 in the mounting state where the first end portion 16 is coupled to the handlebar 3.

One of the power-supply accommodating part 244P and the circuitry 42 is closer to the operating member 14 than the other of the power-supply accommodating part 244P and the circuitry 42. In this embodiment, the circuitry 42 is closer to the operating member 14 than the power-supply accommodating part 244P. However, the power-supply accommodating part 244P can be closer to the operating member 14 than the circuitry 42. A distance between the power-supply accommodating part 244P and the operating member 14 can be equal to a distance between the circuitry 42 and the operating member 14.

One of the power-supply accommodating part 244P and the circuitry 42 is at least partly provided above the other of the power-supply accommodating part 244P and the circuitry 42 in the mounting state where the first end portion 16 is coupled to the handlebar 3. In this embodiment, the power-supply accommodating part 244P is partly provided above the circuitry 42 in the mounting state where the first end portion 16 is coupled to the handlebar 3. However, the power-supply accommodating part 244P can be entirely provided above the circuitry 42 in the mounting state where the first end portion 16 is coupled to the handlebar 3. The circuitry 42 can be at least partly provided above the power-supply accommodating part 244P in the mounting state where the first end portion 16 is coupled to the handlebar 3.

Figure 25:
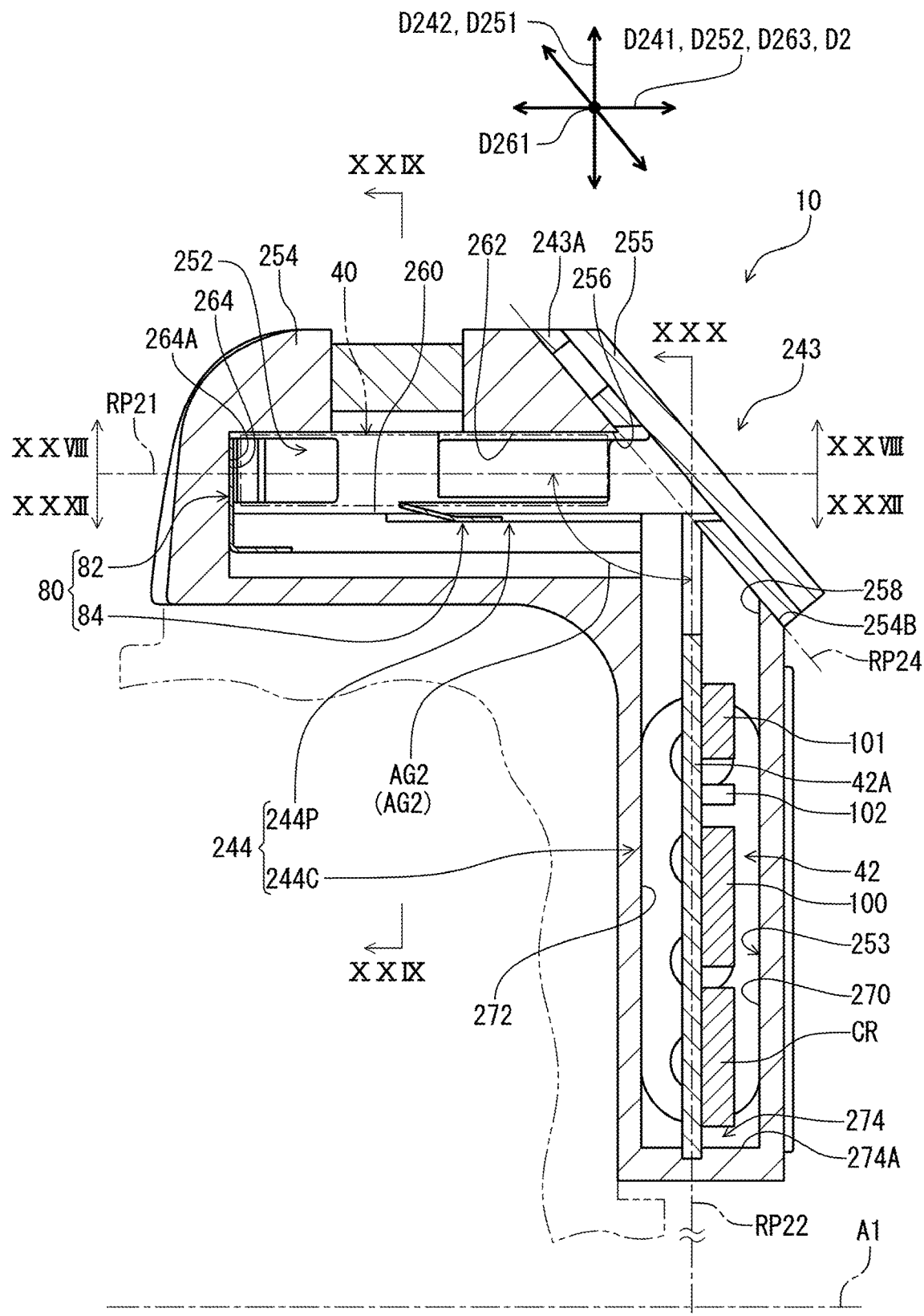
FIG. 25 is a partial cross-sectional view of the operating device taken along line XXV-XXV of FIG. 23.

As seen in FIG. 25, the power-supply accommodating part 244P extends along a reference plane RP21. The circuitry accommodating part 244C extends along an additional reference plane RP22. The power-supply accommodating part 244P is configured to accommodate the power supply 40 extending along the reference plane RP21. The circuitry 42 is provided to the base member 12 to extend along the additional reference plane RP22 intersecting with the reference plane RP21. The circuit board 42A is provided to the base member 12 to extend along the additional reference plane RP22.

The reference plane RP21 and the additional reference plane RP22 intersect with each other to define an intersection angle AG2. The intersection angle AG2 is equal to or smaller than 150 degrees. The intersection angle AG2 is equal to or larger than 30 degrees. In this embodiment, the intersection angle AG2 is 90 degrees. For example, more than half of the base body 46 is provided in a region RG2 defined between the reference plane RP21 and the additional reference plane RP22. The intersection angle AG2 is defined in the region RG2 in which more than half of the base body 46 (entirety of the base body 46 in the illustrated embodiment) is provided. However, the intersection angle AG2 is not limited to this embodiment and the above range.

The accommodating part 244 includes an accommodating space 252 in which at least one of the power supply 40 and the circuitry 42 is to be provided. In this embodiment, the power-supply accommodating part 244P includes the accommodating space 252 in which the power supply 40 is to be provided. However, the position of the accommodating space 252 is not limited to the power-supply accommodating part 244P. The accommodating space 252 can be configured to accommodate the circuitry 42 or both the power supply 40 and the circuitry 42.

The accommodating part 244 includes an accommodating space 253 in which at least one of the power supply 40 and the circuitry 42 is to be provided. In this embodiment, the circuitry accommodating part 244C includes the accommodating space 253 in which the circuitry 42 is to be provided.

However, the position of the accommodating space 253 is not limited to the circuitry accommodating part 244C. The accommodating space 253 can be configured to accommodate the power supply 40 or both the power supply 40 and the circuitry 42.

Figure 26:
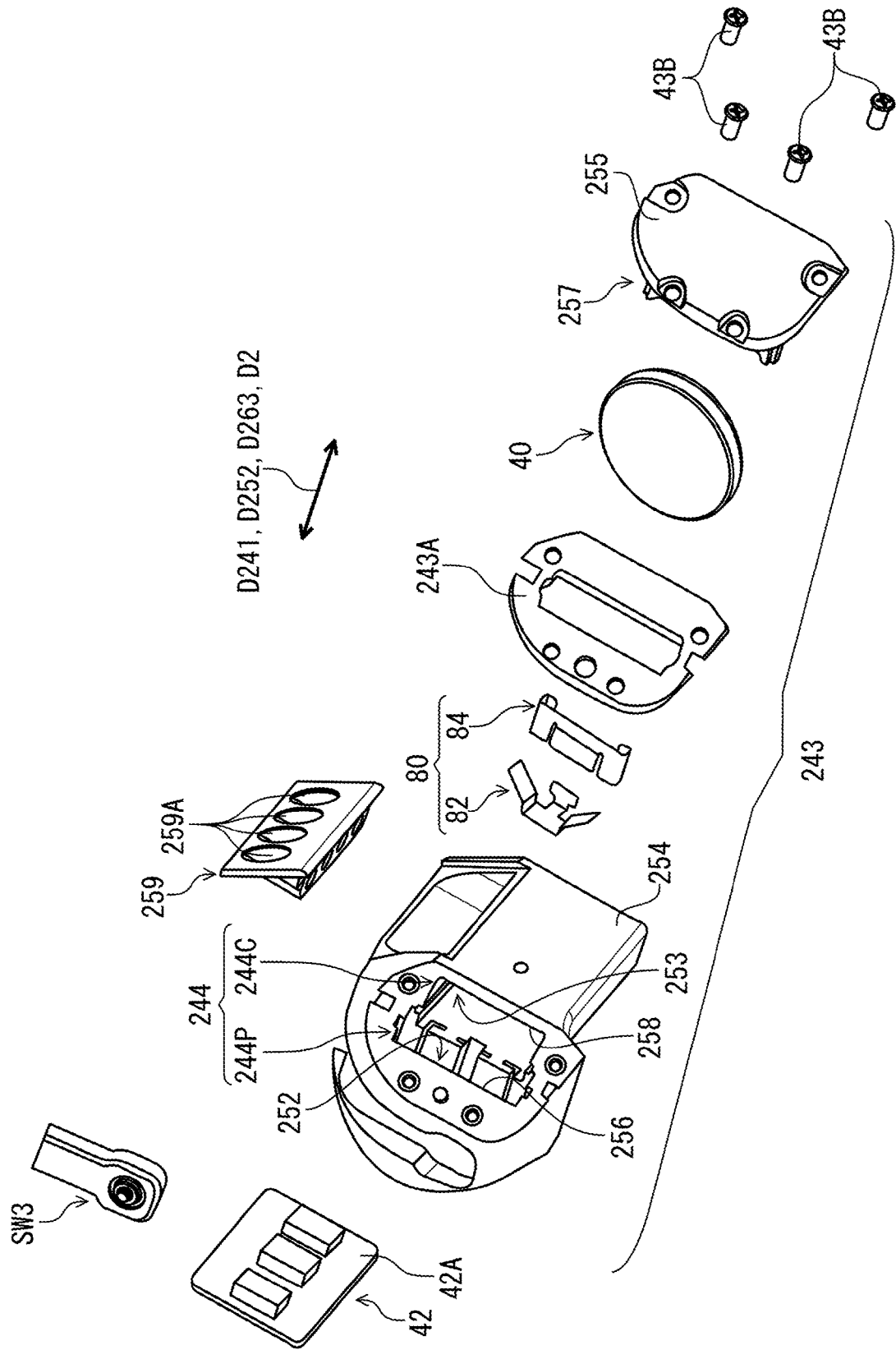
FIG. 26 is an exploded perspective view of an accommodating structure of the operating device illustrated in FIG. 22.

As seen in FIG. 26, the accommodating structure 243 includes a main body 254 and an attachment member 255. The attachment member 255 is configured to be attached to the main body 254. The power-supply accommodating part 244P is provided to at least one of the main body 254 and the attachment member 255 so as to accommodate the power supply 40. In this embodiment, the power-supply accommodating part 244P is provided to the main body 254. However, the power-supply accommodating part 244P can be provided to the attachment member 255 or both the main body 254 and the attachment member 255.

The attachment member 255 is a separate member from the main body 254. The main body 254 is integrally provided as a one-piece unitary member. Each of the main body 254 and the attachment member 255 is made of a non-metallic material such as a fiber-reinforced plastic. However, the material of the main body 254 and the attachment member 255 is not limited to this embodiment.

The accommodating part 244 includes an insertion opening 256 provided at an end of the accommodating part 244. In this embodiment, the power-supply accommodating part 244P includes the insertion opening 256. The accommodating space 252 includes the insertion opening 256. The power supply 40 passes through the insertion opening 256 when the power supply 40 is inserted into or removed from the accommodating space 252. The accommodating space 252 is open through the insertion opening 256 in the axial direction D2 with respect to the pivot axis A1 in a state where the insertion opening 256 is not covered by other members. The attachment member 255 is configured to be attached to the main body 254 to cover the insertion opening 256.

The attachment member 255 is detachably attached to the main body 254. The electric device 210 further comprises the fastener 43B. In this embodiment, the electric device 210 comprises the plurality of fasteners 43B. The attachment member 255 is detachably attached to the main body 254 with the plurality of fasteners 43B. The accommodating structure 243 is configured to allow the power supply 40 to be removed from the power-supply accommodating part 244P in an open state where the attachment member 255 is detached from the main body 254. The attachment member 255 is configured to close the insertion opening 256 in a state where the attachment member 255 is attached to the main body 254. However, the attachment member 255 can be connected to the main body 254 with another member such as a strap to prevent the attachment member 255 from unintentionally dropping from the main body 254.

The electric device 210 further comprises a seal member 243A. The seal member 243A is configured to be provided between the main body 254 and the attachment member 255 in a state where the attachment member 255 is attached to the main body 254. In this embodiment, the seal member 243A is made of a non-metallic material such as an elastic material. Examples of the elastic material include rubber. The seal member 243A is attached to the main body 254 with an integrally molding or a bonding structure such as adhesive. However, the seal member 243A can be attached to the attachment member 255 with an integrally molding or a bonding structure such as adhesive.

The electric device 210 further comprises a holder 257. The holder 257 is configured to at least partly receive the power supply 40 and configured to be arranged in the power-supply accommodating part 244P. The holder 257 is a separate member from the main body 254. The holder 257 is provided to the attachment member 255. The holder 257 extends from the attachment member 255. The holder 257 is configured to be provided in the accommodating space 252 in a state where the attachment member 255 is secured to the main body 254. In this embodiment, the holder 257 is integrally provided with the attachment member 255 as a one-piece unitary member. However, the holder 257 can be provided to the main body 254. The holder 257 can be a separate member from the attachment member 255.

Figure 27:
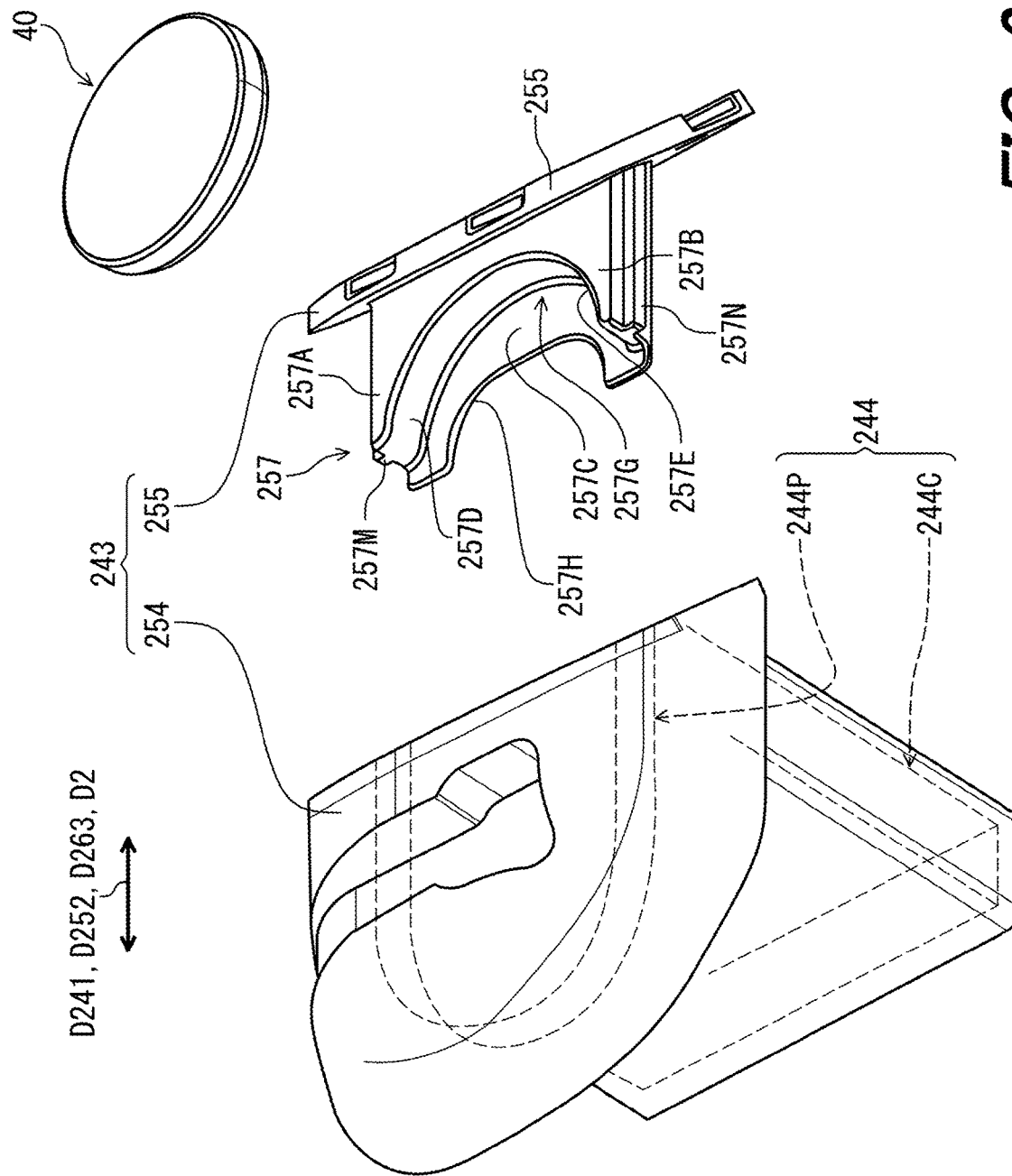
FIG. 27 is another exploded perspective view of the accommodating structure of the operating device illustrated in FIG. 22.

As seen in FIG. 27, the holder 257 includes a first holding arm 257A, a second holding arm 257B, and a support base 257C. The first holding arm 257A protrudes from the attachment member 255 in the axial direction D2. The second holding arm 257B protrudes from the attachment member 255 in the axial direction D2. In this embodiment, the first holding arm 257A is directly coupled to the second holding arm 257B. The first holding arm 257A includes a first holding surface 257D contactable with the power supply 40. The second holding arm 257B includes a second holding surface 257E contactable with the power supply 40. The second holding surface 257E is partly spaced apart from the first holding surface 257D. The second holding surface 257E is continuously connected to the first holding surface 257D. The first holding surface 257D has a curved shape extending along an outer periphery of the power supply 40. The second holding surface 257E has a curved shape extending along the outer periphery of the power supply 40. However, the shapes of the first holding surface 257D and the second holding surface 257E are not limited to the curved shape. The support base 257C is contactable with the power supply 40. The support base 257C is provided between the first holding arm 257A and the second holding arm 257B. The support base 257C couples the first holding arm 257A and the second holding arm 257B. The support base 257C extends from the first holding surface 257D toward the second holding surface 257E. The support base 257C extends from the second holding surface 257E toward the first holding surface 257D.

The first holding part 257A, the second holding arm 257B, and the support base 257C define a support recess 257G in which the power supply 40 is to be provided. The power supply 40, the attachment member 255, and the holder 257 are treated as a single unit in a state where the power supply 40 is provided in the support recess 257G.

The holder 257 includes a first projection 257M and a second projection 257N. The first projection 257M is provided to the first holding arm 257A to guide the holder 257 when the attachment member 255 is attached to the main body 254. The second projection 257N is provided to the second holding arm 257B to guide the holder 257 when the attachment member 255 is attached to the main body 254. The first projection 257M protrudes from the first holding arm 257A. The second projection 257N protrudes from the second holding arm 257B. The first projection 257M extends in the axial direction D2. The second projection 257N extends in the axial direction D2.

The holder 257 is configured to carry the power supply 40 when the power supply 40 is inserted in and/or removed from the power-supply accommodating part 244P through the insertion opening 256. The holder 257 is configured to carry the power supply 40 when the attachment member 255 is secured to and/or detached from the main body 254.

As seen in FIG. 26, the accommodating part 244 includes an insertion opening 258 provided at an end of the accommodating part 244. In this embodiment, the circuitry accommodating part 244C includes the insertion opening 258. The accommodating space 253 includes the insertion opening 258. The circuitry 42 passes through the insertion opening 258 when the circuitry 42 is inserted into and removed from the accommodating space 253. The accommodating space 253 is open through the insertion opening 258 in a direction different from the axial direction D2 in a state where the insertion opening 258 is not covered by other members.

The attachment member 255 is configured to be attached to the main body 254 to cover the insertion opening 258. In this embodiment, the attachment member 255 is configured to be attached to the main body 254 to cover the insertion openings 256 and 258. However, the accommodating structure 243 can include another attachment member configured to cover the insertion opening 258 which is a separate member from the attachment member 255.

As seen in FIG. 23, the grip cover 28 is configured to be attached to the base member 212 so as to at least partly expose the accommodating structure 243 from the grip cover 28 in the state where the grip cover 28 is attached to the base member 212. In this embodiment, the grip cover 28 is configured to be attached to the base member 212 so as to partly expose the main body 254 from the grip cover 28 in the state where the grip cover 28 is attached to the base member 212. The grip cover 28 is configured to be attached to the base member 212 so as not to expose the attachment member 255 from the grip cover 28 in the state where the grip cover 28 is attached to the base member 212. However, the structure of the grip cover 28 is not limited to the above structure. The grip cover 28 can be configured to be attached to the base member 212 so as not to expose the main body 254 from the grip cover 28 in the state where the grip cover 28 is attached to the base member 212. The grip cover 28 can be configured to be attached to the base member 212 so as to at least partly expose the attachment member 255 from the grip cover 28 in the state where the grip cover 28 is attached to the base member 212.

As seen in FIG. 25, the accommodating part 244 includes a first inner surface 260 and a second inner surface 262. In this embodiment, the power-supply accommodating part 244P includes the first inner surface 260. The power-supply accommodating part 244P includes the second inner surface 262. The second inner surface 262 faces towards the first inner surface 260. The second inner surface 262 is spaced apart from the first inner surface 260. The accommodating space 252 is at least partly defined between the first inner surface 260 and the second inner surface 262. Namely, the first inner surface 260 and the second inner surface 262 are spaced apart from each other to at least partly define the accommodating space 252 between the first inner surface 260 and the second inner surface 262.

The first inner surface 260 extends along the reference plane RP21. The second inner surface 262 extends along the reference plane RP21. The reference plane RP21 is defined between the first inner surface 260 and the second inner surface 262. The first inner surface 260 and the second inner surface 262 are parallel to the reference plane RP21. However, the first inner surface 260 and the second inner surface 262 can be non-parallel to the reference plane RP21.

The first inner surface 260 extends along a first direction D241 and faces toward the second inner surface 262. The second inner surface 262 extends along the first direction D241 and faces toward the first inner surface 260. In this embodiment, the first inner surface 260 faces toward the second inner surface 262 in a second direction D242. The first direction D241 is parallel to the reference plane RP21. The second direction D242 is perpendicular to the first direction D241 and is parallel to the additional reference plane RP22. However, the relationship among the reference plane RP21, the additional reference plane RP22, the first direction D241, and the second direction D242 is not limited to this embodiment.

The accommodating part 244 includes a third inner surface 264 extending between the first inner surface 260 and the second inner surface 262. In this embodiment, the power-supply accommodating part 244P includes the third inner surface 264 extending between the first inner surface 260 and the second inner surface 262. The third inner surface 264 extends in the second direction D242. The accommodating space 252 is at least partly defined by the first inner surface 260, the second inner surface 262, and the third inner surface 264. The third inner surface 264 includes a facing part 264A facing toward the insertion opening 256. The power-supply accommodating part 244P extends in the axial direction D2. The accommodating space 252 extends from the third inner surface 264 to the insertion opening 256 in the axial direction D2. In this embodiment, the reference plane RP21 is parallel to the axial direction D2. However, the relationship between the reference plane RP21 and the axial direction D2 is not limited to this embodiment.

Figure 28:
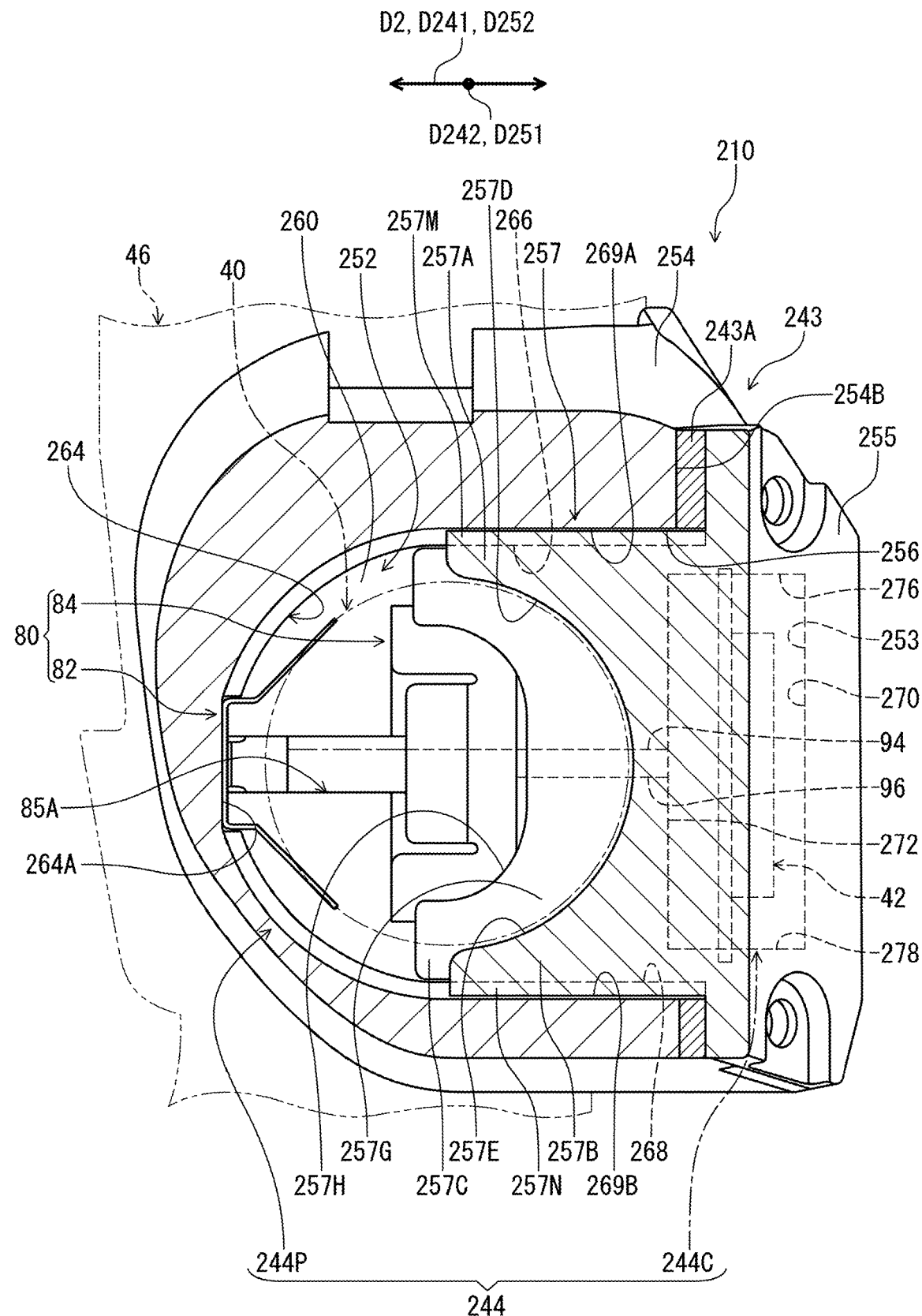
FIG. 28 is a partial cross-sectional view of the operating device taken along line XXVIII-XXVIII of FIG. 25.

As seen in FIG. 28, the third inner surface 264 has a curved shape. The third inner surface 264 extends along an outer periphery of the power supply 40 in a state where the power supply 40 is provided in the accommodating space 252. However, the shape of the third inner surface 264 is not limited to this embodiment.

The accommodating part 244 includes a fourth inner surface 266 and a fifth inner surface 268. The fourth inner surface 266 extends along the axial direction D2 from the third inner surface 264 to the insertion opening 256. The fifth inner surface 268 extends along the axial direction D2 from the third inner surface 264 to the insertion opening 256. The third inner surface 264 circumferentially extends from the fourth inner surface 266 to the fifth inner surface 268.

Figure 29:
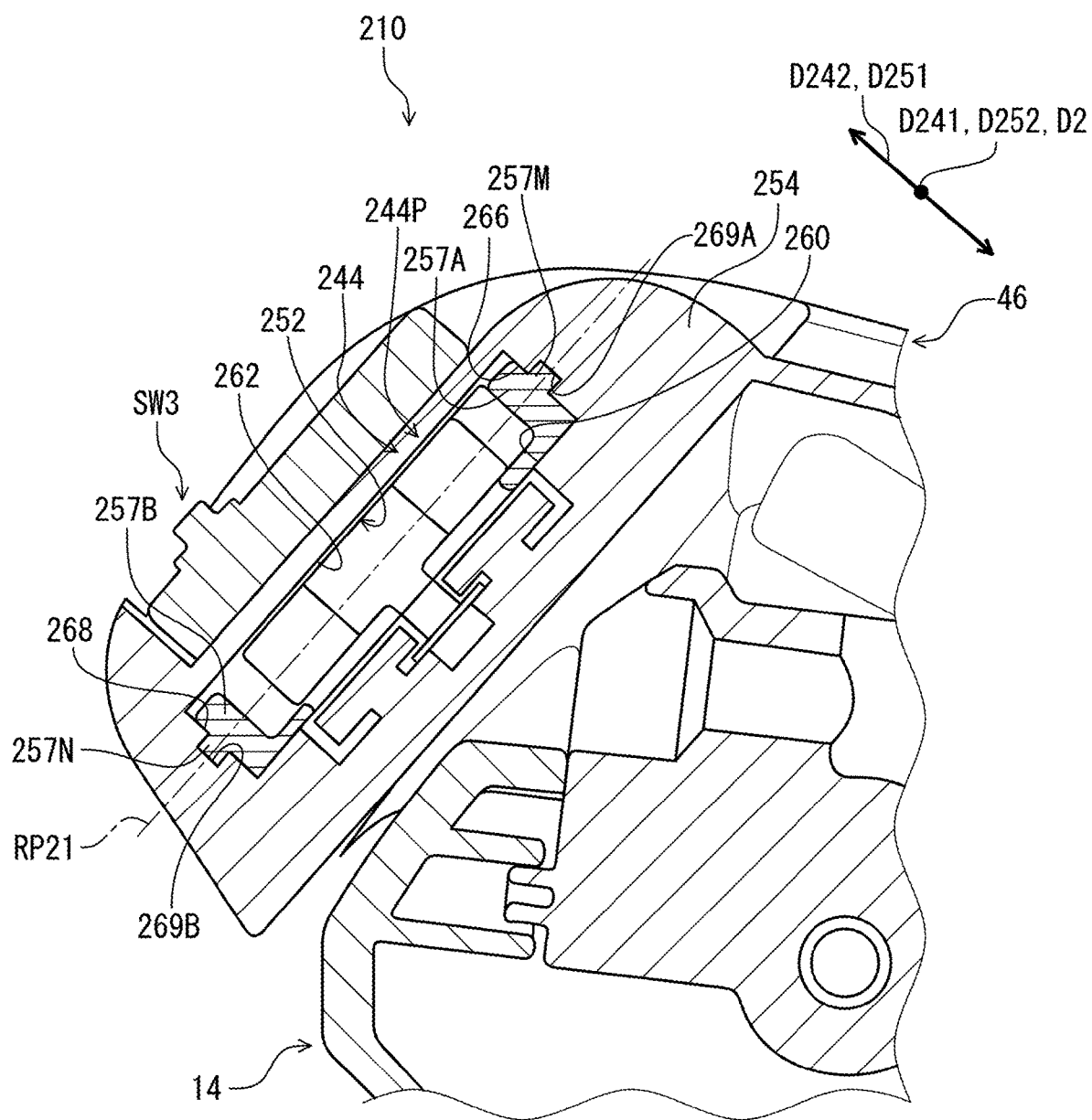
FIG. 29 is a partial cross-sectional view of the operating device taken along line XXIX-XXIX of FIG. 25.

As seen in FIG. 29, the fourth inner surface 266 extends between the first inner surface 260 and the second inner surface 262. The fifth inner surface 268 extends between the first inner surface 260 and the second inner surface 262. The fourth inner surface 266 and the fifth inner surface 268 are spaced apart from each other to at least partly define the accommodating space 252 between the fourth inner surface 266 and the fifth inner surface 268. The fourth inner surface 266 faces toward the fifth inner surface 268. The fourth inner surface 266 extends in the second direction D242. The fifth inner surface 268 extends in the second direction D242. However, the structures of the fourth inner surface 266 and the fifth inner surface 268 are not limited to this embodiment.

The accommodating part 244 includes a first guide groove 269A and a second guide groove 269B. The first guide groove 269A is configured to guide the first projection 257M in the axial direction D2. The second guide groove 269B is configured to guide the second projection 257N in the axial direction D2. The first guide groove 269A is provided in the fourth inner surface 266. The second guide groove 269B is provided in the fifth inner surface 268.

As seen in FIG. 25, the accommodating part 244 includes a first inner surface 270 and a second inner surface 272. In this embodiment, the circuitry accommodating part 244C includes the first inner surface 270. The circuitry accommodating part 244C includes the second inner surface 272. The second inner surface 272 is spaced apart from the first inner surface 270. The accommodating space 253 is at least partly defined between the first inner surface 270 and the second inner surface 272. Namely, the first inner surface 270 and the second inner surface 272 are spaced apart from each other to at least partly define the accommodating space 253 between the first inner surface 270 and the second inner surface 272.

The first inner surface 270 extends along the additional reference plane RP22. The second inner surface 272 extends along the additional reference plane RP22. The additional reference plane RP22 is defined between the first inner surface 270 and the second inner surface 272. The first inner surface 270 and the second inner surface 272 are parallel to the additional reference plane RP22. However, the first inner surface 270 and the second inner surface 272 can be non-parallel to the additional reference plane RP22.

The first inner surface 270 extends along a first direction D251 and faces toward the second inner surface 272. The second inner surface 272 extends along the first direction D251 and faces toward the first inner surface 270. In this embodiment, the first inner surface 270 faces toward the second inner surface 272 in a second direction D252. The first direction D251 is parallel to the additional reference plane RP22 and the second direction D242. The second direction D252 is perpendicular to the first direction D251 and is parallel to the reference plane RP21 and the first direction D241. However, the relationship among the reference plane RP21, the additional reference plane RP22, the first direction D241, the second direction D242, the first direction D251, and the second direction D252 is not limited to this embodiment.

The accommodating part 244 includes a third inner surface 274 extending between the first inner surface 270 and the second inner surface 272. In this embodiment, the circuitry accommodating part 244C includes the third inner surface 274 extending between the first inner surface 270 and the second inner surface 272. The third inner surface 274 extends in the second direction D252. The accommodating space 253 is at least partly defined by the first inner surface 270, the second inner surface 272, and the third inner surface 274. The third inner surface 274 includes a facing part 274A facing toward the insertion opening 258 with respect to the accommodating space 253. The circuitry accommodating part 244C extends in the first direction D251. The accommodating space 253 extends from the third inner surface 274 to the insertion opening 258 in the first direction D251.

As seen in FIG. 28, the accommodating part 244 includes a fourth inner surface 276 and a fifth inner surface 278. The fourth inner surface 276 extends between the first inner surface 270 and the second inner surface 272. The fifth inner surface 278 extends between the first inner surface 270 and the second inner surface 272. The fourth inner surface 276 and the fifth inner surface 278 are spaced apart from each other to at least partly define the accommodating space 253 between the fourth inner surface 276 and the fifth inner surface 278. The fourth inner surface 276 faces toward the fifth inner surface 278.

Figure 30:
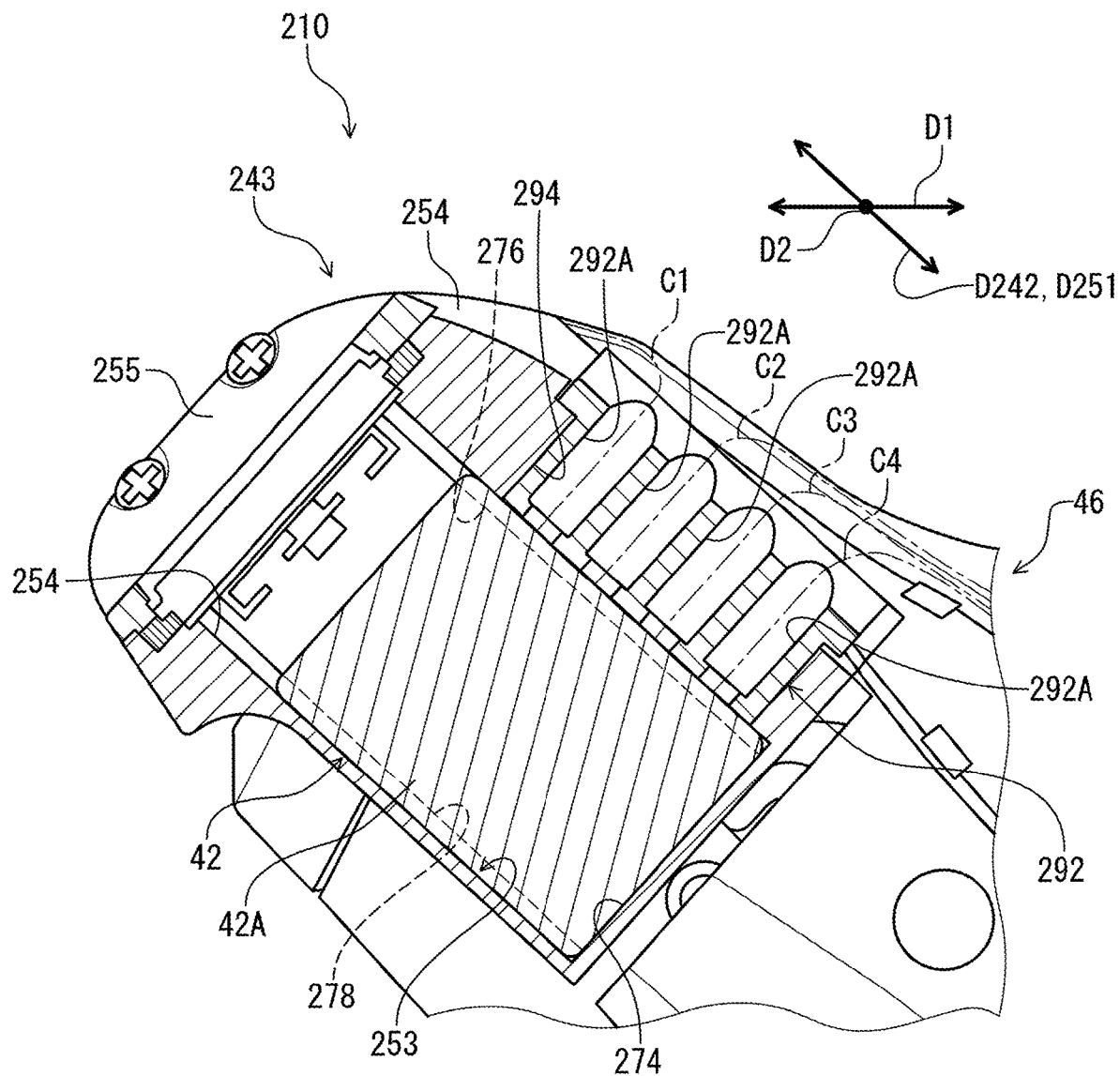
FIG. 30 is a partial cross-sectional view of the operating device taken along line XXX-XXX of FIG. 25.

As seen in FIG. 30, the fourth inner surface 276 extends from the third inner surface 274 to the insertion opening 258 in the first direction D251. The fifth inner surface 278 extends from the third inner surface 274 to the insertion opening 258 in the first direction D51. However, the structures of the fourth inner surface 276 and the fifth inner surface 278 are not limited to this embodiment. The third inner surface 274 extends from the fourth inner surface 276 to the fifth inner surface 278.

As seen in FIG. 25, the operating device 210 further comprises the electrical contact 80. Namely, the electric device 210 further comprises the electrical contact 80. The electrical contact 80 is configured to contact the power supply 40 in a state where the power supply 40 is provided in the accommodating part 244. The electrical contact 80 is provided in at least one of the first inner surface 260, the second inner surface 262 and the third inner surface 264 to be contactable with the power supply 40 in the state where the power supply 40 is accommodated in the accommodating part 244. The electrical contact 80 is provided in at least one of the first inner surface 260, the second inner surface 262, and the third inner surface 264 to be contactable with the power supply 40 in a state where the power supply 40 is accommodated in the power-supply accommodating part 244P. In this embodiment, the electrical contact 80 is provided in the first inner surface 260 and the third inner surface 264 to be contactable with the power supply 40 in the state where the power supply 40 is provided in the accommodating part 244. However, the position of the electrical contact 80 is not limited to this embodiment.

In this embodiment, the positive contact 82 is configured to contact the positive electrode of the power supply 40 in the state where the power supply 40 is provided in the accommodating part 244 (e.g., the power-supply accommodating part 244P). The negative contact 84 is configured to contact the negative electrode of the power supply 40 in the state where the power supply 40 is provided in the accommodating part 244 (e.g., the power-supply accommodating part 244P). The positive contact 82 is provided in the third inner surface 264 to be contactable with the power supply 40 in the state where the power supply 40 is provided in the accommodating part 244 (e.g., the power-supply accommodating part 244P). The negative contact 84 is provided in the first inner surface 260 to be contactable with the power supply 40 in the state where the power supply 40 is provided in the accommodating part 244 (e.g., the power-supply accommodating part 244P). However, the positions of the positive contact 82 and the negative contact 84 are not limited to this embodiment.

As seen in FIG. 28, the support base 257C of the holder 257 includes a recess 257H. The recess 257H is provided between the first holding arm 257A and the second holding arm 257B to avoid interference between the holder 257 and the electrical contact 80. The electrical contact 80 is at least partly provided in the recess 257H in a state where the holder 257 is provided in the power-supply accommodating part 244P. At least one of the positive contact 82 and the negative contact 84 is at least partly provided in the recess 257H in the state where the holder 257 is provided in the power-supply accommodating part 244P. In this embodiment, the negative contact 84 is partly provided in the recess 257H in the state where the holder 257 is provided in the power-supply accommodating part 244P. However, the positional relationship between the holder 257 and the electrical contact 80 is not limited to this embodiment.

Figure 31:
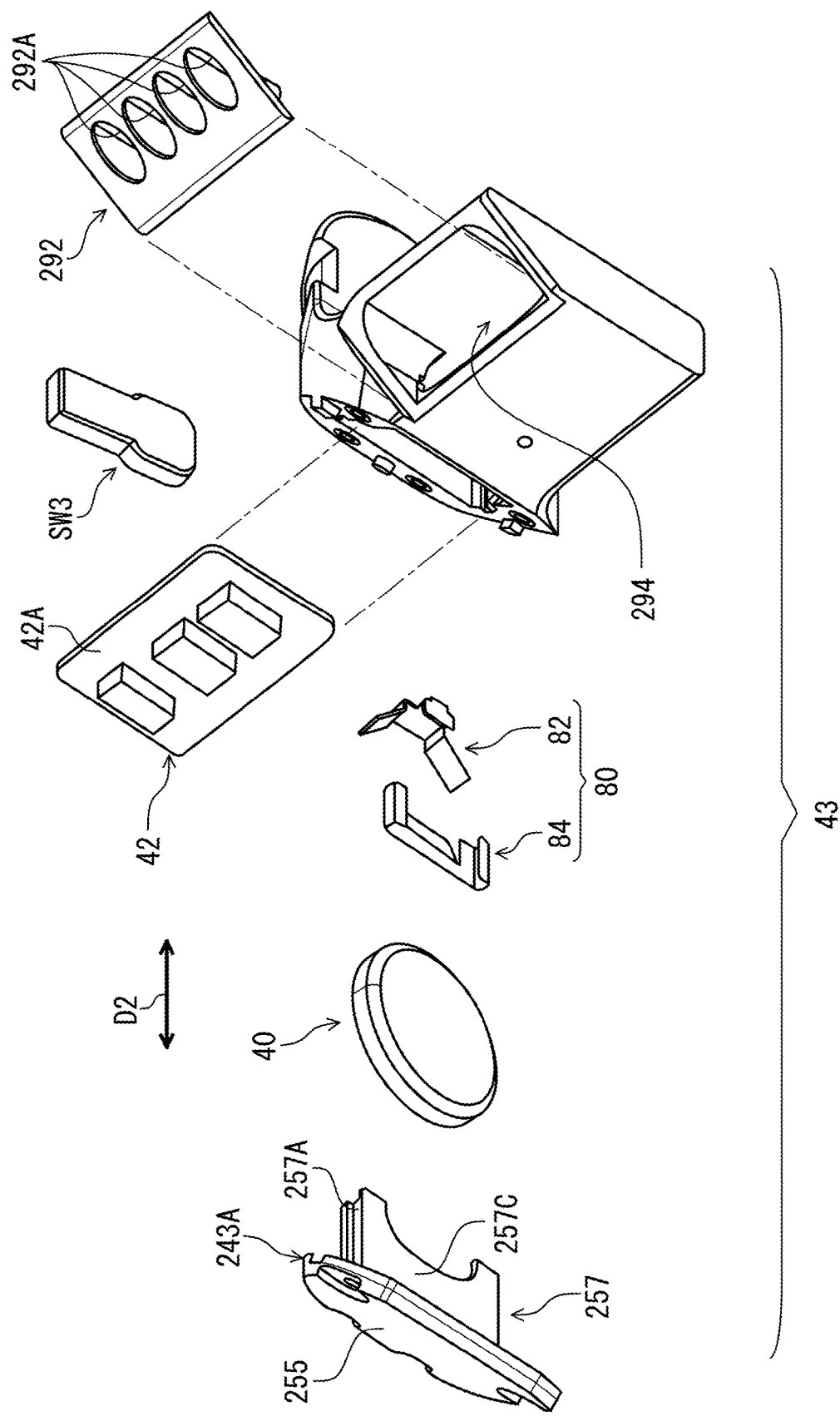
FIG. 31 is another exploded perspective view of the accommodating structure of the operating device illustrated in FIG. 22.

As seen in FIG. 31, the base member 212 includes an additional attachment member 292. The additional attachment member 292 is configured to be attached to the main body 254. The main body 254 includes an opening 294. The opening 294 is in communication with the accommodating space 253 and is separately provided from the insertion opening 258. The additional attachment member 292 is configured to cover the opening 294 in a state where the additional attachment member 292 is attached to the main body 254.

As seen in FIG. 30, the additional attachment member 292 includes a plurality of through-holes 292A. The electric cable C1 extends through one of the plurality of through-hole 292A to connect the switch SW1 to the circuitry 42. The electric cable C2 extends through one of the plurality of through-holes 292A to connect the switch SW2 to the circuitry 42. The electric cable C3 extends through one of the plurality of through-holes 292A to connect the switch SW3 to the circuitry 42. The electric cable C4 extends through one of the plurality of through-holes 292A to connect the connector CN to the circuitry 42.

As seen in FIG. 24, the base member 212 includes a guide groove 212G and a cover 212C. The electric cables C1 to C4 are provided in the guide groove 212G. The cover 212C is attached to the base body 46 to at least partly cover the guide groove 212G.

As seen in FIG. 25, at least one of the reference plane RP21 and the additional reference plane RP22 extends along the pivot axis A1. At least one of the reference plane RP21 and the additional reference plane RP22 intersects with the pivot axis A1. In this embodiment, the reference plane RP21 extends along the pivot axis A1. The reference plane RP21 is parallel to the pivot axis A1. The additional reference plane RP22 intersects with the pivot axis A1. The additional reference plane RP22 is perpendicular to the pivot axis A1. However, at least one of the reference plane RP21 and the additional reference plane RP22 can be inclined relative to the pivot axis A1.

Figure 32:
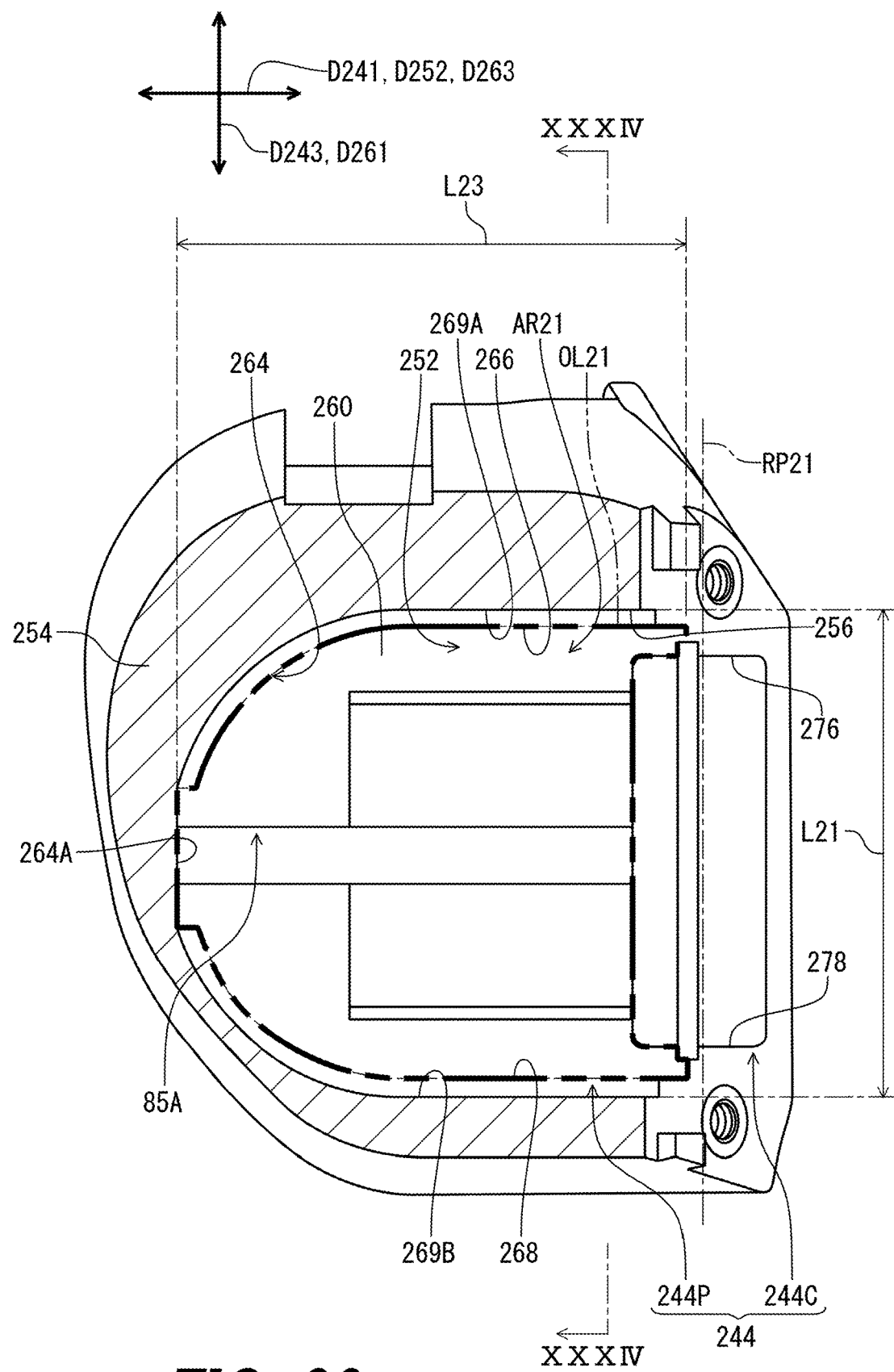
FIG. 32 is a partial cross-sectional view of a main body of the accommodating structure taken along line XXXII-XXXII of FIG. 25.

As seen in FIG. 32, the first inner surface 260 has a first outline OL21. The first outline OL21 defines a first area AR21 as viewed in a direction perpendicular to the reference plane RP21 (see, e.g., FIG. 25). In this embodiment, the first outline OL21 defines the first area AR21 as viewed in the second direction D242 perpendicular to the reference plane RP21 (see, e.g., FIG. 25).

Figure 33:
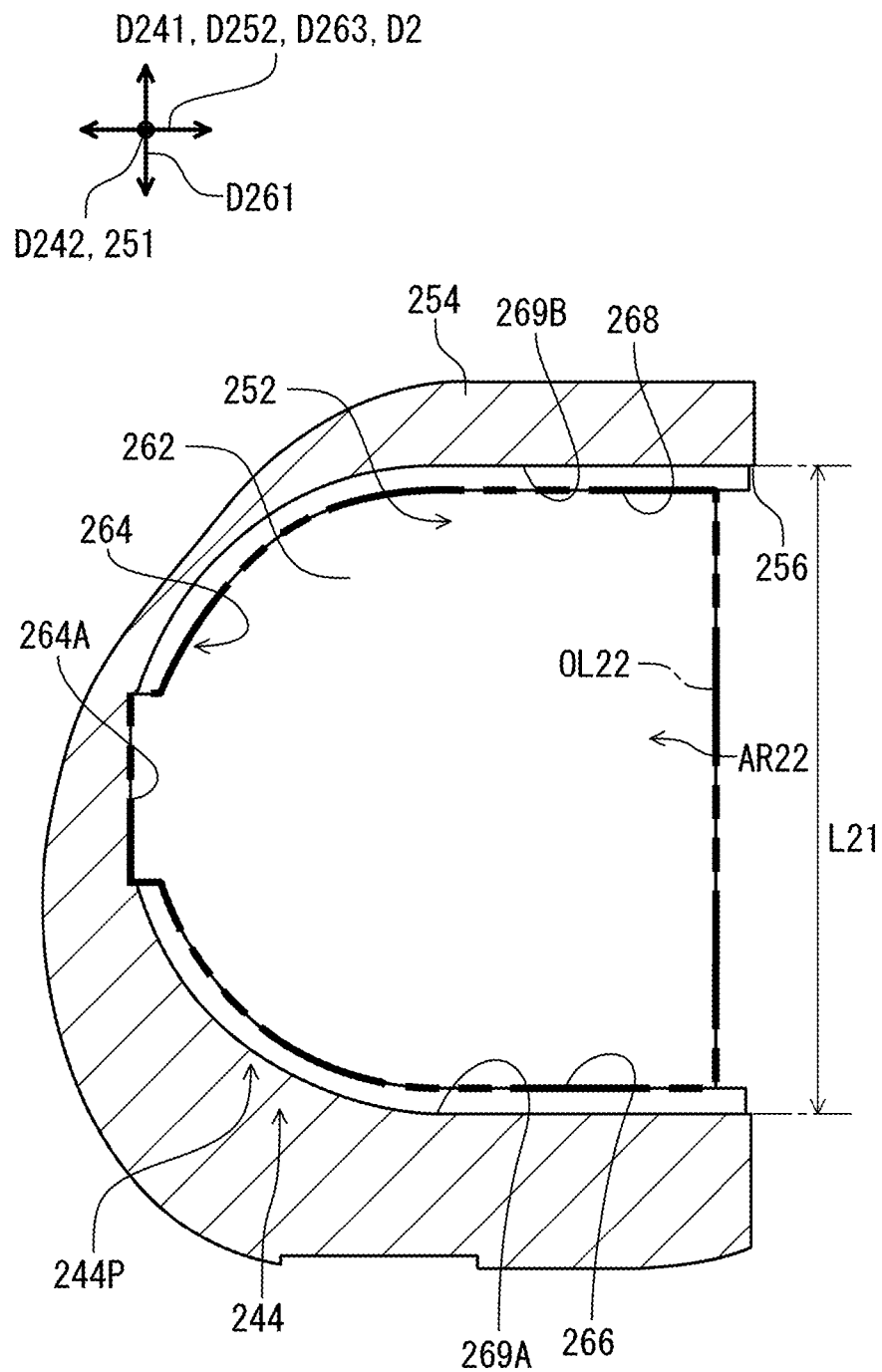
FIG. 33 is another cross-sectional view of the main body of the accommodating structure taken along line XXXIII-XXXIII of FIG. 25.

As seen in FIG. 33, the second inner surface 262 has a second outline OL22. The second outline OL22 defines a second area AR22 as viewed in the direction perpendicular to the reference plane RP21 (see, e.g., FIG. 25). In this embodiment, the second outline OL22 defines the second area AR22 as viewed in the second direction D242 perpendicular to the reference plane RP21 (see, e.g., FIG. 25).

Figure 34:
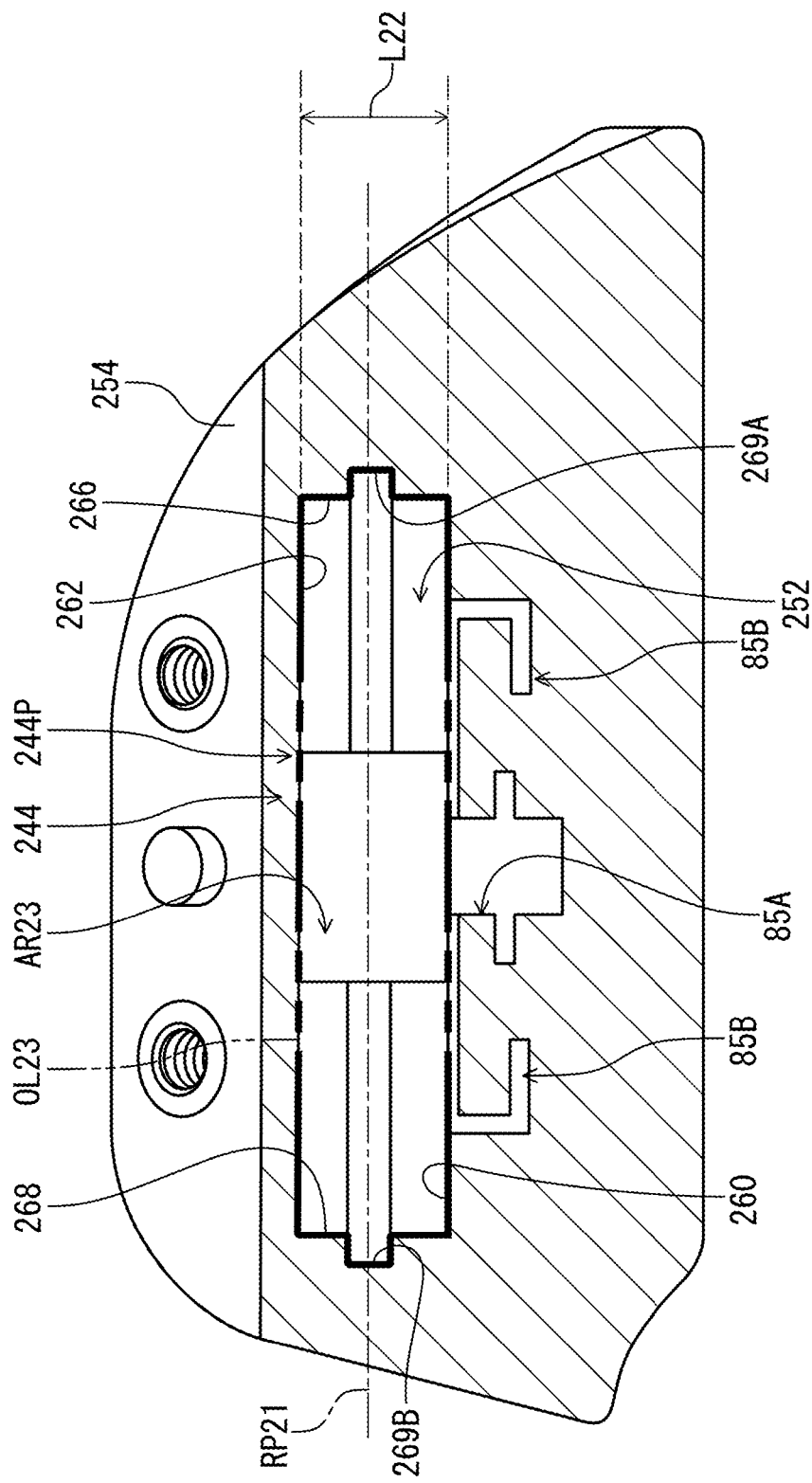
FIG. 34 is another cross-sectional view of the main body of the accommodating structure taken along line XXXIV-XXXIV of FIG. 32.

As seen in FIG. 34, the third inner surface 264 has a third outline OL23. The third outline OL23 defines a third area AR23 as viewed in a direction parallel to the reference plane RP21. In this embodiment, the third outline OL23 defines the third area AR23 as viewed in the axial direction D2 parallel to the reference plane RP21.

Figure 35:
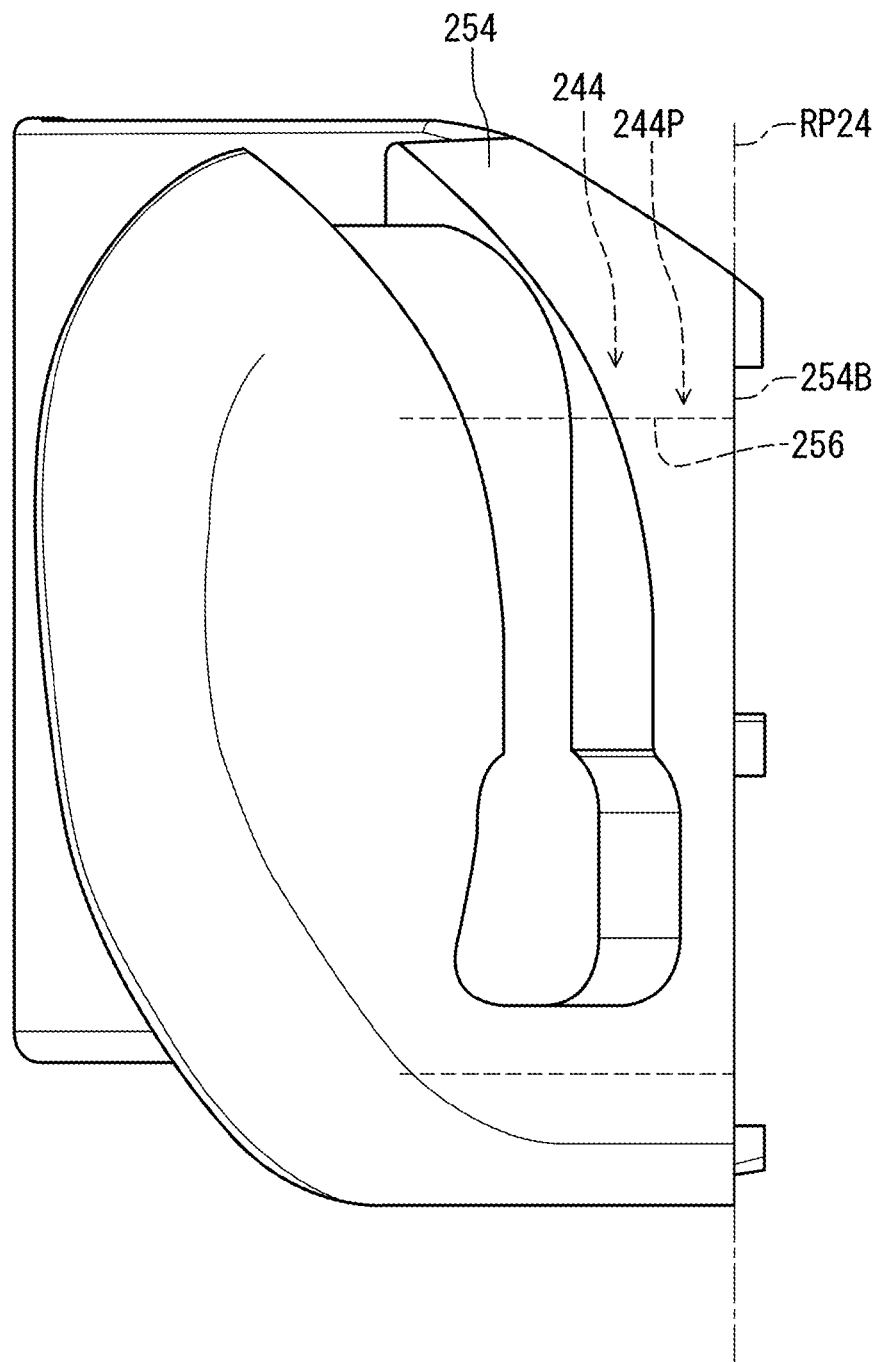
FIG. 35 is a perspective view of the main body of the accommodating structure illustrated in FIG. 32.

As seen in FIG. 35, the insertion opening 256 extends along an insertion opening plane RP24. In this embodiment, the insertion opening plane RP24 extends in a third direction D243 perpendicular to both the first and second directions D241 and D242. As seen in FIG. 25, the insertion opening plane RP24 is inclined relative to the reference plane RP21 and the additional reference plane RP22. However, the relationship among the reference plane RP21, the additional reference plane RP22, and the insertion opening plane RP24. The main body 254 includes an attachment surface 254B. The seal member 243A is in contact with the attachment surface 254B in a state where the seal member 243A is attached to the main body 254. As seen in FIG. 35, the insertion opening plane RP24 is defined on the attachment surface 254B.

Figure 36:
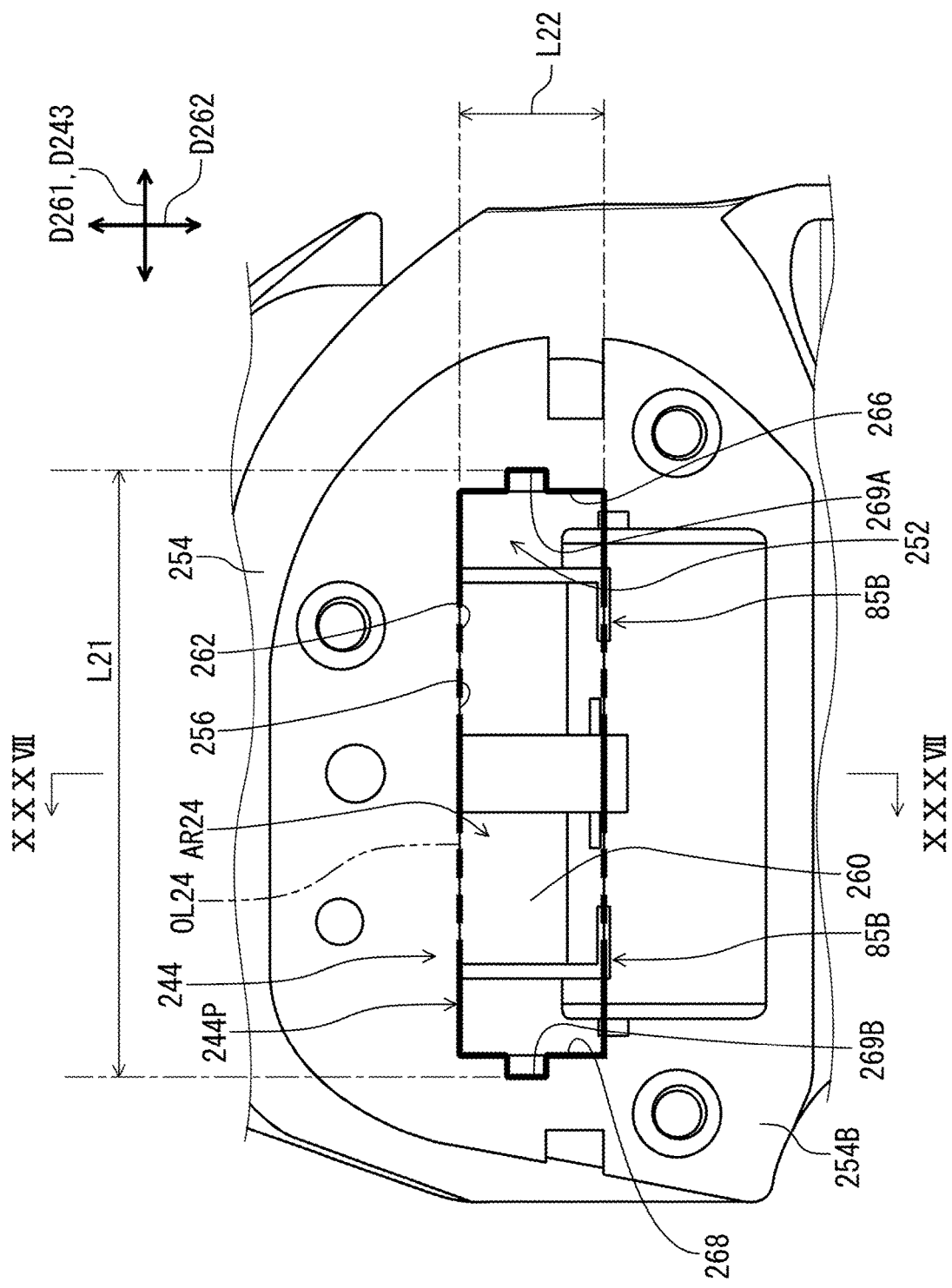
FIG. 36 is a side elevational view of the main body of the accommodating structure illustrated in FIG. 32 as viewed in a direction perpendicular to an attachment surface of the main body.

As seen in FIG. 36, the insertion opening 256 has an opening outline OL24. The opening outline OL24 defines an insertion opening area AR24 as viewed in a direction perpendicular to the insertion opening plane RP24 (see, e.g., FIG. 35). The insertion opening area AR24 is defined between the first inner surface 260 and the second inner surface 262. In this embodiment, the opening outline OL24 defines the insertion opening area AR24 as viewed in the axial direction D2 perpendicular to the insertion opening plane RP24 (see, e.g., FIG. 35).

The insertion opening area AR24 has a first length L21 and a second length L22. The first length L21 is defined in a first length direction D261 parallel to the reference plane RP21. The first length L21 is defined from the first guide groove 269A to the second guide groove 269B in the first length direction D261. Thus, the first length L21 of the insertion opening 256 is equal to a length of the power-supply accommodating part 244P defined in the first length direction D261 (i.e., the first direction D241).

The second length L22 is defined in a second length direction D262 perpendicular to the first length direction D261. The second length L22 is defined from the first inner surface 260 to the second inner surface 262 in the second length direction D262. In this embodiment, the first length L21 is longer than the second length L22. However, the first length L21 can be equal to or shorter than the second length L22.

Figure 37:
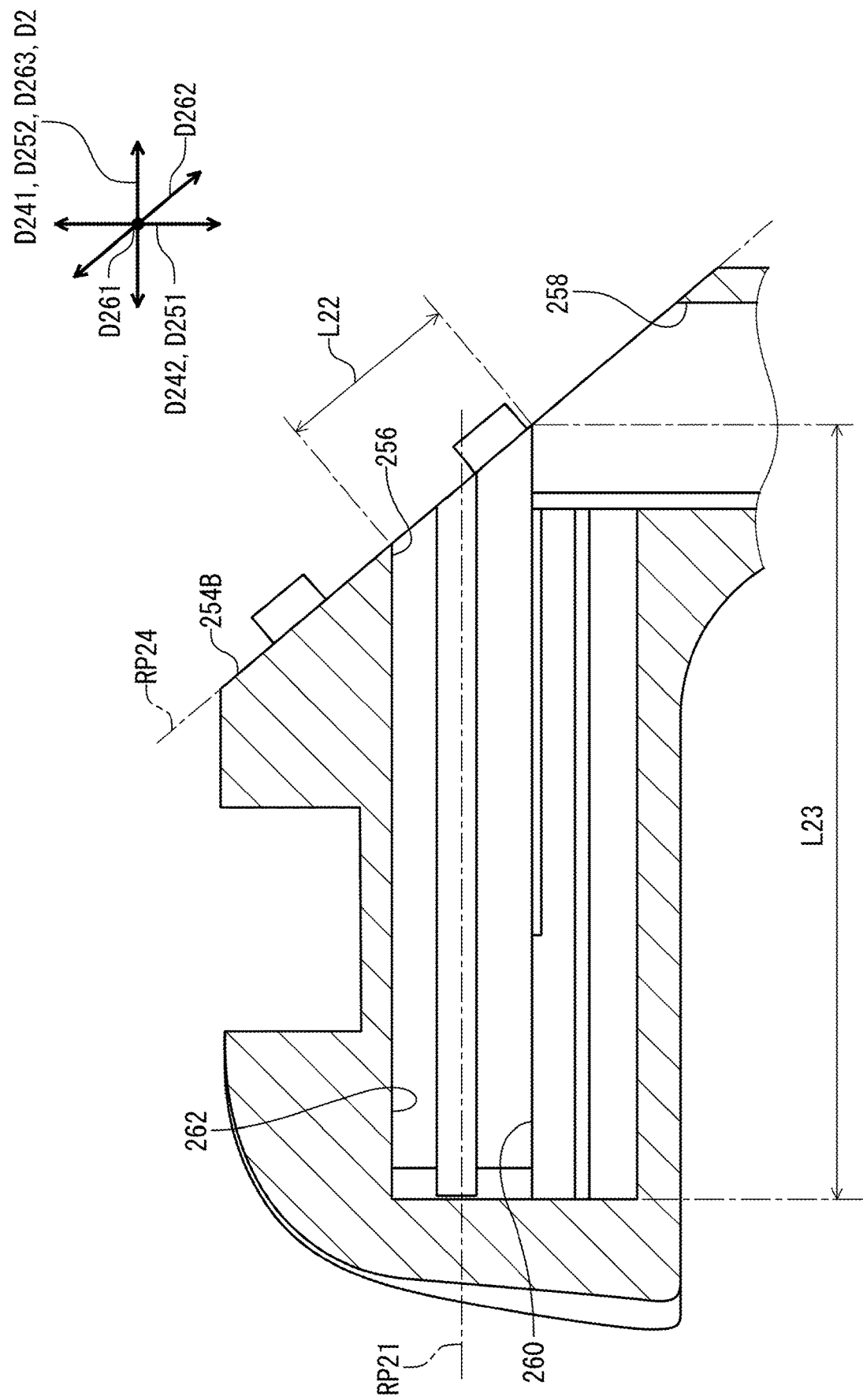
FIG. 37 is another cross-sectional view of the main body of the accommodating structure taken along line XXXVII-XXXVII of FIG. 36.

As seen in FIG. 37, the power-supply accommodating part 244P has a third length L23 defined in a third length direction D263 perpendicular to the first length direction D261 and parallel to the reference plane RP21. The third length L23 is defined as a maximum depth of the power-supply accommodating part 244P. Specifically, the third length L23 is defined as a maximum depth of the accommodating space 252 of the power-supply accommodating part 244P. The third length direction D263 is parallel to the axial direction D2. The third length L23 is longer than the second length L22. However, the third length L23 can be equal to or shorter the second length L22.

As seen in FIGS. 32 and 36, the first area AR21 is larger than the insertion opening area AR24. However, the first area AR21 can be equal to or smaller than the insertion opening area AR24.

As seen in FIGS. 33 and 36, the second area AR22 is larger than the insertion opening area AR24. However, the second area AR22 can be equal to or smaller than the insertion opening area AR24.

As seen in FIGS. 32 and 34, the first area AR21 is larger than the third area AR23. However, the first area AR21 can be equal to or smaller than the third area AR23.

Third Embodiment

An operating or electric device 310 in accordance with a third embodiment will be described below referring to FIGS. 38 to 51. The operating or electric device 310 has the same structure and/or configuration as those of the operating or electric device 10 except for the accommodating structure 43. Thus, elements having substantially the same function as those in the above embodiments will be numbered the same here and will not be described and/or illustrated again in detail here for the sake of brevity.

Figure 38:
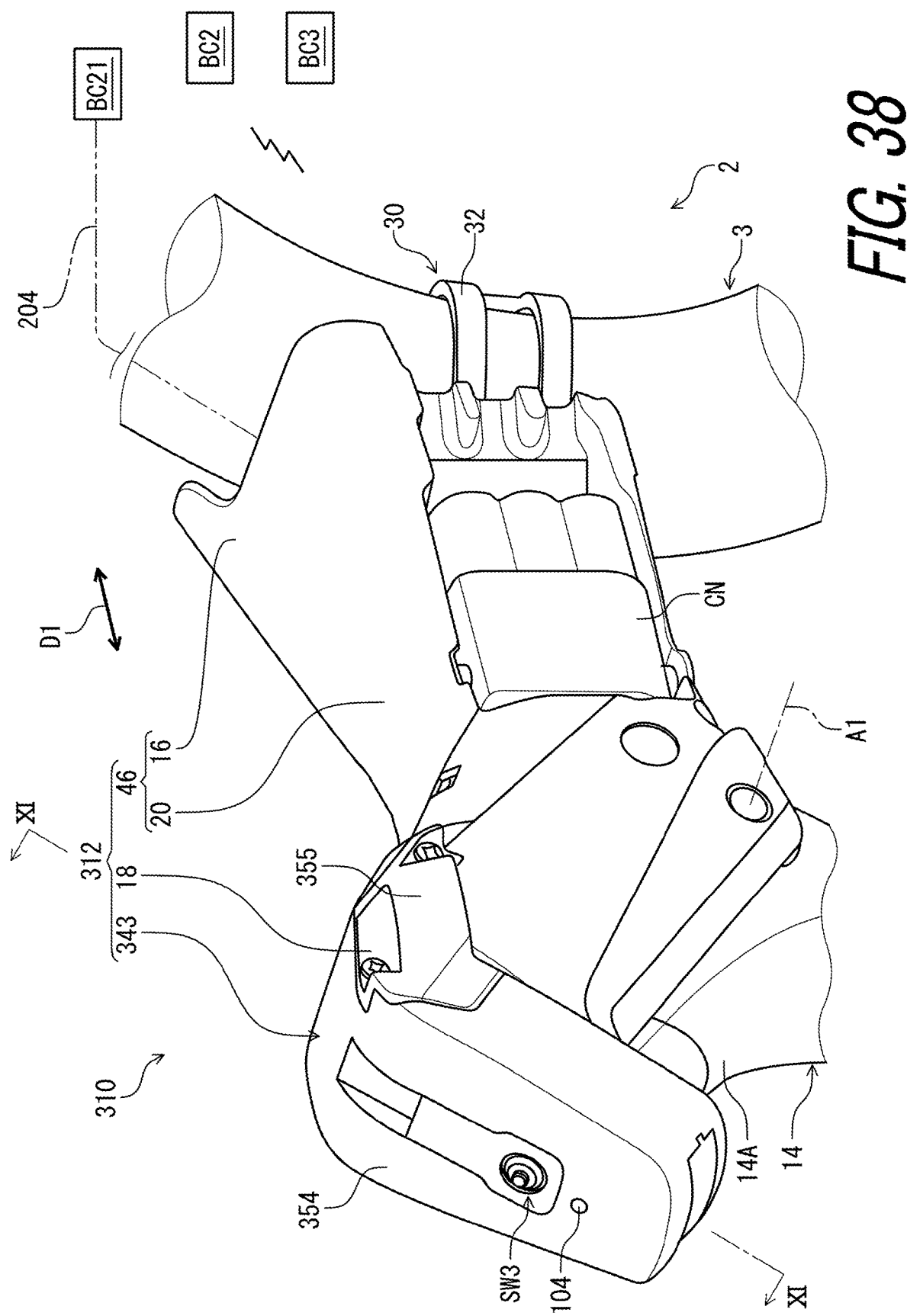
FIG. 38 is a perspective view of an operating device in accordance with a third embodiment.

As seen in FIG. 38, the operating device 310 for the human-powered vehicle 2 comprises a base member 312. The electric device 310 further comprises at least one of an operating member and an actuated member movable relative to the base member 312. In this embodiment, the operating device 310 for the human-powered vehicle 2 comprises the operating member 14. The base member 312 has substantially the same structure as that of the base member 12 of the first embodiment. The base member 312 extends in the longitudinal direction D1. The base member 312 includes the first end portion 16 and the second end portion 18. The first end portion 16 is configured to be coupled to the handlebar 3. The second end portion 18 is opposite to the first end portion 16. The second end portion 18 is opposite to the first end portion 16 in the longitudinal direction D1. The second end portion 18 constitutes a free end portion of the base member 312. The base member 312 includes a grip portion 20 provided between the first end portion 16 and the second end portion 18. The grip portion 20 is provided between the first end portion 16 and the second end portion 18 in the longitudinal direction D1. The base member 312 includes the base body 46.

In this embodiment, as with the operating device 210 of the second embodiment, the operating device 310 is configured to be connected to the electric component BC21 such as a brake device via the mechanical control cable 204 such as a Bowden cable. The hydraulic unit 26 of the first embodiment is omitted from the operating device 310. As with the first embodiment, however, the operating device 310 can include a hydraulic unit configured to actuate the operated device BC1.

Figure 39:
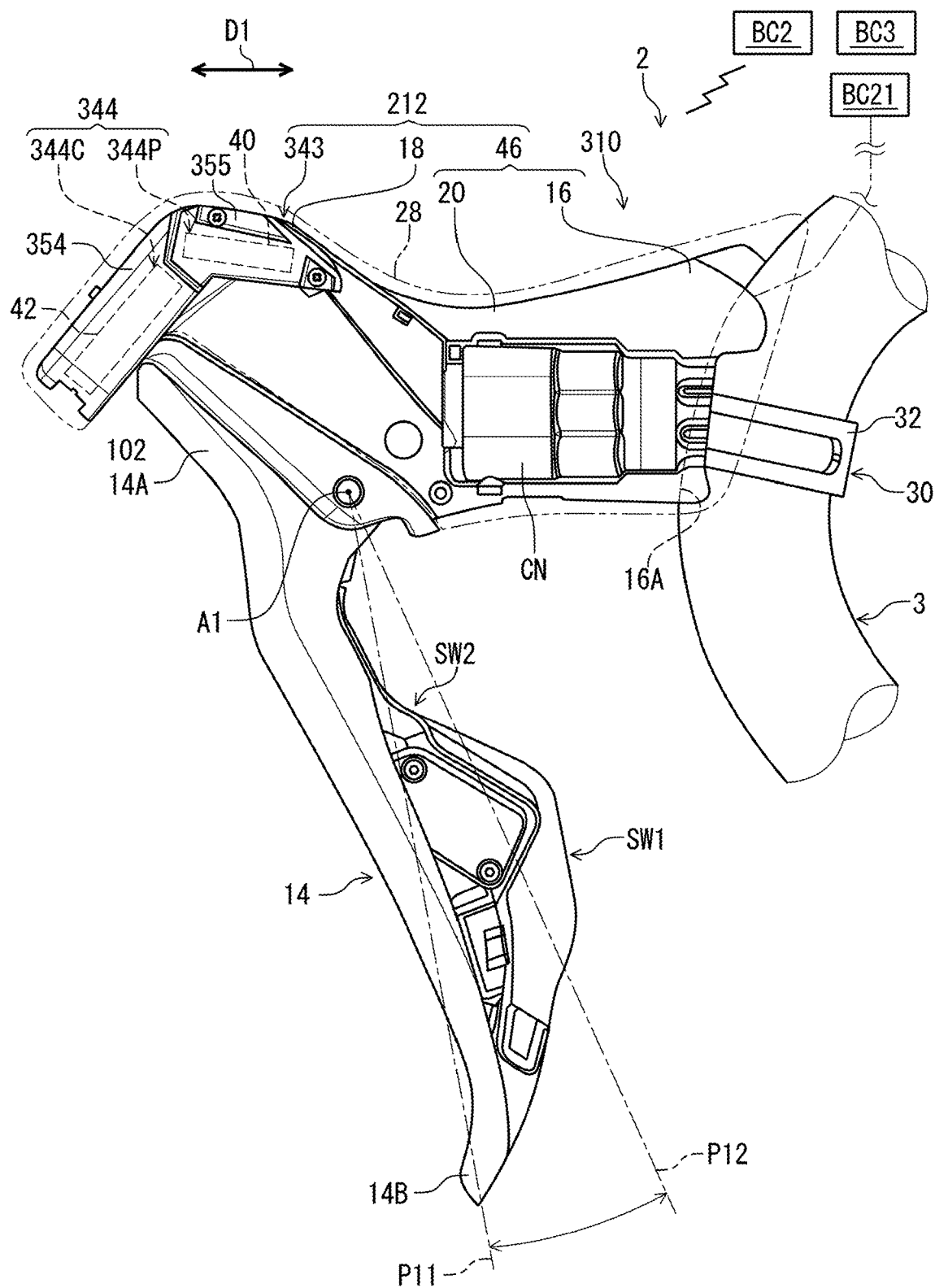
FIG. 39 is a side elevational view of the operating device illustrated in FIG. 38.

As seen in FIG. 39, the base member 312 includes an accommodating structure 343. Namely, the electric device 310 for the human-powered vehicle 2 comprises the accommodating structure 343. The accommodating structure 343 is provided to the second end portion 18. The accommodating structure 343 is disposed at a location which is the farthest from the first end portion 16 in the second end portion 18 along the longitudinal direction D1 as viewed along the pivot axis A1. The accommodating structure 343 includes an accommodating part 344 configured to accommodate at least one of the power supply 40 and the circuitry 42.

In this embodiment, the accommodating part 344 is configured to accommodate the power supply 40 and the circuitry 42. The accommodating part 344 has substantially the same structure as that of the accommodating part 44 of the first embodiment. Specifically, the accommodating part 344 includes a power-supply accommodating part 344P and a circuitry accommodating part 344C. Namely, the base member 312 includes the power-supply accommodating part 344P and the circuitry accommodating part 344C. The accommodating structure 343 includes the power-supply accommodating part 344P and the circuitry accommodating part 344C. The power-supply accommodating part 344P has substantially the same structure as that of the power-supply accommodating part 44P of the first embodiment. The circuitry accommodating part 344C has substantially the same structure as that of the circuitry accommodating part 44C of the first embodiment. The power-supply accommodating part 344P is configured to accommodate the power supply 40. The circuitry accommodating part 344C is configured to accommodate the circuitry 42. However, the accommodating part 344 can be configured to accommodate only one of the power supply 40 and the circuitry 42. One of the power-supply accommodating part 344P and the circuitry accommodating part 344C can be omitted from the accommodating part 344.

The accommodating part 344 is at least partly provided farther from the first end portion 16 of the base member 312 than the proximal end portion 14A of the operating member 14 in the longitudinal direction D1. The accommodating part 344 is at least partly provided farther from the contact surface 16A of the first end portion 16 than the operating member 14. At least one of the power-supply accommodating part 344P and the circuitry 42 is at least partly provided at the second end portion 18 of the base member 312. In this embodiment, the accommodating part 344 is partly provided farther from the first end portion 16 of the base member 312 than the proximal end portion 14A of the operating member 14 in the longitudinal direction D1. The accommodating part 344 is partly provided farther from the contact surface 16A of the first end portion 16 than the operating member 14. The power-supply accommodating part 344P and the circuitry 42 are entirely provided at the second end portion 18 of the base member 312. However, the accommodating part 344 can be entirely provided farther from the first end portion 16 of the base member 312 than the proximal end portion 14A of the operating member 14 in the longitudinal direction D1. The accommodating part 344 can be entirely provided farther from the contact surface 16A of the first end portion 16 than the operating member 14. At least one of the power-supply accommodating part 344P and the circuitry 42 can be partly provided at the second end portion 18 of the base member 312.

The base member 312 includes the base body 46. The accommodating structure 343 is a separate member form the base body 46 and is attached to the base body 46. However, the accommodating structure 43 can be integrally provided with the base body 46 as a one-piece unitary member. The position of the accommodating structure 43 in the base member 312 is not limited to this embodiment.

As with the operating device 10 of the first embodiment, one of the power supply 40 and the circuitry 42 is closer to the operating member 14 than the other of the power supply 40 and the circuitry 42 as viewed along the pivot axis A1. In this embodiment, the circuitry 42 is closer to the operating member 14 than the power supply 40 as viewed along the pivot axis A1. However, the power supply 40 can be closer to the operating member 14 than the circuitry 42.

One of the power supply 40 and the circuitry 42 is at least partly provided above the other of the power supply 40 and the circuitry 42 in the mounting state where the first end portion 16 is coupled to the handlebar 3. In this embodiment, the power supply 40 is partly provided above the circuitry 42 in the mounting state where the first end portion 16 is coupled to the handlebar 3. However, the power supply 40 can be partly provided above the circuitry 42 in the mounting state where the first end portion 16 is coupled to the handlebar 3. The circuitry 42 can be at least partly provided above the power supply 40 in the mounting state where the first end portion 16 is coupled to the handlebar 3.

One of the power-supply accommodating part 344P and the circuitry 42 is closer to the operating member 14 than the other of the power-supply accommodating part 344P and the circuitry 42. In this embodiment, the circuitry 42 is closer to the operating member 14 than the power-supply accommodating part 344P. However, the power-supply accommodating part 344P can be closer to the operating member 14 than the circuitry 42. A distance between the power-supply accommodating part 344P and the operating member 14 can be equal to a distance between the circuitry 42 and the operating member 14.

One of the power-supply accommodating part 344P and the circuitry 42 is at least partly provided above the other of the power-supply accommodating part 344P and the circuitry 42 in the mounting state where the first end portion 16 is coupled to the handlebar 3. In this embodiment, the power-supply accommodating part 344P is partly provided above the circuitry 42 in the mounting state where the first end portion 16 is coupled to the handlebar 3. However, the power-supply accommodating part 344P can be entirely provided above the circuitry 42 in the mounting state where the first end portion 16 is coupled to the handlebar 3. The circuitry 42 can be at least partly provided above the power-supply accommodating part 344P in the mounting state where the first end portion 16 is coupled to the handlebar 3.

Figure 40:
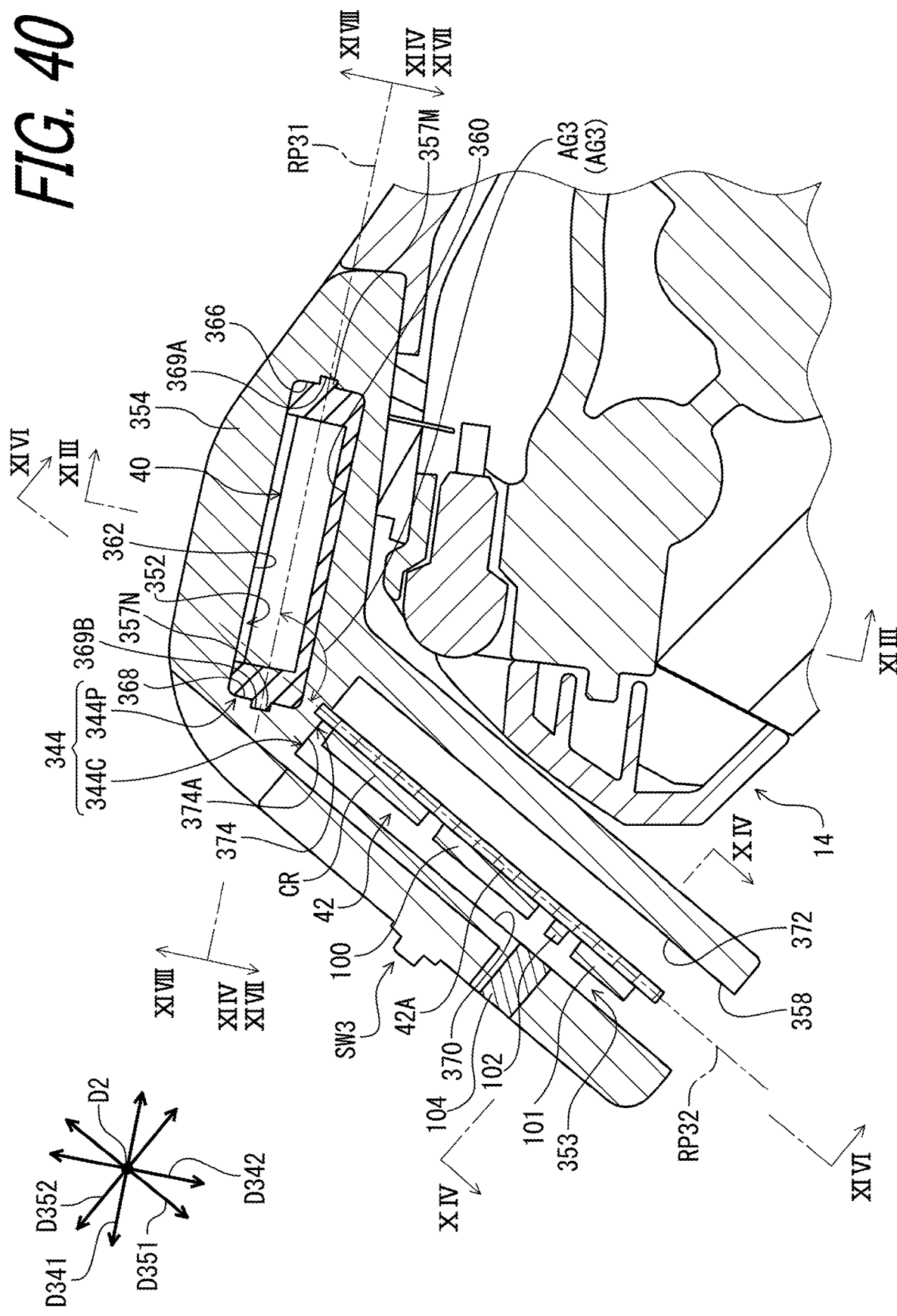
FIG. 40 is a partial cross-sectional view of the operating device taken along line XL-XL of FIG. 38.

As seen in FIG. 40, the power-supply accommodating part 344P extends along a reference plane RP31. The circuitry accommodating part 344C extends along an additional reference plane RP32. The power-supply accommodating part 344P is configured to accommodate the power supply 40 extending along the reference plane RP31. The circuitry 42 is provided to the base member 312 to extend along the additional reference plane RP32 intersecting with the reference plane RP31. The circuit board 42A is provided to the base member 312 to extend along the additional reference plane RP32.

The reference plane RP31 and the additional reference plane RP32 intersect with each other to define an intersection angle AG3. The intersection angle AG3 is equal to or smaller than 150 degrees. The intersection angle AG3 is equal to or larger than 30 degrees. In this embodiment, the intersection angle AG3 is 120 degrees. For example, the pivot axis A1 and more than half of the base body 46 are provided in a region RG3 defined between the reference plane RP31 and the additional reference plane RP32. The intersection angle AG3 is defined in the region RG3 in which the pivot axis A1 and more than half of the base body 46 are provided. However, the intersection angle AG3 is not limited to this embodiment and the above range.

The accommodating part 344 includes an accommodating space 352 in which at least one of the power supply 40 and the circuitry 42 is to be provided. In this embodiment, the power-supply accommodating part 344P includes the accommodating space 352 in which the power supply 40 is to be provided. However, the position of the accommodating space 352 is not limited to the power-supply accommodating part 344P. The accommodating space 352 can be configured to accommodate the circuitry 42 or both the power supply 40 and the circuitry 42.

The accommodating part 344 includes an accommodating space 353 in which at least one of the power supply 40 and the circuitry 42 is to be provided. In this embodiment, the circuitry accommodating part 344C includes the accommodating space 353 in which the circuitry 42 is to be provided. However, the position of the accommodating space 353 is not limited to the circuitry accommodating part 344C. The accommodating space 353 can be configured to accommodate the power supply 40 or both the power supply 40 and the circuitry 42.

Figure 41:
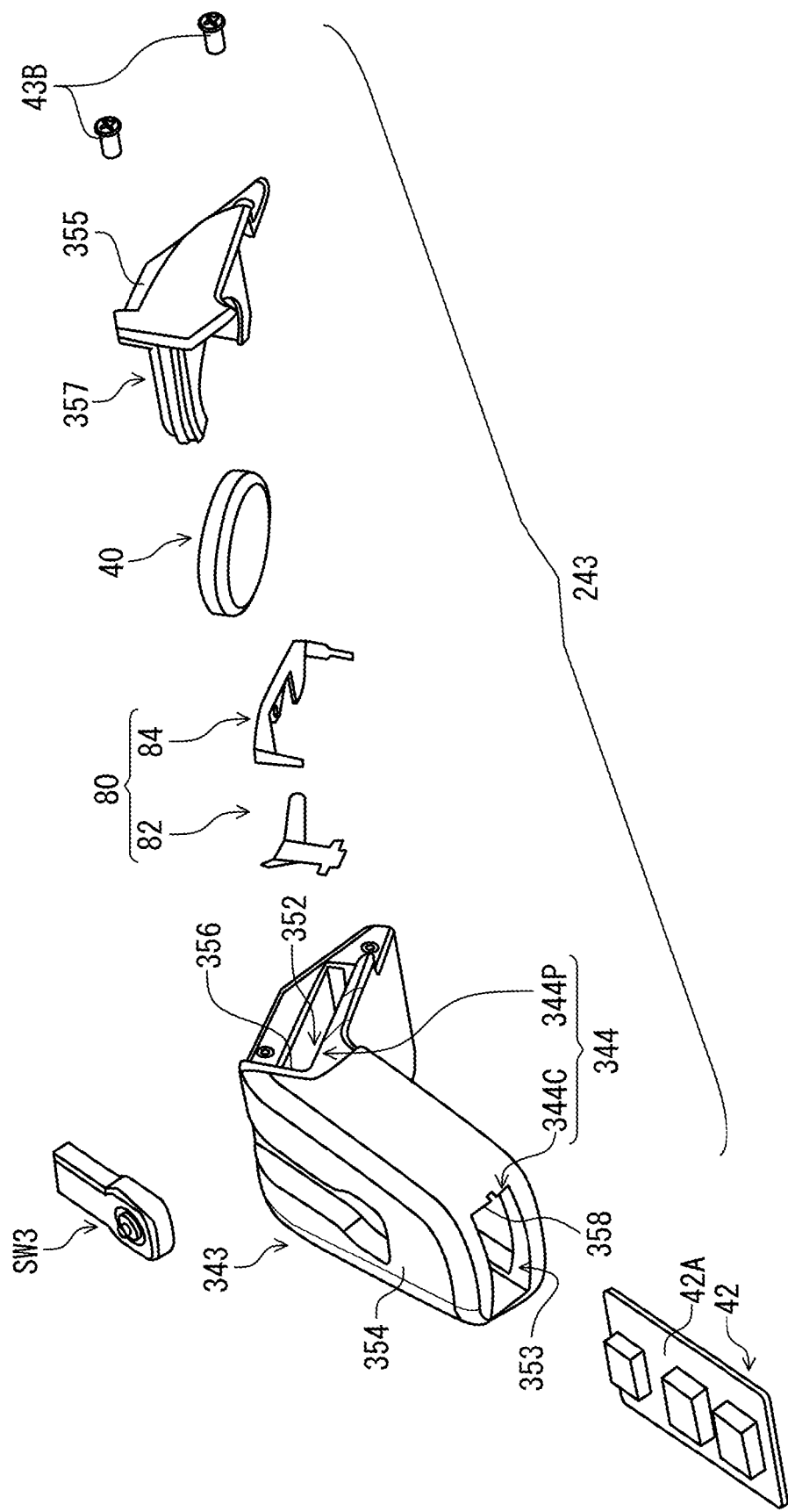
FIG. 41 is an exploded perspective view of an accommodating structure of the operating device illustrated in FIG. 38.

As seen in FIG. 41, the accommodating structure 343 includes a main body 354 and an attachment member 355. The attachment member 355 is configured to be attached to the main body 354. The power-supply accommodating part 344P is provided to at least one of the main body 354 and the attachment member 355 so as to accommodate the power supply 40. In this embodiment, the power-supply accommodating part 344P is provided to the main body 354. However, the power-supply accommodating part 344P can be provided to the attachment member 355 or both the main body 354 and the attachment member 355.

The attachment member 355 is a separate member from the main body 354. The main body 354 is integrally provided as a one-piece unitary member. Each of the main body 354 and the attachment member 355 is made of a non-metallic material such as a fiber-reinforced plastic. However, the material of the main body 354 and the attachment member 355 is not limited to this embodiment.

The accommodating part 344 includes an insertion opening 356 provided at an end of the accommodating part 344. In this embodiment, the power-supply accommodating part 344P includes the insertion opening 356. The accommodating space 352 includes the insertion opening 356. The power supply 40 passes through the insertion opening 356 when the power supply 40 is inserted into or removed from the accommodating space 352. The accommodating space 352 is open through the insertion opening 356 in the axial direction D2 with respect to the pivot axis A1 in a state where the insertion opening 356 is not covered by other members. The attachment member 355 is configured to be attached to the main body 354 to cover the insertion opening 356.

The attachment member 355 is detachably attached to the main body 354. The electric device 310 further comprises the fastener 43B. In this embodiment, the electric device 310 comprises the plurality of fasteners 43B. The attachment member 355 is detachably attached to the main body 354 with the plurality of fasteners 43B. The accommodating structure 343 is configured to allow the power supply 40 to be removed from the power-supply accommodating part 344P in an open state where the attachment member 355 is detached from the main body 354. The attachment member 355 is configured to close the insertion opening 356 in a state where the attachment member 355 is attached to the main body 354. However, the attachment member 355 can be connected to the main body 354 with another member such as a strap to prevent the attachment member 355 from unintentionally dropping from the main body 354. A seal member corresponding to the seal members 43A and 343A of the first and second embodiments is omitted from the electric device 310. However, the electric device 310 can comprise a seal member.

The electric device 310 further comprises a holder 357. The holder 357 is configured to at least partly receive the power supply 40 and configured to be arranged in the power-supply accommodating part 344P. The holder 357 is a separate member from the main body 354. The holder 357 is provided to the attachment member 355. The holder 357 extends from the attachment member 355. The holder 357 is configured to be provided in the accommodating space 352 in a state where the attachment member 355 is secured to the main body 354. In this embodiment, the holder 357 is integrally provided with the attachment member 355 as a one-piece unitary member. However, the holder 357 can be provided to the main body 354. The holder 357 can be a separate member from the attachment member 355.

Figure 42:
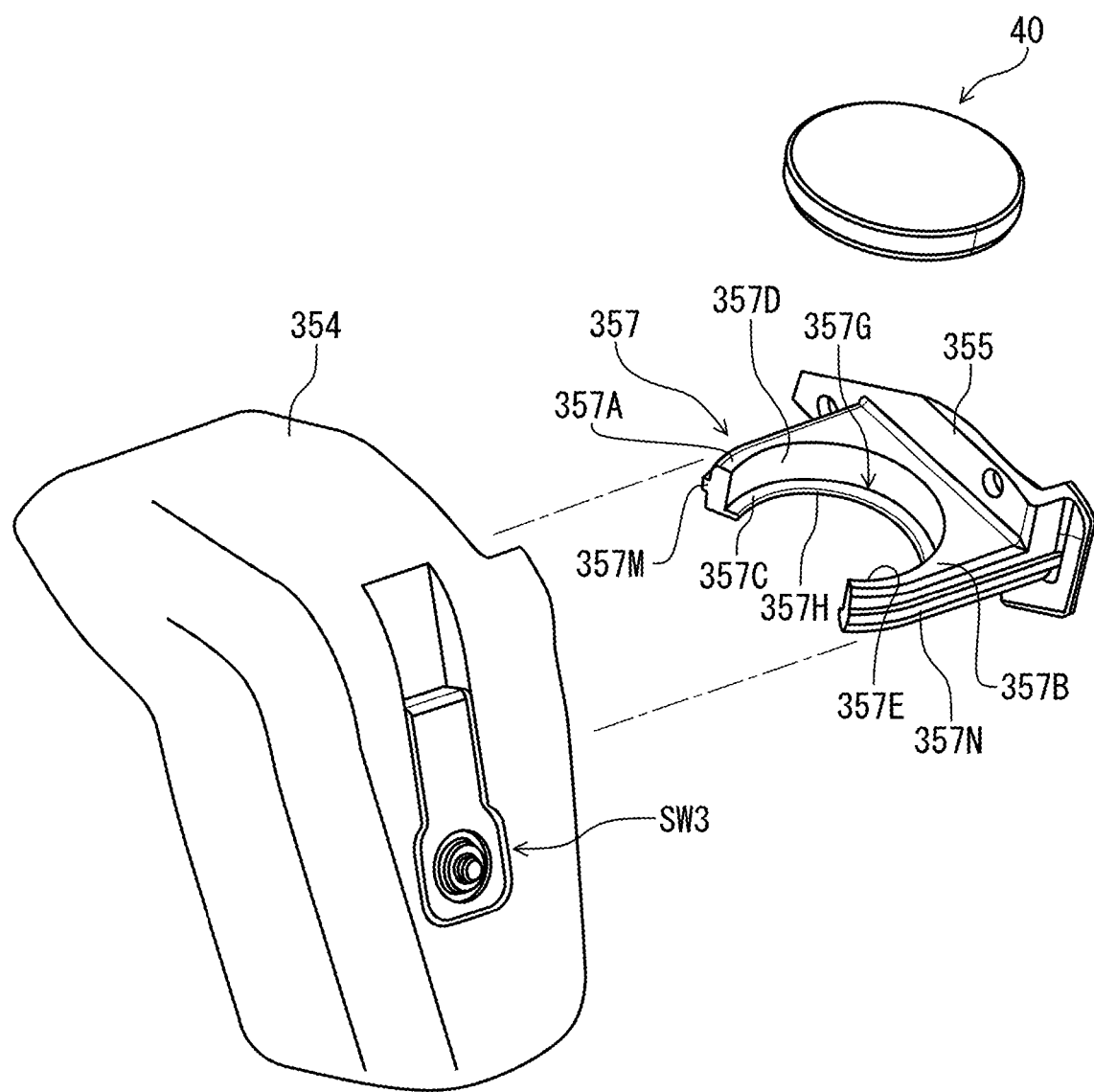
FIG. 42 is another exploded perspective view of the accommodating structure of the operating device illustrated in FIG. 38.

As seen in FIG. 42, the holder 357 includes a first holding arm 357A, a second holding arm 357B, and a support base 357C. The first holding arm 357A protrudes from the attachment member 355 in the axial direction D2. The second holding arm 357B protrudes from the attachment member 355 in the axial direction D2. In this embodiment, the first holding arm 357A is directly coupled to the second holding arm 357B. The first holding arm 357A includes a first holding surface 357D contactable with the power supply 40. The second holding arm 357B includes a second holding surface 357E contactable with the power supply 40. The second holding surface 357E is spaced apart from the first holding surface 357D. The second holding surface 357E is continuously connected to the first holding surface 357D. The first holding surface 357D has a curved shape extending along an outer periphery of the power supply 40. The second holding surface 357E has a curved shape extending along the outer periphery of the power supply 40. However, the shapes of the first holding surface 357D and the second holding surface 357E are not limited to the curved shape. The support base 357C is contactable with the power supply 40. The support base 357C is provided between the first holding arm 357A and the second holding arm 357B. The support base 357C couples the first holding arm 357A and the second holding arm 357B. The support base 357C extends from the first holding surface 357D toward the second holding surface 357E. The support base 357C extends from the second holding surface 357E toward the first holding surface 357D.

The first holding part 357A, the second holding arm 357B, and the support base 357C define a support recess 357G in which the power supply 40 is to be provided. The power supply 40, the attachment member 355, and the holder 357 are treated as a single unit in a state where the power supply 40 is provided in the support recess 357G.

The holder 357 includes a first projection 357M and a second projection 357N. The first projection 357M is provided to the first holding arm 357A to guide the holder 357 when the attachment member 355 is attached to the main body 254. The second projection 357N is provided to the second holding arm 357B to guide the holder 357 when the attachment member 355 is attached to the main body 254. The first projection 357M protrudes from the first holding arm 357A. The second projection 357N protrudes from the second holding arm 357B. The first projection 357M extends in the axial direction D2. The second projection 357N extends in the axial direction D2.

The holder 357 is configured to carry the power supply 40 when the power supply 40 is inserted in and/or removed from the power-supply accommodating part 344P through the insertion opening 356. The holder 357 is configured to carry the power supply 40 when the attachment member 355 is secured to and/or detached from the main body 354.

As seen in FIG. 41, the accommodating part 344 includes an insertion opening 358 provided at an end of the accommodating part 344. In this embodiment, the circuitry accommodating part 344C includes the insertion opening 358. The accommodating space 353 includes the insertion opening 358. The circuitry 42 passes through the insertion opening 358 when the circuitry 42 is inserted into and removed from the accommodating space 353. The accommodating space 353 is open through the insertion opening 358 in a direction different from the axial direction D2 in a state where the insertion opening 358 is not covered by other members.

As seen in FIG. 39, the grip cover 28 is configured to be attached to the base member 312 so as to at least partly expose the accommodating structure 343 from the grip cover 28 in the state where the grip cover 28 is attached to the base member 312. In this embodiment, the grip cover 28 is configured to be attached to the base member 312 so as to partly expose the main body 354 from the grip cover 28 in the state where the grip cover 28 is attached to the base member 312. The grip cover 28 is configured to be attached to the base member 312 so as not to expose the attachment member 355 from the grip cover 28 in the state where the grip cover 28 is attached to the base member 312. However, the structure of the grip cover 28 is not limited to the above structure. The grip cover 28 can be configured to be attached to the base member 312 so as not to expose the main body 354 from the grip cover 28 in the state where the grip cover 28 is attached to the base member 312. The grip cover 28 can be configured to be attached to the base member 312 so as to at least partly expose the attachment member 355 from the grip cover 28 in the state where the grip cover 28 is attached to the base member 312.

As seen in FIG. 40, the accommodating part 344 includes a first inner surface 360 and a second inner surface 362. In this embodiment, the power-supply accommodating part 344P includes the first inner surface 360. The power-supply accommodating part 344P includes the second inner surface 362. The second inner surface 362 faces towards the first inner surface 360. The second inner surface 362 is spaced apart from the first inner surface 360. The accommodating space 352 is at least partly defined between the first inner surface 360 and the second inner surface 362. Namely, the first inner surface 360 and the second inner surface 362 are spaced apart from each other to at least partly define the accommodating space 352 between the first inner surface 360 and the second inner surface 362.

The first inner surface 360 extends along the reference plane RP31. The second inner surface 362 extends along the reference plane RP31. The reference plane RP31 is defined between the first inner surface 360 and the second inner surface 362. The first inner surface 360 and the second inner surface 362 are parallel to the reference plane RP31. However, the first inner surface 360 and the second inner surface 362 can be non-parallel to the reference plane RP31.

The first inner surface 360 extends along a first direction D341 and faces toward the second inner surface 362. The second inner surface 362 extends along the first direction D341 and faces toward the first inner surface 360. In this embodiment, the first inner surface 360 faces toward the second inner surface 362 in a second direction D342. The first direction D341 is parallel to the reference plane RP31. The second direction D342 is perpendicular to the first direction D341 and is inclined relative to the additional reference plane RP32. However, the relationship among the reference plane RP31, the additional reference plane RP32, the first direction D341, and the second direction D342 is not limited to this embodiment.

Figure 43:
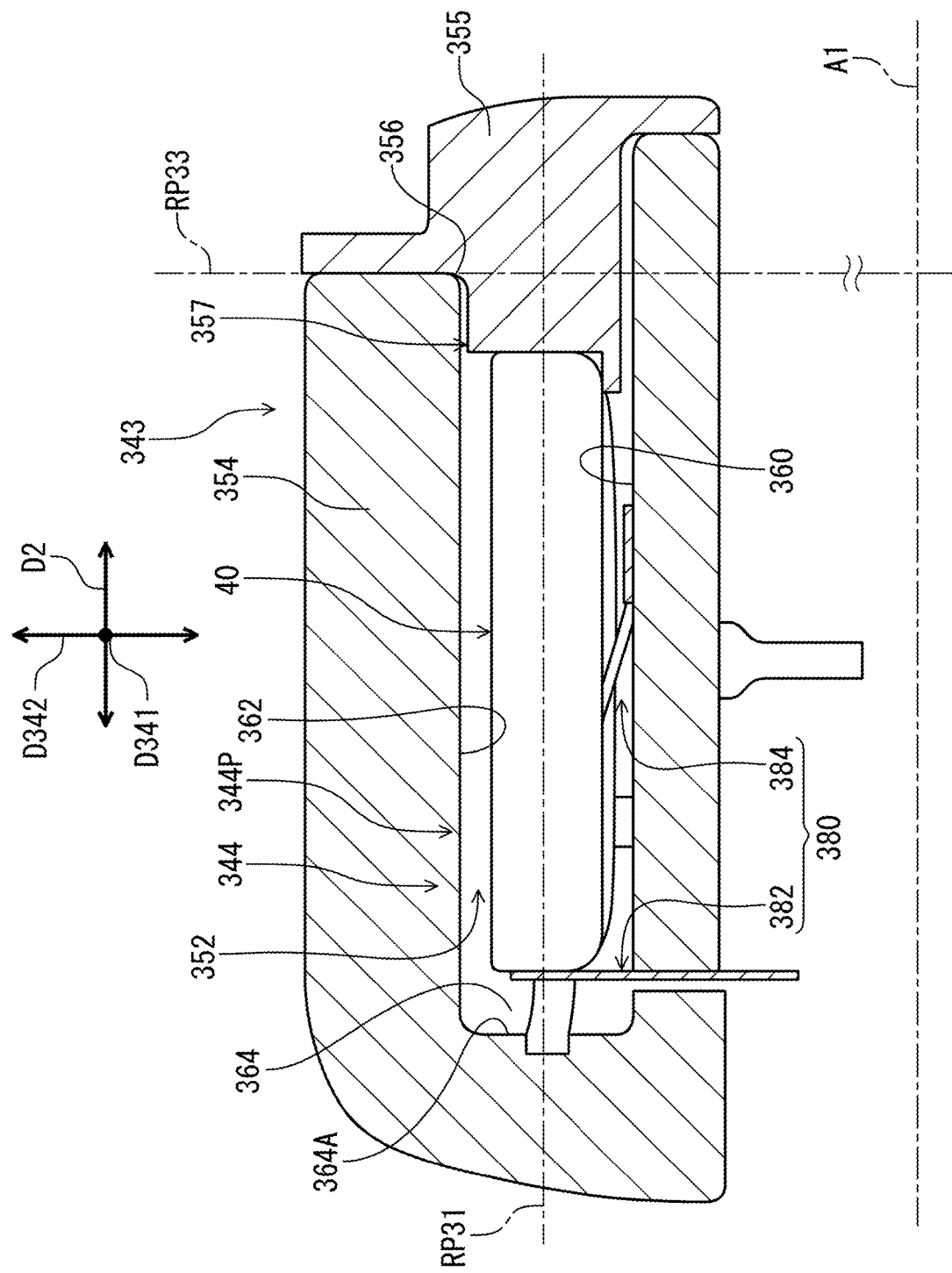
FIG. 43 is a partial cross-sectional view of the accommodating structure of the operating device taken along line XLIII-XLIII of FIG. 40.

As seen in FIG. 43, the accommodating part 344 includes a third inner surface 364 extending between the first inner surface 360 and the second inner surface 362. In this embodiment, the power-supply accommodating part 344P includes the third inner surface 364 extending between the first inner surface 360 and the second inner surface 362. The third inner surface 364 extends in the second direction D342. The accommodating space 352 is at least partly defined by the first inner surface 360, the second inner surface 362, and the third inner surface 364. The third inner surface 364 includes a facing part 364A facing toward the insertion opening 356. The power-supply accommodating part 344P extends in the axial direction D2. The accommodating space 352 extends from the third inner surface 364 to the insertion opening 356 in the axial direction D2. In this embodiment, the reference plane RP31 is parallel to the axial direction D2. However, the relationship between the reference plane RP31 and the axial direction D2 is not limited to this embodiment.

Figure 44:
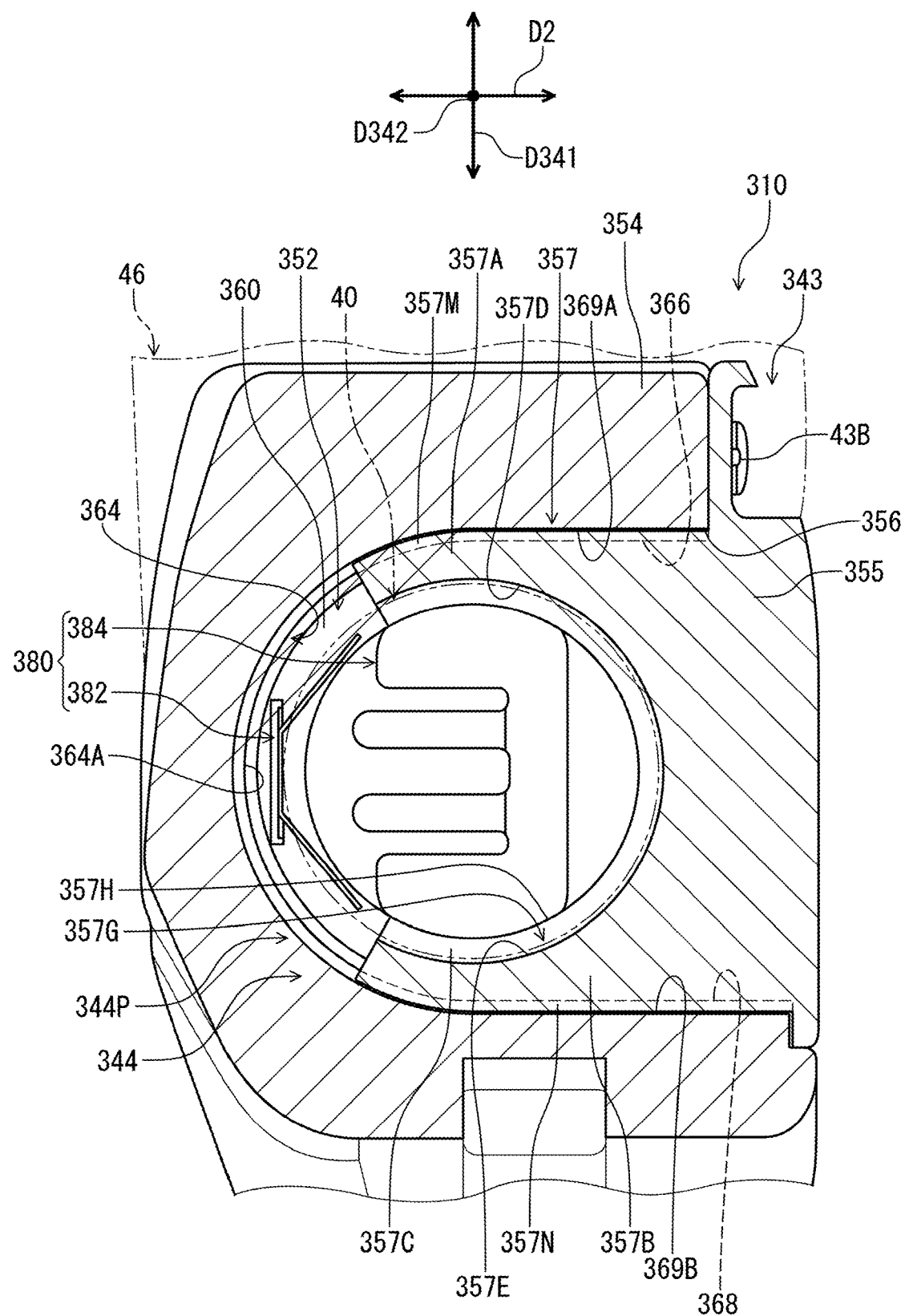
FIG. 44 is a partial cross-sectional view of the accommodating structure of the operating device taken along line XLIV-XLIV of FIG. 40.

As seen in FIG. 44, the third inner surface 364 has a curved shape. The third inner surface 364 extends along an outer periphery of the power supply 40 in a state where the power supply 40 is provided in the accommodating space 352. However, the shape of the third inner surface 364 is not limited to this embodiment.

The accommodating part 344 includes a fourth inner surface 366 and a fifth inner surface 368. The fourth inner surface 366 extends along the axial direction D2 from the third inner surface 364 to the insertion opening 356. The fifth inner surface 368 extends along the axial direction D2 from the third inner surface 364 to the insertion opening 356. The third inner surface 364 circumferentially extends from the fourth inner surface 366 to the fifth inner surface 368.

As seen in FIG. 40, the fourth inner surface 366 extends between the first inner surface 360 and the second inner surface 362. The fifth inner surface 368 extends between the first inner surface 360 and the second inner surface 362. The fourth inner surface 366 and the fifth inner surface 368 are spaced apart from each other to at least partly define the accommodating space 352 between the fourth inner surface 366 and the fifth inner surface 368. The fourth inner surface 366 faces toward the fifth inner surface 368. The fourth inner surface 366 extends in the second direction D342. The fifth inner surface 368 extends in the second direction D342. However, the structures of the fourth inner surface 366 and the fifth inner surface 368 are not limited to this embodiment.

The accommodating part 344 includes a first guide groove 369A and a second guide groove 369B. The first guide groove 369A is configured to guide the first projection 357M in the axial direction D2. The second guide groove 369B is configured to guide the second projection 357N in the axial direction D2. The first guide groove 369A is provided in the fourth inner surface 366. The second guide groove 369B is provided in the fifth inner surface 368.

The accommodating part 344 includes a first inner surface 370 and a second inner surface 372. In this embodiment, the circuitry accommodating part 344C includes the first inner surface 370. The circuitry accommodating part 344C includes the second inner surface 372. The second inner surface 372 is spaced apart from the first inner surface 370. The accommodating space 353 is at least partly defined between the first inner surface 370 and the second inner surface 372. Namely, the first inner surface 370 and the second inner surface 372 are spaced apart from each other to at least partly define the accommodating space 353 between the first inner surface 370 and the second inner surface 372.

The first inner surface 370 extends along the additional reference plane RP32. The second inner surface 372 extends along the additional reference plane RP32. The additional reference plane RP32 is defined between the first inner surface 370 and the second inner surface 372. The first inner surface 370 and the second inner surface 372 are parallel to the additional reference plane RP32. However, the first inner surface 370 and the second inner surface 372 can be non-parallel to the additional reference plane RP32.

The first inner surface 370 extends along a first direction D351 and faces toward the second inner surface 372. The second inner surface 372 extends along the first direction D351 and faces toward the first inner surface 370. In this embodiment, the first inner surface 370 faces toward the second inner surface 372 in a second direction D352. The first direction D351 is parallel to the additional reference plane RP32 and the second direction D342. The second direction D352 is perpendicular to the first direction D351 and is inclined relative to the reference plane RP31 and the first direction D341. However, the relationship among the reference plane RP31, the additional reference plane RP32, the first direction D341, and the second direction D342, the first direction D351, and the second direction D352 is not limited to this embodiment.

The accommodating part 344 includes a third inner surface 374 extending between the first inner surface 370 and the second inner surface 372. In this embodiment, the circuitry accommodating part 344C includes the third inner surface 374 extending between the first inner surface 370 and the second inner surface 372. The third inner surface 374 extends in the second direction D352. The accommodating space 353 is at least partly defined by the first inner surface 370, the second inner surface 372, and the third inner surface 374. The third inner surface 374 includes a facing part 374A facing toward the insertion opening 358 with respect to the accommodating space 353. The circuitry accommodating part 344C extends in the first direction D351. The accommodating space 353 extends from the third inner surface 374 to the insertion opening 358 in the first direction D351.

Figure 45:
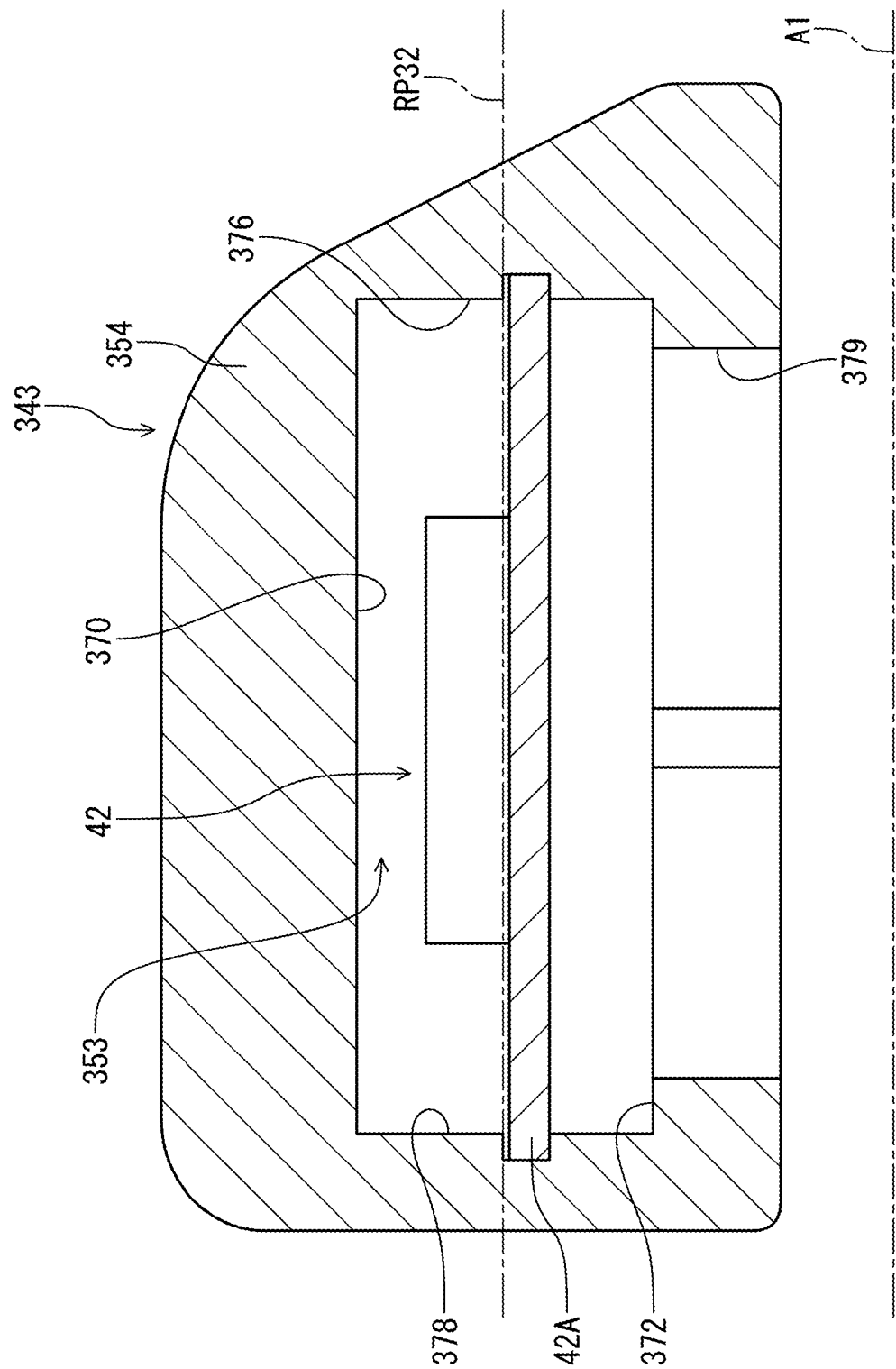
FIG. 45 is a partial cross-sectional view of the accommodating structure of the operating device taken along line XLV-XLV of FIG. 40.

As seen in FIG. 45, the accommodating part 344 includes a fourth inner surface 376 and a fifth inner surface 378. The fourth inner surface 376 extends between the first inner surface 370 and the second inner surface 372. The fifth inner surface 378 extends between the first inner surface 370 and the second inner surface 372. The fourth inner surface 376 and the fifth inner surface 378 are spaced apart from each other to at least partly define the accommodating space 353 between the fourth inner surface 376 and the fifth inner surface 378. The fourth inner surface 376 faces toward the fifth inner surface 378.

Figure 46:
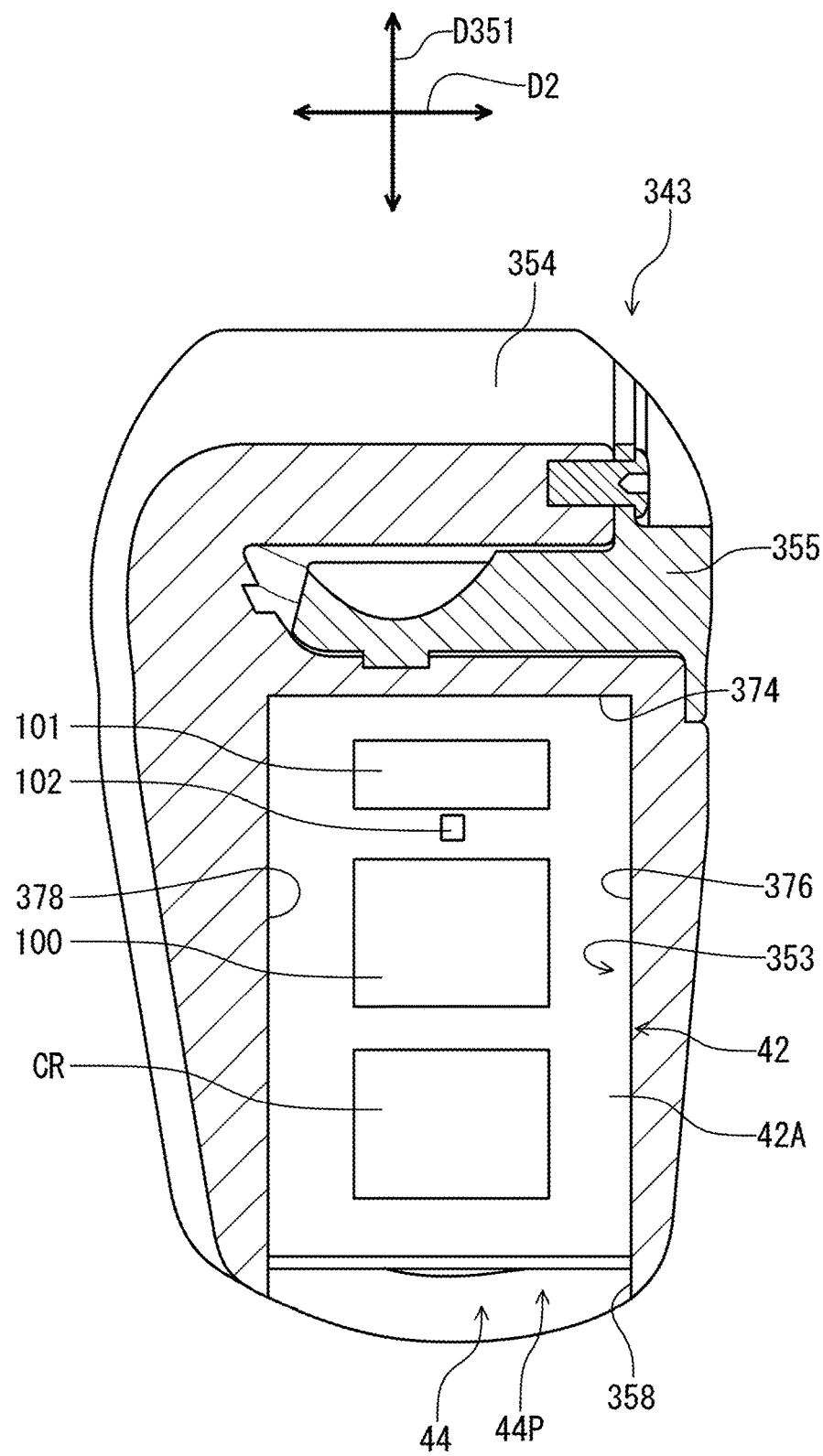
FIG. 46 is a partial cross-sectional view of the accommodating structure of the operating device taken along line XLVI-XLVI of FIG. 40.

As seen in FIG. 46, the fourth inner surface 376 extends from the third inner surface 374 to the insertion opening 358 in the first direction D351. The fifth inner surface 378 extends from the third inner surface 374 to the insertion opening 358 in the first direction D351. However, the structures of the fourth inner surface 376 and the fifth inner surface 378 are not limited to this embodiment. The third inner surface 374 extends from the fourth inner surface 376 to the fifth inner surface 378.

As seen in FIG. 43, the operating device 310 further comprises an electrical contact 380. Namely, the electric device 310 further comprises the electrical contact 380. The electrical contact 380 is configured to contact the power supply 40 in a state where the power supply 40 is provided in the accommodating part 344. The electrical contact 380 is provided in at least one of the first inner surface 360, the second inner surface 362 and the third inner surface 364 to be contactable with the power supply 40 in the state where the power supply 40 is accommodated in the accommodating part 344. The electrical contact 380 is provided in at least one of the first inner surface 360, the second inner surface 362, and the third inner surface 364 to be contactable with the power supply 40 in a state where the power supply 40 is accommodated in the power-supply accommodating part 344P. In this embodiment, the electrical contact 380 is provided in the first inner surface 360 to be contactable with the power supply 40 in the state where the power supply 40 is provided in the accommodating part 344. However, the position of the electrical contact 380 is not limited to this embodiment.

In this embodiment, the electrical contact 380 includes a positive contact 382 and a negative contact 384 which is a separate member from the positive contact 382. The positive contact 382 is configured to contact a positive electrode of the power supply 40 in the state where the power supply 40 is provided in the accommodating part 344 (e.g., the power-supply accommodating part 344P). The negative contact 384 is configured to contact a negative electrode of the power supply 40 in the state where the power supply 40 is provided in the accommodating part 344 (e.g., the power-supply accommodating part 344P). The positive contact 384 is provided in the first inner surface 360 to be contactable with the power supply 40 in the state where the power supply 40 is provided in the accommodating part 344 (e.g., the power-supply accommodating part 344P). The negative contact 384 is provided in the first inner surface 360 to be contactable with the power supply 40 in the state where the power supply 40 is provided in the accommodating part 344 (e.g., the power-supply accommodating part 344P). However, the positions of the positive contact 382 and the negative contact 384 are not limited to this embodiment.

As seen in FIG. 44, the support base 357C of the holder 357 includes a recess 357H. The recess 357H is provided between the first holding arm 357A and the second holding arm 357B to avoid interference between the holder 357 and the electrical contact 380. The electrical contact 380 is at least partly provided in the recess 357H in a state where the holder 357 is provided in the power-supply accommodating part 344P. At least one of the positive contact 382 and the negative contact 384 is at least partly provided in the recess 357H in the state where the holder 357 is provided in the power-supply accommodating part 344P. In this embodiment, the negative contact 384 is partly provided in the recess 357H in the state where the holder 357 is provided in the power-supply accommodating part 344P. However, the positional relationship between the holder 357 and the electrical contact 380 is not limited to this embodiment.

As seen in FIGS. 43 and 45, at least one of the reference plane RP31 and the additional reference plane RP32 extends along the pivot axis A1. In this embodiment, the reference plane RP31 and the additional reference plane RP32 extend along the pivot axis A1. The reference plane RP31 and the additional reference plane RP32 are parallel to the pivot axis A1. However, at least one of the reference plane RP31 and the additional reference plane RP32 can be inclined relative to the pivot axis A1.

Figure 47:
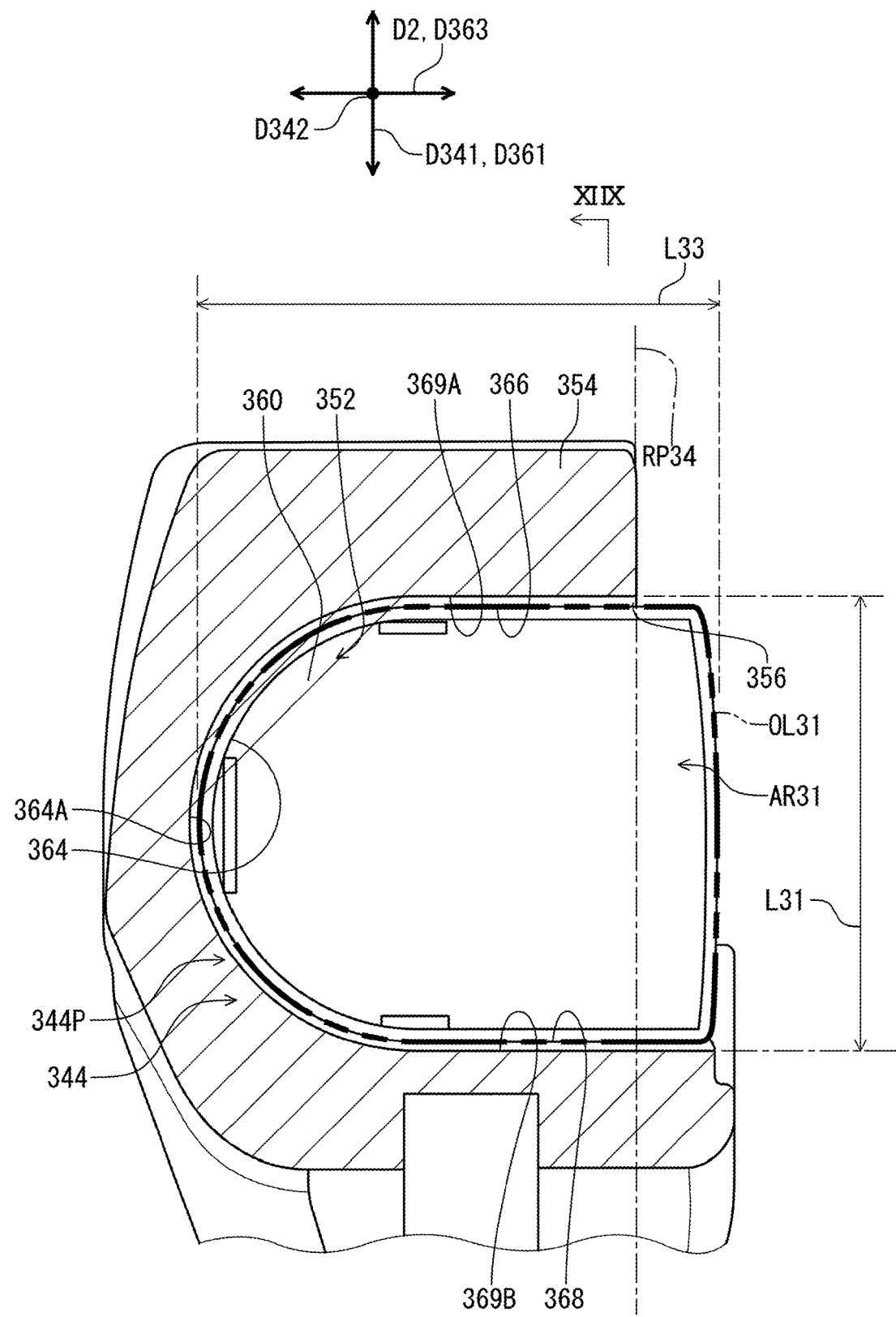
FIG. 47 is a partial cross-sectional view of a main body of the accommodating structure of the operating device taken along line XLVII-XLVII of FIG. 40.

As seen in FIG. 47, the first inner surface 360 has a first outline OL31. The first outline OL31 defines a first area AR31 as viewed in a direction perpendicular to the reference plane RP31 (see, e.g., FIG. 4). In this embodiment, the first outline OL31 defines the first area AR31 as viewed in the second direction D342 perpendicular to the reference plane RP31 (see, e.g., FIG. 40).

Figure 48:
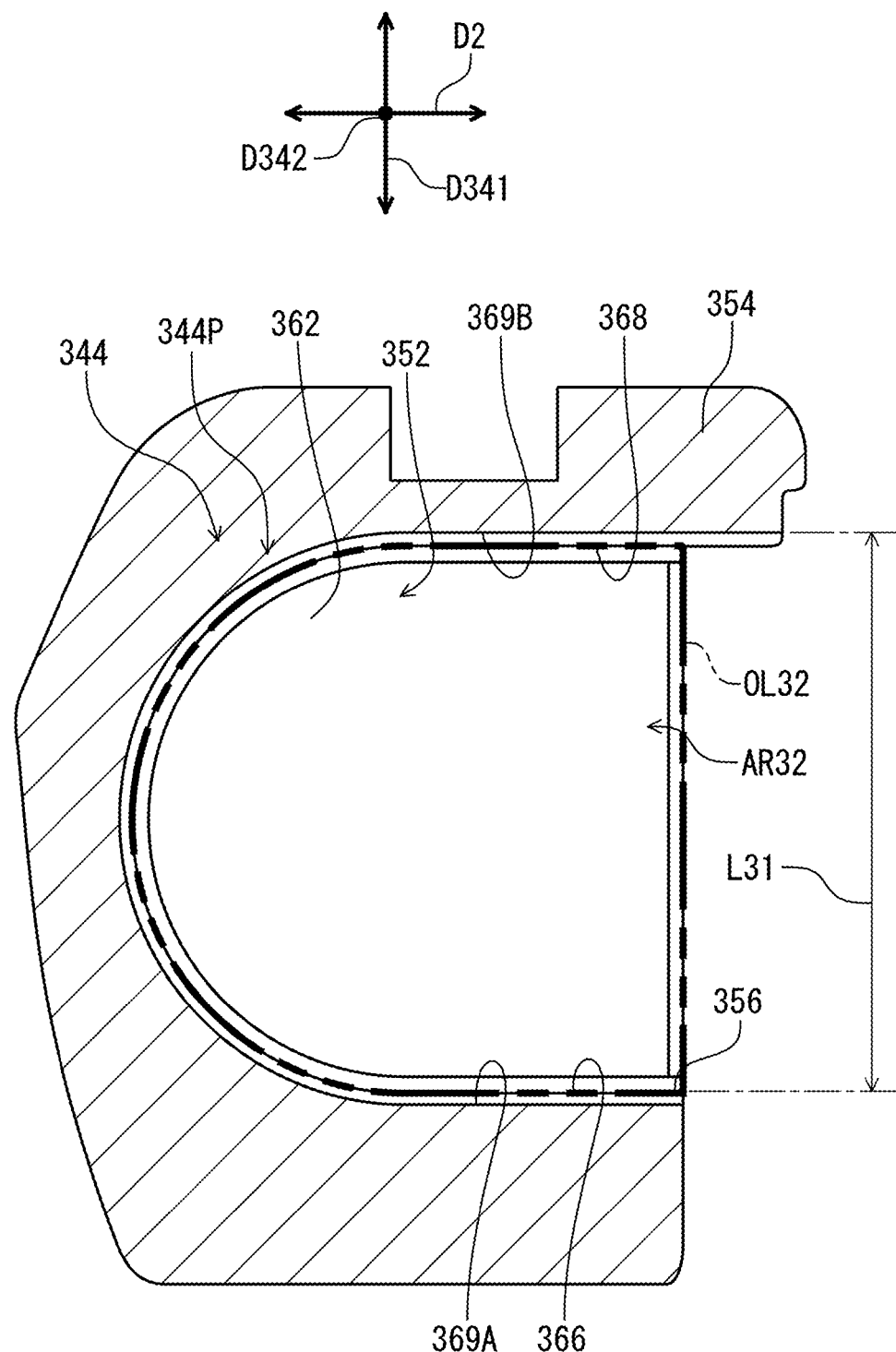
FIG. 48 is a partial cross-sectional view of the main body of the accommodating structure of the operating device taken along line XLVIII-XLVIII of FIG. 40.

As seen in FIG. 48, the second inner surface 362 has a second outline OL32. The second outline OL32 defines a second area AR32 as viewed in the direction perpendicular to the reference plane RP31 (see, e.g., FIG. 40). In this embodiment, the second outline OL32 defines the second area AR32 as viewed in the second direction D342 perpendicular to the reference plane RP31 (see, e.g., FIG. 40).

Figure 49:
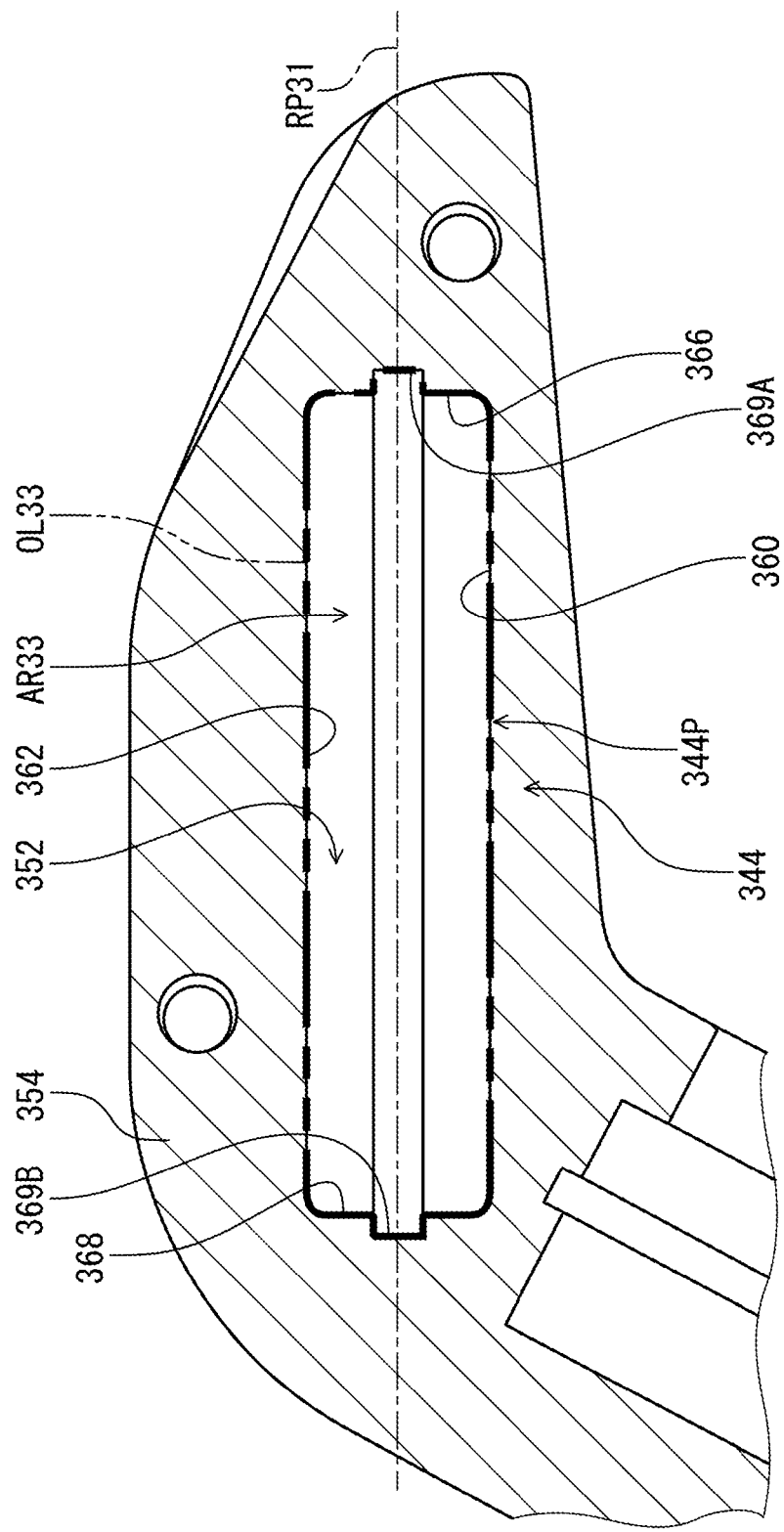
FIG. 49 is a partial cross-sectional view of the main body of the accommodating structure of the operating device taken along line XLIX-XLIX of FIG. 47.

As seen in FIG. 49, the third inner surface 364 has a third outline OL33. The third outline OL33 defines a third area AR33 as viewed in a direction parallel to the reference plane RP31. In this embodiment, the third outline OL33 defines the third area AR33 as viewed in the axial direction D2 parallel to the reference plane RP31.

As seen in FIG. 47, the insertion opening 356 extends along an insertion opening plane RP34. In this embodiment, the insertion opening plane RP34 extends in the first direction D341. The insertion opening plane RP34 is parallel to the first direction D341 and is perpendicular to the axial direction D2. As seen in FIG. 44, the main body 354 includes an attachment surface 354B. The attachment member 355 is in contact with the attachment surface 354B in a state where the attachment member 355 is attached to the main body 354. The insertion opening plane RP34 is defined on the attachment surface 354B.

Figure 50:
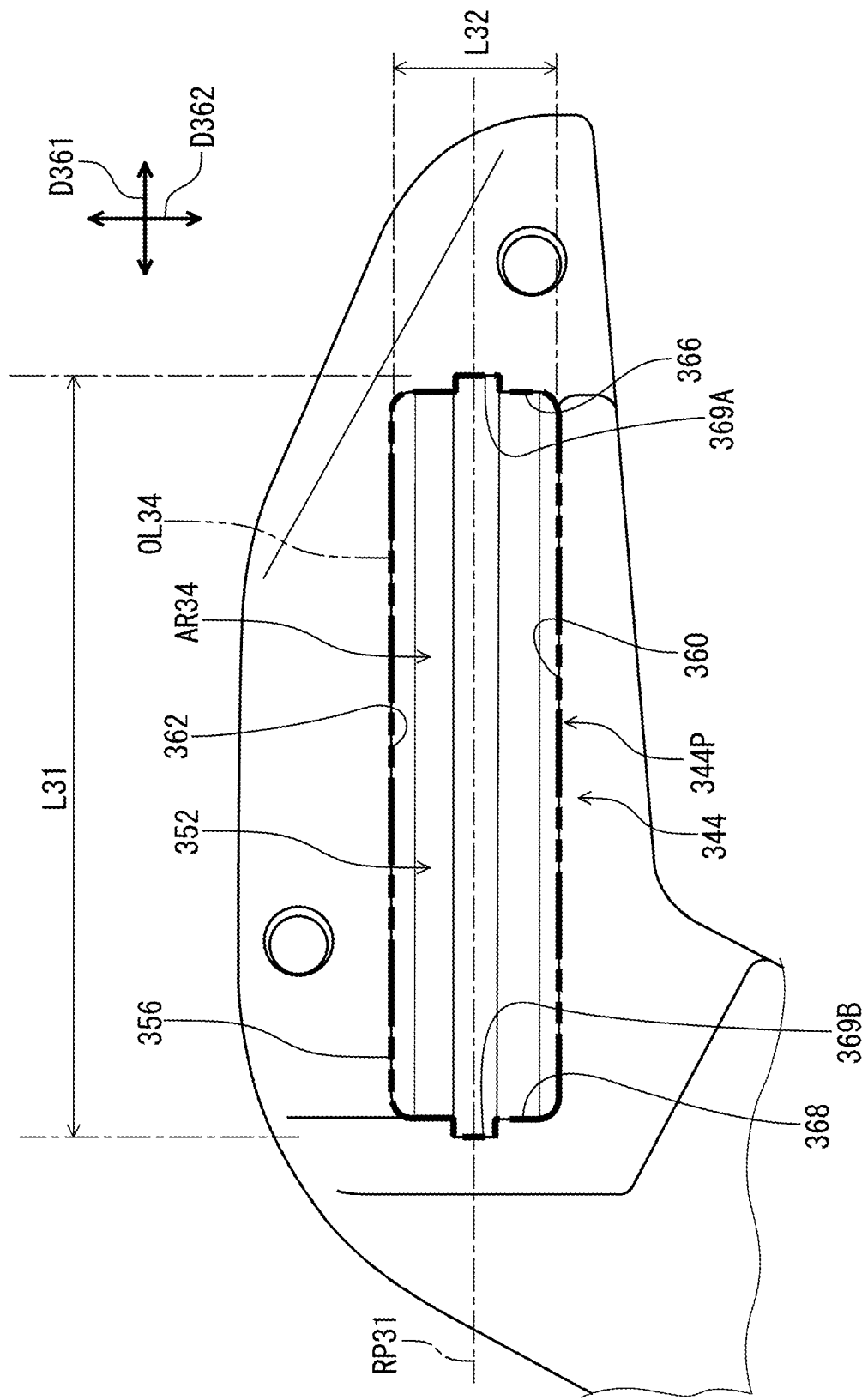
FIG. 50 is a side elevational view of the main body of the accommodating structure illustrated in FIG. 47.

As seen in FIG. 50, the insertion opening 356 has an opening outline OL34. The opening outline OL34 defines an insertion opening area AR34 as viewed in a direction perpendicular to the insertion opening plane RP34 (see, e.g., FIG. 46). The insertion opening area AR34 is defined between the first inner surface 360 and the second inner surface 362. In this embodiment, the opening outline OL34 defines the insertion opening area AR34 as viewed in the axial direction D2 perpendicular to the insertion opening plane RP34 (see, e.g., FIG. 47).

The insertion opening area AR34 has a first length L31 and a second length L32. The first length L31 is defined in a first length direction D361 parallel to the reference plane RP31. The first length L31 is defined from the first guide groove 369A to the second guide groove 369B in the first length direction D361. Thus, the first length L31 of the insertion opening 356 is equal to a length of the power-supply accommodating part 344P defined in the first length direction D361 (i.e., the first direction D341).

The second length L32 is defined in a second length direction D362 perpendicular to the first length direction D361. The second length L32 is defined from the first inner surface 360 to the second inner surface 362 in the second length direction D362. In this embodiment, the first length L31 is longer than the second length L32. However, the first length L31 can be equal to or shorter than the second length L32.

As seen in FIG. 47, the power-supply accommodating part 344P has a third length L33 defined in a third length direction D363 perpendicular to the first length direction D361 and parallel to the reference plane RP321. The third length L33 is defined as a maximum depth of the power-supply accommodating part 344P. Specifically, the third length L33 is defined as a maximum depth of the accommodating space 352 of the power-supply accommodating part 344P. The third length direction D363 is parallel to the axial direction D2.

As seen in FIGS. 47 and 50, the third length L33 is longer than the second length L32. The first area AR31 is larger than the insertion opening area AR34. However, the first area AR31 can be equal to or smaller than the insertion opening area AR34. The third length L33 can be equal to or shorter the second length L32.

As seen in FIGS. 48 and 50, the second area AR32 is larger than the insertion opening area AR34. However, the second area AR32 can be equal to or smaller than the insertion opening area AR34.

As seen in FIGS. 47 and 49, the first area AR31 is larger than the third area AR33. However, the first area AR31 can be equal to or smaller than the third area AR33.

Figure 51:
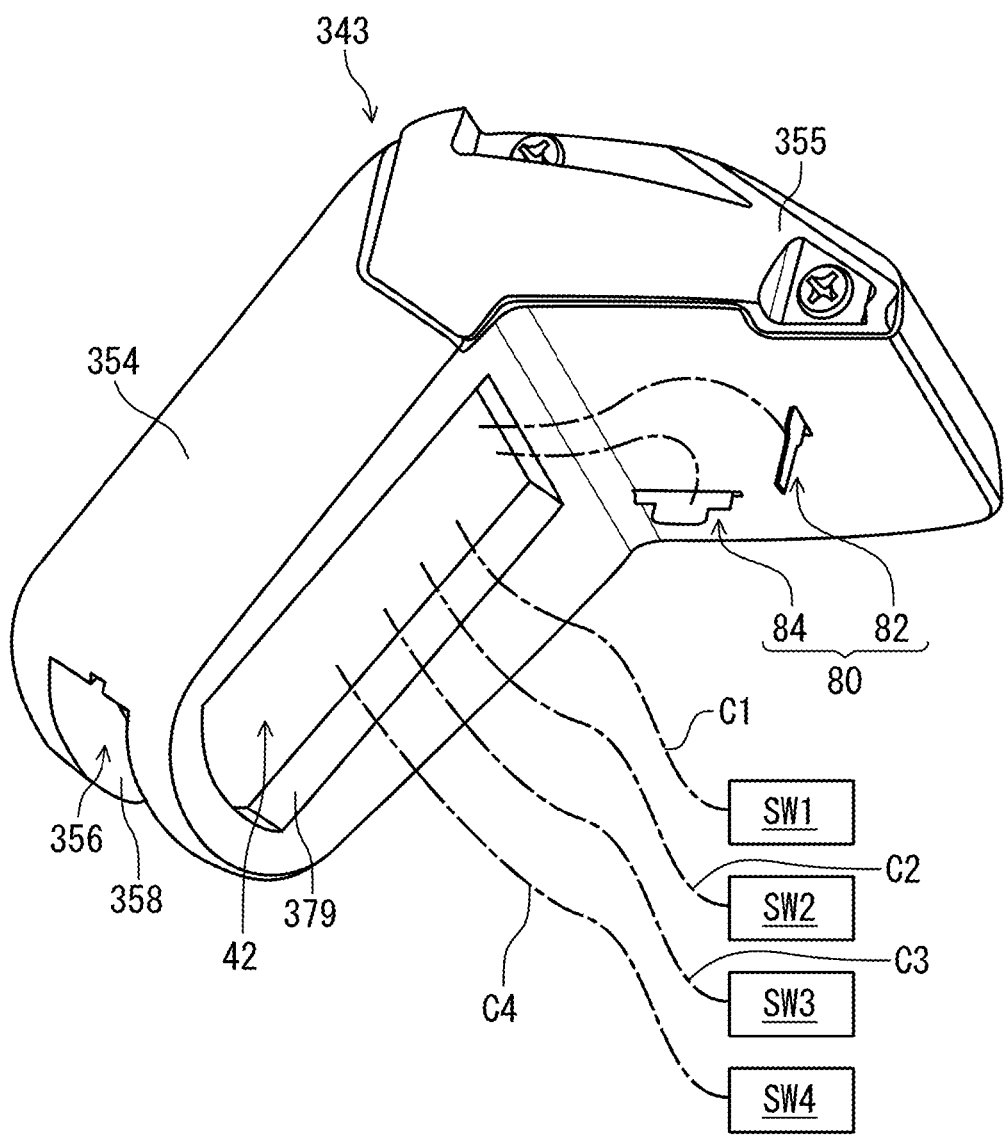
FIG. 51 is a perspective view of the accommodating structure of the operating device illustrated in FIG. 38.

As seen in FIG. 51, the accommodating structure 343 includes an opening 379 provided in the second inner surface 372. The circuitry 42 is partly exposed from the accommodating structure 343 through the opening 379. The electric cables 94 and 96 extend from the accommodating space 353 to ends of the positive and negative contacts 82 and 84 through the intermediate opening 92. The electric cables C1 to C4 extend through the opening 379 to connect the switches SW1, SW2 and SW3 and the connector CN to the circuitry 42.

Fourth Embodiment

An operating or electric device 410 in accordance with a third embodiment will be described below referring to FIGS. 52 to 65. The operating or electric device 410 has the same structure and/or configuration as those of the operating or electric device 10 except for the accommodating structure 43. Thus, elements having substantially the same function as those in the above embodiments will be numbered the same here and will not be described and/or illustrated again in detail here for the sake of brevity.

Figure 52:
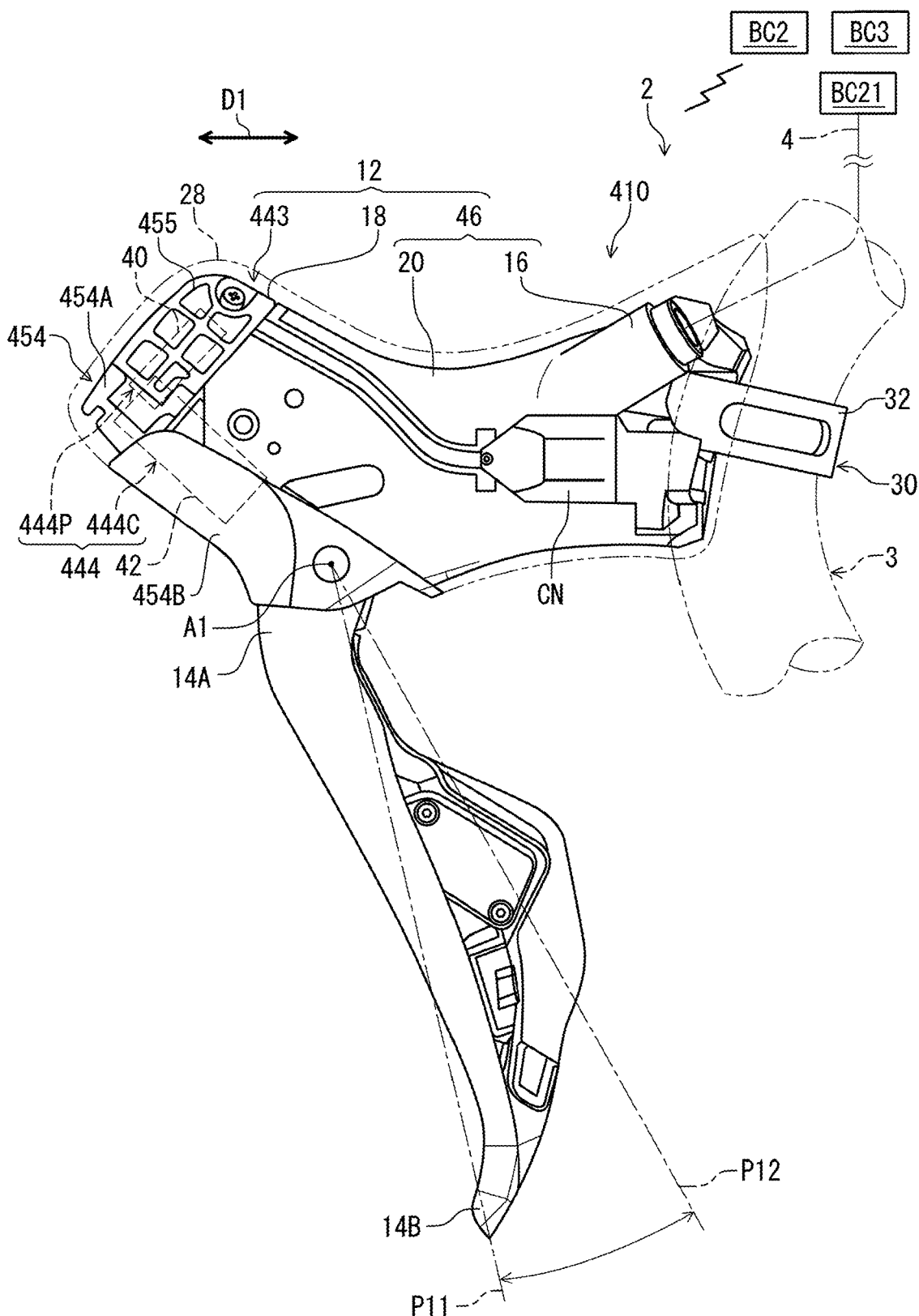
FIG. 52 is a side elevational view of an operating device in accordance with a fourth embodiment.

As seen in FIG. 52, the operating device 410 for the human-powered vehicle 2 comprises a base member 412. The electric device 410 further comprises at least one of an operating member and an actuated member movable relative to the base member 12. In this embodiment, the operating device 410 for the human-powered vehicle 2 comprises the operating member 14. The base member 412 has substantially the same structure as that of the base member 12 of the first embodiment. The base member 412 extends in the longitudinal direction D1. The base member 412 includes the first end portion 16 and the second end portion 18. The first end portion 16 is configured to be coupled to the handlebar 3. The second end portion 18 is opposite to the first end portion 16. The second end portion 18 is opposite to the first end portion 16 in the longitudinal direction D1. The second end portion 18 constitutes a free end portion of the base member 412. The base member 412 includes the grip portion 20 provided between the first end portion 16 and the second end portion 18. The grip portion 20 is provided between the first end portion 16 and the second end portion 18 in the longitudinal direction D1. The base member 412 includes the base body 46.

In this embodiment, the operating device 410 is configured to be connected to an electric component BC21 such as a brake device via a mechanical control cable 204 such as a Bowden cable. The hydraulic unit 26 of the first embodiment is omitted from the operating device 410. As with the first embodiment, however, the operating device 410 can include a hydraulic unit configured to actuate the operated device BC1.

As seen in FIG. 52, the base member 412 includes an accommodating structure 443. Namely, the electric device 410 for the human-powered vehicle 2 comprises the accommodating structure 443. The accommodating structure 443 is provided to the second end portion 18. The accommodating structure 443 is disposed at a location which is the farthest from the first end portion 16 in the second end portion 18 along the longitudinal direction D1 as viewed along the pivot axis A1. The accommodating structure 443 includes the accommodating part 444 configured to accommodate at least one of the power supply 40 and the circuitry 42.

In this embodiment, the accommodating part 444 is configured to accommodate the power supply 40 and the circuitry 42. The accommodating part 444 has substantially the same structure as that of the accommodating part 44 of the first embodiment. Specifically, the accommodating part 444 includes the power-supply accommodating part 444P and the circuitry accommodating part 444C. Namely, the base member 412 includes the power-supply accommodating part 444P and the circuitry accommodating part 444C. The accommodating structure 443 includes the power-supply accommodating part 444P and the circuitry accommodating part 444C. The power-supply accommodating part 444P has substantially the same structure as that of the power-supply accommodating part 44P of the first embodiment. The circuitry accommodating part 444C has substantially the same structure as that of the circuitry accommodating part 44C of the first embodiment. The power-supply accommodating part 444P is configured to accommodate the power supply 40. The circuitry accommodating part 444C is configured to accommodate the circuitry 42. However, the accommodating part 444 can be configured to accommodate only one of the power supply 40 and the circuitry 42. One of the power-supply accommodating part 444P and the circuitry accommodating part 444C can be omitted from the accommodating part 444.

In this embodiment, the positional relationship among the power-supply accommodating part 444P, the circuitry accommodating part 444C, and the base body 46 is different from the positional relationship among the power-supply accommodating part 44P, the circuitry accommodating part 44C, and the base body 46 described in the first embodiment.

Figure 53:
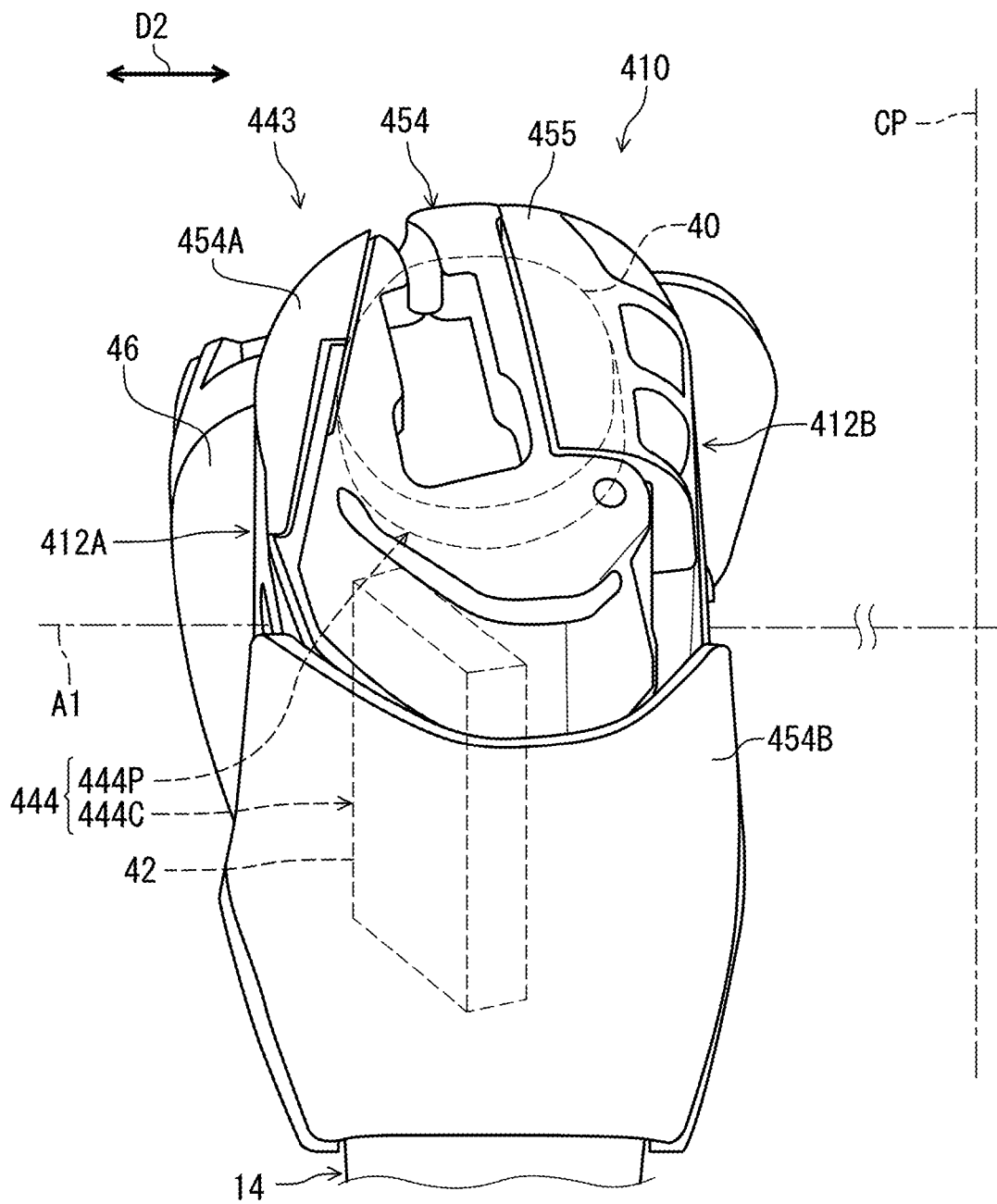
FIG. 53 is a front view of the operating device illustrated in FIG. 52.

As seen in FIG. 53, the base member 412 includes a first lateral surface 412A and a second lateral surface 412B. The second lateral surface 412B is provided on a reverse side of the first lateral surface 412A along the pivot axis A1. One of the power supply 40 and the circuitry 42 is provided closer to one of the first lateral surface 412A and the second lateral surface 412B than to the other of the first lateral surface 412A and the second lateral surface 412B. One of the power-supply accommodating part 44P and the circuitry 42 is provided closer to one of the first lateral surface 412A and the second lateral surface 412B than to the other of the first lateral surface 412A and the second lateral surface 412B. In this embodiment, the circuitry 42 is provided closer to the first lateral surface 412A than to the second lateral surface 412B. The second lateral surface 412B is provided between the first lateral surface 412A and the axial center plane CP of the handlebar 3. The circuitry 42 can be provided closer to the second lateral surface 412B than to the first lateral surface 412A. The power supply 40 can be provided to one of the first lateral surface 412A and the second lateral surface 412B than to the other of the first lateral surface 412A and the second lateral surface 412B.

As seen in FIG. 52, the accommodating part 444 is at least partly provided farther from the first end portion 16 of the base member 412 than the proximal end portion 14A of the operating member 14 in the longitudinal direction D1. The accommodating part 444 is at least partly provided farther from the contact surface 16A of the first end portion 16 than the operating member 14. At least one of the power-supply accommodating part 444P and the circuitry 42 is at least partly provided at the second end portion 18 of the base member 412. In this embodiment, the accommodating part 444 is partly provided farther from the first end portion 16 of the base member 412 than the proximal end portion 14A of the operating member 14 in the longitudinal direction D1. The accommodating part 444 is partly provided farther from the contact surface 16A of the first end portion 16 than the operating member 14. The power-supply accommodating part 444P and the circuitry 42 are entirely provided at the second end portion 18 of the base member 412. However, the accommodating part 444 can be entirely provided farther from the first end portion 16 of the base member 412 than the proximal end portion 14A of the operating member 14 in the longitudinal direction D1. The accommodating part 444 can be entirely provided farther from the contact surface 16A of the first end portion 16 than the operating member 14. At least one of the power-supply accommodating part 444P and the circuitry 42 can be partly provided at the second end portion 18 of the base member 412.

The base member 412 includes the base body 46. The accommodating structure 443 is a separate member form the base body 46 and is attached to the base body 46. However, the accommodating structure 443 can be integrally provided with the base body 46 as a one-piece unitary member. The position of the accommodating structure 443 in the base member 412 is not limited to this embodiment.

As with the operating device 10 of the first embodiment, one of the power supply 40 and the circuitry 42 is closer to the operating member 14 than the other of the power supply 40 and the circuitry 42 as viewed along the pivot axis A1. In this embodiment, the circuitry 42 is closer to the operating member 14 than the power supply 40 as viewed along the pivot axis A1. However, the power supply 40 can be closer to the operating member 14 than the circuitry 42.

One of the power supply 40 and the circuitry 42 is at least partly provided above the other of the power supply 40 and the circuitry 42 in the mounting state where the first end portion 16 is coupled to the handlebar 3. In this embodiment, the power supply 40 is partly provided above the circuitry 42 in the mounting state where the first end portion 16 is coupled to the handlebar 3. However, the power supply 40 can be partly provided above the circuitry 42 in the mounting state where the first end portion 16 is coupled to the handlebar 3. The circuitry 42 can be at least partly provided above the power supply 40 in the mounting state where the first end portion 16 is coupled to the handlebar 3.

One of the power-supply accommodating part 444P and the circuitry 42 is closer to the operating member 14 than the other of the power-supply accommodating part 444P and the circuitry 42. In this embodiment, the circuitry 42 is closer to the operating member 14 than the power-supply accommodating part 444P. However, the power-supply accommodating part 444P can be closer to the operating member 14 than the circuitry 42. A distance between the power-supply accommodating part 444P and the operating member 14 can be equal to a distance between the circuitry 42 and the operating member 14.

One of the power-supply accommodating part 444P and the circuitry 42 is at least partly provided above the other of the power-supply accommodating part 444P and the circuitry 42 in the mounting state where the first end portion 16 is coupled to the handlebar 3. In this embodiment, the power-supply accommodating part 444P is partly provided above the circuitry 42 in the mounting state where the first end portion 16 is coupled to the handlebar 3. However, the power-supply accommodating part 444P can be entirely provided above the circuitry 42 in the mounting state where the first end portion 16 is coupled to the handlebar 3. The circuitry 42 can be at least partly provided above the power-supply accommodating part 444P in the mounting state where the first end portion 16 is coupled to the handlebar 3.

Figure 54:
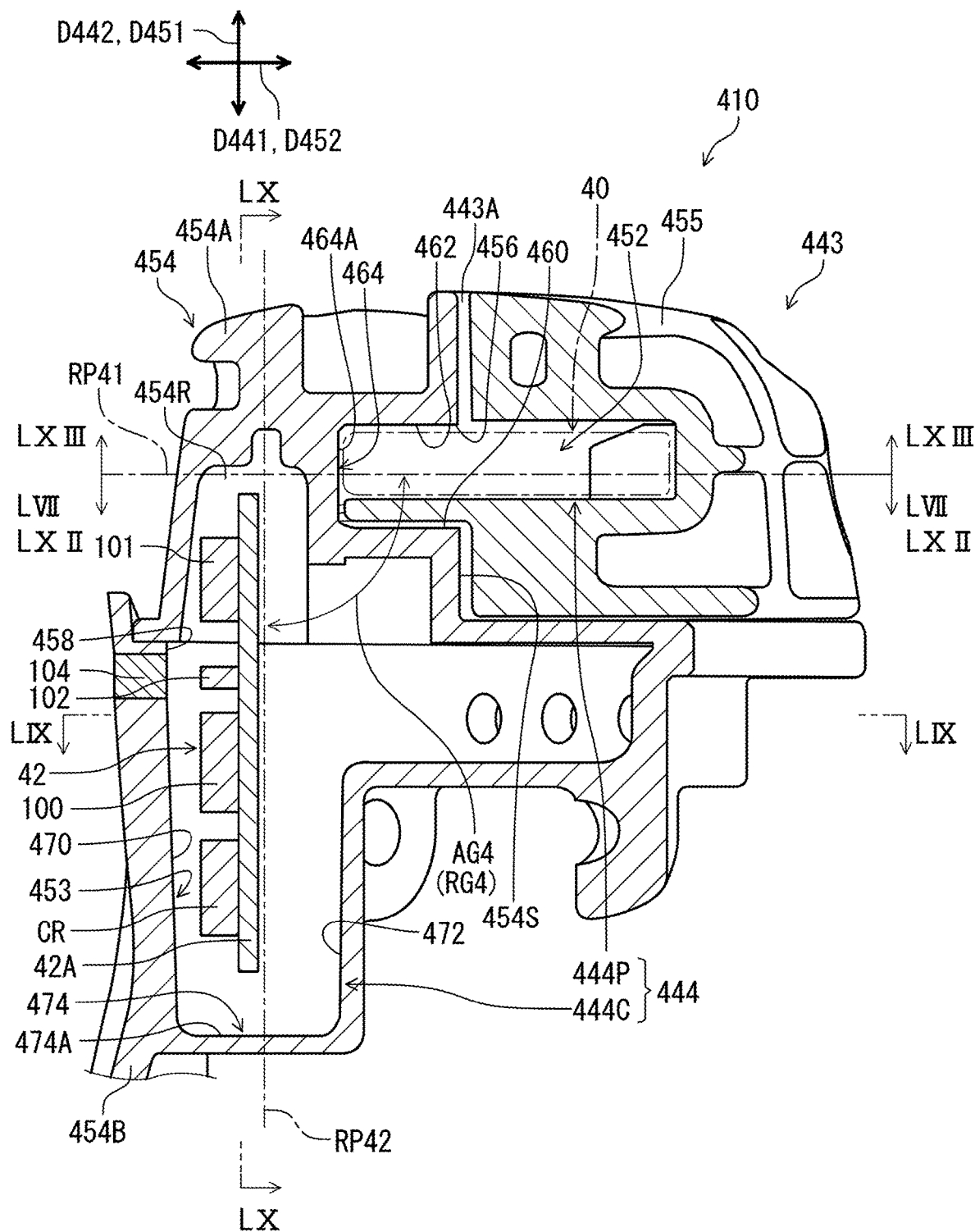
FIG. 54 is a partial cross-sectional view of the operating device taken along line LIV-LIV of FIG. 57.

As seen in FIG. 54, the power-supply accommodating part 444P extends along a reference plane RP41. The circuitry accommodating part 444C extends along an additional reference plane RP42. The power-supply accommodating part 444P is configured to accommodate the power supply 40 extending along the reference plane RP41. The circuitry 42 is provided to the base member 12 to extend along the additional reference plane RP42 intersecting with the reference plane RP41. The circuit board 42A is provided to the base member 12 to extend along the additional reference plane RP42.

The reference plane RP41 and the additional reference plane RP42 intersect with each other to define an intersection angle AG4. The intersection angle AG4 is equal to or smaller than 150 degrees. The intersection angle AG4 is equal to or larger than 30 degrees. In this embodiment, the intersection angle AG4 is 90 degrees. For example, more than half of the base body 46 is provided in a region RG4 defined between the reference plane RP41 and the additional reference plane RP42. The intersection angle AG4 is defined in the region RG4 in which more than half of the base body 46 (entirety of the base body 46 in the illustrated embodiment) is provided. However, the intersection angle AG4 is not limited to this embodiment and the above range.

The accommodating part 444 includes an accommodating space 452 in which at least one of the power supply 40 and the circuitry 42 is to be provided. In this embodiment, the power-supply accommodating part 444P includes the accommodating space 452 in which the power supply 40 is to be provided. However, the position of the accommodating space 452 is not limited to the power-supply accommodating part 444P. The accommodating space 452 can be configured to accommodate the circuitry 42 or both the power supply 40 and the circuitry 42.

The accommodating part 444 includes an accommodating space 453 in which at least one of the power supply 40 and the circuitry 42 is to be provided. In this embodiment, the circuitry accommodating part 444C includes the accommodating space 453 in which the circuitry 42 is to be provided. However, the position of the accommodating space 453 is not limited to the circuitry accommodating part 444C. The accommodating space 453 can be configured to accommodate the power supply 40 or both the power supply 40 and the circuitry 42.

Figure 55:
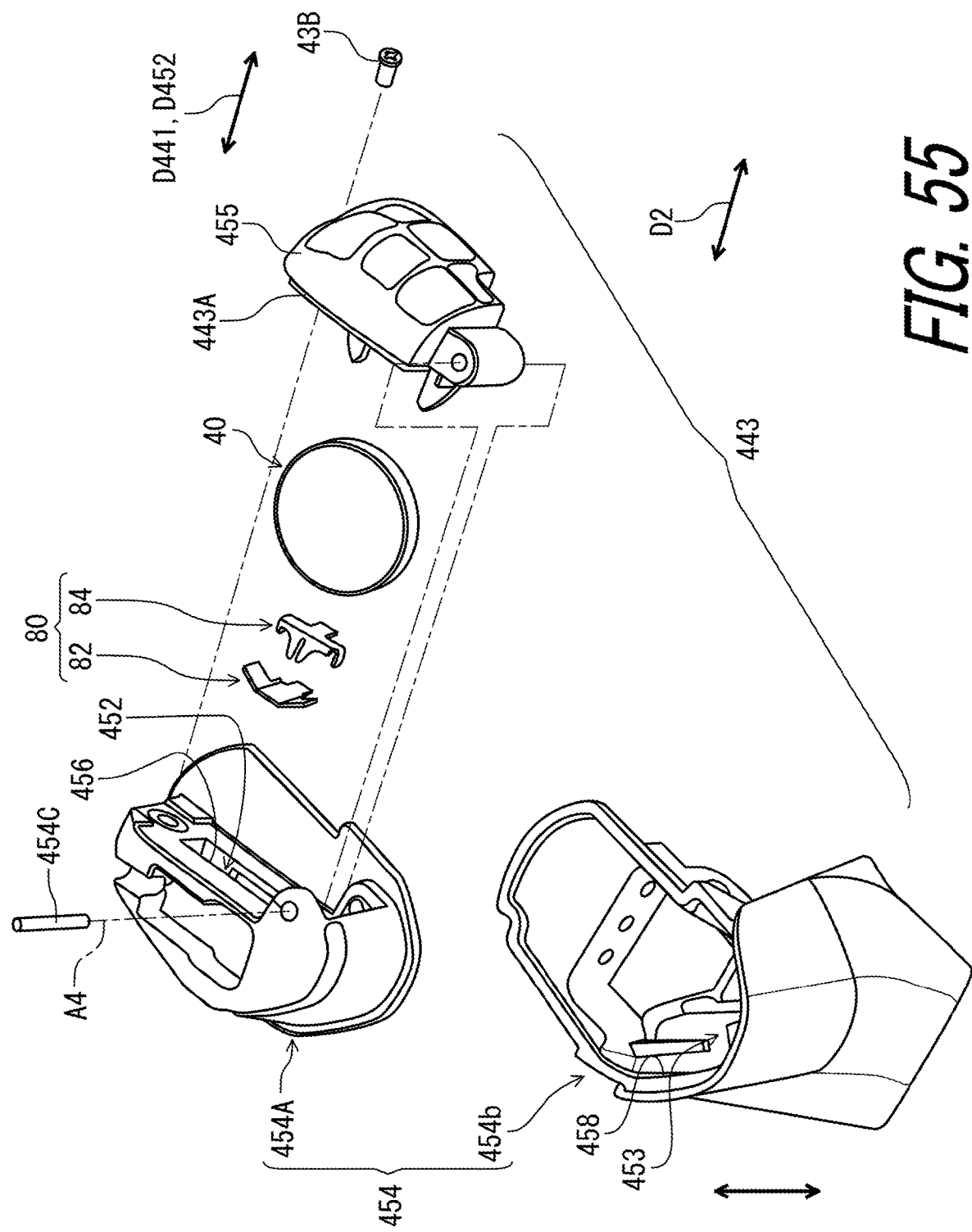
FIG. 55 is an exploded perspective view of an accommodating structure of the operating device illustrated in FIG. 52.

As seen in FIG. 55, the accommodating structure 443 includes a main body 454 and an attachment member 455. The attachment member 455 is configured to be attached to the main body 454. The power-supply accommodating part 444P is provided to at least one of the main body 454 and the attachment member 455 so as to accommodate the power supply 40. In this embodiment, the power-supply accommodating part 444P is provided to the main body 454 and the attachment member 455. However, the power-supply accommodating part 444P can be provided to only one of the attachment member 455 and the attachment member 455.

The attachment member 455 is a separate member from the main body 454. The main body 454 is integrally provided as a one-piece unitary member. Each of the main body 454 and the attachment member 455 is made of a non-metallic material such as a fiber-reinforced plastic. However, the material of the main body 454 and the attachment member 455 is not limited to this embodiment.

In this embodiment, the main body 454 includes a first main body 454A and a second main body 454B. The second main body 454B is a separate member from the first main body 454A. The power-supply accommodating part 444P is provided to the first main body 454A. The circuitry accommodating part 444C is provided to the second main body 454B. However, the circuitry accommodating part 444C is provided to at least one of the first main body 454A and the second main body 454B. The power-supply accommodating part 444P is provided to the first main body 454A and the second main body 454B. The second main body 454B can be integrally provided with the first main body 454A as a one-piece unitary member.

Figure 56:
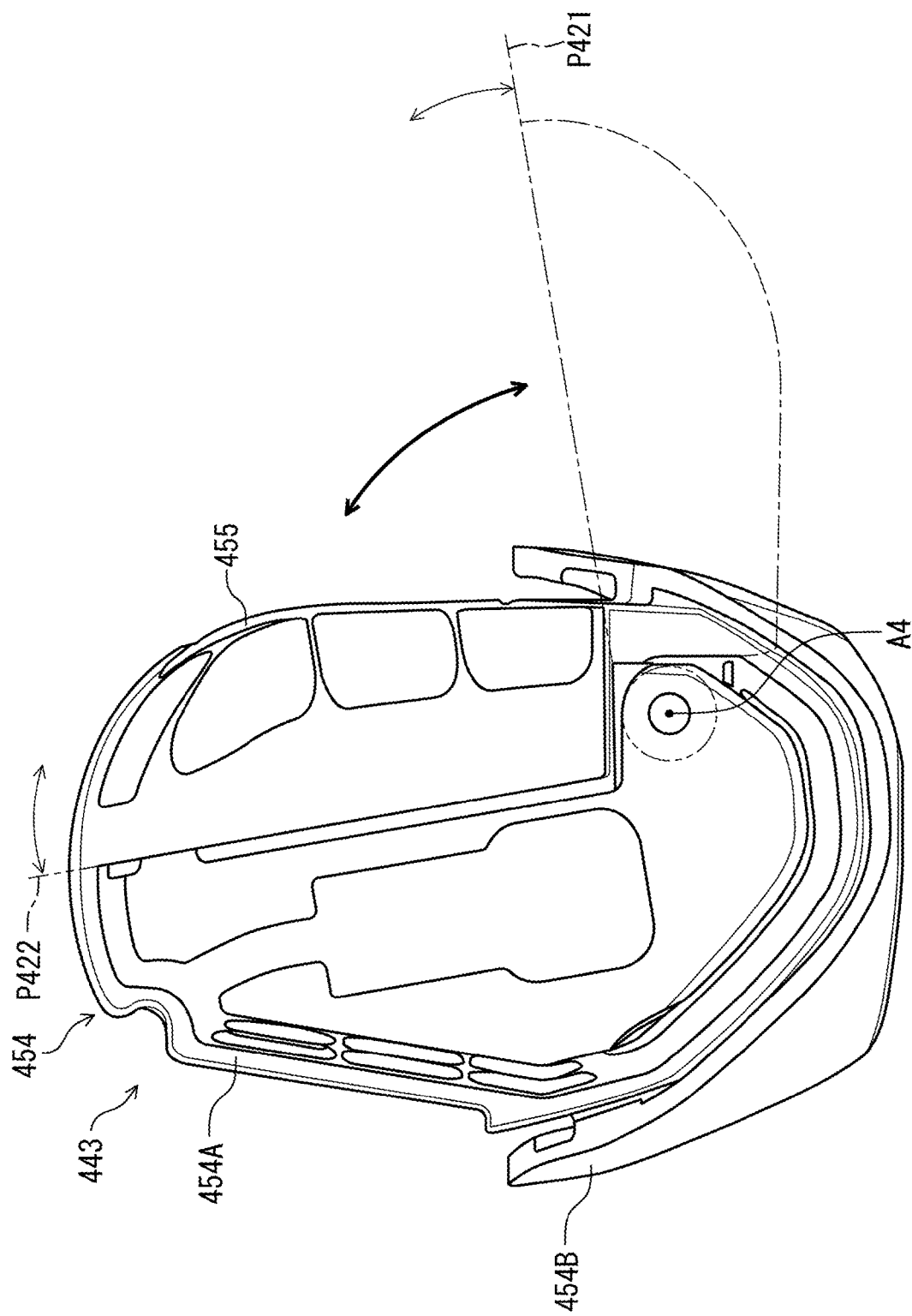
FIG. 56 is a top view of the accommodating structure of the operating device illustrated in FIG. 52.

As seen in FIG. 56, the attachment member 455 is pivotally coupled to the main body 454 so as to be movable between an open position P421 and a closed position P422. The attachment member 455 is pivotally coupled to the main body 454 with a pivot pin 454C. The attachment member 455 is movably coupled to the main body 454 between an open position P421 and a closed position P422. The attachment member 455 is configured to allow the power supply 40 to be removed from the power-supply accommodating part 444P in an open state where the attachment member 455 is in the open position P421. The attachment member 455 is configured to close the insertion opening 56 in a closed state where the attachment member 455 is in the closed position P422.

The attachment member 455 is pivotable relative to the main body 454 about an additional pivot axis A4. The attachment member 455 is pivotable relative to the main body 454 about the additional pivot axis A4 between the open position P421 and the closed position P422. In this embodiment, the attachment member 455 is pivotally coupled to the first main body 454A about the additional pivot axis A4. However, the attachment member 455 can be pivotally coupled to the second main body 454B or both the first main body 454A and the second main body 454B.

As seen in FIG. 55, the accommodating part 444 includes an insertion opening 456 provided at an end of the accommodating part 444. In this embodiment, the power-supply accommodating part 444P includes the insertion opening 456. The accommodating space 452 includes the insertion opening 456. The power supply 40 passes through the insertion opening 456 when the power supply 40 is inserted into or removed from the accommodating space 452. The accommodating space 452 is open through the insertion opening 456 in the axial direction D2 with respect to the pivot axis A1 in a state where the insertion opening 456 is not covered by other members. The attachment member 455 is configured to be attached to the main body 454 to cover the insertion opening 456.

The electric device 410 further comprises the fastener 43B. The attachment member 455 is secured to the main body 454 with the fastener 43B. The accommodating structure 443 is configured to allow the power supply 40 to be removed from the power-supply accommodating part 444P in an open state where the attachment member 455 is detached from the main body 454. The attachment member 455 is configured to close the insertion opening 456 in a state where the attachment member 455 is attached to the main body 454. However, the attachment member 455 can be connected to the main body 454 with another member such as a strap to prevent the attachment member 455 from unintentionally dropping from the main body 454.

The electric device 410 further comprises a seal member 443A. The seal member 443A is configured to be provided between the main body 454 and the attachment member 455 in a state where the attachment member 455 is attached to the main body 454. In this embodiment, the seal member 443A is made of a non-metallic material such as an elastic material. Examples of the elastic material include rubber. The seal member 443A is attached to the main body 454 with an integrally molding or a bonding structure such as adhesive. However, the seal member 443A can be attached to the attachment member 455 with an integrally molding or a bonding structure such as adhesive.

Figure 57:
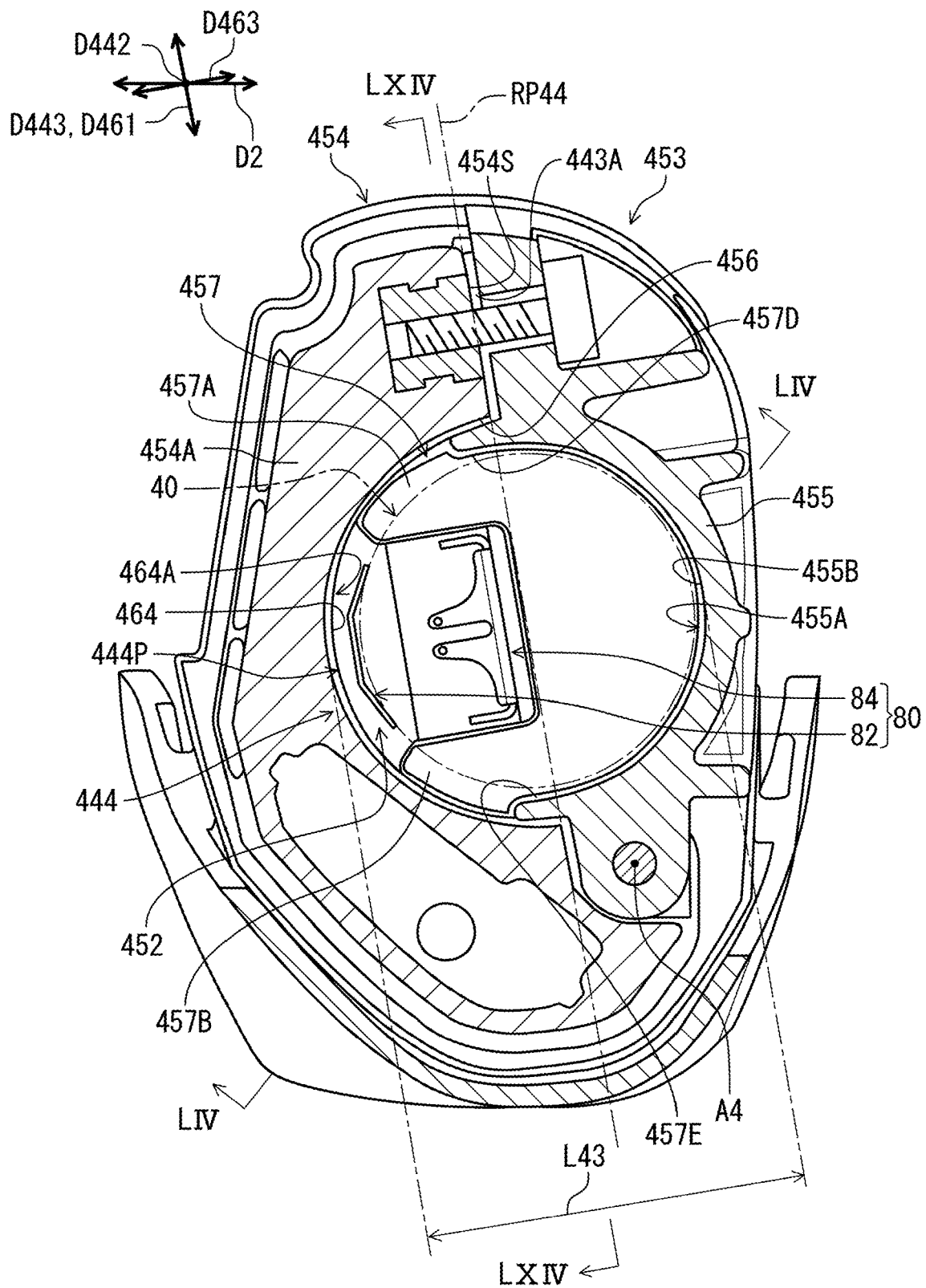
FIG. 57 is a partial cross-sectional view of the operating device taken along line LVII-LVII of FIG. 54.

As seen in FIG. 57, the electric device 410 further comprises a holder 457. The holder 457 is configured to at least partly receive the power supply 40 and configured to be arranged in the power-supply accommodating part 444P. The holder 457 is a separate member from the main body 454. The holder 457 is provided to the attachment member 455. The holder 457 extends from the attachment member 455. The holder 457 is configured to be provided in the accommodating space 452 in a state where the attachment member 455 is secured to the main body 454. In this embodiment, the holder 457 is integrally provided with the attachment member 455 as a one-piece unitary member. However, the holder 457 can be provided to the main body 454. The holder 457 can be a separate member from the attachment member 455.

In this embodiment, the attachment member 455 includes an accommodating recess 455A and an inner surface 455B. The inner surface 455B at least partly defines the accommodating recess 455A. In this embodiment, the inner surface 455B has a curved shape extending along the outer periphery of the power supply 40. However, the shape of the inner surface 455B is not limited to this embodiment.

The power supply 40 is partly provided in the accommodating recess 455A in a state where the power supply 40 is provided on the holder 457. The power supply 40 is provided in the power-supply accommodating part 444P in a state where the power supply 40 is provided on the holder 457 and where the attachment member 455 is in the closed position P422.

Figure 58:
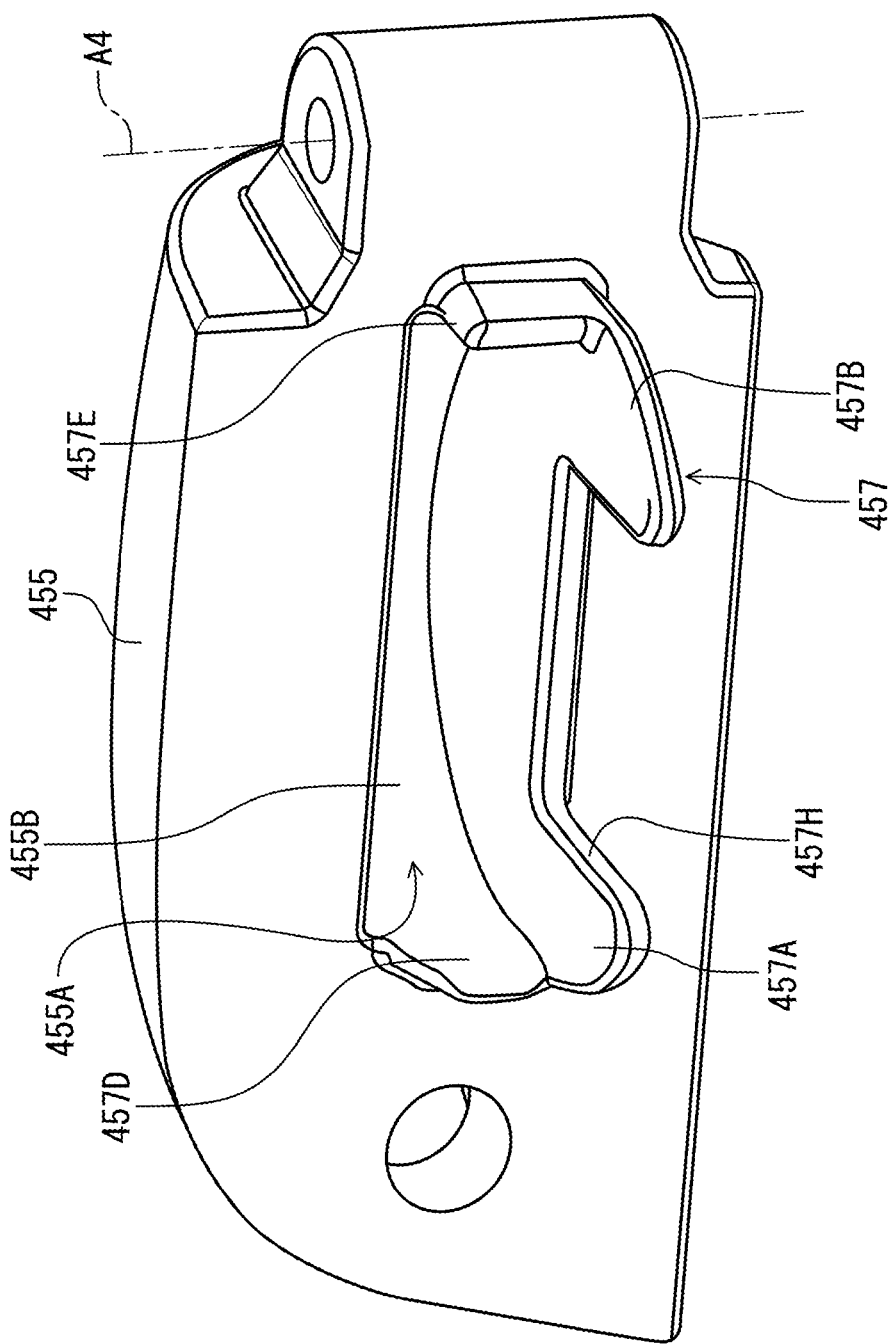
FIG. 58 is a perspective view of a holder of the accommodating structure of the operating device illustrated in FIG. 52.

As seen in FIG. 58, the holder 457 includes a first holding arm 457A and a second holding arm 457B. The first holding arm 457A protrudes from the attachment member 455 in the axial direction D2. The second holding arm 457B protrudes from the attachment member 455.

As seen in FIG. 57, the first holding arm 457A includes a first holding surface 457D contactable with the power supply 40. The second holding arm 457B includes a second holding surface 457E contactable with the power supply 40. The second holding surface 457E is spaced apart from the first holding surface 457D. The first holding surface 457D has a curved shape extending along the outer periphery of the power supply 40. The second holding surface 457E has a curved shape extending along the outer periphery of the power supply 40. However, the shapes of the first holding surface 457D and the second holding surface 457E are not limited to the curved shape.

As seen in FIG. 54, the accommodating part 444 includes an insertion opening 458 provided at an end of the accommodating part 444. In this embodiment, the circuitry accommodating part 444C includes the insertion opening 458. The accommodating space 453 includes the insertion opening 458. The circuitry 42 passes through the insertion opening 458 when the circuitry 42 is inserted into and removed from the accommodating space 453. The accommodating space 453 is open through the insertion opening 458 in a direction different from the axial direction D2 in a state where the insertion opening 458 is not covered by other members. In this embodiment, the second main body 454B includes the accommodating space 453 and the insertion opening 458. However, the positions of the accommodating space 453 and the insertion opening 458 are not limited to this embodiment.

The first main body 454A is configured to be attached to the second main body 454B to cover the insertion opening 458. In this embodiment, the first main body 454A includes an additional recess 454R. The circuitry accommodating part 444C includes the accommodating space 453 and the additional recess 454R. The circuitry 42 is provided in the accommodating space 453 and the additional recess 454R. However, the additional recess 454R can be omitted from the circuitry accommodating part 444C.

As seen in FIG. 52, the grip cover 28 is configured to be attached to the base member 412 so as to at least partly expose the accommodating structure 443 from the grip cover 28 in the state where the grip cover 28 is attached to the base member 412. In this embodiment, the grip cover 28 is configured to be attached to the base member 412 so as to partly expose the main body 454 from the grip cover 28 in the state where the grip cover 28 is attached to the base member 412. The grip cover 28 is configured to be attached to the base member 412 so as not to expose the attachment member 455 from the grip cover 28 in the state where the grip cover 28 is attached to the base member 412. However, the structure of the grip cover 28 is not limited to the above structure. The grip cover 28 can be configured to be attached to the base member 412 so as not to expose the main body 454 from the grip cover 28 in the state where the grip cover 28 is attached to the base member 412. The grip cover 28 can be configured to be attached to the base member 412 so as to at least partly expose the attachment member 455 from the grip cover 28 in the state where the grip cover 28 is attached to the base member 412.

As seen in FIG. 54, the accommodating part 444 includes a first inner surface 460 and a second inner surface 462. In this embodiment, the power-supply accommodating part 444P includes the first inner surface 460. The power-supply accommodating part 444P includes the second inner surface 462. The second inner surface 462 faces towards the first inner surface 460. The second inner surface 462 is spaced apart from the first inner surface 460. The accommodating space 452 is at least partly defined between the first inner surface 460 and the second inner surface 462. Namely, the first inner surface 460 and the second inner surface 462 are spaced apart from each other to at least partly define the accommodating space 452 between the first inner surface 460 and the second inner surface 462.

The first inner surface 460 extends along the reference plane RP41. The second inner surface 462 extends along the reference plane RP41. The reference plane RP41 is defined between the first inner surface 460 and the second inner surface 462. The first inner surface 460 and the second inner surface 462 are parallel to the reference plane RP41. However, the first inner surface 460 and the second inner surface 462 can be non-parallel to the reference plane RP41.

The first inner surface 460 extends along a first direction D441 and faces toward the second inner surface 462. The second inner surface 462 extends along the first direction D441 and faces toward the first inner surface 460. In this embodiment, the first inner surface 460 faces toward the second inner surface 462 in a second direction D442. The first direction D441 is parallel to the reference plane RP41. The second direction D442 is perpendicular to the first direction D441 and is parallel to the additional reference plane RP42. However, the relationship among the reference plane RP41, the additional reference plane RP42, the first direction D441, and the second direction D442 is not limited to this embodiment.

As seen in FIG. 54, the accommodating part 444 includes a third inner surface 464 extending between the first inner surface 460 and the second inner surface 462. In this embodiment, the power-supply accommodating part 444P includes the third inner surface 464 extending between the first inner surface 460 and the second inner surface 462. The third inner surface 464 extends in the second direction D442. The accommodating space 452 is at least partly defined by the first inner surface 460, the second inner surface 462, and the third inner surface 464. The third inner surface 464 includes a facing part 464A facing toward the insertion opening 456.

As seen in FIG. 57, the accommodating space 452 extends from the third inner surface 464 to the insertion opening 456 in the axial direction D2. The third inner surface 464 has a curved shape. The third inner surface 464 extends along an outer periphery of the power supply 40 in a state where the power supply 40 is provided in the accommodating space 452. However, the shape of the third inner surface 464 is not limited to this embodiment.

As seen in FIG. 54, the accommodating part 444 includes a first inner surface 470 and a second inner surface 472. In this embodiment, the circuitry accommodating part 444C includes the first inner surface 470. The circuitry accommodating part 444C includes the second inner surface 472. The second inner surface 472 is spaced apart from the first inner surface 470. The accommodating space 453 is at least partly defined between the first inner surface 470 and the second inner surface 472. Namely, the first inner surface 470 and the second inner surface 472 are spaced apart from each other to at least partly define the accommodating space 453 between the first inner surface 470 and the second inner surface 472.

The first inner surface 470 extends along the additional reference plane RP42. The second inner surface 472 extends along the additional reference plane RP42. The additional reference plane RP42 is defined between the first inner surface 470 and the second inner surface 472. The first inner surface 470 and the second inner surface 472 are parallel to the additional reference plane RP42. However, the first inner surface 470 and the second inner surface 472 can be non-parallel to the additional reference plane RP42.

The first inner surface 470 extends along a first direction D451 and faces toward the second inner surface 472. The second inner surface 472 extends along the first direction D451 and faces toward the first inner surface 470. In this embodiment, the first inner surface 470 faces toward the second inner surface 472 in a second direction D452. The first direction D451 is parallel to the additional reference plane RP42 and the second direction D442. The second direction D452 is perpendicular to the first direction D451 and is parallel to the reference plane RP41 and the first direction D441. However, the relationship among the reference plane RP41, the additional reference plane RP42, the first direction D441, the second direction D442, the first direction D451, and the second direction D452 is not limited to this embodiment.

The accommodating part 444 includes a third inner surface 474 extending between the first inner surface 470 and the second inner surface 472. In this embodiment, the circuitry accommodating part 444C includes the third inner surface 474 extending between the first inner surface 470 and the second inner surface 472. The third inner surface 474 extends in the second direction D452. The accommodating space 453 is at least partly defined by the first inner surface 470, the second inner surface 472, and the third inner surface 474. The third inner surface 474 includes a facing part 474A facing toward the insertion opening 458 with respect to the accommodating space 453. The circuitry accommodating part 444C extends in the first direction D451. The accommodating space 453 extends from the third inner surface 474 to the insertion opening 458 in the first direction D451.

Figure 59:
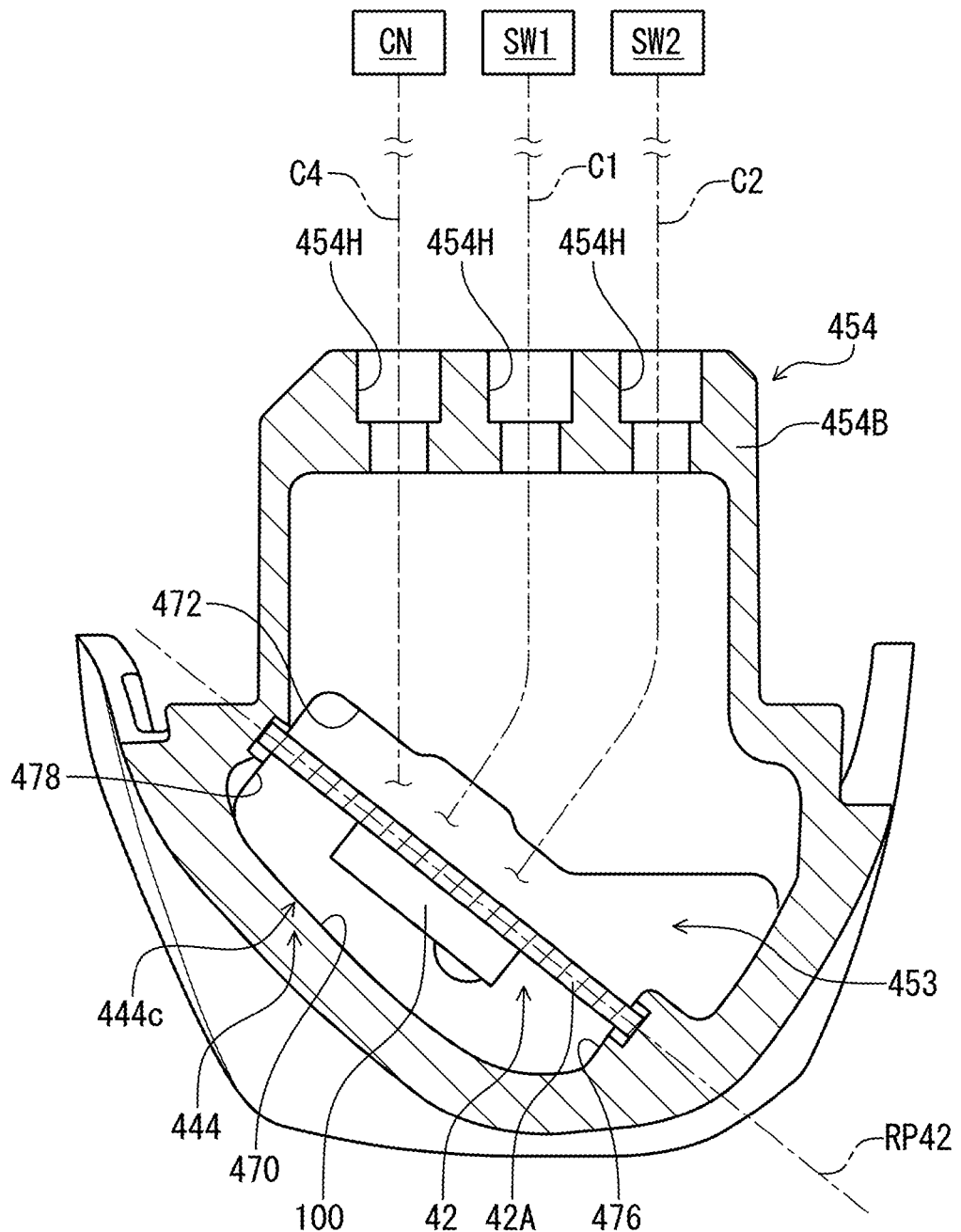
FIG. 59 is a partial cross-sectional view of the operating device taken along line LIX-LIX of FIG. 54.

As seen in FIG. 59, the accommodating part 444 includes a fourth inner surface 476 and a fifth inner surface 478. The fourth inner surface 476 extends between the first inner surface 470 and the second inner surface 472. The fifth inner surface 478 extends between the first inner surface 470 and the second inner surface 472. The fourth inner surface 476 and the fifth inner surface 478 are spaced apart from each other to at least partly define the accommodating space 453 between the fourth inner surface 476 and the fifth inner surface 478. The fourth inner surface 476 faces toward the fifth inner surface 478.

Figure 60:
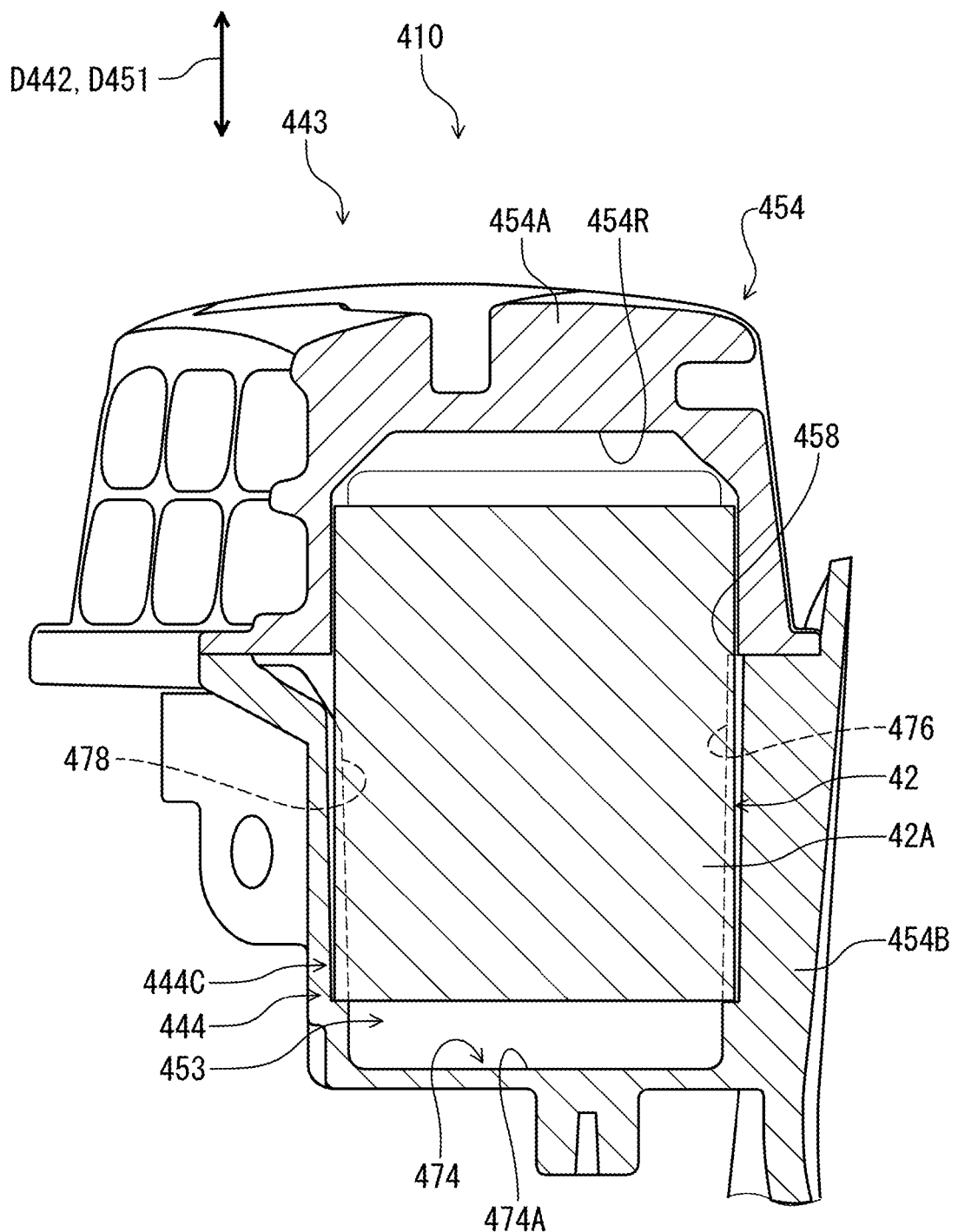
FIG. 60 is a partial cross-sectional view of the operating device taken along line LX-LX of FIG. 54.

As seen in FIG. 60, the fourth inner surface 476 extends from the third inner surface 474 to the insertion opening 458 in the first direction D451. The fifth inner surface 478 extends from the third inner surface 474 to the insertion opening 458 in the first direction D51. However, the structures of the fourth inner surface 476 and the fifth inner surface 478 are not limited to this embodiment. The third inner surface 474 extends from the fourth inner surface 476 to the fifth inner surface 478.

As seen in FIG. 57, the operating device 410 further comprises the electrical contact 80. Namely, the electric device 410 further comprises the electrical contact 80. The electrical contact 80 is configured to contact the power supply 40 in a state where the power supply 40 is provided in the accommodating part 444. The electrical contact 80 is provided in at least one of the first inner surface 460, the second inner surface 462 and the third inner surface 464 to be contactable with the power supply 40 in the state where the power supply 40 is accommodated in the accommodating part 444. The electrical contact 80 is provided in at least one of the first inner surface 460, the second inner surface 462, and the third inner surface 464 to be contactable with the power supply 40 in a state where the power supply 40 is accommodated in the power-supply accommodating part 444P. In this embodiment, the electrical contact 80 is provided in the first inner surface 460 and the third inner surface 464 to be contactable with the power supply 40 in the state where the power supply 40 is provided in the accommodating part 444. However, the position of the electrical contact 80 is not limited to this embodiment.

In this embodiment, the positive contact 82 is configured to contact the positive electrode of the power supply 40 in the state where the power supply 40 is provided in the accommodating part 444 (e.g., the power-supply accommodating part 444P). The negative contact 84 is configured to contact the negative electrode of the power supply 40 in the state where the power supply 40 is provided in the accommodating part 444 (e.g., the power-supply accommodating part 444P). The positive contact 82 is provided in the first inner surface 460 to be contactable with the power supply 40 in the state where the power supply 40 is provided in the accommodating part 444 (e.g., the power-supply accommodating part 444P). The negative contact 84 is provided in the first inner surface 460 to be contactable with the power supply 40 in the state where the power supply 40 is provided in the accommodating part 444 (e.g., the power-supply accommodating part 444P). However, the positions of the positive contact 82 and the negative contact 84 are not limited to this embodiment.

The holder 457 includes a recess 457H. The recess 45711 is provided between the first holding arm 457A and the second holding arm 457B to avoid interference between the holder 457 and the electrical contact 80. The electrical contact 80 is at least partly provided in the recess 457H in a state where the holder 457 is provided in the power-supply accommodating part 444P. At least one of the positive contact 82 and the negative contact 84 is at least partly provided in the recess 457H in the state where the holder 457 is provided in the power-supply accommodating part 444P. In this embodiment, the negative contact 84 is partly provided in the recess 457H in the state where the holder 457 is provided in the power-supply accommodating part 444P. However, the positional relationship between the holder 457 and the electrical contact 80 is not limited to this embodiment.

As seen in FIG. 59, the main body 454 includes a plurality of through-holes 454H. In this embodiment, the second main body 454B includes the plurality of through-holes 454H. The electric cable C1 extends through one of the plurality of through-hole 454H to connect the switch SW1 to the circuitry 42. The electric cable C2 extends through one of the plurality of through-holes 454H to connect the switch SW2 to the circuitry 42. The electric cable C4 extends through one of the plurality of through-holes 454H to connect the connector CN to the circuitry 42.

As seen in FIG. 54, at least one of the reference plane RP41 and the additional reference plane RP42 extends along the pivot axis A1. At least one of the reference plane RP41 and the additional reference plane RP42 intersects with the pivot axis A1. In this embodiment, the reference plane RP41 extends along the pivot axis A1. The reference plane RP41 is parallel to the pivot axis A1. The additional reference plane RP42 intersects with the pivot axis A1. The additional reference plane RP42 is perpendicular to the pivot axis A1. However, at least one of the reference plane RP41 and the additional reference plane RP42 can be inclined relative to the pivot axis A1.

Figure 61:
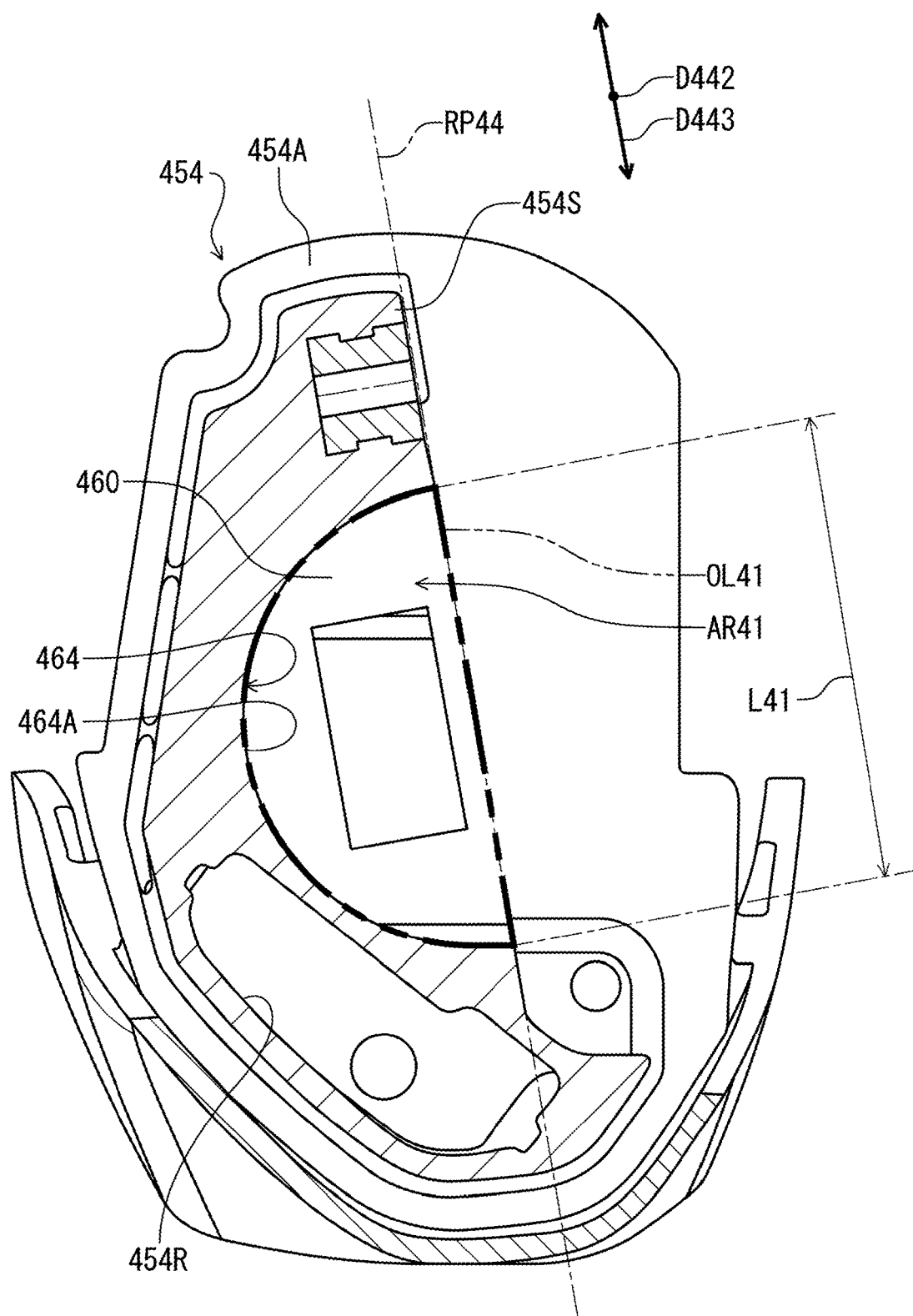
FIG. 61 is a partial cross-sectional view of a main body of the accommodating structure of the operating device taken along line LXI-LXI of FIG. 54.

As seen in FIG. 61, the first inner surface 460 has a first outline OL41. The first outline OL41 defines a first area AR41 as viewed in a direction perpendicular to the reference plane RP41 (see, e.g., FIG. 54). In this embodiment, the first outline OL41 defines the first area AR41 as viewed in the second direction D442 perpendicular to the reference plane RP41 (see, e.g., FIG. 54).

Figure 62:
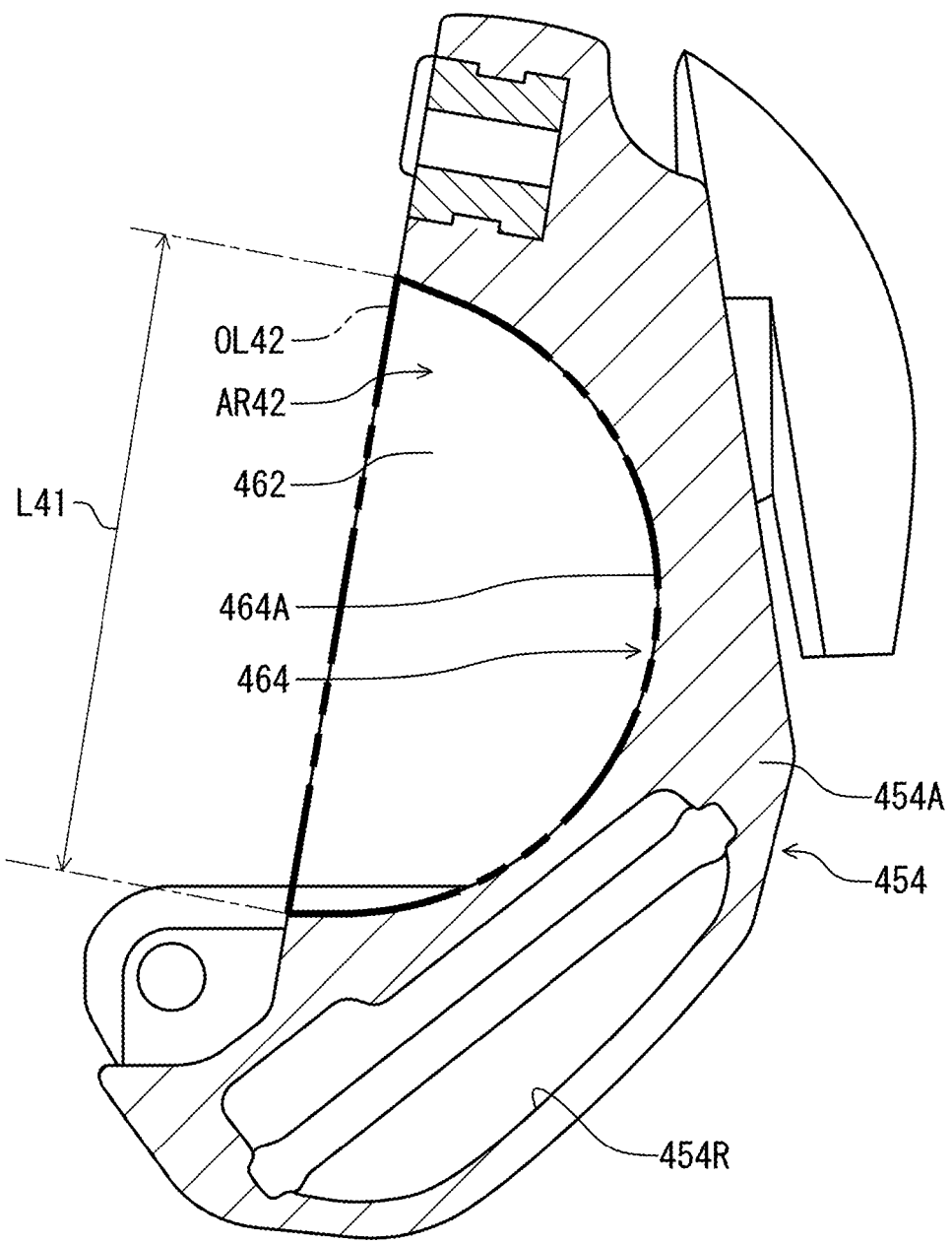
FIG. 62 is a partial cross-sectional view of the main body of the accommodating structure of the operating device taken along line LXII-LXII of FIG. 54.

As seen in FIG. 62, the second inner surface 462 has a second outline OL42. The second outline OL42 defines a second area AR42 as viewed in the direction perpendicular to the reference plane RP41 (see, e.g., FIG. 54). In this embodiment, the second outline OL42 defines the second area AR42 as viewed in the second direction D442 perpendicular to the reference plane RP41 (see, e.g., FIG. 54).

Figure 63:
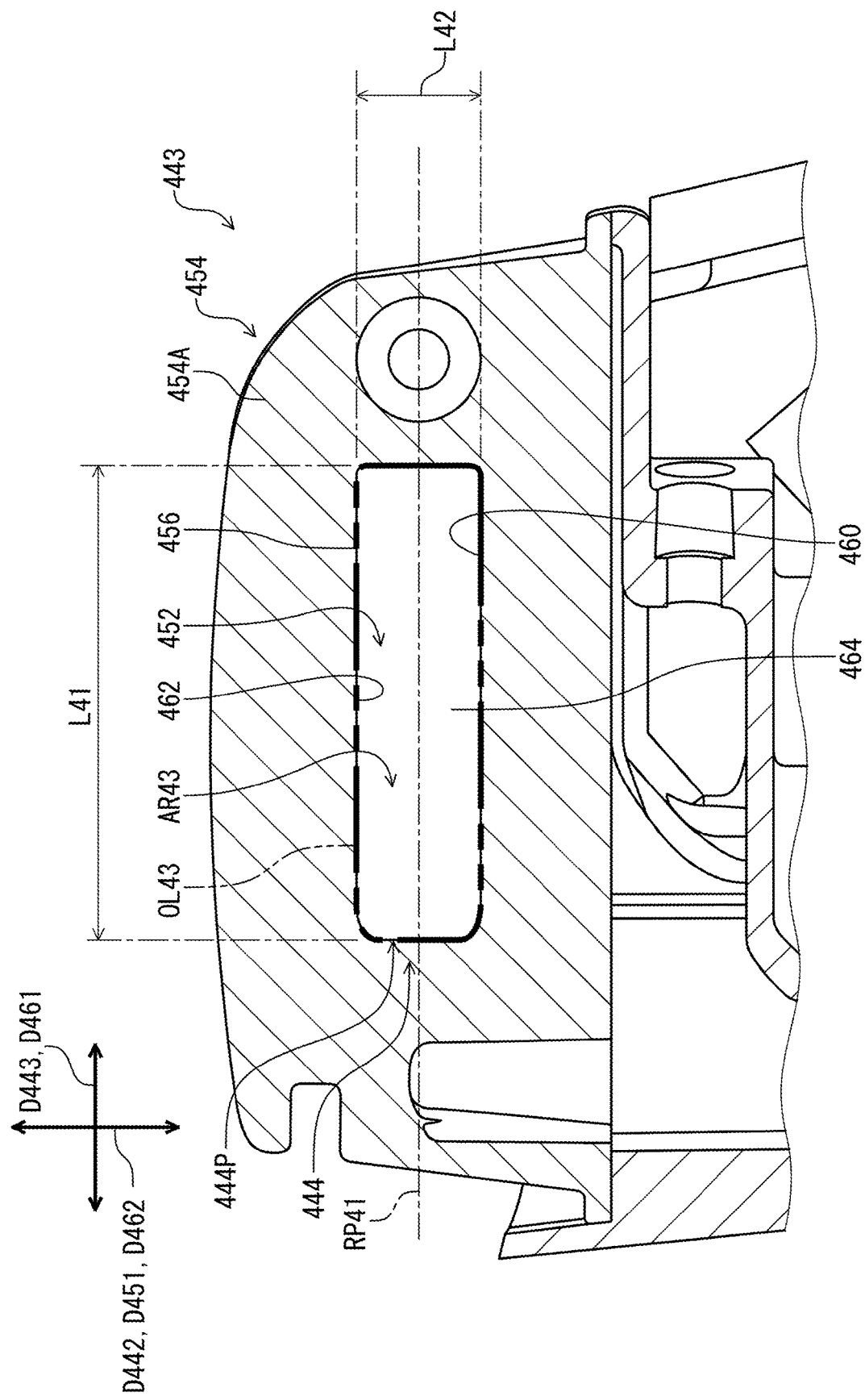
FIG. 63 is a partial cross-sectional view of the main body of the accommodating structure of the operating device taken along line LXIII-LXIII of FIG. 54.

As seen in FIG. 63, the third inner surface 464 has a third outline OL43. The third outline OL43 defines a third area AR43 as viewed in a direction parallel to the reference plane RP41. In this embodiment, the third outline OL43 defines the third area AR43 as viewed in the first direction D441 parallel to the reference plane RP41.

As seen in FIG. 57, the insertion opening 456 extends along an insertion opening plane RP44. In this embodiment, the insertion opening plane RP44 extends in a third direction D443 perpendicular to the second direction D442. The main body 454 includes an attachment surface 454S. The seal member 443A is in contact with the attachment surface 454S in a state where the seal member 443A is attached to the main body 454. The insertion opening plane RP44 is defined on the attachment surface 454S.

Figure 64:
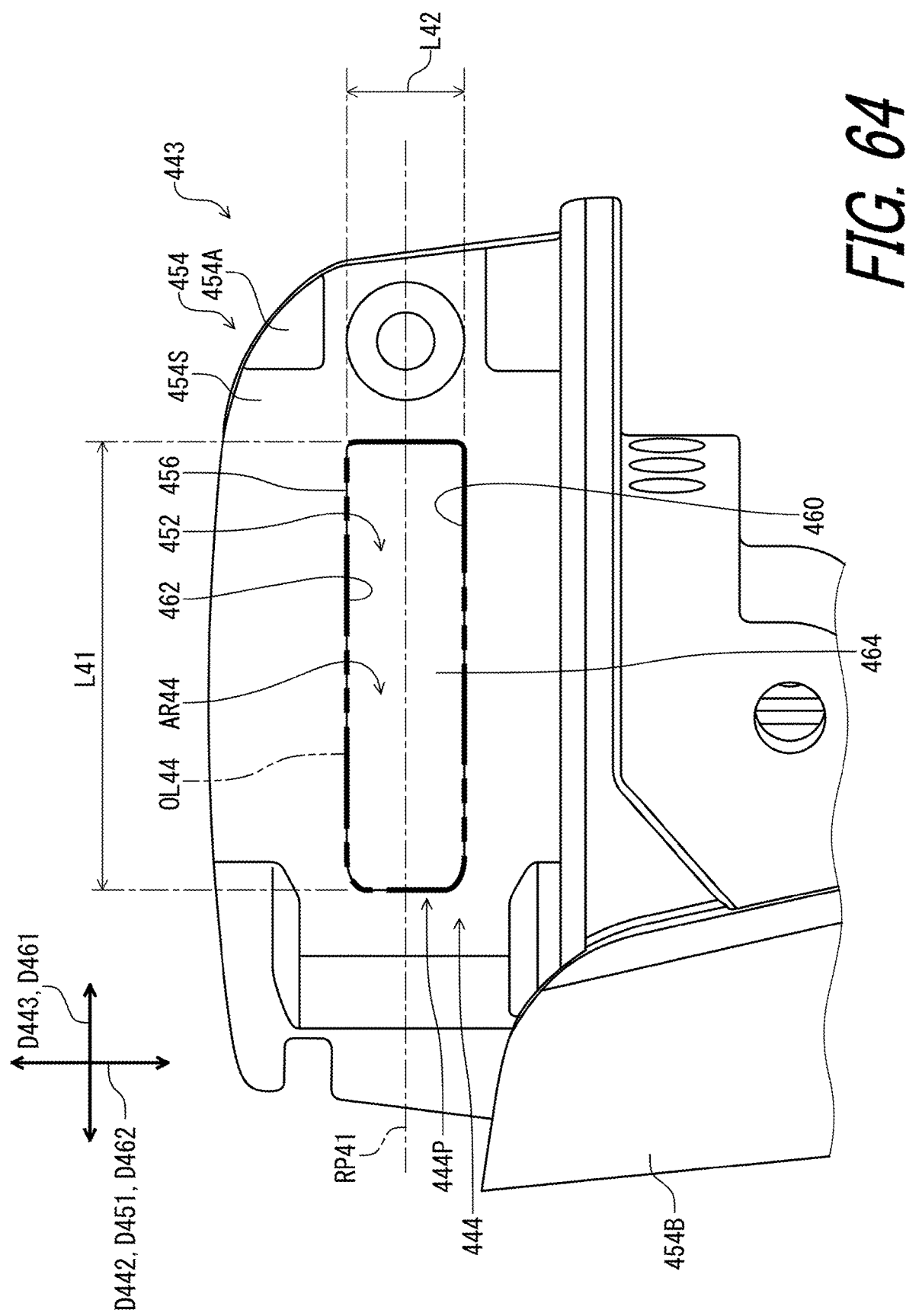
FIG. 64 is a side elevational view of the main body of the accommodating structure illustrated in FIG. 54.

As seen in FIG. 64, the insertion opening 456 has an opening outline OL44. The opening outline OL44 defines an insertion opening area AR44 as viewed in a direction perpendicular to the insertion opening plane RP44 (see, e.g., FIG. 57). The insertion opening area AR44 is defined between the first inner surface 460 and the second inner surface 462. In this embodiment, the opening outline OL44 defines the insertion opening area AR44 as viewed in the first direction D441 perpendicular to the insertion opening plane RP44 (see, e.g., FIG. 57).

The insertion opening area AR44 has a first length L41 and a second length L42. The first length L41 is defined in a first length direction D461 parallel to the reference plane RP41. The first length L41 is defined from the first guide groove 469A to the second guide groove 469B in the first length direction D461. Thus, the first length L41 of the insertion opening 456 is equal to a length of the power-supply accommodating part 444P defined in the first length direction D461.

The second length L42 is defined in a second length direction D462 perpendicular to the first length direction D461. The second length L42 is defined from the first inner surface 460 to the second inner surface 462 in the second length direction D462. In this embodiment, the first length L41 is longer than the second length L42. However, the first length L41 can be equal to or shorter than the second length L42.

As seen in FIG. 57, the power-supply accommodating part 444P has a third length L43 defined in a third length direction D463 perpendicular to the first length direction D461 and parallel to the reference plane RP41. The third length L43 is defined as a maximum depth of the power-supply accommodating part 444P. Specifically, the third length L43 is defined as a maximum depth of the accommodating space 452 of the power-supply accommodating part 444P. The accommodating space 452 is at least partly defined by the third inner surface 464 and the inner surface 455B of the attachment member 455. The third length L43 is defined between the third inner surface 464 and the inner surface 455B. The third length direction D463 is inclined relative to the axial direction D2. The third length L43 is longer than the second length L42. However, the third length L43 can be equal to or shorter than the second length L42.

As seen in FIGS. 61 and 64, the first area AR41 is larger than the insertion opening area AR44. However, the first area AR41 can be equal to or smaller than the insertion opening area AR44.

As seen in FIGS. 62 and 64, the second area AR42 is larger than the insertion opening area AR44. However, the second area AR42 can be equal to or smaller than the insertion opening area AR44.

As seen in FIGS. 61 and 63, the first area AR41 is larger than the third area AR43. However, the first area AR41 can be equal to or smaller than the third area AR43.

Modifications

Figure 65:
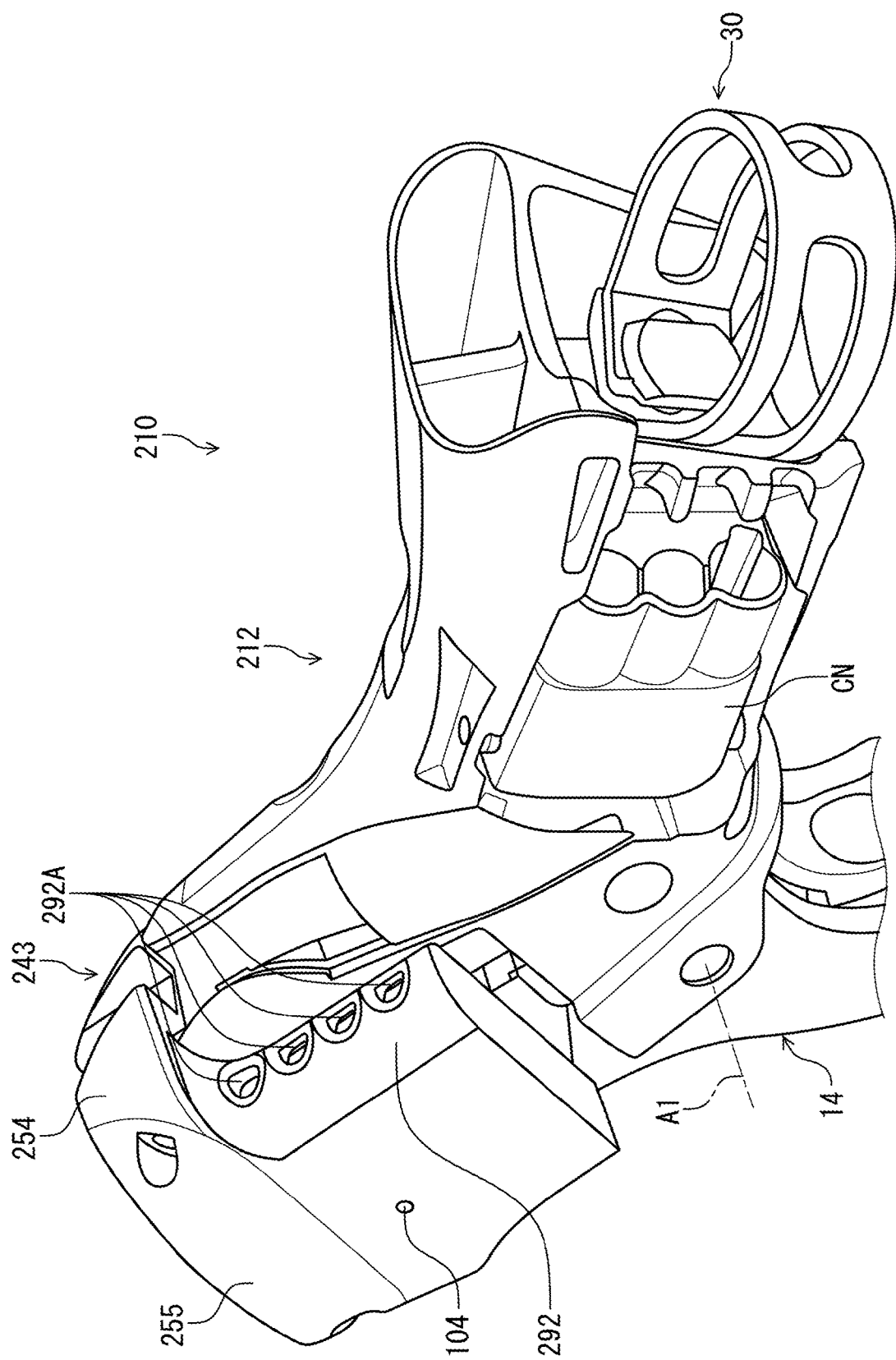
FIG. 65 is a perspective view of an operating device in accordance with a modification.

The accommodating structure 243 of the second embodiment can be modified to the structure illustrated in FIG. 65. In this modification, the additional attachment member 292 is integrally provided with the main body 254 as a one-piece unitary member. The plurality of through-hole 292A is directly provided on the main body 254 of the accommodating structure 243.

Figure 66:
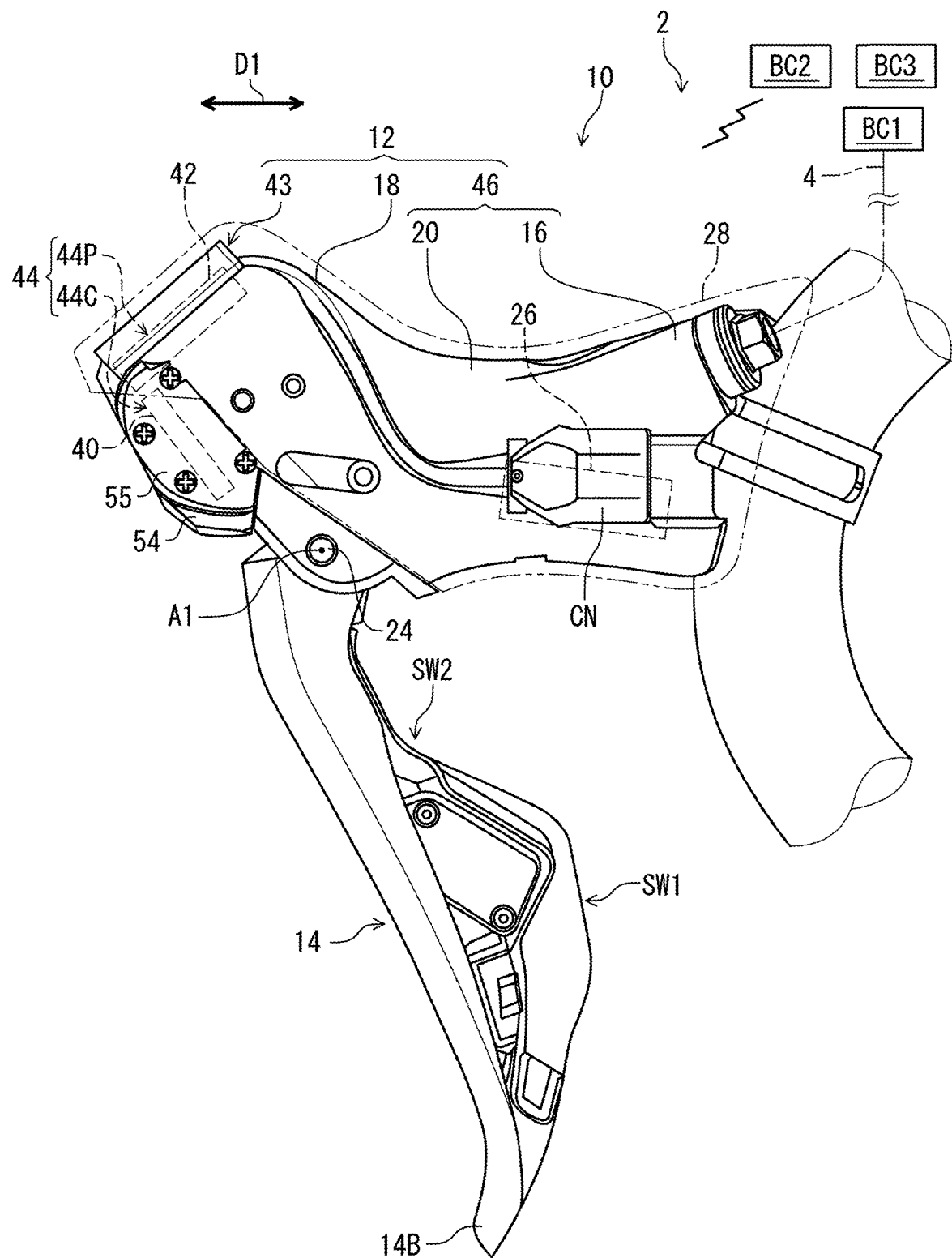
FIG. 66 is a side elevational view of an operating device in accordance with another modification.

In the operating device 10 of the first embodiment illustrated in FIG. 2, the power supply 40 is partly provided above the circuitry 42 in the mounting state where the first end portion 16 is coupled to the handlebar 3. As seen in the operating device 10 illustrated in FIG. 66, however, the circuitry 42 can be at least partly provided above the power supply 40 in the mounting state where the first end portion 16 is coupled to the handlebar 3. The circuitry 42 can be at least partly provided above the power-supply accommodating part 44P in the mounting state where the first end portion 16 is coupled to the handlebar 3.

Figure 67:
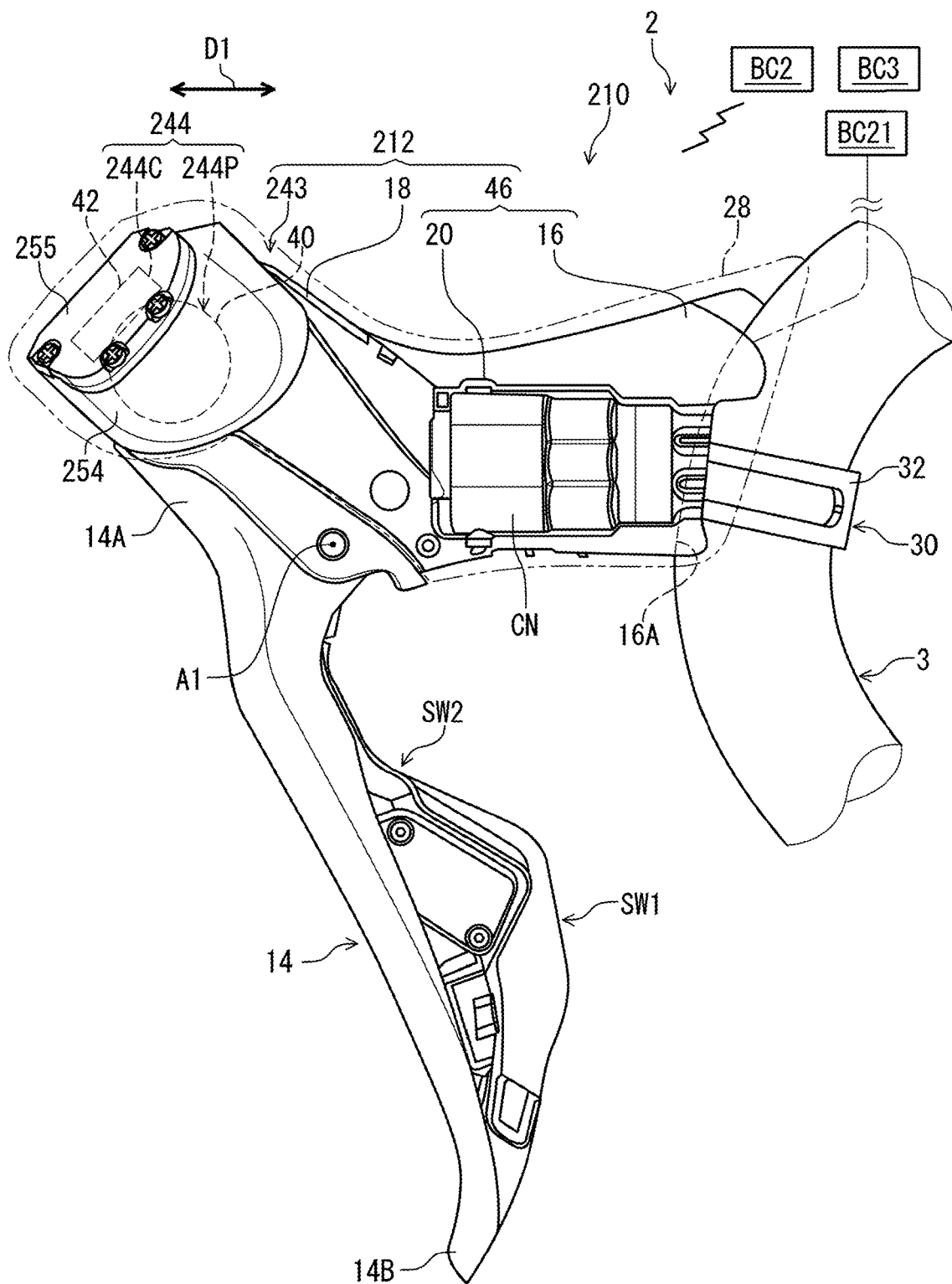
FIG. 67 is a side elevational view of an operating device in accordance with another modification.

In the operating device 210 of the second embodiment illustrated in FIG. 23, the power supply 40 is partly provided above the circuitry 42 in the mounting state where the first end portion 16 is coupled to the handlebar 3. As seen in the operating device 210 illustrated in FIG. 67, however, the circuitry 42 can be at least partly provided above the power supply 40 in the mounting state where the first end portion 16 is coupled to the handlebar 3. The circuitry 42 can be at least partly provided above the power-supply accommodating part 244P in the mounting state where the first end portion 16 is coupled to the handlebar 3.

Figure 68:
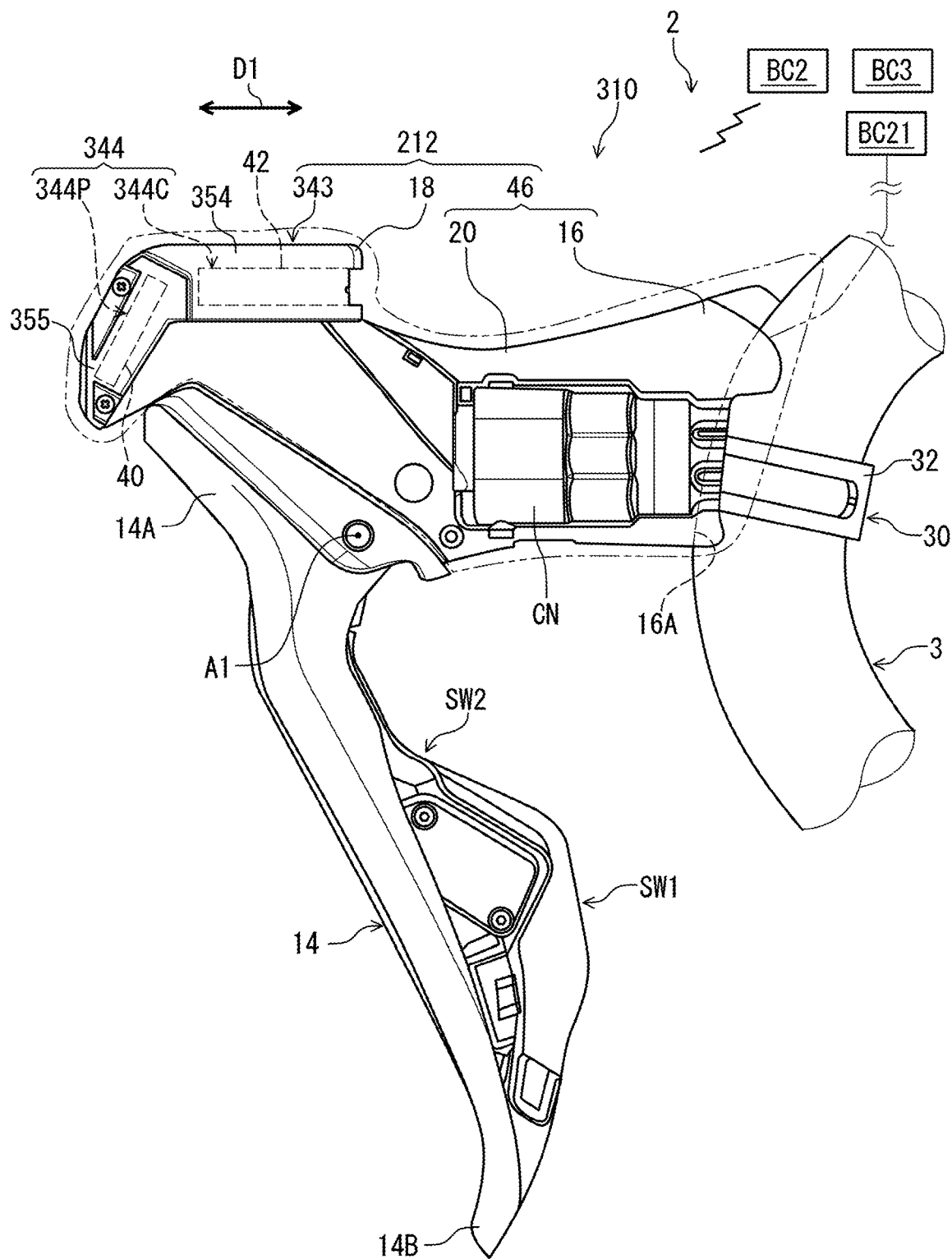
FIG. 68 is a side elevational view of an operating device in accordance with another modification.

In the operating device 310 of the third embodiment illustrated in FIG. 39, the power supply 40 is partly provided above the circuitry 42 in the mounting state where the first end portion 16 is coupled to the handlebar 3. As seen in the operating device 310 illustrated in FIG. 68, however, the circuitry 42 can be at least partly provided above the power supply 40 in the mounting state where the first end portion 16 is coupled to the handlebar 3. The circuitry 42 can be at least partly provided above the power-supply accommodating part 344P in the mounting state where the first end portion 16 is coupled to the handlebar 3.

Figure 69:
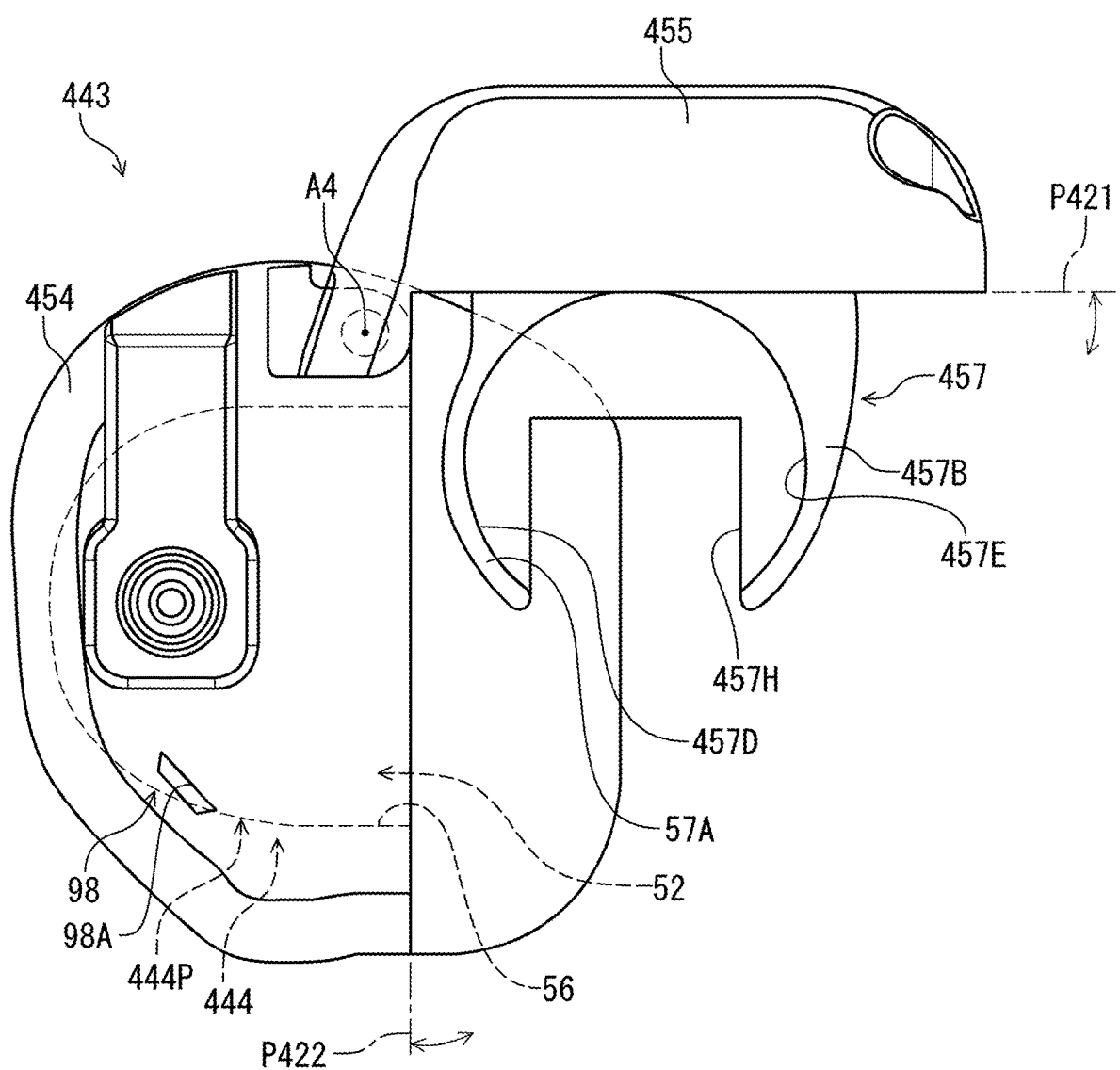
FIG. 69 is a top elevational view of an accommodating structure of an operating device in accordance with another modification.

In the operating device 410 of the forth embodiment illustrated in FIG. 56, the additional pivot axis A4 is provided on a front side of the attachment member 455 in the closed state where the attachment member 455 is in the closed position P422. As seen in FIG. 69, however, the additional pivot axis A4 can be provided on a rear side of the attachment member 455 in the closed state where the attachment member 455 is in the closed position P422. The pivotally coupling structures of both the accommodating structure 443 and the modification of FIG. 69 can apply to the first to third embodiments and the modifications illustrated in FIGS. 65 to 68.

Figure 70:
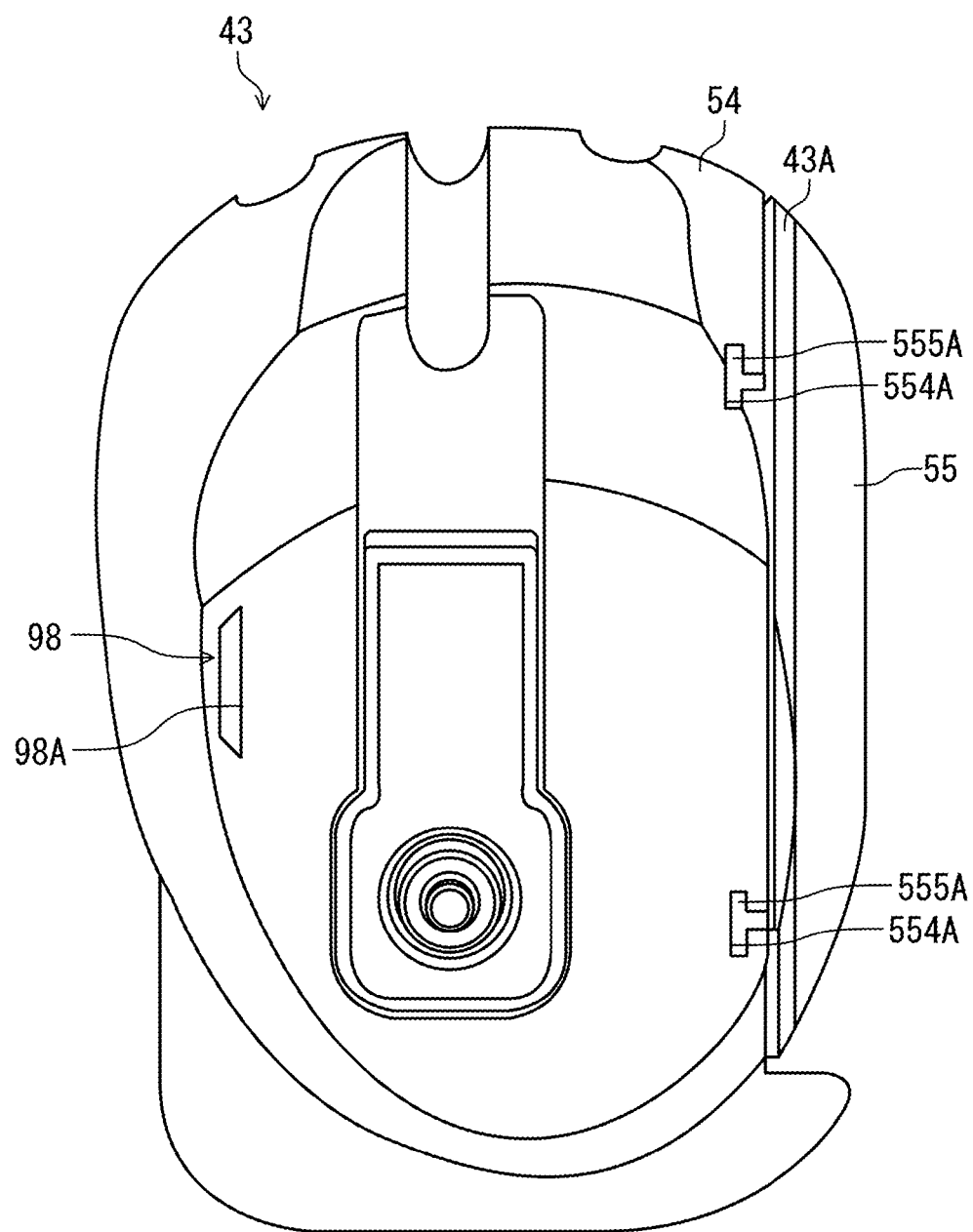
FIG. 70 is a top elevational view of an accommodating structure of an operating device in accordance with another modification.
Figure 71:
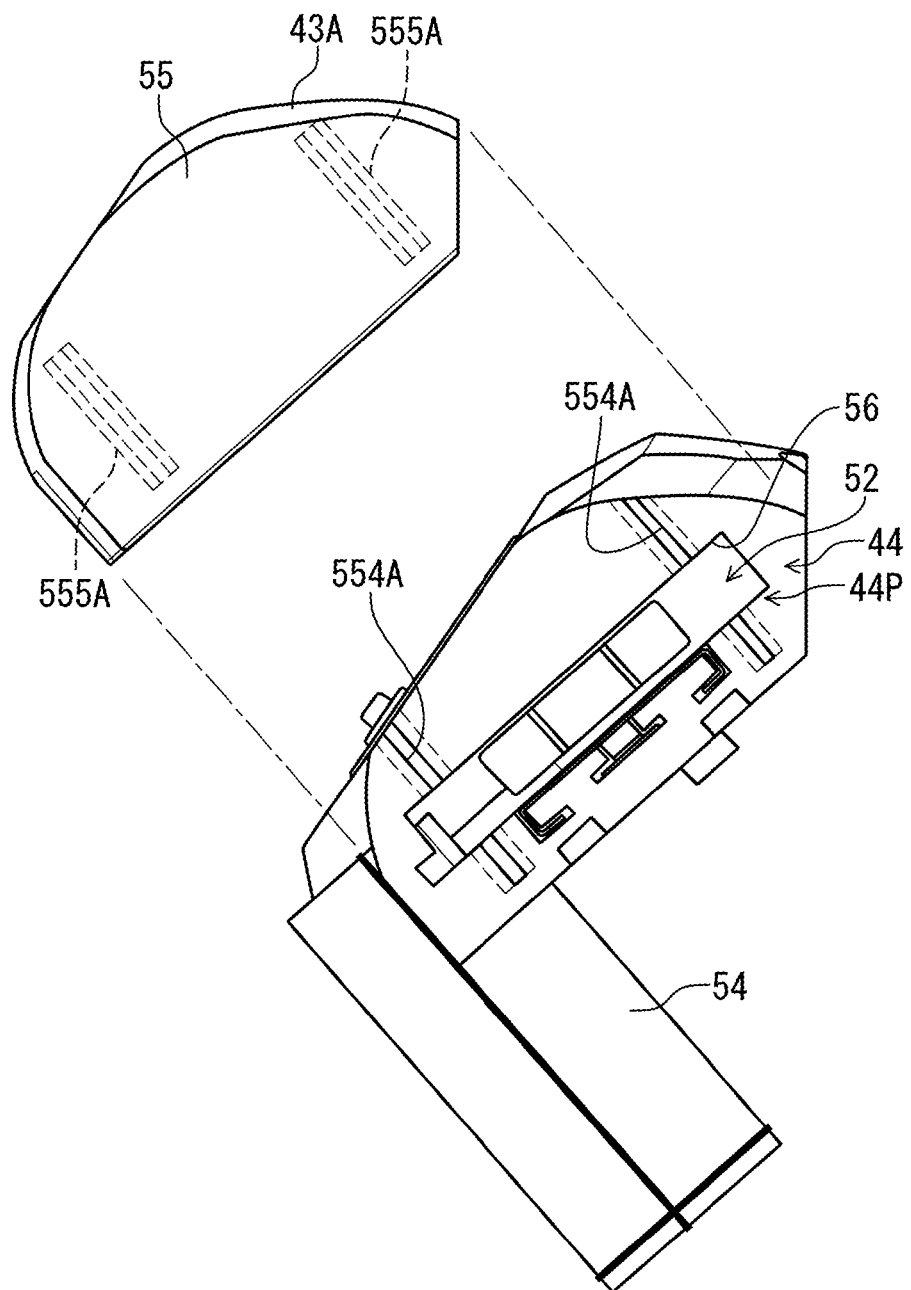
FIG. 71 is an exploded side elevational view of the accommodating structure of the operating device illustrated in FIG. 70.

Furthermore, as seen in FIGS. 70 and 71, the attachment member 55 can be slidably attached to the main body 54. In this modification, the attachment member 55 includes one of a guide groove 554A and a guide portion 555A. The main body 54 includes the other of the guide groove 554A and the guide portion 555A. In the illustrated modification, the attachment member 55 includes the plurality of guide portions 555A. The main body 54 includes the plurality of guide grooves 554A. The guide portion 555A is inserted into the guide groove 554A when the attachment member 55 is attached to the main body 54. The seal member 43A is secured to the attachment member 55. This structure can apply to the second to fourth embodiments and the modifications illustrated in FIGS. 65 to 68.

Figure 72:
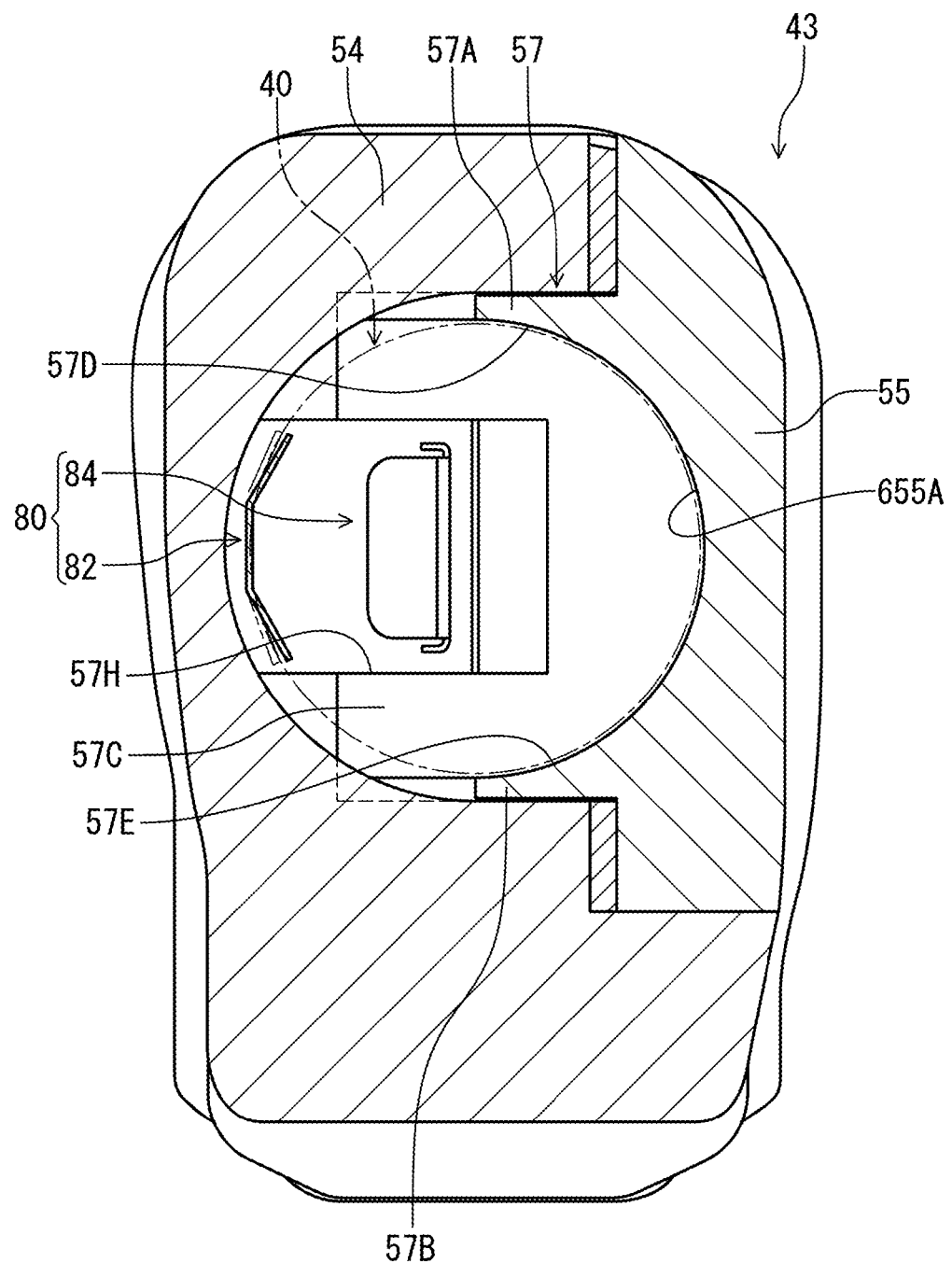
FIG. 72 is a partial cross-sectional view of an accommodating structure of an operating device in accordance with another modification.

In the operating device 10 of the first embodiment illustrated in FIG. 2, the power-supply accommodating part 44P is provided to only the main body 54. As seen in FIG. 72, however, the power-supply accommodating part 44P can be provided to both the main body 54 and the attachment member 55. In this modification, the attachment member 55 includes an additional recess 655A. The power supply 40 is partly provided in the additional recess 655A in a state where the attachment member 55 is attached to the main body 54. This structure can apply to the second to fourth embodiments and the modifications illustrated in FIGS. 65 to 68.

Figure 73:
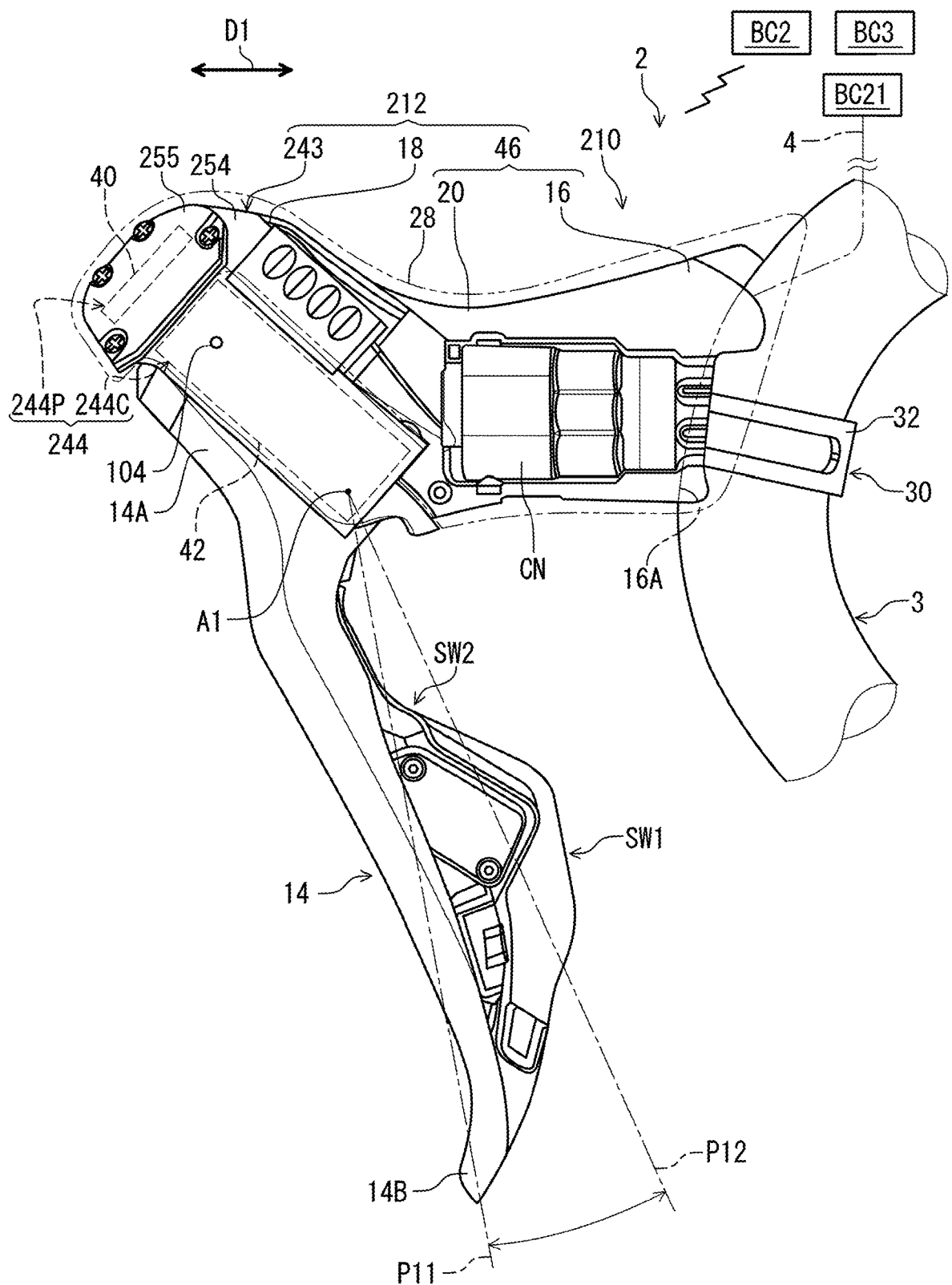
FIG. 73 is a side elevational view of an operating device in accordance with another modification.

In the operating device 210 of the second embodiment illustrated in FIG. 23, the power-supply accommodating part 244P and the circuitry 42 do not overlap with the pivot axis A1 when viewed from a first direction extending along the pivot axis A1. As seen in FIG. 73, however, one of the power-supply accommodating part 244P and the circuitry 42 can at least partly overlap with the pivot axis A1 when viewed along the pivot axis A1. In the illustrated modification, the circuitry 42 overlaps with the pivot axis A1 when viewed along the pivot axis A1 while the power-supply accommodating part 244P does not overlap with the pivot axis A1 when viewed along the pivot axis A1. The circuitry accommodating part 244C overlaps with the pivot axis A1 when viewed along the pivot axis A1. This structure can apply to the modifications of FIGS. 65 and 67.

Figure 74:
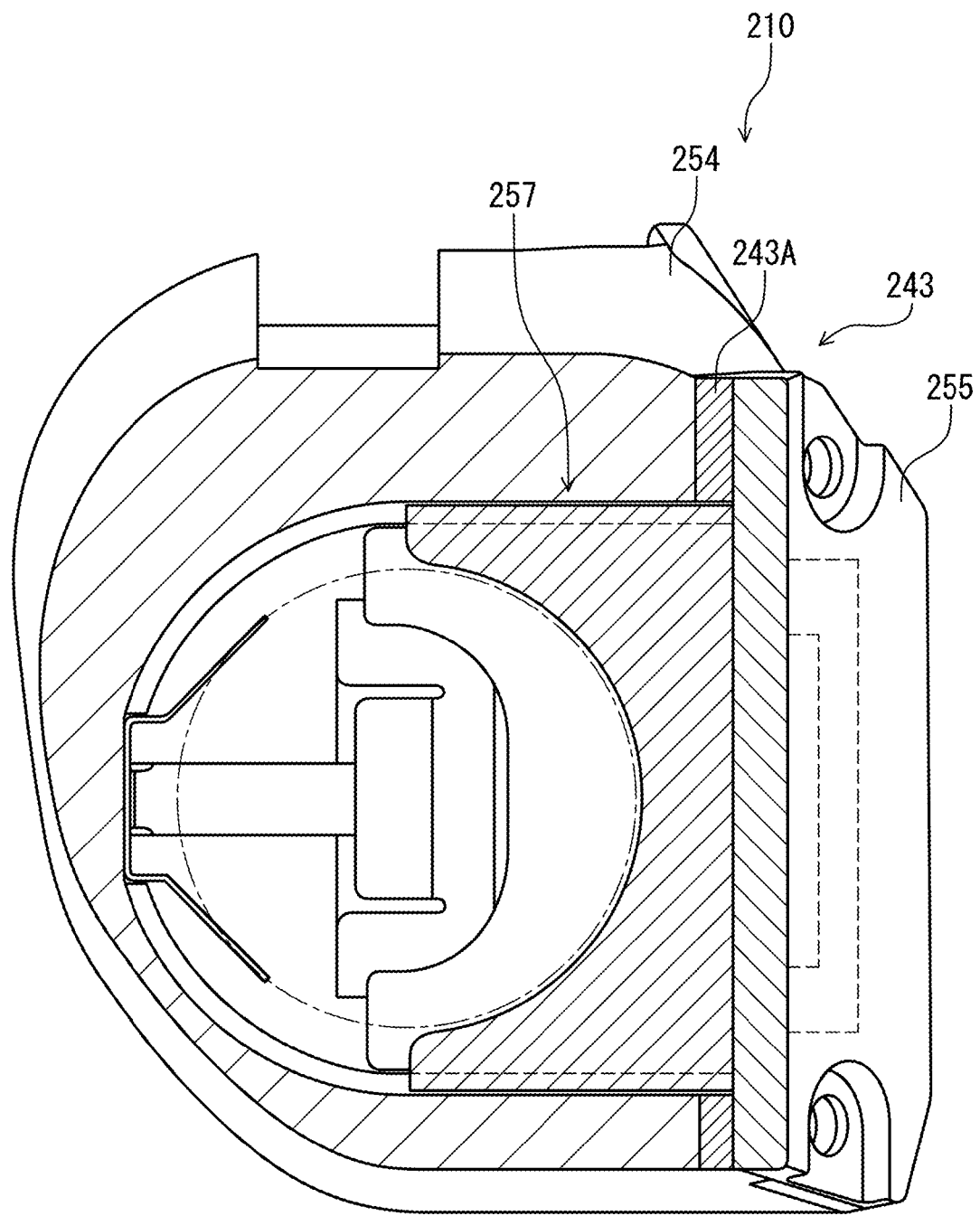
FIG. 74 is a partial cross-sectional view of an operating device in accordance with another modification.

In the operating device 210 of the second embodiment illustrated in FIG. 28, the holder 257 is integrally provided with the attachment member 255 as a one-piece unitary member. As seen in FIG. 74, however, the holder 257 can be a separate member from the attachment member 255. The holder 257 can be integrally provided with the main body 254 as a one-piece unitary member. This structure can apply to the first, third, and fourth embodiments and the modifications of FIGS. 65 and 73.

Figure 75:
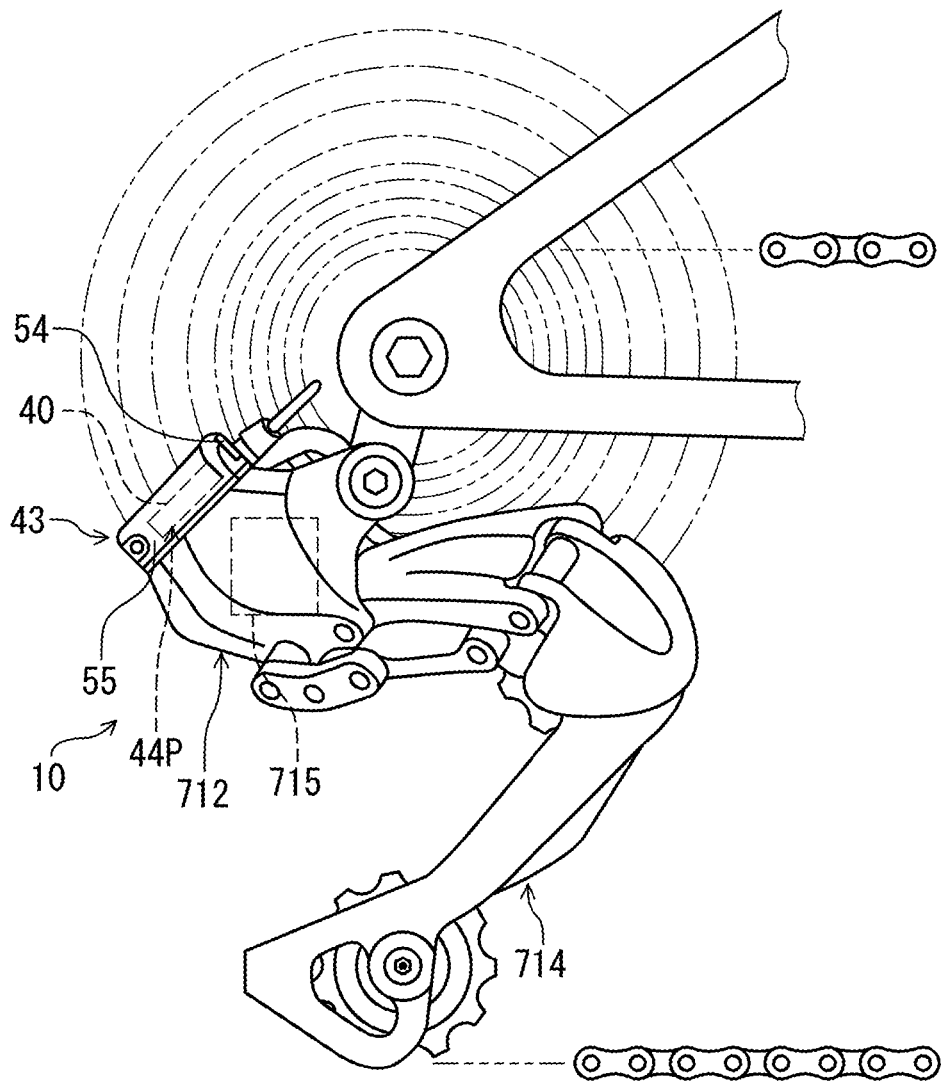
FIG. 75 is a side elevational view of an electric device in accordance with another modification.

In the electric device 10 of the first embodiment illustrated in FIG. 2, the electric device 10 comprises the operating member 14. However, the electric device 10 can comprise at least one of an operating member and an operated member. The electric device can include at least one of a derailleur, a suspension, an adjustable seatpost, a brake device, a lighting device, and a display device. As seen in FIG. 75, for example, an electric device 710 can include a derailleur. The electric device 710 comprise a base member 712, an operated member 714, and an actuator 715. The operated member 714 is movably coupled to the base member 712. The actuator 715 is configured to move the operated member 714 relative to the base member 712. The accommodating structure 43 is secured to the base member 712. The power supply 40 is accommodated in the accommodating structure 43 and is configured to supply electricity to the actuator 715. This structure can apply to the first to fourth embodiments and the modifications illustrated in FIGS. 65 to 74.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
a base member including a power-supply accommodating part configured to accommodate a power supply extending along a reference plane;
circuitry provided on the base member to extend along an additional reference plane intersecting with the reference plane; and
an operating member pivotally coupled to the base member about a pivot axis, wherein
the circuitry includes a circuit board provided to the base member to extend along the additional reference plane,
the base member includes
a first end portion configured to be coupled to a handlebar, and
a second end portion opposite to the first end portion, and
the circuit board is at least partly provided farther from the first end portion than the pivot axis is from the first end portion.

2. The operating device according to claim 1, wherein
the reference plane and the additional reference plane intersect with each other to define an intersection angle, and the intersection angle is equal to or smaller than 150 degrees.

3. The operating device according to claim 2, wherein the intersection angle is equal to or larger than 30 degrees.

4. The operating device according to claim 1, wherein at least one of the reference plane and the additional reference plane extends along the pivot axis.

5. The operating device according to claim 1, wherein at least one of the reference plane and the additional reference plane intersects with the pivot axis.

6. The operating device according to claim 1, wherein
the base member includes
a grip portion provided between the first end portion and the second end portion.

7. An operating device for a human-powered vehicle, comprising:
a base member including a power-supply accommodating part configured to accommodate a power supply extending along a reference plane;
circuitry provided to the base member to extend along an additional reference plane intersecting with the reference plane; and
an operating member pivotally coupled to the base member about a pivot axis, wherein
the base member includes
a first end portion configured to be coupled to a handlebar,
a second end portion opposite to the first end portion, and
a grip portion provided between the first end portion and the second end portion, and
the circuitry is at least partly provided at the second end portion of the base member and is at least partly provided farther from the first end portion than the pivot axis is from the first end portion.

8. The operating device according to claim 6, wherein
one of the power-supply accommodating part and the circuitry is at least partly provided above the other of the power-supply accommodating part and the circuitry in a mounting state where the first end portion is coupled to the handlebar.

9. The operating device according to claim 6, wherein
one of the power-supply accommodating part and the circuitry at least partly overlaps with the pivot axis when viewed along the pivot axis.

10. The operating device according to claim 6, wherein
one of the power-supply accommodating part and the circuitry is closer to the operating member than the other of the power-supply accommodating part and the circuitry.

11. The operating device according to claim 1, wherein
the base member includes a first lateral surface and a second lateral surface,
the second lateral surface is provided on a reverse side of the first lateral surface along the pivot axis, and
one of the power-supply accommodating part and the circuitry is at least partly provided on one of the first lateral surface and the second lateral surface.

12. An operating device for a human-powered vehicle, comprising:
a base member including a power-supply accommodating part configured to accommodate a power supply extending along a reference plane; and
circuitry provided to the base member to extend along an additional reference plane intersecting with the reference plane, wherein the power-supply accommodating part includes
- a first inner surface extending along the reference plane and having a first outline defining a first area as viewed in a direction perpendicular to the reference plane, and
- an insertion opening extending along an insertion opening plane non-parallel to the reference plane, the insertion opening having an opening outline defining an insertion opening area viewed in a direction perpendicular to the insertion opening plane, and the first area is larger than the insertion opening area.

13. The operating device according to claim 12, wherein
the power-supply accommodating part includes an accommodating space and a second inner surface extending along the reference plane,
the insertion opening area is defined between the first inner surface and the second inner surface, and
the accommodating space is at least partly defined between the first inner surface and the second inner surface.

14. The operating device according to claim 13, wherein
the power-supply accommodating part includes a third inner surface extending between the first inner surface and the second inner surface,
the power-supply accommodating part is at least partly defined by the first inner surface, the second inner surface, and the third inner surface, and
the third inner surface includes a facing part facing toward the insertion opening.

15. The operating device according to claim 14, further comprising
an electrical contact provided in at least one of the first inner surface, the second inner surface, and the third inner surface to be contactable with the power supply in a state where the power supply is accommodated in the power-supply accommodating part.

16. The operating device according to claim 1, wherein
the circuitry includes at least one of a communicator, an antenna, an informing unit, and a controller.

17. The operating device according to claim 1, wherein
the circuitry is mounted to the base member.

18. The operating device according to claim 1, wherein
the base member includes a circuitry accommodating part configured to accommodate the circuitry extending along the additional reference plane.

19. The operating device according to claim 1, wherein
the reference plane extends parallel to the pivot axis.

20. The operating device according to claim 7, wherein
the power-supply accommodating part is at least partly provided at the second end portion of the base member and is at least partly provided farther from the first end portion than the pivot axis is from the first end portion.

* * * * *